US012676927B2

(12) United States Patent
Yang et al.

(10) Patent No.: US 12,676,927 B2
(45) Date of Patent: Jul. 7, 2026

(54) PHONE USER INTERFACE

(71) Applicant: Apple Inc., Cupertino, CA (US)

(72) Inventors: Lawrence Y. Yang, Bellevue, WA (US); Imran Chaudhri, San Francisco, CA (US); Anton M. Davydov, Gilroy, CA (US); Alan C. Dye, San Francisco, CA (US); Dylan Ross Edwards, San Jose, CA (US); Christopher Patrick Foss, San Francisco, CA (US); Jonathan P. Ive, San Francisco, CA (US); Zachery Kennedy, Marina Del Rey, CA (US); Stephen O. Lemay, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 18/200,480

(22) Filed: May 22, 2023

(65) Prior Publication Data

US 2023/0291824 A1 Sep. 14, 2023

Related U.S. Application Data

(63) Continuation of application No. 17/013,778, filed on Sep. 7, 2020, now Pat. No. 11,700,326, which is a
(Continued)

(51) Int. Cl.
*H04M 1/60* (2006.01)
*G06F 1/16* (2006.01)
(Continued)

(52) U.S. Cl.
CPC .......... *H04M 1/6066* (2013.01); *G06F 1/163* (2013.01); *G06F 3/04842* (2013.01);
(Continued)

(58) Field of Classification Search
CPC ........... H04M 1/6066; H04M 1/72412; H04M 1/72469; H04M 1/72484; H04M 3/428;
(Continued)

(56) References Cited

U.S. PATENT DOCUMENTS 3,148,500 A 9/1964 Hayes
4,174,606 A 11/1979 Masuda et al.
(Continued)

FOREIGN PATENT DOCUMENTS

AR 060465 A1 6/2008
AU 2007100826 A4 9/2007
(Continued)

OTHER PUBLICATIONS

Corrected Notice of Allowance received for U.S. Appl. No. 16/935,002, mailed on Jul. 17, 2023, 5 pages.
(Continued)

*Primary Examiner* — Zhitong Chen
(74) *Attorney, Agent, or Firm* — YHE Law LLP

(57) ABSTRACT

An electronic device having a user interface for accessing phone features. The user interface accounts for whether the electronic device is connected to a companion cellular phone. The user interface accounts for a headset is available for use to carry on a call. The user interface permits transition between using one or more of cellular phone, headset, and/or the electronic device to be used for carrying on incoming or outgoing calls.

39 Claims, 54 Drawing Sheets

Related U.S. Application Data continuation of application No. 16/259,954, filed on Jan. 28, 2019, now Pat. No. 10,771,606, which is a continuation of application No. 14/841,614, filed on Aug. 31, 2015, now Pat. No. 10,320,963.

(60) Provisional application No. 62/129,853, filed on Mar. 8, 2015, provisional application No. 62/044,939, filed on Sep. 2, 2014.

(51) Int. Cl.

| | |
|---|---|
| G06F 3/04842 | (2022.01) |
| G06F 3/0488 | (2022.01) |
| G06F 3/04883 | (2022.01) |
| H04M 1/02 | (2006.01) |
| H04M 1/2745 | (2020.01) |
| H04M 1/72412 | (2021.01) |
| H04M 1/72469 | (2021.01) |
| H04M 1/72484 | (2021.01) |
| H04M 3/428 | (2006.01) |
| H04W 4/16 | (2009.01) |
| H04W 52/02 | (2009.01) |
| H04M 1/663 | (2006.01) |

(52) U.S. Cl.

CPC ........ *G06F 3/0488* (2013.01); *G06F 3/04883* (2013.01); *H04M 1/0258* (2013.01); *H04M 1/2745* (2013.01); *H04M 1/72412* (2021.01); *H04M 1/72469* (2021.01); *H04M 1/72484* (2021.01); *H04M 3/428* (2013.01); *H04M 3/4285* (2013.01); *H04W 4/16* (2013.01); *H04W 52/0254* (2013.01); *H04W 52/027* (2013.01); *G06F 2203/04105* (2013.01); *H04M 1/663* (2013.01); *H04M 2250/12* (2013.01); *H04M 2250/22* (2013.01); *H04M 2250/60* (2013.01); *Y02D 30/70* (2020.08)

(58) Field of Classification Search

CPC ............. H04M 1/663; H04M 2250/12; H04M 2250/22; H04M 2250/60; H04M 1/2746; H04M 2250/02; G06F 3/0488; G06F 1/163; G06F 3/04883; G06F 3/04842; G06F 2203/04105; H04W 4/16; H04W 52/0254; H04W 52/027; Y02D 30/70

See application file for complete search history.

(56) References Cited

U.S. PATENT DOCUMENTS

| | | | |
|---|---|---|---|
| 5,202,961 A | 4/1993 | Mills et al. |
| 5,208,790 A | 5/1993 | Sato et al. |
| 5,220,541 A | 6/1993 | Vuilleumier |
| 5,455,808 A | 10/1995 | Grupp et al. |
| 5,475,653 A | 12/1995 | Yamada et al. |
| 5,487,054 A | 1/1996 | Capps et al. |
| 5,508,979 A | 4/1996 | Eisenegger |
| 5,659,693 A | 8/1997 | Hansen et al. |
| 5,793,366 A | 8/1998 | Mano et al. |
| 5,801,700 A | 9/1998 | Ferguson |
| 5,825,353 A | 10/1998 | Will |
| 5,845,257 A | 12/1998 | Fu et al. |
| 5,870,683 A | 2/1999 | Wells et al. |
| 5,892,519 A | 4/1999 | Hirai et al. |
| 5,986,655 A | 11/1999 | Chiu et al. |
| 5,999,195 A | 12/1999 | Santangeli |
| 6,002,402 A | 12/1999 | Schacher |
| 6,014,429 A | 1/2000 | Laporta et al. |
| 6,016,248 A | 1/2000 | Anzai et al. |
| 6,043,818 A | 3/2000 | Nakano et al. |
| 6,097,371 A | 8/2000 | Siddiqui et al. |
| 6,191,807 B1 | 2/2001 | Hamada et al. |
| 6,199,012 B1 | 3/2001 | Hasegawa |
| 6,323,846 B1 | 11/2001 | Westerman et al. |
| 6,359,839 B1 | 3/2002 | Schenk et al. |
| 6,362,842 B1 | 3/2002 | Tahara et al. |
| 6,393,462 B1 | 5/2002 | Mullen-Schultz |
| 6,416,471 B1 | 7/2002 | Kumar et al. |
| 6,449,219 B1 | 9/2002 | Hepp et al. |
| 6,477,117 B1 | 11/2002 | Narayanaswami et al. |
| 6,496,780 B1 | 12/2002 | Harris et al. |
| 6,504,934 B1 | 1/2003 | Kasai et al. |
| 6,515,988 B1 | 2/2003 | Eldridge et al. |
| 6,556,222 B1 | 4/2003 | Narayanaswami |
| 6,570,557 B1 | 5/2003 | Westerman et al. |
| 6,650,894 B1 | 11/2003 | Berstis et al. |
| 6,661,438 B1 | 12/2003 | Shiraishi et al. |
| 6,677,932 B1 | 1/2004 | Westerman |
| 6,721,784 B1 | 4/2004 | Leonard et al. |
| 6,728,533 B2 | 4/2004 | Ishii et al. |
| 6,809,724 B1 | 10/2004 | Shiraishi et al. |
| 6,871,076 B2 | 3/2005 | Samn et al. |
| 6,922,147 B1 | 7/2005 | Viksnins et al. |
| 7,036,090 B1 | 4/2006 | Nguyen |
| 7,081,905 B1 | 7/2006 | Raghunath |
| 7,149,893 B1 | 12/2006 | Leonard et al. |
| 7,197,122 B2 | 3/2007 | Vuori |
| 7,203,380 B2 | 4/2007 | Chiu et al. |
| 7,257,254 B2 | 8/2007 | Tunney et al. |
| 7,365,736 B2 | 4/2008 | Marvit et al. |
| 7,370,244 B2 | 5/2008 | Breitling et al. |
| 7,415,720 B2 | 8/2008 | Jung |
| 7,454,192 B1 | 11/2008 | Zhu |
| 7,515,509 B2 | 4/2009 | Klein et al. |
| 7,526,728 B2 | 4/2009 | Apparao et al. |
| 7,546,470 B2 | 6/2009 | Schultz |
| 7,571,014 B1 | 8/2009 | Lambourne et al. |
| 7,593,749 B2 | 9/2009 | Vallström et al. |
| 7,593,755 B2 | 9/2009 | Colando et al. |
| 7,614,008 B2 | 11/2009 | Ording |
| 7,633,076 B2 | 12/2009 | Huppi et al. |
| 7,637,204 B2 | 12/2009 | Sumser et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,751,285 B1 | 7/2010 | Cain et al. |
| 7,789,225 B2 | 9/2010 | Whiteis |
| 7,797,390 B2 | 9/2010 | Hagale et al. |
| 7,834,861 B2 | 11/2010 | Lee |
| 7,843,769 B2 | 11/2010 | Ishida et al. |
| 7,844,914 B2 | 11/2010 | Andre et al. |
| 7,860,936 B1 | 12/2010 | Newstadt et al. |
| 7,898,542 B1 | 3/2011 | Yu et al. |
| 7,908,219 B2 | 3/2011 | Abanami et al. |
| 7,953,393 B2 | 5/2011 | Chin et al. |
| 7,957,762 B2 | 6/2011 | Herz et al. |
| 8,006,002 B2 | 8/2011 | Kalayjian et al. |
| 8,028,323 B2 | 9/2011 | Weel |
| 8,036,901 B2 | 10/2011 | Mozer |
| 8,042,157 B2 | 10/2011 | Bennett et al. |
| 8,060,571 B2 | 11/2011 | Rao |
| 8,077,157 B2 | 12/2011 | Sengupta et al. |
| 8,105,208 B2 | 1/2012 | Oleson et al. |
| 8,121,586 B2 | 2/2012 | Araradian et al. |
| 8,150,930 B2 | 4/2012 | Satterfield et al. |
| 8,171,137 B1 | 5/2012 | Parks et al. |
| 8,180,382 B1 | 5/2012 | Graefen |
| D661,612 S | 6/2012 | Hsu et al. |
| 8,224,894 B1 | 7/2012 | Parks et al. |
| 8,225,191 B1 | 7/2012 | Kalman |
| 8,239,784 B2 | 8/2012 | Hotelling et al. |
| 8,255,830 B2 | 8/2012 | Ording et al. |
| 8,260,879 B2 | 9/2012 | Chan |
| 8,279,180 B2 | 10/2012 | Hotelling et al. |
| 8,285,258 B2 | 10/2012 | Schultz et al. |
| 8,290,603 B1 | 10/2012 | Lambourne |
| 8,364,855 B2 | 1/2013 | James et al. |
| 8,375,326 B2 | 2/2013 | Bucher et al. |
| 8,381,135 B2 | 2/2013 | Hotelling et al. |
| 8,386,563 B2 | 2/2013 | Parks et al. |
| 8,392,259 B2 | 3/2013 | Macgillivray et al. |

(56) References Cited

U.S. PATENT DOCUMENTS

| | | |
|---|---|---|
| 8,392,617 B1 | 3/2013 | Weber et al. |
| 8,405,663 B2 | 3/2013 | Wikkerink et al. |
| 8,427,303 B1 | 4/2013 | Brady et al. |
| 8,434,133 B2 | 4/2013 | Kulkarni et al. |
| 8,458,780 B1 | 6/2013 | Takkallapally et al. |
| 8,467,766 B2 | 6/2013 | Rackley et al. |
| 8,478,363 B2 | 7/2013 | Levien et al. |
| 8,478,816 B2 | 7/2013 | Parks et al. |
| 8,479,122 B2 | 7/2013 | Hotelling et al. |
| 8,488,752 B1 | 7/2013 | Wiesen |
| 8,572,493 B2 | 10/2013 | Qureshi |
| 8,584,031 B2 | 11/2013 | Moore et al. |
| 8,595,649 B2 | 11/2013 | Sherrard et al. |
| 8,613,070 B1 | 12/2013 | Borzycki et al. |
| 8,624,836 B1 | 1/2014 | Miller et al. |
| 8,648,799 B1 | 2/2014 | Lloyd |
| 8,686,961 B2 | 4/2014 | Yamano |
| 8,718,556 B2 | 5/2014 | Lee et al. |
| 8,732,609 B1 | 5/2014 | Bayersdorfer et al. |
| 8,769,624 B2 | 7/2014 | Cotterill |
| 8,774,868 B2 | 7/2014 | Niu et al. |
| 8,811,951 B1 | 8/2014 | Faaborg et al. |
| 8,812,601 B2 | 8/2014 | Hsieh et al. |
| 8,825,445 B2 | 9/2014 | Hoffman et al. |
| 8,826,415 B2 | 9/2014 | Last |
| 8,848,932 B2 | 9/2014 | Poulsen et al. |
| 8,866,761 B2 | 10/2014 | Enami |
| 8,868,338 B1 | 10/2014 | Chau et al. |
| 8,884,874 B1 | 11/2014 | Kim et al. |
| 8,886,710 B2 | 11/2014 | Evans et al. |
| 8,903,671 B2 | 12/2014 | Park et al. |
| 8,914,840 B2 | 12/2014 | Reisman |
| 8,922,485 B1 | 12/2014 | Lloyd |
| 8,963,894 B2 | 2/2015 | Klassen et al. |
| 8,996,639 B1 | 3/2015 | Faaborg et al. |
| 9,002,322 B2 | 4/2015 | Cotterill |
| 9,042,556 B2 | 5/2015 | Kallai et al. |
| 9,070,092 B2 | 6/2015 | Shieh et al. |
| 9,071,945 B1 | 6/2015 | Rubin et al. |
| 9,075,612 B2 | 7/2015 | Yang et al. |
| 9,084,003 B1 | 7/2015 | Sanio et al. |
| 9,095,779 B2 | 8/2015 | Chan et al. |
| 9,100,944 B2 | 8/2015 | Sauhta et al. |
| 9,112,849 B1 | 8/2015 | Werkelin et al. |
| 9,112,984 B2 | 8/2015 | Sejnoha et al. |
| 9,134,902 B2 | 9/2015 | Kang et al. |
| 9,141,270 B1 | 9/2015 | Stuart et al. |
| 9,164,663 B1 | 10/2015 | Berard |
| 9,173,052 B2 | 10/2015 | Hauser et al. |
| 9,185,062 B1 | 11/2015 | Yang et al. |
| 9,191,988 B2 | 11/2015 | Newham |
| 9,202,509 B2 | 12/2015 | Kallai et al. |
| 9,207,835 B1 | 12/2015 | Yang et al. |
| 9,244,562 B1 | 1/2016 | Moscovich et al. |
| 9,247,363 B2 | 1/2016 | Triplett et al. |
| 9,251,787 B1 | 2/2016 | Hart et al. |
| 9,253,631 B1 | 2/2016 | White et al. |
| 9,268,387 B2 | 2/2016 | Yu |
| 9,269,083 B1 | 2/2016 | Jarajapu et al. |
| 9,294,476 B1 | 3/2016 | Lurey et al. |
| 9,294,853 B1 | 3/2016 | Dhaundiyal |
| 9,319,782 B1 | 4/2016 | Crump et al. |
| 9,329,831 B1 | 5/2016 | Fullerton et al. |
| 9,374,607 B2 | 6/2016 | Bates et al. |
| 9,400,489 B2 | 7/2016 | Kim et al. |
| 9,431,021 B1 | 8/2016 | Scalise et al. |
| 9,450,812 B2 | 9/2016 | Lee et al. |
| 9,459,781 B2 | 10/2016 | Kocienda et al. |
| 9,459,786 B2 | 10/2016 | Thakur et al. |
| 9,461,833 B1 | 10/2016 | Marra et al. |
| 9,477,208 B2 | 10/2016 | Park et al. |
| 9,483,529 B1 | 11/2016 | Pasoi et al. |
| 9,489,074 B2 | 11/2016 | Oonishi |
| 9,519,413 B2 | 12/2016 | Bates |
| 9,547,425 B2 | 1/2017 | Kocienda et al. |
| 9,549,323 B2 | 1/2017 | Lee et al. |
| 9,575,591 B2 | 2/2017 | Yang et al. |
| 9,578,160 B2 | 2/2017 | Kim et al. |
| 9,582,165 B2 | 2/2017 | Wilson et al. |
| 9,588,661 B1 | 3/2017 | Jauhal et al. |
| 9,628,414 B1 | 4/2017 | Umapathy et al. |
| 9,653,067 B2 | 5/2017 | Brooks et al. |
| 9,680,927 B2 | 6/2017 | Miller et al. |
| 9,703,369 B1 | 7/2017 | Mullen |
| 9,710,639 B1 | 7/2017 | Saini |
| 9,727,749 B2 | 8/2017 | Tzeng et al. |
| 9,729,730 B2 | 8/2017 | Levesque et al. |
| 9,794,720 B1 | 10/2017 | Kadri |
| 9,800,525 B1 | 10/2017 | Lerner et al. |
| 9,820,323 B1 | 11/2017 | Young et al. |
| 9,846,685 B2 | 12/2017 | Li |
| 9,847,999 B2 | 12/2017 | Van Os et al. |
| 9,886,953 B2 | 2/2018 | Lemay et al. |
| 9,898,250 B1 | 2/2018 | Williams et al. |
| 9,922,317 B2 | 3/2018 | Bak et al. |
| 9,954,989 B2 | 4/2018 | Zhou |
| 9,954,991 B2 | 4/2018 | Wang et al. |
| 9,967,401 B2 | 5/2018 | Coffman et al. |
| 10,055,121 B2 | 8/2018 | Chaudhri et al. |
| 10,089,607 B2 | 10/2018 | Ziat et al. |
| 10,096,015 B2 | 10/2018 | Bak et al. |
| 10,104,089 B2 | 10/2018 | Kim et al. |
| 10,129,044 B2 | 11/2018 | Kangshang et al. |
| 10,135,905 B2 | 11/2018 | Chaudhri et al. |
| 10,157,040 B2 | 12/2018 | Ballinger et al. |
| 10,178,234 B2 | 1/2019 | Coffman et al. |
| 10,182,138 B2 | 1/2019 | Motika et al. |
| 10,198,563 B2 | 2/2019 | Wang et al. |
| 10,216,392 B2 | 2/2019 | Zhao |
| 10,225,711 B2 | 3/2019 | Parks et al. |
| 10,248,779 B2 | 4/2019 | Song et al. |
| 10,282,078 B2 | 5/2019 | Choi |
| 10,284,980 B1 | 5/2019 | Woo et al. |
| 10,299,300 B1 | 5/2019 | Young |
| 10,303,422 B1 | 5/2019 | Woo et al. |
| 10,334,054 B2 | 6/2019 | Van Os et al. |
| 10,374,804 B2 | 8/2019 | Lee et al. |
| 10,416,844 B2 | 9/2019 | Yang et al. |
| 10,417,037 B2 | 9/2019 | Gruber et al. |
| 10,466,881 B2 | 11/2019 | Sasaki et al. |
| 10,515,623 B1 | 12/2019 | Grizzel |
| 10,524,300 B2 | 12/2019 | Ueda et al. |
| 10,585,472 B2 | 3/2020 | Tokubo et al. |
| 10,630,795 B2 | 4/2020 | Aoki et al. |
| 10,674,072 B1 | 6/2020 | Manzari et al. |
| 10,701,067 B1 | 6/2020 | Ziraknejad et al. |
| 10,713,699 B1 | 7/2020 | Lien et al. |
| 10,732,819 B2 | 8/2020 | Wang et al. |
| 10,742,645 B2 | 8/2020 | Hevizi et al. |
| 10,742,648 B2 | 8/2020 | Magyar et al. |
| 10,749,967 B2 | 8/2020 | Van Os et al. |
| 10,779,085 B1 | 9/2020 | Carrigan |
| 10,824,299 B2 | 11/2020 | Bai |
| 10,833,887 B2 | 11/2020 | Wu |
| 10,955,956 B2 | 3/2021 | Gleeson et al. |
| 11,133,008 B2 | 9/2021 | Piernot et al. |
| 11,157,143 B2 | 10/2021 | Yang et al. |
| 11,343,370 B1 | 5/2022 | Gordon et al. |
| 11,431,834 B1 | 8/2022 | Gordon et al. |
| 11,449,212 B2 | 9/2022 | Roard et al. |
| 11,463,576 B1 | 10/2022 | Gordon et al. |
| 11,500,510 B2 | 11/2022 | Tokuchi et al. |
| 11,589,184 B1 | 2/2023 | Mont-Reynaud |
| 11,900,015 B2 | 2/2024 | Kim et al. |
| 12,170,883 B2 | 12/2024 | Marculescu et al. |
| 2001/0031622 A1 | 10/2001 | Kivela et al. |
| 2001/0039497 A1 | 11/2001 | Hubbard |
| 2001/0049627 A1 | 12/2001 | Simpson |
| 2002/0002039 A1 | 1/2002 | Qureshey et al. |
| 2002/0015024 A1 | 2/2002 | Westerman et al. |
| 2002/0037715 A1 | 3/2002 | Mauney et al. |
| 2002/0038384 A1 | 3/2002 | Khan et al. |
| 2002/0054066 A1 | 5/2002 | Kikinis et al. |
| 2002/0054541 A1 | 5/2002 | Hall et al. |

(56) References Cited

U.S. PATENT DOCUMENTS

| | | |
|---|---|---|
| 2002/0057284 A1 | 5/2002 | Dalby et al. |
| 2002/0059295 A1 | 5/2002 | Ludtke et al. |
| 2002/0068600 A1 | 6/2002 | Chihara et al. |
| 2002/0081976 A1 | 6/2002 | Fujisawa et al. |
| 2002/0098857 A1 | 7/2002 | Ishii |
| 2002/0115478 A1 | 8/2002 | Fujisawa et al. |
| 2002/0116276 A1 | 8/2002 | Ottley |
| 2002/0120869 A1 | 8/2002 | Engstrom |
| 2002/0126135 A1 | 9/2002 | Ball et al. |
| 2002/0131331 A1 | 9/2002 | Molander et al. |
| 2002/0140633 A1 | 10/2002 | Rafii et al. |
| 2002/0142734 A1 | 10/2002 | Wickstead |
| 2002/0167488 A1 | 11/2002 | Hinckley et al. |
| 2002/0168938 A1 | 11/2002 | Chang |
| 2002/0180797 A1 | 12/2002 | Bachmann |
| 2003/0003897 A1 | 1/2003 | Hyon |
| 2003/0027621 A1 | 2/2003 | Libby et al. |
| 2003/0028639 A1 | 2/2003 | Yamamoto et al. |
| 2003/0055977 A1 | 3/2003 | Miller |
| 2003/0067497 A1 | 4/2003 | Pichon et al. |
| 2003/0074647 A1 | 4/2003 | Andrew et al. |
| 2003/0076298 A1 | 4/2003 | Rosenberg |
| 2003/0079057 A1 | 4/2003 | Ruskin et al. |
| 2003/0081506 A1 | 5/2003 | Karhu et al. |
| 2003/0097413 A1 | 5/2003 | Vishik et al. |
| 2003/0160861 A1 | 8/2003 | Barlow et al. |
| 2003/0164847 A1 | 9/2003 | Zaima et al. |
| 2003/0182628 A1 | 9/2003 | Lira |
| 2003/0188183 A1 | 10/2003 | Lee et al. |
| 2003/0214885 A1 | 11/2003 | Powell et al. |
| 2003/0229722 A1 | 12/2003 | Beyda |
| 2003/0229900 A1 | 12/2003 | Reisman |
| 2004/0001105 A1 | 1/2004 | Chew et al. |
| 2004/0017733 A1 | 1/2004 | Sullivan |
| 2004/0021699 A1 | 2/2004 | Fildebrandt et al. |
| 2004/0027396 A1 | 2/2004 | Lection |
| 2004/0032955 A1 | 2/2004 | Hashimoto et al. |
| 2004/0041841 A1 | 3/2004 | Lemogne et al. |
| 2004/0046638 A1 | 3/2004 | Kawasaki |
| 2004/0047244 A1 | 3/2004 | Iino et al. |
| 2004/0070511 A1 | 4/2004 | Kim |
| 2004/0073432 A1 | 4/2004 | Stone |
| 2004/0077462 A1 | 4/2004 | Brown et al. |
| 2004/0113953 A1 | 6/2004 | Newman |
| 2004/0181695 A1 | 9/2004 | Walker et al. |
| 2004/0192332 A1 | 9/2004 | Samn |
| 2004/0218472 A1 | 11/2004 | Narayanaswami et al. |
| 2004/0225502 A1 | 11/2004 | Bear et al. |
| 2004/0236975 A1 | 11/2004 | Gaskins et al. |
| 2004/0242200 A1 | 12/2004 | Maeoka et al. |
| 2004/0261010 A1 | 12/2004 | Matsuishi |
| 2004/0264916 A1 | 12/2004 | Van et al. |
| 2005/0015803 A1 | 1/2005 | Macrae et al. |
| 2005/0041667 A1 | 2/2005 | Miller et al. |
| 2005/0066209 A1 | 3/2005 | Kee et al. |
| 2005/0071188 A1 | 3/2005 | Thuerk |
| 2005/0093868 A1 | 5/2005 | Hinckley |
| 2005/0096009 A1 | 5/2005 | Ackley |
| 2005/0117752 A1 | 6/2005 | Iima et al. |
| 2005/0125744 A1 | 6/2005 | Hubbard et al. |
| 2005/0138552 A1 | 6/2005 | Venolia |
| 2005/0144452 A1 | 6/2005 | Lynch et al. |
| 2005/0168566 A1 | 8/2005 | Tada et al. |
| 2005/0188856 A1 | 9/2005 | Sumser et al. |
| 2005/0190059 A1 | 9/2005 | Wehrenberg |
| 2005/0191159 A1 | 9/2005 | Benko |
| 2005/0197063 A1 | 9/2005 | White et al. |
| 2005/0198128 A1 | 9/2005 | Anderson et al. |
| 2005/0200611 A1 | 9/2005 | Goto et al. |
| 2005/0220304 A1 | 10/2005 | Lenoir et al. |
| 2005/0233780 A1 | 10/2005 | Jani et al. |
| 2005/0239512 A1 | 10/2005 | Hasegawa et al. |
| 2005/0266884 A1 | 12/2005 | Marriott et al. |
| 2005/0268237 A1 | 12/2005 | Crane et al. |
| 2005/0278587 A1 | 12/2005 | Breitling et al. |
| 2005/0278757 A1 | 12/2005 | Grossman et al. |
| 2006/0005156 A1 | 1/2006 | Korpipää et al. |
| 2006/0017692 A1 | 1/2006 | Wehrenberg et al. |
| 2006/0019639 A1 | 1/2006 | Adams et al. |
| 2006/0019649 A1 | 1/2006 | Feinleib et al. |
| 2006/0026245 A1 | 2/2006 | Cunningham et al. |
| 2006/0026536 A1 | 2/2006 | Hotelling et al. |
| 2006/0033724 A1 | 2/2006 | Chaudhri et al. |
| 2006/0035632 A1 | 2/2006 | Sorvari et al. |
| 2006/0044283 A1 | 3/2006 | Eri et al. |
| 2006/0055700 A1 | 3/2006 | Niles et al. |
| 2006/0069604 A1 | 3/2006 | Leukart et al. |
| 2006/0085765 A1 | 4/2006 | Peterson et al. |
| 2006/0092177 A1 | 5/2006 | Blasko et al. |
| 2006/0092770 A1 | 5/2006 | Demas |
| 2006/0098634 A1 | 5/2006 | Umemoto et al. |
| 2006/0132456 A1 | 6/2006 | Anson |
| 2006/0160090 A1 | 7/2006 | Macina et al. |
| 2006/0161621 A1 | 7/2006 | Rosenberg |
| 2006/0161629 A1 | 7/2006 | Cohen et al. |
| 2006/0185005 A1 | 8/2006 | Graves et al. |
| 2006/0195787 A1 | 8/2006 | Topiwala et al. |
| 2006/0197753 A1 | 9/2006 | Hotelling |
| 2006/0206709 A1 | 9/2006 | Labrou et al. |
| 2006/0210092 A1 | 9/2006 | Navid |
| 2006/0214935 A1 | 9/2006 | Boyd et al. |
| 2006/0217104 A1 | 9/2006 | Cho |
| 2006/0224882 A1 | 10/2006 | Chin |
| 2006/0250578 A1 | 11/2006 | Pohl et al. |
| 2006/0258289 A1 | 11/2006 | Dua |
| 2006/0288226 A1 | 12/2006 | Kowal |
| 2007/0004461 A1 | 1/2007 | Bathina et al. |
| 2007/0006096 A1 | 1/2007 | Kim et al. |
| 2007/0015519 A1 | 1/2007 | Casey |
| 2007/0027682 A1 | 2/2007 | Bennett |
| 2007/0030256 A1 | 2/2007 | Akaike et al. |
| 2007/0036300 A1 | 2/2007 | Brown et al. |
| 2007/0037605 A1 | 2/2007 | Logan et al. |
| 2007/0061786 A1 | 3/2007 | Zhou et al. |
| 2007/0073649 A1 | 3/2007 | Kikkoji et al. |
| 2007/0073823 A1 | 3/2007 | Cohen |
| 2007/0082707 A1 | 4/2007 | Flynt et al. |
| 2007/0085157 A1 | 4/2007 | Fadell et al. |
| 2007/0094330 A1 | 4/2007 | Russell et al. |
| 2007/0097113 A1 | 5/2007 | Lee et al. |
| 2007/0113294 A1 | 5/2007 | Field et al. |
| 2007/0115933 A1 | 5/2007 | Muhamed et al. |
| 2007/0117549 A1 | 5/2007 | Arnos |
| 2007/0143495 A1 | 6/2007 | Porat |
| 2007/0150834 A1 | 6/2007 | Muller et al. |
| 2007/0150836 A1 | 6/2007 | Deggelmann et al. |
| 2007/0150842 A1 | 6/2007 | Chaudhri et al. |
| 2007/0152979 A1 | 7/2007 | Jobs et al. |
| 2007/0157089 A1 | 7/2007 | Van Os et al. |
| 2007/0157097 A1 | 7/2007 | Peters et al. |
| 2007/0157103 A1 | 7/2007 | Arneson et al. |
| 2007/0162872 A1 | 7/2007 | Hong et al. |
| 2007/0162963 A1 | 7/2007 | Penet et al. |
| 2007/0173233 A1 | 7/2007 | Vander Veen et al. |
| 2007/0180492 A1 | 8/2007 | Hassan et al. |
| 2007/0186106 A1 | 8/2007 | Ting et al. |
| 2007/0191008 A1 | 8/2007 | Bucher et al. |
| 2007/0202925 A1 | 8/2007 | Beith |
| 2007/0213955 A1 | 9/2007 | Ishida et al. |
| 2007/0216659 A1 | 9/2007 | Amineh |
| 2007/0226778 A1 | 9/2007 | Pietruszka |
| 2007/0229221 A1 | 10/2007 | Saotome |
| 2007/0236475 A1 | 10/2007 | Wherry |
| 2007/0239754 A1 | 10/2007 | Schnitman et al. |
| 2007/0260547 A1 | 11/2007 | Little |
| 2007/0279190 A1 | 12/2007 | Lugt et al. |
| 2007/0283011 A1 | 12/2007 | Rakowski et al. |
| 2007/0288932 A1 | 12/2007 | Horvitz et al. |
| 2007/0294182 A1 | 12/2007 | Hammad |
| 2008/0010387 A1 | 1/2008 | Curtis et al. |
| 2008/0011827 A1 | 1/2008 | Little et al. |
| 2008/0014989 A1 | 1/2008 | Sandegard et al. |
| 2008/0016368 A1 | 1/2008 | Adams |
| 2008/0016537 A1 | 1/2008 | Little et al. |

(56) References Cited

U.S. PATENT DOCUMENTS

| | | | |
|---|---|---|---|
| 2008/0017721 A1 | 1/2008 | Zehnacker | |
| 2008/0024459 A1 | 1/2008 | Poupyrev et al. | |
| 2008/0027947 A1 | 1/2008 | Pritchett et al. | |
| 2008/0033779 A1 | 2/2008 | Coffman et al. | |
| 2008/0040786 A1 | 2/2008 | Chang et al. | |
| 2008/0042866 A1 | 2/2008 | Morse et al. | |
| 2008/0046839 A1 | 2/2008 | Mehra et al. | |
| 2008/0052643 A1 | 2/2008 | Ike et al. | |
| 2008/0052945 A1 | 3/2008 | Matas et al. | |
| 2008/0055263 A1* | 3/2008 | Lemay | H04M 1/27475 |
| | | | 715/764 |
| 2008/0055264 A1 | 3/2008 | Anzures et al. | |
| 2008/0057926 A1 | 3/2008 | Forstall et al. | |
| 2008/0062141 A1 | 3/2008 | Chaudhri | |
| 2008/0070593 A1 | 3/2008 | Altman et al. | |
| 2008/0076637 A1 | 3/2008 | Gilley et al. | |
| 2008/0079589 A1 | 4/2008 | Blackadar | |
| 2008/0081558 A1 | 4/2008 | Dunko et al. | |
| 2008/0082934 A1 | 4/2008 | Kocienda et al. | |
| 2008/0091166 A1 | 4/2008 | Fitzgerald et al. | |
| 2008/0091717 A1 | 4/2008 | Garbow et al. | |
| 2008/0094370 A1 | 4/2008 | Ording et al. | |
| 2008/0098313 A1 | 4/2008 | Pollack | |
| 2008/0100693 A1 | 5/2008 | Jobs et al. | |
| 2008/0114678 A1 | 5/2008 | Bennett et al. | |
| 2008/0114980 A1 | 5/2008 | Sridhar | |
| 2008/0122796 A1 | 5/2008 | Jobs et al. | |
| 2008/0127268 A1 | 5/2008 | Bergeron et al. | |
| 2008/0146289 A1 | 6/2008 | Korneluk et al. | |
| 2008/0155428 A1 | 6/2008 | Lee | |
| 2008/0160974 A1 | 7/2008 | Vartiainen et al. | |
| 2008/0165136 A1 | 7/2008 | Christie et al. | |
| 2008/0168396 A1 | 7/2008 | Matas et al. | |
| 2008/0168404 A1 | 7/2008 | Ording | |
| 2008/0172634 A1 | 7/2008 | Choi et al. | |
| 2008/0186808 A1 | 8/2008 | Lee | |
| 2008/0192021 A1 | 8/2008 | Lim et al. | |
| 2008/0201454 A1 | 8/2008 | Soffer | |
| 2008/0208762 A1 | 8/2008 | Arthur et al. | |
| 2008/0216022 A1 | 9/2008 | Lorch et al. | |
| 2008/0219151 A1 | 9/2008 | Ma et al. | |
| 2008/0229409 A1 | 9/2008 | Miller et al. | |
| 2008/0246778 A1 | 10/2008 | Ham et al. | |
| 2008/0259829 A1 | 10/2008 | Rosenblatt | |
| 2008/0273712 A1 | 11/2008 | Eichfeld et al. | |
| 2008/0273713 A1 | 11/2008 | Hartung et al. | |
| 2008/0282202 A1 | 11/2008 | Sunday | |
| 2008/0285772 A1 | 11/2008 | Haulick et al. | |
| 2008/0292074 A1 | 11/2008 | Boni et al. | |
| 2008/0305742 A1 | 12/2008 | Basir | |
| 2008/0313257 A1 | 12/2008 | Allen et al. | |
| 2008/0320391 A1 | 12/2008 | Lemay et al. | |
| 2009/0003552 A1 | 1/2009 | Goldman et al. | |
| 2009/0003620 A1 | 1/2009 | Mckillop et al. | |
| 2009/0005011 A1 | 1/2009 | Christie et al. | |
| 2009/0006846 A1 | 1/2009 | Rosenblatt | |
| 2009/0011821 A1 | 1/2009 | Griswold et al. | |
| 2009/0031375 A1 | 1/2009 | Sullivan et al. | |
| 2009/0037536 A1 | 2/2009 | Braam | |
| 2009/0049502 A1 | 2/2009 | Levien et al. | |
| 2009/0051648 A1 | 2/2009 | Shamaie et al. | |
| 2009/0051649 A1 | 2/2009 | Rondel | |
| 2009/0054044 A1 | 2/2009 | Ikemori et al. | |
| 2009/0055377 A1 | 2/2009 | Hedge et al. | |
| 2009/0055383 A1 | 2/2009 | Zalewski | |
| 2009/0055494 A1 | 2/2009 | Fukumoto et al. | |
| 2009/0060170 A1 | 3/2009 | Coughlan et al. | |
| 2009/0063851 A1 | 3/2009 | Nijdam | |
| 2009/0066648 A1 | 3/2009 | Kerr et al. | |
| 2009/0082043 A1 | 3/2009 | Lazaridis | |
| 2009/0088204 A1 | 4/2009 | Culbert et al. | |
| 2009/0094681 A1 | 4/2009 | Sadler et al. | |
| 2009/0098914 A1 | 4/2009 | Martin-Cocher et al. | |
| 2009/0100342 A1 | 4/2009 | Jakobson et al. | |
| 2009/0100383 A1 | 4/2009 | Sunday et al. | |
| 2009/0119754 A1 | 5/2009 | Schubert | |
| 2009/0122149 A1 | 5/2009 | Ishii | |
| 2009/0125571 A1 | 5/2009 | Kiilerich et al. | |
| 2009/0135678 A1 | 5/2009 | Godat | |
| 2009/0140960 A1 | 6/2009 | Mahowald et al. | |
| 2009/0141046 A1 | 6/2009 | Rathnam et al. | |
| 2009/0144391 A1 | 6/2009 | Jung et al. | |
| 2009/0144451 A1 | 6/2009 | Cabezas et al. | |
| 2009/0144639 A1 | 6/2009 | Nims et al. | |
| 2009/0153466 A1 | 6/2009 | Tilley | |
| 2009/0158390 A1 | 6/2009 | Guan | |
| 2009/0164219 A1 | 6/2009 | Yeung et al. | |
| 2009/0164581 A1 | 6/2009 | Bove et al. | |
| 2009/0164923 A1 | 6/2009 | Ovi et al. | |
| 2009/0165107 A1 | 6/2009 | Tojo et al. | |
| 2009/0174680 A1 | 7/2009 | Anzures et al. | |
| 2009/0174763 A1 | 7/2009 | Bengtsson et al. | |
| 2009/0175425 A1 | 7/2009 | Lee | |
| 2009/0177538 A1 | 7/2009 | Brewer et al. | |
| 2009/0178007 A1 | 7/2009 | Matas et al. | |
| 2009/0181726 A1 | 7/2009 | Vargas et al. | |
| 2009/0187423 A1 | 7/2009 | Kim | |
| 2009/0187842 A1 | 7/2009 | Collins et al. | |
| 2009/0189915 A1 | 7/2009 | Mercer et al. | |
| 2009/0193514 A1 | 7/2009 | Adams et al. | |
| 2009/0195497 A1 | 8/2009 | Fitzgerald et al. | |
| 2009/0199130 A1 | 8/2009 | Tsern et al. | |
| 2009/0199188 A1 | 8/2009 | Fujimaki | |
| 2009/0209293 A1 | 8/2009 | Louch | |
| 2009/0216556 A1 | 8/2009 | Martin et al. | |
| 2009/0228938 A1 | 9/2009 | White et al. | |
| 2009/0231356 A1 | 9/2009 | Barnes et al. | |
| 2009/0231960 A1 | 9/2009 | Hutcheson | |
| 2009/0239587 A1 | 9/2009 | Negron et al. | |
| 2009/0241169 A1 | 9/2009 | Dhand et al. | |
| 2009/0244015 A1 | 10/2009 | Sengupta et al. | |
| 2009/0248737 A1 | 10/2009 | Shukla et al. | |
| 2009/0248751 A1 | 10/2009 | Myman et al. | |
| 2009/0249244 A1 | 10/2009 | Robinson et al. | |
| 2009/0249247 A1 | 10/2009 | Tseng et al. | |
| 2009/0254624 A1 | 10/2009 | Baudin et al. | |
| 2009/0256780 A1 | 10/2009 | Small et al. | |
| 2009/0259958 A1 | 10/2009 | Ban | |
| 2009/0262088 A1 | 10/2009 | Moll-Carrillo et al. | |
| 2009/0265643 A1 | 10/2009 | Jachner et al. | |
| 2009/0271744 A1 | 10/2009 | Anders | |
| 2009/0298444 A1 | 12/2009 | Shigeta | |
| 2009/0300513 A1 | 12/2009 | Nims et al. | |
| 2009/0304205 A1 | 12/2009 | Hardacker et al. | |
| 2009/0304359 A1 | 12/2009 | Lemay et al. | |
| 2009/0305732 A1 | 12/2009 | Marcellino et al. | |
| 2009/0307511 A1 | 12/2009 | Fiennes et al. | |
| 2009/0307633 A1 | 12/2009 | Haughay et al. | |
| 2009/0311993 A1 | 12/2009 | Horodezky | |
| 2009/0313299 A1 | 12/2009 | Bonev et al. | |
| 2009/0313582 A1 | 12/2009 | Rupsingh et al. | |
| 2009/0327886 A1 | 12/2009 | Whytock et al. | |
| 2010/0004031 A1 | 1/2010 | Kim | |
| 2010/0017474 A1 | 1/2010 | Kandekar et al. | |
| 2010/0017748 A1 | 1/2010 | Taylor et al. | |
| 2010/0023449 A1 | 1/2010 | Skowronek et al. | |
| 2010/0026640 A1 | 2/2010 | Kim et al. | |
| 2010/0042835 A1 | 2/2010 | Lee et al. | |
| 2010/0048358 A1 | 2/2010 | Tchao et al. | |
| 2010/0050086 A1* | 2/2010 | Sherrard | H04M 1/27 |
| | | | 715/739 |
| 2010/0054497 A1 | 3/2010 | Bull et al. | |
| 2010/0058231 A1 | 3/2010 | Duarte et al. | |
| 2010/0064255 A1 | 3/2010 | Rottler et al. | |
| 2010/0070490 A1 | 3/2010 | Amidon et al. | |
| 2010/0075656 A1 | 3/2010 | Howarter et al. | |
| 2010/0082481 A1 | 4/2010 | Lin et al. | |
| 2010/0085203 A1 | 4/2010 | Kahn et al. | |
| 2010/0094809 A1 | 4/2010 | Consul et al. | |
| 2010/0099462 A1 | 4/2010 | Baek et al. | |
| 2010/0106647 A1 | 4/2010 | Raman | |
| 2010/0107070 A1 | 4/2010 | Devineni et al. | |
| 2010/0107229 A1 | 4/2010 | Najafi et al. | |
| 2010/0109864 A1 | 5/2010 | Haartsen et al. | |

(56)　　　　References Cited

U.S. PATENT DOCUMENTS

| | | |
|---|---|---|
| 2010/0110082 A1 | 5/2010 | Myrick et al. |
| 2010/0114974 A1 | 5/2010 | Jung et al. |
| 2010/0121636 A1 | 5/2010 | Burke et al. |
| 2010/0123724 A1 | 5/2010 | Moore et al. |
| 2010/0124906 A1 | 5/2010 | Hautala |
| 2010/0125785 A1 | 5/2010 | Moore et al. |
| 2010/0125811 A1 | 5/2010 | Moore et al. |
| 2010/0138764 A1 | 6/2010 | Hatambeiki et al. |
| 2010/0138780 A1 | 6/2010 | Marano et al. |
| 2010/0141606 A1 | 6/2010 | Bae et al. |
| 2010/0146463 A1 | 6/2010 | Cho et al. |
| 2010/0156807 A1 | 6/2010 | Stallings et al. |
| 2010/0156833 A1 | 6/2010 | Kim et al. |
| 2010/0157742 A1 | 6/2010 | Relyea et al. |
| 2010/0159995 A1 | 6/2010 | Stallings et al. |
| 2010/0162138 A1 | 6/2010 | Pascal et al. |
| 2010/0162169 A1 | 6/2010 | Skarp |
| 2010/0174644 A1 | 7/2010 | Rosano et al. |
| 2010/0175006 A1 | 7/2010 | Li |
| 2010/0178873 A1 | 7/2010 | Lee et al. |
| 2010/0191818 A1 | 7/2010 | Satterfield et al. |
| 2010/0194692 A1 | 8/2010 | Orr et al. |
| 2010/0198453 A1 | 8/2010 | Dorogusker et al. |
| 2010/0205563 A1 | 8/2010 | Haapsaari et al. |
| 2010/0223542 A1 | 9/2010 | Vuong et al. |
| 2010/0226213 A1 | 9/2010 | Drugge |
| 2010/0235726 A1 | 9/2010 | Ording et al. |
| 2010/0235746 A1 | 9/2010 | Anzures |
| 2010/0243516 A1 | 9/2010 | Martin et al. |
| 2010/0248823 A1 | 9/2010 | Smith |
| 2010/0250376 A1 | 9/2010 | Nandiraju |
| 2010/0251158 A1 | 9/2010 | Geppert et al. |
| 2010/0251176 A1 | 9/2010 | Fong et al. |
| 2010/0257466 A1 | 10/2010 | Wroblewski et al. |
| 2010/0269069 A1 | 10/2010 | Paila et al. |
| 2010/0269108 A1 | 10/2010 | Boudreau et al. |
| 2010/0269156 A1 | 10/2010 | Hohlfeld et al. |
| 2010/0271312 A1 | 10/2010 | Alameh et al. |
| 2010/0271343 A1 | 10/2010 | Nagashima et al. |
| 2010/0272250 A1 | 10/2010 | Yap et al. |
| 2010/0277579 A1 | 11/2010 | Cho et al. |
| 2010/0279663 A1 | 11/2010 | Wang et al. |
| 2010/0280983 A1 | 11/2010 | Cho et al. |
| 2010/0281374 A1 | 11/2010 | Schulz et al. |
| 2010/0281409 A1 | 11/2010 | Rainisto et al. |
| 2010/0284389 A1 | 11/2010 | Ramsay et al. |
| 2010/0287249 A1 | 11/2010 | Yigang et al. |
| 2010/0292600 A1 | 11/2010 | Dibenedetto et al. |
| 2010/0293598 A1 | 11/2010 | Collart et al. |
| 2010/0295789 A1 | 11/2010 | Shin et al. |
| 2010/0295803 A1 | 11/2010 | Kim et al. |
| 2010/0296678 A1 | 11/2010 | Kuhn-Rahloff et al. |
| 2010/0299436 A1 | 11/2010 | Khalid et al. |
| 2010/0299639 A1 | 11/2010 | Ramsay et al. |
| 2010/0304729 A1 | 12/2010 | Sabotta et al. |
| 2010/0311336 A1 | 12/2010 | Huotari et al. |
| 2010/0317408 A1 | 12/2010 | Ferren et al. |
| 2010/0321201 A1 | 12/2010 | Huang et al. |
| 2010/0325194 A1 | 12/2010 | Williamson et al. |
| 2010/0332518 A1 | 12/2010 | Song et al. |
| 2011/0003587 A1 | 1/2011 | Belz et al. |
| 2011/0003665 A1 | 1/2011 | Burton et al. |
| 2011/0007611 A1 | 1/2011 | Kato et al. |
| 2011/0010470 A1 | 1/2011 | Hulbert et al. |
| 2011/0012772 A1 | 1/2011 | Chuang et al. |
| 2011/0016425 A1 | 1/2011 | Homburg et al. |
| 2011/0018695 A1 | 1/2011 | Bells et al. |
| 2011/0029750 A1 | 2/2011 | Jang et al. |
| 2011/0029870 A1 | 2/2011 | May et al. |
| 2011/0029891 A1 | 2/2011 | Kim et al. |
| 2011/0035799 A1 | 2/2011 | Handler |
| 2011/0041102 A1 | 2/2011 | Kim |
| 2011/0047014 A1 | 2/2011 | De Angelo |
| 2011/0054268 A1 | 3/2011 | Fidacaro et al. |
| 2011/0054830 A1 | 3/2011 | Logan |
| 2011/0057903 A1 | 3/2011 | Yamano et al. |
| 2011/0059769 A1* | 3/2011 | Brunolli ............ H04M 1/72448 |
| | | 455/556.1 |
| 2011/0061017 A1 | 3/2011 | Ullrich et al. |
| 2011/0065384 A1 | 3/2011 | Cader et al. |
| 2011/0071818 A1 | 3/2011 | Jiang |
| 2011/0074699 A1 | 3/2011 | Marr et al. |
| 2011/0078622 A1 | 3/2011 | Missig et al. |
| 2011/0080356 A1 | 4/2011 | Kang et al. |
| 2011/0080411 A1 | 4/2011 | Wikkerink et al. |
| 2011/0081923 A1 | 4/2011 | Bednar et al. |
| 2011/0087431 A1 | 4/2011 | Gupta et al. |
| 2011/0088086 A1 | 4/2011 | Swink et al. |
| 2011/0092190 A1 | 4/2011 | Willey et al. |
| 2011/0096011 A1 | 4/2011 | Suzuki |
| 2011/0098928 A1 | 4/2011 | Hoffman et al. |
| 2011/0106671 A1 | 5/2011 | Minnis et al. |
| 2011/0106921 A1 | 5/2011 | Brown et al. |
| 2011/0111735 A1 | 5/2011 | Pietrow |
| 2011/0115721 A1 | 5/2011 | Li et al. |
| 2011/0115945 A1 | 5/2011 | Takano et al. |
| 2011/0130168 A1 | 6/2011 | Vendrow et al. |
| 2011/0138166 A1 | 6/2011 | Peszek et al. |
| 2011/0138295 A1 | 6/2011 | Momchilov et al. |
| 2011/0138329 A1 | 6/2011 | Wells et al. |
| 2011/0142234 A1 | 6/2011 | Rogers |
| 2011/0149874 A1 | 6/2011 | Reif |
| 2011/0151415 A1 | 6/2011 | Darling et al. |
| 2011/0151418 A1 | 6/2011 | Delespaul et al. |
| 2011/0157046 A1 | 6/2011 | Lee et al. |
| 2011/0157055 A1 | 6/2011 | Tilley et al. |
| 2011/0164058 A1 | 7/2011 | Lemay |
| 2011/0164269 A1 | 7/2011 | Kamishiro |
| 2011/0167369 A1 | 7/2011 | van Os |
| 2011/0167382 A1 | 7/2011 | Van Os |
| 2011/0167383 A1 | 7/2011 | Schuller et al. |
| 2011/0170004 A1 | 7/2011 | Nunes |
| 2011/0175832 A1 | 7/2011 | Miyazawa et al. |
| 2011/0178811 A1 | 7/2011 | Sheridan |
| 2011/0179386 A1 | 7/2011 | Shaffer et al. |
| 2011/0181521 A1 | 7/2011 | Reid et al. |
| 2011/0183650 A1 | 7/2011 | Mckee |
| 2011/0187497 A1 | 8/2011 | Chin |
| 2011/0191695 A1 | 8/2011 | Dinka et al. |
| 2011/0197165 A1 | 8/2011 | Filippov et al. |
| 2011/0202861 A1 | 8/2011 | Fritzley et al. |
| 2011/0202883 A1 | 8/2011 | Oh et al. |
| 2011/0205182 A1 | 8/2011 | Miyazawa et al. |
| 2011/0205851 A1 | 8/2011 | Harris |
| 2011/0214158 A1 | 9/2011 | Pasquero et al. |
| 2011/0215921 A1 | 9/2011 | Ben et al. |
| 2011/0225426 A1 | 9/2011 | Agarwal et al. |
| 2011/0225547 A1 | 9/2011 | Fong et al. |
| 2011/0227872 A1 | 9/2011 | Huska et al. |
| 2011/0231914 A1 | 9/2011 | Hung |
| 2011/0234633 A1 | 9/2011 | Ogura et al. |
| 2011/0239158 A1 | 9/2011 | Barraclough et al. |
| 2011/0250895 A1 | 10/2011 | Wohlert et al. |
| 2011/0252146 A1 | 10/2011 | Santamaria et al. |
| 2011/0254683 A1 | 10/2011 | Soldan et al. |
| 2011/0254684 A1 | 10/2011 | Antoci et al. |
| 2011/0265002 A1 | 10/2011 | Hong et al. |
| 2011/0265041 A1 | 10/2011 | Ganetakos et al. |
| 2011/0273526 A1 | 11/2011 | Mehin et al. |
| 2011/0275358 A1 | 11/2011 | Faenger |
| 2011/0276901 A1 | 11/2011 | Zambetti et al. |
| 2011/0279323 A1 | 11/2011 | Hung et al. |
| 2011/0279852 A1 | 11/2011 | Oda et al. |
| 2011/0281568 A1 | 11/2011 | Le |
| 2011/0283334 A1 | 11/2011 | Choi et al. |
| 2011/0285656 A1 | 11/2011 | Yaksick et al. |
| 2011/0291971 A1 | 12/2011 | Masaki et al. |
| 2011/0302518 A1 | 12/2011 | Zhang |
| 2011/0304648 A1 | 12/2011 | Kim et al. |
| 2011/0306393 A1 | 12/2011 | Goldman et al. |
| 2011/0306421 A1 | 12/2011 | Nishimoto et al. |
| 2011/0314398 A1 | 12/2011 | Yano et al. |
| 2011/0316769 A1 | 12/2011 | Boettcher et al. |
| 2011/0316858 A1 | 12/2011 | Shen et al. |

(56)　　　References Cited

U.S. PATENT DOCUMENTS

| | | |
|---|---|---|
| 2011/0316884 A1 | 12/2011 | Giambalvo et al. |
| 2011/0319056 A1 | 12/2011 | Toy et al. |
| 2011/0320450 A1 | 12/2011 | Liu et al. |
| 2012/0004920 A1 | 1/2012 | Kelly et al. |
| 2012/0005476 A1 | 1/2012 | Wei et al. |
| 2012/0008526 A1 | 1/2012 | Borghei et al. |
| 2012/0011449 A1 | 1/2012 | Sasson et al. |
| 2012/0015779 A1 | 1/2012 | Powch et al. |
| 2012/0016678 A1 | 1/2012 | Gruber et al. |
| 2012/0019400 A1 | 1/2012 | Patel et al. |
| 2012/0019513 A1 | 1/2012 | Fong et al. |
| 2012/0019610 A1* | 1/2012 | Hornyak .......... H04N 21/41407 |
| | | 348/14.02 |
| 2012/0022872 A1 | 1/2012 | Gruber et al. |
| 2012/0024947 A1 | 2/2012 | Naelon et al. |
| 2012/0026110 A1 | 2/2012 | Yamano et al. |
| 2012/0028707 A1 | 2/2012 | Raitt et al. |
| 2012/0033028 A1 | 2/2012 | Murphy et al. |
| 2012/0036556 A1 | 2/2012 | Lebeau et al. |
| 2012/0038546 A1 | 2/2012 | Cromer et al. |
| 2012/0040719 A1 | 2/2012 | Lee et al. |
| 2012/0044062 A1 | 2/2012 | Jersa et al. |
| 2012/0047380 A1 | 2/2012 | Nurmi |
| 2012/0050185 A1 | 3/2012 | Davydov et al. |
| 2012/0051560 A1 | 3/2012 | Sanders |
| 2012/0052920 A1 | 3/2012 | Kobayashi et al. |
| 2012/0052921 A1 | 3/2012 | Lim et al. |
| 2012/0054651 A1 | 3/2012 | Tsai |
| 2012/0054655 A1 | 3/2012 | Kang et al. |
| 2012/0059664 A1 | 3/2012 | Georgiev et al. |
| 2012/0059787 A1 | 3/2012 | Brown et al. |
| 2012/0059813 A1 | 3/2012 | Sejnoha et al. |
| 2012/0060077 A1 | 3/2012 | Mate et al. |
| 2012/0066629 A1 | 3/2012 | Lee et al. |
| 2012/0066731 A1 | 3/2012 | Vasquez et al. |
| 2012/0071149 A1 | 3/2012 | Bandyopadhyay et al. |
| 2012/0071770 A1 | 3/2012 | Grey et al. |
| 2012/0079126 A1 | 3/2012 | Evans et al. |
| 2012/0084692 A1 | 4/2012 | Bae |
| 2012/0084729 A1 | 4/2012 | Lin et al. |
| 2012/0092383 A1 | 4/2012 | Hysek et al. |
| 2012/0096069 A1 | 4/2012 | Chan |
| 2012/0096076 A1 | 4/2012 | Chan et al. |
| 2012/0096386 A1 | 4/2012 | Baumann et al. |
| 2012/0102399 A1 | 4/2012 | Nicholson |
| 2012/0102437 A1 | 4/2012 | Worley et al. |
| 2012/0105358 A1 | 5/2012 | Momeyer et al. |
| 2012/0108215 A1 | 5/2012 | Kameli et al. |
| 2012/0113008 A1 | 5/2012 | Makinen et al. |
| 2012/0117507 A1 | 5/2012 | Tseng et al. |
| 2012/0124499 A1 | 5/2012 | Tsai et al. |
| 2012/0129496 A1 | 5/2012 | Park et al. |
| 2012/0131458 A1 | 5/2012 | Hayes et al. |
| 2012/0136998 A1 | 5/2012 | Hough et al. |
| 2012/0143361 A1 | 6/2012 | Kurabayashi et al. |
| 2012/0143694 A1 | 6/2012 | Zargahi et al. |
| 2012/0146899 A1 | 6/2012 | Teng |
| 2012/0149405 A1 | 6/2012 | Bhat |
| 2012/0150970 A1 | 6/2012 | Peterson et al. |
| 2012/0154293 A1 | 6/2012 | Hinckley et al. |
| 2012/0154303 A1 | 6/2012 | Lazaridis et al. |
| 2012/0157114 A1 | 6/2012 | Alameh et al. |
| 2012/0158511 A1 | 6/2012 | Lucero et al. |
| 2012/0159380 A1 | 6/2012 | Kocienda et al. |
| 2012/0167008 A1 | 6/2012 | Zaman et al. |
| 2012/0172088 A1 | 7/2012 | Kirch et al. |
| 2012/0178431 A1 | 7/2012 | Gold |
| 2012/0185542 A1 | 7/2012 | Vyrros et al. |
| 2012/0185547 A1 | 7/2012 | Hugg et al. |
| 2012/0204123 A1 | 8/2012 | Bauer et al. |
| 2012/0210226 A1 | 8/2012 | Mccoy et al. |
| 2012/0214458 A1 | 8/2012 | Levien et al. |
| 2012/0216127 A1 | 8/2012 | Meyr |
| 2012/0218177 A1 | 8/2012 | Pang et al. |
| 2012/0218201 A1 | 8/2012 | Tamas et al. |
| 2012/0222092 A1 | 8/2012 | Rabii |
| 2012/0223890 A1 | 9/2012 | Borovsky et al. |
| 2012/0223935 A1 | 9/2012 | Renwick et al. |
| 2012/0233571 A1 | 9/2012 | Wever et al. |
| 2012/0239949 A1 | 9/2012 | Kalyanasundaram et al. |
| 2012/0254263 A1 | 10/2012 | Hiestermann et al. |
| 2012/0254318 A1 | 10/2012 | Poniatowski |
| 2012/0254324 A1 | 10/2012 | Majeti et al. |
| 2012/0254325 A1 | 10/2012 | Majeti et al. |
| 2012/0254804 A1 | 10/2012 | Sheha et al. |
| 2012/0257095 A1 | 10/2012 | Velazquez |
| 2012/0260169 A1 | 10/2012 | Schwartz et al. |
| 2012/0272230 A1 | 10/2012 | Lee |
| 2012/0276956 A1 | 11/2012 | Tanioka |
| 2012/0284185 A1 | 11/2012 | Mettler et al. |
| 2012/0284256 A1 | 11/2012 | Mahajan et al. |
| 2012/0284297 A1 | 11/2012 | Aguera-Arcas et al. |
| 2012/0284673 A1 | 11/2012 | Lamb et al. |
| 2012/0289217 A1 | 11/2012 | Riemer et al. |
| 2012/0290109 A1 | 11/2012 | Engelberg et al. |
| 2012/0290653 A1 | 11/2012 | Sharkey |
| 2012/0290657 A1 | 11/2012 | Parks et al. |
| 2012/0290943 A1 | 11/2012 | Toney et al. |
| 2012/0290950 A1 | 11/2012 | Rapaport et al. |
| 2012/0294118 A1 | 11/2012 | Haulick et al. |
| 2012/0297017 A1 | 11/2012 | Livshits et al. |
| 2012/0302256 A1 | 11/2012 | Pai et al. |
| 2012/0304084 A1 | 11/2012 | Kim et al. |
| 2012/0306770 A1 | 12/2012 | Moore et al. |
| 2012/0313847 A1 | 12/2012 | Boda et al. |
| 2012/0322508 A1 | 12/2012 | Forstall et al. |
| 2012/0324357 A1 | 12/2012 | Viegers et al. |
| 2012/0324390 A1 | 12/2012 | Tao et al. |
| 2013/0002580 A1 | 1/2013 | Sudou |
| 2013/0005487 A1 | 1/2013 | Frazzini et al. |
| 2013/0007203 A1 | 1/2013 | Szu |
| 2013/0007665 A1 | 1/2013 | Chaudhri et al. |
| 2013/0014019 A1 | 1/2013 | Kim et al. |
| 2013/0016818 A1 | 1/2013 | Cohn |
| 2013/0017846 A1 | 1/2013 | Schoppe |
| 2013/0019175 A1 | 1/2013 | Kotler et al. |
| 2013/0022221 A1 | 1/2013 | Kallai et al. |
| 2013/0024781 A1 | 1/2013 | Douillet et al. |
| 2013/0024802 A1 | 1/2013 | Zeng et al. |
| 2013/0024932 A1 | 1/2013 | Toebes et al. |
| 2013/0026293 A1 | 1/2013 | Schneider et al. |
| 2013/0027289 A1 | 1/2013 | Choi et al. |
| 2013/0027341 A1 | 1/2013 | Mastandrea |
| 2013/0027412 A1 | 1/2013 | Roddy |
| 2013/0031217 A1 | 1/2013 | Rajapakse |
| 2013/0035942 A1 | 2/2013 | Kim et al. |
| 2013/0041790 A1 | 2/2013 | Murugesan et al. |
| 2013/0044080 A1 | 2/2013 | Chiang |
| 2013/0046397 A1 | 2/2013 | Fadell et al. |
| 2013/0046893 A1 | 2/2013 | Hauser et al. |
| 2013/0047084 A1 | 2/2013 | Sanders et al. |
| 2013/0047233 A1 | 2/2013 | Fisk et al. |
| 2013/0050263 A1 | 2/2013 | Khoe et al. |
| 2013/0051755 A1 | 2/2013 | Brown et al. |
| 2013/0053007 A1 | 2/2013 | Cosman et al. |
| 2013/0053107 A1 | 2/2013 | Kang et al. |
| 2013/0054697 A1 | 2/2013 | Cha et al. |
| 2013/0057566 A1 | 3/2013 | Kriese et al. |
| 2013/0060687 A1 | 3/2013 | Bak et al. |
| 2013/0061155 A1 | 3/2013 | Hon |
| 2013/0063364 A1* | 3/2013 | Moore ................ G06F 3/04883 |
| | | 345/173 |
| 2013/0063366 A1 | 3/2013 | Paul |
| 2013/0063383 A1 | 3/2013 | Anderssonreimer et al. |
| 2013/0065566 A1 | 3/2013 | Gisby et al. |
| 2013/0067027 A1 | 3/2013 | Song et al. |
| 2013/0067391 A1 | 3/2013 | Pittappilly et al. |
| 2013/0067407 A1 | 3/2013 | Dehmann |
| 2013/0069893 A1 | 3/2013 | Brinda et al. |
| 2013/0073286 A1 | 3/2013 | Bastea-Forte et al. |
| 2013/0073584 A1 | 3/2013 | Kuper et al. |
| 2013/0074194 A1 | 3/2013 | White et al. |
| 2013/0076757 A1 | 3/2013 | Pritting |
| 2013/0080177 A1 | 3/2013 | Chen |

(56) References Cited

U.S. PATENT DOCUMENTS

| | | |
|---|---|---|
| 2013/0080516 A1 | 3/2013 | Bologh |
| 2013/0080525 A1 | 3/2013 | Aoki et al. |
| 2013/0080955 A1 | 3/2013 | Reimann et al. |
| 2013/0082819 A1 | 4/2013 | Cotterill |
| 2013/0082965 A1 | 4/2013 | Wada et al. |
| 2013/0086637 A1 | 4/2013 | Cotterill et al. |
| 2013/0091205 A1 | 4/2013 | Kotler et al. |
| 2013/0091214 A1 | 4/2013 | Kellerman et al. |
| 2013/0091298 A1 | 4/2013 | Ozzie et al. |
| 2013/0091429 A1 | 4/2013 | Weng et al. |
| 2013/0091443 A1 | 4/2013 | Park et al. |
| 2013/0093715 A1 | 4/2013 | Marsden et al. |
| 2013/0093833 A1 | 4/2013 | Al-Asaaed et al. |
| 2013/0094666 A1 | 4/2013 | Haaff et al. |
| 2013/0094770 A1 | 4/2013 | Lee et al. |
| 2013/0102281 A1 | 4/2013 | Kanda et al. |
| 2013/0102298 A1 | 4/2013 | Goodman et al. |
| 2013/0103797 A1 | 4/2013 | Park et al. |
| 2013/0107674 A1 | 5/2013 | Gossweiler et al. |
| 2013/0111579 A1 | 5/2013 | Newman et al. |
| 2013/0115932 A1 | 5/2013 | Williams et al. |
| 2013/0116967 A1 | 5/2013 | Akcasu et al. |
| 2013/0117058 A1 | 5/2013 | Norton et al. |
| 2013/0117383 A1 | 5/2013 | Hymel et al. |
| 2013/0117693 A1 | 5/2013 | Anderson et al. |
| 2013/0120106 A1 | 5/2013 | Cauwels et al. |
| 2013/0120254 A1 | 5/2013 | Mun et al. |
| 2013/0121119 A1 | 5/2013 | Umamoto |
| 2013/0124207 A1 | 5/2013 | Sarin et al. |
| 2013/0130745 A1 | 5/2013 | Niu et al. |
| 2013/0137073 A1 | 5/2013 | Nacey et al. |
| 2013/0141365 A1 | 6/2013 | Lynn et al. |
| 2013/0141371 A1 | 6/2013 | Hallford et al. |
| 2013/0141514 A1 | 6/2013 | Chao et al. |
| 2013/0142495 A1 | 6/2013 | Terai |
| 2013/0145303 A1 | 6/2013 | Prakash et al. |
| 2013/0157729 A1 | 6/2013 | Tabe |
| 2013/0159858 A1 | 6/2013 | Joffray et al. |
| 2013/0159941 A1 | 6/2013 | Langlois et al. |
| 2013/0166332 A1 | 6/2013 | Hammad |
| 2013/0169219 A1 | 7/2013 | Gray |
| 2013/0169870 A1 | 7/2013 | Lee et al. |
| 2013/0170324 A1 | 7/2013 | Tu et al. |
| 2013/0173699 A1 | 7/2013 | Parks et al. |
| 2013/0173794 A1 | 7/2013 | Agerbak et al. |
| 2013/0174044 A1 | 7/2013 | Hill |
| 2013/0187753 A1 | 7/2013 | Chiriyankandath |
| 2013/0189963 A1 | 7/2013 | Epp et al. |
| 2013/0191454 A1 | 7/2013 | Oliver et al. |
| 2013/0191785 A1 | 7/2013 | Wu et al. |
| 2013/0191911 A1 | 7/2013 | Dellinger et al. |
| 2013/0194476 A1 | 8/2013 | Shimosato |
| 2013/0197679 A1 | 8/2013 | Balakrishnan et al. |
| 2013/0201098 A1 | 8/2013 | Schilit et al. |
| 2013/0205194 A1 | 8/2013 | Decker et al. |
| 2013/0205210 A1 | 8/2013 | Jeon et al. |
| 2013/0205375 A1 | 8/2013 | Woxblom et al. |
| 2013/0209972 A1 | 8/2013 | Carter et al. |
| 2013/0212212 A1 | 8/2013 | Addepalli et al. |
| 2013/0212470 A1 | 8/2013 | Karunamuni et al. |
| 2013/0212492 A1 | 8/2013 | Chen et al. |
| 2013/0215044 A1 | 8/2013 | Ahn et al. |
| 2013/0222230 A1 | 8/2013 | Choi et al. |
| 2013/0222236 A1 | 8/2013 | Gärdenfors et al. |
| 2013/0222270 A1 | 8/2013 | Winkler et al. |
| 2013/0227412 A1 | 8/2013 | Ornstein et al. |
| 2013/0230293 A1 | 9/2013 | Boyle et al. |
| 2013/0231127 A1 | 9/2013 | Kildal et al. |
| 2013/0234924 A1 | 9/2013 | Janefalkar et al. |
| 2013/0234929 A1 | 9/2013 | Libin |
| 2013/0234969 A1 | 9/2013 | Yeh et al. |
| 2013/0239202 A1 | 9/2013 | Adams et al. |
| 2013/0243924 A1 | 9/2013 | Bhandari et al. |
| 2013/0244615 A1 | 9/2013 | Miller |
| 2013/0244633 A1 | 9/2013 | Jacobs et al. |
| 2013/0246522 A1 | 9/2013 | Bilinski et al. |
| 2013/0246916 A1 | 9/2013 | Reimann et al. |
| 2013/0254574 A1 | 9/2013 | Zacchio et al. |
| 2013/0254705 A1 | 9/2013 | Mooring et al. |
| 2013/0254714 A1 | 9/2013 | Shin et al. |
| 2013/0256403 A1 | 10/2013 | Keith |
| 2013/0259247 A1 | 10/2013 | Kim |
| 2013/0262298 A1 | 10/2013 | Morley et al. |
| 2013/0262857 A1 | 10/2013 | Neuman et al. |
| 2013/0263043 A1 | 10/2013 | Sarbin et al. |
| 2013/0268593 A1 | 10/2013 | Parekh |
| 2013/0275875 A1 | 10/2013 | Gruber et al. |
| 2013/0275881 A1 | 10/2013 | Hahm et al. |
| 2013/0282844 A1 | 10/2013 | Logan et al. |
| 2013/0283199 A1 | 10/2013 | Selig et al. |
| 2013/0283283 A1 | 10/2013 | Wang et al. |
| 2013/0298024 A1 | 11/2013 | Rhee et al. |
| 2013/0301482 A1 | 11/2013 | Katis et al. |
| 2013/0304758 A1 | 11/2013 | Gruber et al. |
| 2013/0305354 A1 | 11/2013 | King et al. |
| 2013/0307809 A1 | 11/2013 | Sudou |
| 2013/0310089 A1 | 11/2013 | Gianoukos et al. |
| 2013/0311597 A1 | 11/2013 | Arrouye et al. |
| 2013/0311986 A1 | 11/2013 | Arrouye et al. |
| 2013/0311997 A1 | 11/2013 | Gruber et al. |
| 2013/0314302 A1 | 11/2013 | Jeung et al. |
| 2013/0317688 A1 | 11/2013 | Uratani et al. |
| 2013/0318158 A1 | 11/2013 | Teng et al. |
| 2013/0318249 A1 | 11/2013 | Mcdonough et al. |
| 2013/0321314 A1 | 12/2013 | Oh et al. |
| 2013/0322634 A1 | 12/2013 | Bennett et al. |
| 2013/0324081 A1 | 12/2013 | Gargi et al. |
| 2013/0325967 A1 | 12/2013 | Parks et al. |
| 2013/0326418 A1 | 12/2013 | Utsuki et al. |
| 2013/0329924 A1 | 12/2013 | Fleizach et al. |
| 2013/0331130 A1 | 12/2013 | Lee |
| 2013/0332162 A1 | 12/2013 | Keen |
| 2013/0332560 A1 | 12/2013 | Knight et al. |
| 2013/0333006 A1 | 12/2013 | Tapling et al. |
| 2013/0339436 A1 | 12/2013 | Gray |
| 2013/0339772 A1 | 12/2013 | Yu |
| 2013/0345978 A1 | 12/2013 | Lush et al. |
| 2013/0346068 A1 | 12/2013 | Solem et al. |
| 2013/0346859 A1 | 12/2013 | Bates et al. |
| 2013/0346882 A1 | 12/2013 | Shiplacoff et al. |
| 2013/0346892 A1 | 12/2013 | Wren et al. |
| 2013/0347018 A1 | 12/2013 | Limp et al. |
| 2013/0347022 A1 | 12/2013 | Bates et al. |
| 2014/0003597 A1 | 1/2014 | Lazaridis et al. |
| 2014/0006562 A1 | 1/2014 | Handa et al. |
| 2014/0012927 A1 | 1/2014 | Gertzfield et al. |
| 2014/0013414 A1 | 1/2014 | Bruck et al. |
| 2014/0015784 A1 | 1/2014 | Oonishi |
| 2014/0026188 A1 | 1/2014 | Gubler |
| 2014/0032682 A1 | 1/2014 | Prado et al. |
| 2014/0032706 A1 | 1/2014 | Kuscher et al. |
| 2014/0036639 A1 | 2/2014 | Boni et al. |
| 2014/0037107 A1 | 2/2014 | Marino et al. |
| 2014/0040831 A1 | 2/2014 | Akasaka et al. |
| 2014/0043367 A1 | 2/2014 | Sakaino et al. |
| 2014/0043424 A1 | 2/2014 | Gava et al. |
| 2014/0045463 A1 | 2/2014 | Hsieh et al. |
| 2014/0046464 A1 | 2/2014 | Reimann |
| 2014/0047020 A1 | 2/2014 | Matus et al. |
| 2014/0047382 A1 | 2/2014 | Kim et al. |
| 2014/0047525 A1 | 2/2014 | Bonhoff |
| 2014/0049447 A1 | 2/2014 | Choi |
| 2014/0053281 A1 | 2/2014 | Benoit et al. |
| 2014/0055388 A1 | 2/2014 | Yook et al. |
| 2014/0055552 A1 | 2/2014 | Song et al. |
| 2014/0057569 A1 | 2/2014 | Toivanen et al. |
| 2014/0058860 A1 | 2/2014 | Roh et al. |
| 2014/0058873 A1 | 2/2014 | Sorensen et al. |
| 2014/0058941 A1 | 2/2014 | Moon et al. |
| 2014/0059125 A1 | 2/2014 | Hillier |
| 2014/0059448 A1 | 2/2014 | Lee |
| 2014/0059493 A1 | 2/2014 | Kim |
| 2014/0064155 A1 | 3/2014 | Evans et al. |
| 2014/0068306 A1 | 3/2014 | Oh et al. |

(56) References Cited

U.S. PATENT DOCUMENTS

| | | |
|---|---|---|
| 2014/0068314 A1 | 3/2014 | Kim et al. |
| 2014/0068751 A1 | 3/2014 | Last |
| 2014/0073256 A1 | 3/2014 | Newham et al. |
| 2014/0074570 A1 | 3/2014 | Hope et al. |
| 2014/0075003 A1 | 3/2014 | Tanaka et al. |
| 2014/0075130 A1 | 3/2014 | Bansal et al. |
| 2014/0080416 A1 | 3/2014 | Seo et al. |
| 2014/0082136 A1 | 3/2014 | Puga et al. |
| 2014/0082501 A1 | 3/2014 | Bae et al. |
| 2014/0082533 A1 | 3/2014 | Kelley et al. |
| 2014/0082715 A1 | 3/2014 | Grajek et al. |
| 2014/0085487 A1 | 3/2014 | Park et al. |
| 2014/0089196 A1 | 3/2014 | Paya et al. |
| 2014/0095965 A1 | 4/2014 | Li |
| 2014/0101169 A1 | 4/2014 | Kurata et al. |
| 2014/0104178 A1 | 4/2014 | Jo |
| 2014/0106677 A1 | 4/2014 | Altman |
| 2014/0114966 A1 | 4/2014 | Bilinski et al. |
| 2014/0122730 A1 | 5/2014 | Burch et al. |
| 2014/0123005 A1 | 5/2014 | Forstall et al. |
| 2014/0123043 A1 | 5/2014 | Schmidt et al. |
| 2014/0123257 A1 | 5/2014 | Gordon et al. |
| 2014/0125620 A1 | 5/2014 | Panther et al. |
| 2014/0126336 A1 | 5/2014 | Goeller et al. |
| 2014/0129959 A1 | 5/2014 | Battles et al. |
| 2014/0136481 A1 | 5/2014 | Quan et al. |
| 2014/0136633 A1 | 5/2014 | Murillo et al. |
| 2014/0136986 A1 | 5/2014 | Martin et al. |
| 2014/0136989 A1 | 5/2014 | Choi |
| 2014/0136990 A1 | 5/2014 | Gonnen et al. |
| 2014/0139422 A1 | 5/2014 | Mistry et al. |
| 2014/0139637 A1 | 5/2014 | Mistry et al. |
| 2014/0143671 A1 | 5/2014 | Kovalick |
| 2014/0143678 A1 | 5/2014 | Mistry et al. |
| 2014/0143682 A1 | 5/2014 | Druck et al. |
| 2014/0143737 A1 | 5/2014 | Mistry et al. |
| 2014/0149878 A1 | 5/2014 | Mischari et al. |
| 2014/0149884 A1 | 5/2014 | Flynn et al. |
| 2014/0155031 A1 | 6/2014 | Lee et al. |
| 2014/0155123 A1 | 6/2014 | Lee et al. |
| 2014/0157167 A1 | 6/2014 | Zhu |
| 2014/0164945 A1 | 6/2014 | Junqua et al. |
| 2014/0164955 A1 | 6/2014 | Thiruvidam et al. |
| 2014/0165012 A1 | 6/2014 | Shen et al. |
| 2014/0168696 A1 | 6/2014 | Matsuhara et al. |
| 2014/0171064 A1 | 6/2014 | Das |
| 2014/0171156 A1 | 6/2014 | Pattikonda et al. |
| 2014/0173439 A1 | 6/2014 | Gutierrez et al. |
| 2014/0173447 A1 | 6/2014 | Das et al. |
| 2014/0176298 A1 | 6/2014 | Kumar et al. |
| 2014/0176426 A1 | 6/2014 | Morohoshi |
| 2014/0176475 A1 | 6/2014 | Myers et al. |
| 2014/0180595 A1 | 6/2014 | Brumback et al. |
| 2014/0181183 A1 | 6/2014 | Yamamoto et al. |
| 2014/0181202 A1 | 6/2014 | Gossain |
| 2014/0181219 A1 | 6/2014 | Wang et al. |
| 2014/0181654 A1 | 6/2014 | Kumar et al. |
| 2014/0181658 A1 | 6/2014 | Kumar et al. |
| 2014/0189533 A1 | 7/2014 | Krack et al. |
| 2014/0189577 A1 | 7/2014 | Haslam et al. |
| 2014/0189584 A1 | 7/2014 | Weng et al. |
| 2014/0189589 A1 | 7/2014 | Kim et al. |
| 2014/0195972 A1 | 7/2014 | Lee et al. |
| 2014/0197946 A1 | 7/2014 | Park et al. |
| 2014/0197965 A1 | 7/2014 | Park et al. |
| 2014/0207707 A1 | 7/2014 | Na et al. |
| 2014/0213295 A1 | 7/2014 | Conklin |
| 2014/0222933 A1 | 8/2014 | Stovicek et al. |
| 2014/0223490 A1 | 8/2014 | Pan et al. |
| 2014/0233755 A1 | 8/2014 | Kim et al. |
| 2014/0237361 A1 | 8/2014 | Martin et al. |
| 2014/0239733 A1 | 8/2014 | Mach et al. |
| 2014/0240122 A1 | 8/2014 | Roberts et al. |
| 2014/0244165 A1 | 8/2014 | Bells et al. |
| 2014/0245177 A1 | 8/2014 | Maklouf et al. |
| 2014/0247229 A1 | 9/2014 | Cho et al. |
| 2014/0250391 A1 | 9/2014 | Jong et al. |
| 2014/0258292 A1 | 9/2014 | Thramann et al. |
| 2014/0258935 A1 | 9/2014 | Nishida et al. |
| 2014/0267002 A1 | 9/2014 | Luna |
| 2014/0267303 A1 | 9/2014 | Larkin et al. |
| 2014/0267911 A1 | 9/2014 | Grant et al. |
| 2014/0269614 A1 | 9/2014 | Maguire et al. |
| 2014/0270183 A1 | 9/2014 | Luna |
| 2014/0274211 A1 | 9/2014 | Sejnoha et al. |
| 2014/0278435 A1 | 9/2014 | Ganong, III et al. |
| 2014/0279728 A1 | 9/2014 | Skole |
| 2014/0282103 A1 | 9/2014 | Jerry |
| 2014/0282240 A1 | 9/2014 | Flynn et al. |
| 2014/0282254 A1 | 9/2014 | Feiereisen et al. |
| 2014/0283018 A1 | 9/2014 | Dadu et al. |
| 2014/0289660 A1 | 9/2014 | Min |
| 2014/0298432 A1 | 10/2014 | Brown |
| 2014/0304664 A1 | 10/2014 | Lee et al. |
| 2014/0306898 A1 | 10/2014 | Cueto |
| 2014/0310348 A1 | 10/2014 | Keskitalo et al. |
| 2014/0320387 A1 | 10/2014 | Eriksson et al. |
| 2014/0320425 A1 | 10/2014 | Jeong et al. |
| 2014/0325447 A1 | 10/2014 | Jin et al. |
| 2014/0334644 A1 | 11/2014 | Selig et al. |
| 2014/0335789 A1 | 11/2014 | Cohen et al. |
| 2014/0337450 A1 | 11/2014 | Choudhary et al. |
| 2014/0337791 A1 | 11/2014 | Agnetta et al. |
| 2014/0337931 A1 | 11/2014 | Cotterill |
| 2014/0344375 A1 | 11/2014 | Hauser et al. |
| 2014/0344687 A1 | 11/2014 | Durham et al. |
| 2014/0344711 A1 | 11/2014 | Hallerstrom Sjostedt et al. |
| 2014/0344904 A1 | 11/2014 | Venkataramani et al. |
| 2014/0347289 A1 | 11/2014 | Lee et al. |
| 2014/0354527 A1 | 12/2014 | Chen et al. |
| 2014/0354759 A1 | 12/2014 | Cranfill et al. |
| 2014/0359140 A1 | 12/2014 | Shankarraman |
| 2014/0359454 A1 | 12/2014 | Lee et al. |
| 2014/0359637 A1 | 12/2014 | Yan |
| 2014/0359709 A1 | 12/2014 | Nassar et al. |
| 2014/0362293 A1 | 12/2014 | Bakar et al. |
| 2014/0363024 A1 | 12/2014 | Apodaca |
| 2014/0364056 A1 | 12/2014 | Belk et al. |
| 2014/0365226 A1 | 12/2014 | Sinha |
| 2014/0365904 A1 | 12/2014 | Kim et al. |
| 2014/0365944 A1 | 12/2014 | Moore et al. |
| 2014/0372309 A1 | 12/2014 | Bullard et al. |
| 2014/0375577 A1 | 12/2014 | Yeh et al. |
| 2014/0380187 A1 | 12/2014 | Gardenfors et al. |
| 2014/0380229 A1 | 12/2014 | Volodin et al. |
| 2015/0007049 A1 | 1/2015 | Langlois |
| 2015/0012435 A1 | 1/2015 | Wright et al. |
| 2015/0019944 A1 | 1/2015 | Kalgi |
| 2015/0019963 A1 | 1/2015 | Park et al. |
| 2015/0020081 A1 | 1/2015 | Cho et al. |
| 2015/0022438 A1 | 1/2015 | Hong |
| 2015/0032457 A1 | 1/2015 | Koo et al. |
| 2015/0032812 A1 | 1/2015 | Dudley |
| 2015/0033136 A1 | 1/2015 | Sasaki et al. |
| 2015/0033361 A1 | 1/2015 | Choi et al. |
| 2015/0039494 A1 | 2/2015 | Sinton et al. |
| 2015/0040029 A1 | 2/2015 | Koum et al. |
| 2015/0042852 A1 | 2/2015 | Lee et al. |
| 2015/0046828 A1 | 2/2015 | Desai et al. |
| 2015/0049591 A1* | 2/2015 | Adams ................... G04G 21/04 |
| | | 368/239 |
| 2015/0051721 A1 | 2/2015 | Cheng |
| 2015/0051913 A1 | 2/2015 | Choi |
| 2015/0052222 A1 | 2/2015 | Farrell et al. |
| 2015/0052461 A1 | 2/2015 | Sullivan et al. |
| 2015/0055197 A1 | 2/2015 | Romanoff et al. |
| 2015/0057945 A1 | 2/2015 | White et al. |
| 2015/0067513 A1 | 3/2015 | Zambetti et al. |
| 2015/0067521 A1 | 3/2015 | Heo et al. |
| 2015/0067803 A1 | 3/2015 | Alduaiji |
| 2015/0082446 A1 | 3/2015 | Flowers et al. |
| 2015/0085057 A1 | 3/2015 | Ouyang et al. |
| 2015/0086041 A1 | 3/2015 | Reimann |
| 2015/0089359 A1 | 3/2015 | Brisebois |

(56) References Cited

U.S. PATENT DOCUMENTS

| | | | |
|---|---|---|---|
| 2015/0092520 A1 | 4/2015 | Robison et al. | |
| 2015/0095175 A1 | 4/2015 | Dua | |
| 2015/0098309 A1* | 4/2015 | Adams | G04F 10/00 |
| | | | 368/10 |
| 2015/0100537 A1 | 4/2015 | Grieves et al. | |
| 2015/0100621 A1 | 4/2015 | Pan | |
| 2015/0100623 A1 | 4/2015 | Gudell et al. | |
| 2015/0102992 A1 | 4/2015 | Klement et al. | |
| 2015/0110419 A1 | 4/2015 | Xu et al. | |
| 2015/0111559 A1 | 4/2015 | Leaver et al. | |
| 2015/0112990 A1 | 4/2015 | Van Os et al. | |
| 2015/0113407 A1 | 4/2015 | Hoffert et al. | |
| 2015/0113435 A1 | 4/2015 | Phillips | |
| 2015/0113468 A1 | 4/2015 | Clark | |
| 2015/0116464 A1 | 4/2015 | Tanaka | |
| 2015/0117162 A1 | 4/2015 | Tsai et al. | |
| 2015/0120545 A1 | 4/2015 | Fiore et al. | |
| 2015/0130737 A1 | 5/2015 | Im et al. | |
| 2015/0130830 A1 | 5/2015 | Nagasaki et al. | |
| 2015/0131121 A1 | 5/2015 | Kang | |
| 2015/0135282 A1 | 5/2015 | Kong et al. | |
| 2015/0138101 A1 | 5/2015 | Park et al. | |
| 2015/0143419 A1 | 5/2015 | Bhagwat et al. | |
| 2015/0149599 A1 | 5/2015 | Caunter et al. | |
| 2015/0149967 A1 | 5/2015 | Bernstein et al. | |
| 2015/0153952 A1 | 6/2015 | Grossman et al. | |
| 2015/0154589 A1 | 6/2015 | Li | |
| 2015/0154676 A1 | 6/2015 | Matousek et al. | |
| 2015/0156307 A1 | 6/2015 | Kim et al. | |
| 2015/0160806 A1 | 6/2015 | Fey et al. | |
| 2015/0163188 A1 | 6/2015 | Faaborg et al. | |
| 2015/0163788 A1 | 6/2015 | Karunakaran | |
| 2015/0169893 A1 | 6/2015 | Desai | |
| 2015/0172393 A1 | 6/2015 | Oplinger et al. | |
| 2015/0172584 A1 | 6/2015 | Park et al. | |
| 2015/0179008 A1 | 6/2015 | Sung et al. | |
| 2015/0185703 A1 | 7/2015 | Tanaka | |
| 2015/0185849 A1 | 7/2015 | Ramsay et al. | |
| 2015/0186892 A1 | 7/2015 | Zhang et al. | |
| 2015/0188869 A1 | 7/2015 | Smilak et al. | |
| 2015/0189426 A1 | 7/2015 | Pang | |
| 2015/0193069 A1 | 7/2015 | Di Censo et al. | |
| 2015/0193392 A1 | 7/2015 | Greenblatt et al. | |
| 2015/0194050 A1 | 7/2015 | Lee | |
| 2015/0195133 A1 | 7/2015 | Sheets et al. | |
| 2015/0195179 A1 | 7/2015 | Skare et al. | |
| 2015/0195649 A1 | 7/2015 | Vogt | |
| 2015/0199967 A1 | 7/2015 | Reddy et al. | |
| 2015/0200715 A1 | 7/2015 | Oiwa et al. | |
| 2015/0205353 A1 | 7/2015 | Feng et al. | |
| 2015/0205971 A1 | 7/2015 | Sanio et al. | |
| 2015/0208158 A1 | 7/2015 | Sanders | |
| 2015/0212681 A1 | 7/2015 | Shinozaki et al. | |
| 2015/0213542 A1 | 7/2015 | Wallaja | |
| 2015/0215128 A1 | 7/2015 | Pal | |
| 2015/0215382 A1 | 7/2015 | Arora et al. | |
| 2015/0215398 A1 | 7/2015 | Murphy et al. | |
| 2015/0217163 A1 | 8/2015 | Amis et al. | |
| 2015/0220774 A1 | 8/2015 | Ebersman et al. | |
| 2015/0222615 A1 | 8/2015 | Allain et al. | |
| 2015/0222680 A1 | 8/2015 | Grover | |
| 2015/0223005 A1 | 8/2015 | Hardman et al. | |
| 2015/0229650 A1 | 8/2015 | Grigg et al. | |
| 2015/0229750 A1 | 8/2015 | Zhou et al. | |
| 2015/0229782 A1 | 8/2015 | Zuidema et al. | |
| 2015/0242065 A1 | 8/2015 | Ko et al. | |
| 2015/0242073 A1 | 8/2015 | Munoz et al. | |
| 2015/0242597 A1 | 8/2015 | Danciu | |
| 2015/0242611 A1 | 8/2015 | Cotterill | |
| 2015/0242837 A1 | 8/2015 | Yarbrough et al. | |
| 2015/0243163 A1 | 8/2015 | Shoemake | |
| 2015/0248200 A1 | 9/2015 | Cho et al. | |
| 2015/0248235 A1 | 9/2015 | Offenberg et al. | |
| 2015/0248268 A1 | 9/2015 | Kumar et al. | |
| 2015/0248389 A1 | 9/2015 | Kahn et al. | |
| 2015/0249540 A1 | 9/2015 | Khalil et al. | |
| 2015/0253960 A1 | 9/2015 | Lin et al. | |
| 2015/0254661 A1 | 9/2015 | Lanc | |
| 2015/0261410 A1 | 9/2015 | Kumar et al. | |
| 2015/0261415 A1 | 9/2015 | Lee et al. | |
| 2015/0261493 A1 | 9/2015 | Lemmon et al. | |
| 2015/0262183 A1 | 9/2015 | Gervais et al. | |
| 2015/0264303 A1 | 9/2015 | Chastney et al. | |
| 2015/0269848 A1 | 9/2015 | Yuen et al. | |
| 2015/0271120 A1 | 9/2015 | Langholz | |
| 2015/0278799 A1 | 10/2015 | Palanisamy | |
| 2015/0286360 A1 | 10/2015 | Wachter | |
| 2015/0286372 A1 | 10/2015 | Swindell et al. | |
| 2015/0286387 A1 | 10/2015 | Gu et al. | |
| 2015/0286391 A1 | 10/2015 | Jacobs et al. | |
| 2015/0286694 A1 | 10/2015 | Kaplinger et al. | |
| 2015/0286813 A1 | 10/2015 | Jakobsson | |
| 2015/0295921 A1 | 10/2015 | Cao | |
| 2015/0301608 A1 | 10/2015 | Nagaraju et al. | |
| 2015/0302856 A1 | 10/2015 | Kim et al. | |
| 2015/0304330 A1 | 10/2015 | Soamboonsrup et al. | |
| 2015/0309768 A1 | 10/2015 | Van Der Heide | |
| 2015/0312175 A1 | 10/2015 | Langholz | |
| 2015/0312184 A1 | 10/2015 | Langholz et al. | |
| 2015/0312185 A1 | 10/2015 | Langholz et al. | |
| 2015/0312299 A1 | 10/2015 | Chen | |
| 2015/0324552 A1 | 11/2015 | Beckhardt | |
| 2015/0324751 A1 | 11/2015 | Orenstein et al. | |
| 2015/0326510 A1 | 11/2015 | Tomlinson et al. | |
| 2015/0331699 A1 | 11/2015 | Mckillop et al. | |
| 2015/0331881 A1 | 11/2015 | Myles | |
| 2015/0339466 A1 | 11/2015 | Gao et al. | |
| 2015/0347010 A1 | 12/2015 | Yang et al. | |
| 2015/0347086 A1 | 12/2015 | Liedholm et al. | |
| 2015/0347738 A1 | 12/2015 | Ulrich et al. | |
| 2015/0348002 A1 | 12/2015 | Van et al. | |
| 2015/0348014 A1 | 12/2015 | Van Os et al. | |
| 2015/0348548 A1 | 12/2015 | Piernot et al. | |
| 2015/0350141 A1 | 12/2015 | Yang et al. | |
| 2015/0350296 A1 | 12/2015 | Yang et al. | |
| 2015/0350297 A1 | 12/2015 | Yang et al. | |
| 2015/0350448 A1 | 12/2015 | Coffman et al. | |
| 2015/0355816 A1 | 12/2015 | Shim | |
| 2015/0355818 A1 | 12/2015 | Corbin | |
| 2015/0355879 A1 | 12/2015 | Beckhardt et al. | |
| 2015/0356278 A1 | 12/2015 | Britt et al. | |
| 2015/0358304 A1 | 12/2015 | Beckhardt et al. | |
| 2015/0365400 A1 | 12/2015 | Cox | |
| 2015/0370455 A1 | 12/2015 | Van Os et al. | |
| 2015/0370469 A1 | 12/2015 | Leong et al. | |
| 2015/0373172 A1 | 12/2015 | Boesen | |
| 2015/0378522 A1 | 12/2015 | Butts | |
| 2015/0379476 A1 | 12/2015 | Chaudhri et al. | |
| 2016/0004417 A1 | 1/2016 | Bates | |
| 2016/0005024 A1 | 1/2016 | Harrell | |
| 2016/0005189 A1* | 1/2016 | Gray | G06V 30/413 |
| | | | 345/633 |
| 2016/0006745 A1 | 1/2016 | Furuichi et al. | |
| 2016/0011850 A1 | 1/2016 | Sheen et al. | |
| 2016/0012294 A1 | 1/2016 | Bouck | |
| 2016/0012417 A1 | 1/2016 | Mizon | |
| 2016/0014266 A1 | 1/2016 | Bhatt | |
| 2016/0018872 A1 | 1/2016 | Tu et al. | |
| 2016/0018899 A1 | 1/2016 | Tu et al. | |
| 2016/0018900 A1 | 1/2016 | Tu et al. | |
| 2016/0021168 A1 | 1/2016 | Chaudhri et al. | |
| 2016/0026429 A1 | 1/2016 | Triplett | |
| 2016/0026779 A1 | 1/2016 | Grigg et al. | |
| 2016/0028869 A1 | 1/2016 | Bhatt | |
| 2016/0034133 A1 | 2/2016 | Wilson et al. | |
| 2016/0034148 A1 | 2/2016 | Wilson et al. | |
| 2016/0034152 A1 | 2/2016 | Wilson et al. | |
| 2016/0034166 A1 | 2/2016 | Wilson et al. | |
| 2016/0034167 A1 | 2/2016 | Wilson et al. | |
| 2016/0034887 A1 | 2/2016 | Lee | |
| 2016/0036996 A1 | 2/2016 | Midholt et al. | |
| 2016/0037345 A1 | 2/2016 | Margadoudakis | |
| 2016/0041597 A1 | 2/2016 | Graham et al. | |
| 2016/0048705 A1 | 2/2016 | Yang | |

(56)                References Cited

U.S. PATENT DOCUMENTS

| | | |
|---|---|---|
| 2016/0050199 A1 | 2/2016 | Ganesan |
| 2016/0050476 A1 | 2/2016 | Patil |
| 2016/0054710 A1 | 2/2016 | Jo et al. |
| 2016/0054841 A1 | 2/2016 | Yang et al. |
| 2016/0058336 A1 | 3/2016 | Blahnik et al. |
| 2016/0062487 A1 | 3/2016 | Foss et al. |
| 2016/0062540 A1 | 3/2016 | Yang et al. |
| 2016/0062567 A1 | 3/2016 | Yang et al. |
| 2016/0062570 A1 | 3/2016 | Dascola et al. |
| 2016/0062589 A1 | 3/2016 | Wan et al. |
| 2016/0062606 A1 | 3/2016 | Vega et al. |
| 2016/0062719 A1 | 3/2016 | Romano et al. |
| 2016/0063748 A1 | 3/2016 | Kim et al. |
| 2016/0065505 A1 | 3/2016 | Iskander |
| 2016/0065707 A1 | 3/2016 | Yang et al. |
| 2016/0065708 A1 | 3/2016 | Yang et al. |
| 2016/0066277 A1 | 3/2016 | Yang et al. |
| 2016/0073223 A1 | 3/2016 | Woolsey et al. |
| 2016/0077734 A1 | 3/2016 | Buxton et al. |
| 2016/0077794 A1 | 3/2016 | Kim et al. |
| 2016/0080552 A1 | 3/2016 | Keating et al. |
| 2016/0086176 A1 | 3/2016 | Henrique et al. |
| 2016/0088039 A1 | 3/2016 | Millington et al. |
| 2016/0088146 A1 | 3/2016 | Ying et al. |
| 2016/0092072 A1 | 3/2016 | So et al. |
| 2016/0092665 A1 | 3/2016 | Cowan et al. |
| 2016/0097651 A1 | 4/2016 | Jung et al. |
| 2016/0103970 A1 | 4/2016 | Liu et al. |
| 2016/0117147 A1 | 4/2016 | Zambetti et al. |
| 2016/0124592 A1 | 5/2016 | Kidron et al. |
| 2016/0127799 A1 | 5/2016 | Alsina et al. |
| 2016/0132132 A1 | 5/2016 | Li |
| 2016/0132864 A1 | 5/2016 | Shah et al. |
| 2016/0134488 A1 | 5/2016 | Straub et al. |
| 2016/0134942 A1 | 5/2016 | Lo |
| 2016/0142763 A1 | 5/2016 | Kim et al. |
| 2016/0150624 A1 | 5/2016 | Meerbeek et al. |
| 2016/0155443 A1 | 6/2016 | Khan et al. |
| 2016/0156687 A1 | 6/2016 | Leung |
| 2016/0156992 A1 | 6/2016 | Kuper |
| 2016/0162252 A1 | 6/2016 | Di Censo et al. |
| 2016/0165600 A1 | 6/2016 | Choi et al. |
| 2016/0171482 A1 | 6/2016 | Muncey et al. |
| 2016/0173617 A1 | 6/2016 | Allinson |
| 2016/0183046 A1 | 6/2016 | Kwon |
| 2016/0188181 A1 | 6/2016 | Smith |
| 2016/0189451 A1 | 6/2016 | Yoo et al. |
| 2016/0193502 A1 | 7/2016 | Kang et al. |
| 2016/0196042 A1 | 7/2016 | Laute et al. |
| 2016/0196106 A1 | 7/2016 | Hammer et al. |
| 2016/0196760 A1 | 7/2016 | Koo et al. |
| 2016/0209906 A1 | 7/2016 | Chae et al. |
| 2016/0210568 A1 | 7/2016 | Krupa et al. |
| 2016/0210602 A1 | 7/2016 | Siddique et al. |
| 2016/0210983 A1 | 7/2016 | Amada et al. |
| 2016/0212374 A1 | 7/2016 | Usbergo et al. |
| 2016/0224966 A1 | 8/2016 | Van Os et al. |
| 2016/0239167 A1 | 8/2016 | Reimann et al. |
| 2016/0241543 A1 | 8/2016 | Jung et al. |
| 2016/0241983 A1 | 8/2016 | Lambourne et al. |
| 2016/0246566 A1 | 8/2016 | Fullerton et al. |
| 2016/0253145 A1 | 9/2016 | Lee et al. |
| 2016/0256741 A1 | 9/2016 | Holma et al. |
| 2016/0259542 A1 | 9/2016 | Chaudhri et al. |
| 2016/0259656 A1 | 9/2016 | Sumner et al. |
| 2016/0259936 A1 | 9/2016 | Mukherjee et al. |
| 2016/0260436 A1 | 9/2016 | Lemay et al. |
| 2016/0261790 A1 | 9/2016 | Lee et al. |
| 2016/0267319 A1 | 9/2016 | Murillo et al. |
| 2016/0267779 A1 | 9/2016 | Kuang |
| 2016/0270717 A1 | 9/2016 | Luna et al. |
| 2016/0277708 A1 | 9/2016 | Rintel et al. |
| 2016/0277885 A1 | 9/2016 | Shan et al. |
| 2016/0283194 A1 | 9/2016 | Patil et al. |
| 2016/0291924 A1 | 10/2016 | Bierbower et al. |
| 2016/0294896 A1 | 10/2016 | O'Driscoll et al. |
| 2016/0294958 A1 | 10/2016 | Zhang et al. |
| 2016/0295340 A1 | 10/2016 | Baker et al. |
| 2016/0299526 A1 | 10/2016 | Inagaki et al. |
| 2016/0299669 A1 | 10/2016 | Bates |
| 2016/0299736 A1 | 10/2016 | Bates et al. |
| 2016/0314451 A1 | 10/2016 | Martin |
| 2016/0316147 A1 | 10/2016 | Bernstein et al. |
| 2016/0320849 A1 | 11/2016 | Koo |
| 2016/0336531 A1 | 11/2016 | Yokoyama |
| 2016/0342141 A1 | 11/2016 | Koumaiha et al. |
| 2016/0342386 A1 | 11/2016 | Kallai et al. |
| 2016/0345039 A1 | 11/2016 | Billmeyer |
| 2016/0345172 A1 | 11/2016 | Cotterill |
| 2016/0350839 A1 | 12/2016 | Avidor et al. |
| 2016/0351191 A1 | 12/2016 | Vilermo et al. |
| 2016/0352661 A1 | 12/2016 | Yang et al. |
| 2016/0357502 A1 | 12/2016 | Lambourne et al. |
| 2016/0360344 A1 | 12/2016 | Shim et al. |
| 2016/0364600 A1 | 12/2016 | Shah et al. |
| 2016/0366531 A1 | 12/2016 | Popova |
| 2016/0372113 A1 | 12/2016 | David et al. |
| 2016/0373884 A1 | 12/2016 | Peterson et al. |
| 2016/0378961 A1 | 12/2016 | Park |
| 2016/0379205 A1 | 12/2016 | Margadoudakis |
| 2016/0379633 A1 | 12/2016 | Lehman et al. |
| 2016/0381476 A1 | 12/2016 | Gossain et al. |
| 2017/0003931 A1 | 1/2017 | Dvortsov et al. |
| 2017/0010677 A1 | 1/2017 | Roh et al. |
| 2017/0010794 A1 | 1/2017 | Cho et al. |
| 2017/0013562 A1 | 1/2017 | Lim et al. |
| 2017/0019517 A1 | 1/2017 | Wilder et al. |
| 2017/0025124 A1 | 1/2017 | Mixter et al. |
| 2017/0026686 A1 | 1/2017 | Glazier et al. |
| 2017/0031552 A1 | 2/2017 | Lin |
| 2017/0031648 A1 | 2/2017 | So et al. |
| 2017/0041727 A1 | 2/2017 | Reimann |
| 2017/0046025 A1 | 2/2017 | Dascola et al. |
| 2017/0048686 A1 | 2/2017 | Chang et al. |
| 2017/0054731 A1 | 2/2017 | Cotterill |
| 2017/0068402 A1 | 3/2017 | Lochhead et al. |
| 2017/0068407 A1 | 3/2017 | Wilson et al. |
| 2017/0068439 A1 | 3/2017 | Mohseni |
| 2017/0068507 A1 | 3/2017 | Kim et al. |
| 2017/0070346 A1 | 3/2017 | Lombardi et al. |
| 2017/0078294 A1 | 3/2017 | Medvinsky |
| 2017/0083189 A1 | 3/2017 | Yang et al. |
| 2017/0083202 A1 | 3/2017 | Yang et al. |
| 2017/0083285 A1 | 3/2017 | Meyers et al. |
| 2017/0083494 A1 | 3/2017 | Kim et al. |
| 2017/0087469 A1 | 3/2017 | Hardee et al. |
| 2017/0092085 A1 | 3/2017 | Agarwal |
| 2017/0092270 A1 | 3/2017 | Newendorp et al. |
| 2017/0093846 A1 | 3/2017 | Lopez Lecube et al. |
| 2017/0099270 A1 | 4/2017 | Anson |
| 2017/0115940 A1 | 4/2017 | Byeon |
| 2017/0123571 A1 | 5/2017 | Huang et al. |
| 2017/0123640 A1 | 5/2017 | Wilson et al. |
| 2017/0127145 A1 | 5/2017 | Rajapakse |
| 2017/0134553 A1 | 5/2017 | Jeon et al. |
| 2017/0134567 A1 | 5/2017 | Jeon et al. |
| 2017/0134872 A1 | 5/2017 | Silva et al. |
| 2017/0140372 A1 | 5/2017 | Wang et al. |
| 2017/0142087 A1 | 5/2017 | Maninder et al. |
| 2017/0142584 A1 | 5/2017 | Oh et al. |
| 2017/0147129 A1 | 5/2017 | Kyoun et al. |
| 2017/0147197 A1 | 5/2017 | Yang et al. |
| 2017/0148010 A1 | 5/2017 | Bak et al. |
| 2017/0153795 A1 | 6/2017 | Yang et al. |
| 2017/0180843 A1 | 6/2017 | Perianu et al. |
| 2017/0185373 A1 | 6/2017 | Kim et al. |
| 2017/0192730 A1 | 7/2017 | Yang et al. |
| 2017/0192743 A1 | 7/2017 | Chun et al. |
| 2017/0193813 A1 | 7/2017 | Carroll et al. |
| 2017/0195772 A1 | 7/2017 | Han et al. |
| 2017/0212667 A1 | 7/2017 | Miyazaki |
| 2017/0220212 A1 | 8/2017 | Yang et al. |
| 2017/0227935 A1 | 8/2017 | Su et al. |
| 2017/0235545 A1 | 8/2017 | Millington et al. |

(56) References Cited

U.S. PATENT DOCUMENTS

| | | |
|---|---|---|
| 2017/0235926 A1 | 8/2017 | Fyke et al. |
| 2017/0235935 A1 | 8/2017 | Song et al. |
| 2017/0239524 A1 | 8/2017 | Lee et al. |
| 2017/0242653 A1 | 8/2017 | Lang et al. |
| 2017/0243508 A1 | 8/2017 | Cheng et al. |
| 2017/0269556 A1 | 9/2017 | Zhou |
| 2017/0269792 A1 | 9/2017 | Xu et al. |
| 2017/0270507 A1 | 9/2017 | Wang et al. |
| 2017/0289249 A1 | 10/2017 | Knight et al. |
| 2017/0322713 A1 | 11/2017 | Hwang et al. |
| 2017/0339151 A1 | 11/2017 | Van Os et al. |
| 2017/0354845 A1 | 12/2017 | Williams et al. |
| 2017/0357420 A1 | 12/2017 | Dye et al. |
| 2017/0357434 A1 | 12/2017 | Coffman et al. |
| 2017/0357439 A1 | 12/2017 | Lemay et al. |
| 2017/0357477 A1 | 12/2017 | Im et al. |
| 2017/0357973 A1 | 12/2017 | Van Os et al. |
| 2017/0371535 A1 | 12/2017 | Li et al. |
| 2018/0012596 A1 | 1/2018 | Piernot et al. |
| 2018/0013815 A1 | 1/2018 | Gold |
| 2018/0039916 A1 | 2/2018 | Ravindra |
| 2018/0040324 A1 | 2/2018 | Wilberding |
| 2018/0062691 A1 | 3/2018 | Barnett, Jr. |
| 2018/0067622 A1 | 3/2018 | Chaudhri et al. |
| 2018/0067633 A1 | 3/2018 | Wilson et al. |
| 2018/0067712 A1 | 3/2018 | Behzadi et al. |
| 2018/0067904 A1 | 3/2018 | Li |
| 2018/0069957 A1 | 3/2018 | Mushikabe et al. |
| 2018/0070187 A1 | 3/2018 | Drinkwater et al. |
| 2018/0075439 A1 | 3/2018 | Bak et al. |
| 2018/0096064 A1 | 4/2018 | Lennon et al. |
| 2018/0109629 A1 | 4/2018 | Van Os et al. |
| 2018/0124128 A1 | 5/2018 | Faulkner et al. |
| 2018/0131732 A1 | 5/2018 | Aronoff et al. |
| 2018/0139292 A1 | 5/2018 | Koren et al. |
| 2018/0181185 A1 | 6/2018 | Graham et al. |
| 2018/0183849 A1 | 6/2018 | Shin et al. |
| 2018/0190279 A1 | 7/2018 | Anderson et al. |
| 2018/0205797 A1 | 7/2018 | Faulkner |
| 2018/0217709 A1 | 8/2018 | Hotelling |
| 2018/0234549 A1 | 8/2018 | Coffman et al. |
| 2018/0267773 A1 | 9/2018 | Kim et al. |
| 2018/0302790 A1 | 10/2018 | Cotterill |
| 2018/0329672 A1 | 11/2018 | Sadak et al. |
| 2018/0335903 A1 | 11/2018 | Coffman et al. |
| 2018/0337924 A1 | 11/2018 | Graham et al. |
| 2018/0341448 A1 | 11/2018 | Behzadi et al. |
| 2018/0349022 A1 | 12/2018 | Chaudhri et al. |
| 2018/0351762 A1 | 12/2018 | Iyengar et al. |
| 2018/0357631 A1 | 12/2018 | Bak et al. |
| 2018/0364648 A1 | 12/2018 | Chi et al. |
| 2018/0375676 A1 | 12/2018 | Bader-Natal et al. |
| 2019/0012069 A1 | 1/2019 | Bates |
| 2019/0012073 A1 | 1/2019 | Hwang |
| 2019/0012966 A1 | 1/2019 | Shi |
| 2019/0013018 A1 | 1/2019 | Rekstad |
| 2019/0026011 A1 | 1/2019 | Wang et al. |
| 2019/0037004 A1 | 1/2019 | Chaudhri et al. |
| 2019/0057593 A1 | 2/2019 | Park et al. |
| 2019/0058777 A1 | 2/2019 | Chen |
| 2019/0074991 A1 | 3/2019 | Peterson et al. |
| 2019/0075200 A1 | 3/2019 | Seo et al. |
| 2019/0102145 A1 | 4/2019 | Wilberding et al. |
| 2019/0124203 A1 | 4/2019 | Coffman et al. |
| 2019/0124510 A1 | 4/2019 | Cotterill |
| 2019/0129661 A1 | 5/2019 | Hirota et al. |
| 2019/0149972 A1 | 5/2019 | Parks et al. |
| 2019/0158645 A1 | 5/2019 | Yang et al. |
| 2019/0172016 A1 | 6/2019 | Chaudhri et al. |
| 2019/0187787 A1 | 6/2019 | White et al. |
| 2019/0199963 A1 | 6/2019 | Ahn et al. |
| 2019/0222775 A1 | 7/2019 | Ahn |
| 2019/0232110 A1 | 8/2019 | Williams et al. |
| 2019/0232111 A1 | 8/2019 | Williams et al. |
| 2019/0246238 A1 | 8/2019 | Crutchfield et al. |
| 2019/0268771 A1 | 8/2019 | Seo et al. |
| 2019/0278900 A1 | 9/2019 | Yang et al. |
| 2019/0286301 A1 | 9/2019 | Yang et al. |
| 2019/0289079 A1 | 9/2019 | Van Os et al. |
| 2019/0294406 A1 | 9/2019 | Bierbower et al. |
| 2019/0297439 A1 | 9/2019 | Maeda |
| 2019/0306607 A1 | 10/2019 | Clayton et al. |
| 2019/0310759 A1 | 10/2019 | Stein et al. |
| 2019/0339784 A1 | 11/2019 | Lemay et al. |
| 2019/0339804 A1 | 11/2019 | Gleeson et al. |
| 2019/0342519 A1 | 11/2019 | Van Os et al. |
| 2019/0354252 A1 | 11/2019 | Badr |
| 2019/0361694 A1 | 11/2019 | Gordon et al. |
| 2019/0361729 A1 | 11/2019 | Gruber et al. |
| 2020/0050426 A1 | 2/2020 | Jung et al. |
| 2020/0098362 A1 | 3/2020 | Piernot et al. |
| 2020/0098368 A1 | 3/2020 | Lemay et al. |
| 2020/0104018 A1 | 4/2020 | Coffman et al. |
| 2020/0120503 A1 | 4/2020 | Cotterill |
| 2020/0125037 A1 | 4/2020 | Jo et al. |
| 2020/0133206 A1 | 4/2020 | Jo et al. |
| 2020/0149921 A1 | 5/2020 | Hoffman et al. |
| 2020/0154583 A1 | 5/2020 | Lee et al. |
| 2020/0174734 A1 | 6/2020 | Gomes et al. |
| 2020/0186576 A1 | 6/2020 | Gopal et al. |
| 2020/0192627 A1 | 6/2020 | Jang et al. |
| 2020/0193997 A1 | 6/2020 | Piernot et al. |
| 2020/0201491 A1 | 6/2020 | Coffman et al. |
| 2020/0201495 A1 | 6/2020 | Coffman et al. |
| 2020/0201540 A1 | 6/2020 | Zambetti et al. |
| 2020/0213437 A1 | 7/2020 | Bhatt |
| 2020/0213530 A1 | 7/2020 | Ahn |
| 2020/0218486 A1 | 7/2020 | Behzadi et al. |
| 2020/0225817 A1 | 7/2020 | Coffman et al. |
| 2020/0226896 A1 | 7/2020 | Robertson et al. |
| 2020/0304917 A1 | 9/2020 | Ryu |
| 2020/0310748 A1 | 10/2020 | Huang |
| 2020/0326811 A1 | 10/2020 | Nolan et al. |
| 2020/0348807 A1 | 11/2020 | Garcia et al. |
| 2020/0348827 A1 | 11/2020 | Wilson et al. |
| 2020/0356242 A1 | 11/2020 | Wilson et al. |
| 2020/0366742 A1 | 11/2020 | Van Os et al. |
| 2020/0367816 A1 | 11/2020 | Selvam |
| 2020/0371577 A1 | 11/2020 | Graham et al. |
| 2020/0374645 A1 | 11/2020 | Settel |
| 2020/0379711 A1 | 12/2020 | Graham et al. |
| 2020/0379712 A1 | 12/2020 | Carrigan |
| 2020/0379713 A1 | 12/2020 | Carrigan |
| 2020/0379714 A1 | 12/2020 | Graham et al. |
| 2020/0379729 A1 | 12/2020 | Graham et al. |
| 2020/0379730 A1 | 12/2020 | Graham et al. |
| 2020/0383157 A1 | 12/2020 | Lee et al. |
| 2021/0011588 A1 | 1/2021 | Coffman et al. |
| 2021/0014610 A1 | 1/2021 | Carrigan et al. |
| 2021/0073741 A1 | 3/2021 | Chaudhri et al. |
| 2021/0141437 A1 | 5/2021 | Graham et al. |
| 2021/0173431 A1 | 6/2021 | Yang et al. |
| 2021/0203765 A1 | 7/2021 | Yang et al. |
| 2021/0203878 A1 | 7/2021 | Lee et al. |
| 2021/0255816 A1 | 8/2021 | Behzadi et al. |
| 2021/0255819 A1 | 8/2021 | Graham et al. |
| 2021/0272118 A1 | 9/2021 | Van Os et al. |
| 2021/0366480 A1 | 11/2021 | Lemay et al. |
| 2021/0390955 A1 | 12/2021 | Piernot et al. |
| 2021/0392223 A1 | 12/2021 | Coffman et al. |
| 2022/0014715 A1 | 1/2022 | Tamura et al. |
| 2022/0019292 A1 | 1/2022 | Lemay et al. |
| 2022/0043626 A1 | 2/2022 | Carrigan |
| 2022/0047918 A1 | 2/2022 | Williams et al. |
| 2022/0058257 A1 | 2/2022 | Cotterill |
| 2022/0100367 A1 | 3/2022 | Carrigan et al. |
| 2022/0100841 A1 | 3/2022 | Yang et al. |
| 2022/0121342 A1 | 4/2022 | Chundi et al. |
| 2022/0129858 A1 | 4/2022 | Chaudhri et al. |
| 2022/0147135 A1 | 5/2022 | Graham et al. |
| 2022/0163996 A1 | 5/2022 | Yang et al. |
| 2022/0167113 A1 | 5/2022 | Beckhardt |
| 2022/0199267 A1 | 6/2022 | Subramanian et al. |
| 2022/0229524 A1 | 7/2022 | McKenzie et al. |

(56) References Cited

U.S. PATENT DOCUMENTS

| | | |
|---|---|---|
| 2022/0279063 A1 | 9/2022 | Coffman et al. |
| 2022/0286549 A1 | 9/2022 | Coffman et al. |
| 2022/0291793 A1 | 9/2022 | Zambetti et al. |
| 2022/0300108 A1 | 9/2022 | Yang et al. |
| 2022/0303383 A1 | 9/2022 | Coffman et al. |
| 2022/0350482 A1 | 11/2022 | Carrigan et al. |
| 2022/0391166 A1 | 12/2022 | Sanders |
| 2023/0035941 A1 | 2/2023 | Herman et al. |
| 2023/0040703 A1 | 2/2023 | Lemay et al. |
| 2023/0052490 A1 | 2/2023 | Chaudhri et al. |
| 2023/0066552 A1 | 3/2023 | Van Os et al. |
| 2023/0073844 A1 | 3/2023 | Coffman et al. |
| 2023/0079965 A1 | 3/2023 | Garcia et al. |
| 2023/0084551 A1 | 3/2023 | Coffman et al. |
| 2023/0104819 A1 | 4/2023 | Coffman et al. |
| 2023/0106600 A1 | 4/2023 | Coffman et al. |
| 2023/0106761 A1 | 4/2023 | Coffman et al. |
| 2023/0127384 A1 | 4/2023 | Stout |
| 2023/0179700 A1 | 6/2023 | Bhatt |
| 2023/0214107 A1 | 7/2023 | Zambetti et al. |
| 2023/0224667 A1 | 7/2023 | Rodman et al. |
| 2023/0234444 A1 | 7/2023 | Derichs et al. |
| 2023/0246857 A1 | 8/2023 | Boucheron et al. |
| 2023/0266866 A1 | 8/2023 | Bates et al. |
| 2023/0319413 A1 | 10/2023 | Manzari et al. |
| 2023/0334432 A1 | 10/2023 | Chaudhri et al. |
| 2023/0370507 A1 | 11/2023 | Chang et al. |
| 2023/0376268 A1 | 11/2023 | Carrigan et al. |
| 2023/0393705 A1 | 12/2023 | Krenn |
| 2023/0393809 A1 | 12/2023 | Carrigan et al. |
| 2023/0409191 A1 | 12/2023 | Carrigan et al. |
| 2023/0409279 A1 | 12/2023 | Reese et al. |
| 2024/0053953 A1 | 2/2024 | Sanders |
| 2024/0062640 A1 | 2/2024 | Carrigan et al. |
| 2024/0080642 A1 | 3/2024 | Carrigan et al. |
| 2024/0111333 A1 | 4/2024 | Yang et al. |
| 2024/0176441 A1 | 5/2024 | Yang et al. |
| 2024/0205628 A1 | 6/2024 | Sharifi et al. |
| 2024/0211891 A1 | 6/2024 | Kennedy et al. |
| 2024/0220009 A1 | 7/2024 | Dryer et al. |
| 2024/0263956 A1 | 8/2024 | Vashisht |
| 2024/0310982 A1 | 9/2024 | Chaudhri et al. |
| 2024/0316404 A1 | 9/2024 | Williams et al. |
| 2024/0377922 A1 | 11/2024 | Rajam et al. |
| 2024/0406290 A1 | 12/2024 | Giuliani et al. |
| 2024/0419322 A1 | 12/2024 | Carrigan et al. |
| 2025/0036261 A1 | 1/2025 | Yang et al. |
| 2025/0047777 A1 | 2/2025 | Bhatt |
| 2025/0054379 A1 | 2/2025 | Carrigan et al. |
| 2025/0080940 A1 | 3/2025 | White |
| 2025/0097641 A1 | 3/2025 | Maclean et al. |
| 2025/0153004 A1 | 5/2025 | Williams et al. |
| 2025/0165134 A1 | 5/2025 | Wilson et al. |
| 2025/0165136 A1 | 5/2025 | Zambetti et al. |
| 2025/0165216 A1 | 5/2025 | Carrigan et al. |
| 2025/0165930 A1 | 5/2025 | Chaudhri et al. |
| 2025/0238127 A1 | 7/2025 | Alonso et al. |
| 2025/0238128 A1 | 7/2025 | Manzari et al. |
| 2025/0238129 A1 | 7/2025 | Moussette et al. |
| 2025/0240516 A1 | 7/2025 | Zumbrunnen et al. |
| 2025/0315796 A1 | 10/2025 | Chaudhri et al. |
| 2025/0350945 A1 | 11/2025 | Yang et al. |
| 2025/0358358 A1 | 11/2025 | Coffman et al. |
| 2025/0383837 A1 | 12/2025 | Sanders |

FOREIGN PATENT DOCUMENTS

| | | | |
|---|---|---|---|
| AU | 2008100011 A4 | 2/2008 | |
| AU | 2010249319 A1 | 6/2012 | |
| AU | 2015101019 A4 | 9/2015 | |
| AU | 2016102028 B4 | 7/2017 | |
| AU | 2022201622 A1 | 3/2022 | |
| CA | 2545339 A1 | 11/2007 | |
| CA | 2781636 A1 | 7/2010 | |
| CA | 2729388 A1 | 9/2011 | |
| CA | 2792987 A1 | 10/2011 | |
| CA | 2876587 A1 | 2/2014 | |
| CH | 707412 A2 | 6/2014 | |
| CN | 1452739 A | 10/2003 | |
| CN | 1525723 A | 9/2004 | |
| CN | 1558690 A | 12/2004 | |
| CN | 1629776 A | 6/2005 | |
| CN | 1663174 A | 8/2005 | |
| CN | 1741104 A | 3/2006 | |
| CN | 1846221 A | 10/2006 | |
| CN | 1852335 A | 10/2006 | |
| CN | 1863281 A | 11/2006 | |
| CN | 1908981 A | 2/2007 | |
| CN | 1950762 A | 4/2007 | |
| CN | 1997957 A | 7/2007 | |
| CN | 101042618 A | 9/2007 | |
| CN | 101046721 A | 10/2007 | |
| CN | 101098535 A | 1/2008 | |
| CN | 101118469 A | 2/2008 | |
| CN | 101203821 A | 6/2008 | |
| CN | 101232528 A | 7/2008 | |
| CN | 101268470 A | 9/2008 | |
| CN | 101276255 A | 10/2008 | |
| CN | 101299694 A | 11/2008 | |
| CN | 101321156 A | 12/2008 | |
| CN | 101329595 A | 12/2008 | |
| CN | 101341718 A | 1/2009 | |
| CN | 101341727 A | 1/2009 | |
| CN | 101374090 A | 2/2009 | |
| CN | 101382438 A | 3/2009 | |
| CN | 101390371 A | 3/2009 | |
| CN | 101409743 A | 4/2009 | |
| CN | 101443727 A | 5/2009 | |
| CN | 101485128 A | 7/2009 | |
| CN | 101535940 A | 9/2009 | |
| CN | 101610155 A | 12/2009 | |
| CN | 101620494 A | 1/2010 | |
| CN | 101627349 A | 1/2010 | |
| CN | 101627361 A | 1/2010 | |
| CN | 101702112 A | 5/2010 | |
| CN | 101819486 A | 9/2010 | |
| CN | 101853132 A | 10/2010 | |
| CN | 101872240 A | 10/2010 | |
| CN | 101873386 A | 10/2010 | |
| CN | 101877745 A | 11/2010 | |
| CN | 101877748 A | 11/2010 | |
| CN | 101910992 A | 12/2010 | |
| CN | 101943883 A | 1/2011 | |
| CN | 101969511 A | 2/2011 | |
| CN | 101978374 A | 2/2011 | |
| CN | 101981987 A | 2/2011 | |
| CN | 102012738 A | 4/2011 | |
| CN | 102065148 A | 5/2011 | |
| CN | 102111454 A | 6/2011 | |
| CN | 102111505 A | 6/2011 | |
| CN | 102163098 A | 8/2011 | |
| CN | 102164213 A | 8/2011 | |
| CN | 201928419 U | 8/2011 | |
| CN | 102202192 A | 9/2011 | |
| CN | 102209321 A | 10/2011 | |
| CN | 102215374 A | 10/2011 | |
| CN | 102262506 A | 11/2011 | |
| CN | 102281294 A | 12/2011 | |
| CN | 102301323 A | 12/2011 | |
| CN | 102301415 A | 12/2011 | |
| CN | 102375690 A | 3/2012 | |
| CN | 102388355 A | 3/2012 | |
| CN | 102396205 A | 3/2012 | |
| CN | 102404458 A | 4/2012 | |
| CN | 102414755 A | 4/2012 | |
| CN | 102426490 A | 4/2012 | |
| CN | 102430244 A | 5/2012 | |
| CN | 102438092 A | 5/2012 | |
| CN | 102446059 A | 5/2012 | |
| CN | 102446435 A | 5/2012 | |
| CN | 102449560 A | 5/2012 | |
| CN | 102449561 A | 5/2012 | |
| CN | 102450040 A | 5/2012 | |
| CN | 102455860 A | 5/2012 | |

(56) References Cited

FOREIGN PATENT DOCUMENTS

| | | | |
|---|---|---|---|
| CN | 102687176 A | 9/2012 |
| CN | 102695302 A | 9/2012 |
| CN | 102707994 A | 10/2012 |
| CN | 102737313 A | 10/2012 |
| CN | 102740146 A | 10/2012 |
| CN | 102750086 A | 10/2012 |
| CN | 102754071 A | 10/2012 |
| CN | 102763066 A | 10/2012 |
| CN | 102769705 A | 11/2012 |
| CN | 102772211 A | 11/2012 |
| CN | 102790826 A | 11/2012 |
| CN | 102800045 A | 11/2012 |
| CN | 102859480 A | 1/2013 |
| CN | 102866828 A | 1/2013 |
| CN | 102968267 A | 3/2013 |
| CN | 102981727 A | 3/2013 |
| CN | 102982401 A | 3/2013 |
| CN | 102984342 A | 3/2013 |
| CN | 102989159 A | 3/2013 |
| CN | 103003668 A | 3/2013 |
| CN | 103067625 A | 4/2013 |
| CN | 103092469 A | 5/2013 |
| CN | 103119968 A | 5/2013 |
| CN | 103139370 A | 6/2013 |
| CN | 103199311 A | 7/2013 |
| CN | 103207674 A | 7/2013 |
| CN | 103250138 A | 8/2013 |
| CN | 103260079 A | 8/2013 |
| CN | 103309606 A | 9/2013 |
| CN | 103327159 A | 9/2013 |
| CN | 103399480 A | 11/2013 |
| CN | 103399703 A | 11/2013 |
| CN | 103399750 A | 11/2013 |
| CN | 203311163 U | 11/2013 |
| CN | 103425119 A | 12/2013 |
| CN | 103425451 A | 12/2013 |
| CN | 103440247 A | 12/2013 |
| CN | 103458215 A | 12/2013 |
| CN | 103473004 A | 12/2013 |
| CN | 103500079 A | 1/2014 |
| CN | 103558916 A | 2/2014 |
| CN | 103562832 A | 2/2014 |
| CN | 103562841 A | 2/2014 |
| CN | 103576902 A | 2/2014 |
| CN | 103581413 A | 2/2014 |
| CN | 103581544 A | 2/2014 |
| CN | 103582873 A | 2/2014 |
| CN | 103583031 A | 2/2014 |
| CN | 103593154 A | 2/2014 |
| CN | 103604272 A | 2/2014 |
| CN | 103607660 A | 2/2014 |
| CN | 103650522 A | 3/2014 |
| CN | 103677520 A | 3/2014 |
| CN | 103677559 A | 3/2014 |
| CN | 103685729 A | 3/2014 |
| CN | 103713843 A | 4/2014 |
| CN | 103744671 A | 4/2014 |
| CN | 103765385 A | 4/2014 |
| CN | 203520050 U | 4/2014 |
| CN | 103793075 A | 5/2014 |
| CN | 103795866 A | 5/2014 |
| CN | 103809905 A | 5/2014 |
| CN | 103838992 A | 6/2014 |
| CN | 103853328 A | 6/2014 |
| CN | 103853493 A | 6/2014 |
| CN | 103876721 A | 6/2014 |
| CN | 103902010 A | 7/2014 |
| CN | 103902165 A | 7/2014 |
| CN | 103944811 A | 7/2014 |
| CN | 103959751 A | 7/2014 |
| CN | 103997366 A | 8/2014 |
| CN | 104102388 A | 10/2014 |
| CN | 104106036 A | 10/2014 |
| CN | 104160362 A | 11/2014 |
| CN | 203942537 U | 11/2014 |
| CN | 104205785 A | 12/2014 |
| CN | 104281257 A | 1/2015 |
| CN | 104288983 A | 1/2015 |
| CN | 104331796 A | 2/2015 |
| CN | 104335234 A | 2/2015 |
| CN | 104360735 A | 2/2015 |
| CN | 104392352 A | 3/2015 |
| CN | 104434314 A | 3/2015 |
| CN | 104464010 A | 3/2015 |
| CN | 104508426 A | 4/2015 |
| CN | 104574054 A | 4/2015 |
| CN | 104583998 A | 4/2015 |
| CN | 104584061 A | 4/2015 |
| CN | 104867004 A | 8/2015 |
| CN | 104917794 A | 9/2015 |
| CN | 104994106 A | 10/2015 |
| CN | 105051676 A | 11/2015 |
| CN | 105208511 A | 12/2015 |
| CN | 105260078 A | 1/2016 |
| CN | 105278681 A | 1/2016 |
| CN | 103583031 B | 2/2016 |
| CN | 105308634 A | 2/2016 |
| CN | 105373920 A | 3/2016 |
| CN | 105388998 A | 3/2016 |
| CN | 105431855 A | 3/2016 |
| CN | 105549947 A | 5/2016 |
| CN | 205263700 U | 5/2016 |
| CN | 105654286 A | 6/2016 |
| CN | 105654287 A | 6/2016 |
| CN | 205267230 U | 6/2016 |
| CN | 105745863 A | 7/2016 |
| CN | 105794231 A | 7/2016 |
| CN | 105830015 A | 8/2016 |
| CN | 105940678 A | 9/2016 |
| CN | 205608658 U | 9/2016 |
| CN | 106030700 A | 10/2016 |
| CN | 106062810 A | 10/2016 |
| CN | 106134209 A | 11/2016 |
| CN | 106170783 A | 11/2016 |
| CN | 106383645 A | 2/2017 |
| CN | 106416142 A | 2/2017 |
| CN | 106462617 A | 2/2017 |
| CN | 106716954 A | 5/2017 |
| CN | 106797415 A | 5/2017 |
| CN | 107077288 A | 8/2017 |
| CN | 107250949 A | 10/2017 |
| CN | 107637073 A | 1/2018 |
| CN | 104012150 B | 5/2018 |
| CN | 108292203 A | 7/2018 |
| CN | 108683798 A | 10/2018 |
| CN | 108829325 A | 11/2018 |
| CN | 109302531 A | 2/2019 |
| CN | 109314795 A | 2/2019 |
| CN | 109347581 A | 2/2019 |
| CN | 109688442 A | 4/2019 |
| CN | 110637465 A | 12/2019 |
| CN | 111208969 A | 5/2020 |
| CN | 105900376 B | 2/2021 |
| CN | 108683798 B | 4/2021 |
| CN | 113748408 A | 12/2021 |
| CN | 113835583 A | 12/2021 |
| EP | 0831629 A2 | 3/1998 |
| EP | 1079371 A1 | 2/2001 |
| EP | 1133119 A2 | 9/2001 |
| EP | 1215575 A2 | 6/2002 |
| EP | 1357458 A2 | 10/2003 |
| EP | 1589734 A2 | 10/2005 |
| EP | 1659504 A2 | 5/2006 |
| EP | 1226699 B1 | 6/2006 |
| EP | 1674977 A2 | 6/2006 |
| EP | 1679879 A2 | 7/2006 |
| EP | 1705883 A1 | 9/2006 |
| EP | 1708116 A2 | 10/2006 |
| EP | 1760584 A1 | 3/2007 |
| EP | 1777611 A1 | 4/2007 |
| EP | 1832969 A2 | 9/2007 |
| EP | 1885109 A2 | 2/2008 |
| EP | 2018032 A1 | 1/2009 |
| EP | 2020648 A2 | 2/2009 |

(56) References Cited

FOREIGN PATENT DOCUMENTS

| | | | |
|---|---|---|---|
| EP | 2040146 | A2 | 3/2009 |
| EP | 2051157 | A1 | 4/2009 |
| EP | 2180665 | A1 | 4/2010 |
| EP | 2194508 | A1 | 6/2010 |
| EP | 2194698 | A1 | 6/2010 |
| EP | 2204702 | A1 | 7/2010 |
| EP | 2247087 | A1 | 11/2010 |
| EP | 2284646 | A1 | 2/2011 |
| EP | 2302493 | A2 | 3/2011 |
| EP | 2312512 | A1 | 4/2011 |
| EP | 2360902 | A2 | 8/2011 |
| EP | 2367098 | A2 | 9/2011 |
| EP | 2394711 | A1 | 12/2011 |
| EP | 2407219 | A2 | 1/2012 |
| EP | 2413577 | A2 | 2/2012 |
| EP | 2423810 | A1 | 2/2012 |
| EP | 2437148 | A2 | 4/2012 |
| EP | 2490432 | A1 | 8/2012 |
| EP | 2523109 | A1 | 11/2012 |
| EP | 2547117 | A1 | 1/2013 |
| EP | 2568693 | A2 | 3/2013 |
| EP | 2574026 | A1 | 3/2013 |
| EP | 2582120 | A1 | 4/2013 |
| EP | 2600584 | A1 | 6/2013 |
| EP | 2602759 | A2 | 6/2013 |
| EP | 2610701 | A1 | 7/2013 |
| EP | 2615607 | A2 | 7/2013 |
| EP | 2632193 | A2 | 8/2013 |
| EP | 2653961 | A1 | 10/2013 |
| EP | 2674889 | A2 | 12/2013 |
| EP | 2677775 | A1 | 12/2013 |
| EP | 2693382 | A2 | 2/2014 |
| EP | 2703972 | A1 | 3/2014 |
| EP | 2610701 | A9 | 4/2014 |
| EP | 2720126 | A1 | 4/2014 |
| EP | 2725473 | A1 | 4/2014 |
| EP | 2733598 | A2 | 5/2014 |
| EP | 2738640 | A2 | 6/2014 |
| EP | 2738749 | A1 | 6/2014 |
| EP | 2741190 | A2 | 6/2014 |
| EP | 2742404 | A2 | 6/2014 |
| EP | 2750062 | A2 | 7/2014 |
| EP | 2770673 | A1 | 8/2014 |
| EP | 2770708 | A1 | 8/2014 |
| EP | 2821912 | A1 | 1/2015 |
| EP | 2849042 | A1 | 3/2015 |
| EP | 2891049 | A1 | 7/2015 |
| EP | 2892240 | A1 | 7/2015 |
| EP | 2891049 | A4 | 3/2016 |
| EP | 2993602 | A1 | 3/2016 |
| EP | 2993909 | A1 | 3/2016 |
| EP | 2998822 | A2 | 3/2016 |
| EP | 3032537 | A2 | 6/2016 |
| EP | 2568693 | A3 | 7/2016 |
| EP | 3057342 | A1 | 8/2016 |
| EP | 3073703 | A1 | 9/2016 |
| EP | 3138300 | A1 | 3/2017 |
| EP | 3163495 | A1 | 5/2017 |
| EP | 3227771 | A1 | 10/2017 |
| EP | 3276905 | A1 | 1/2018 |
| EP | 3373122 | A1 | 9/2018 |
| EP | 3379853 | A1 | 9/2018 |
| EP | 2632193 | B1 | 10/2018 |
| EP | 3420441 | A1 | 1/2019 |
| EP | 2568693 | B1 | 12/2019 |
| EP | 3633963 | A1 | 4/2020 |
| EP | 3833002 | A1 | 6/2021 |
| EP | 4109891 | A1 | 12/2022 |
| FR | 3069679 | A1 | 2/2019 |
| GB | 2341698 | A | 3/2000 |
| GB | 2370208 | A | 6/2002 |
| GB | 2466038 | A | 6/2010 |
| GB | 2475669 | A | 6/2011 |
| GB | 2505476 | A | 3/2014 |
| IN | 201647028648 | A | 10/2016 |
| JP | 5-90390 | U | 12/1993 |
| JP | 8-110955 | A | 4/1996 |
| JP | 8-285964 | A | 11/1996 |
| JP | 9-251084 | A | 9/1997 |
| JP | 11-45117 | A | 2/1999 |
| JP | 11-98249 | A | 4/1999 |
| JP | 11-160470 | A | 6/1999 |
| JP | 11-232013 | A | 8/1999 |
| JP | 11-312029 | A | 11/1999 |
| JP | 2000-122957 | A | 4/2000 |
| JP | 2000-200092 | A | 7/2000 |
| JP | 2000-209660 | A | 7/2000 |
| JP | 2000-241199 | A | 9/2000 |
| JP | 2000-259477 | A | 9/2000 |
| JP | 2000-283772 | A | 10/2000 |
| JP | 2001-318852 | A | 11/2001 |
| JP | 2001-331758 | A | 11/2001 |
| JP | 2002-507718 | A | 3/2002 |
| JP | 2002-163217 | A | 6/2002 |
| JP | 2002271451 | A | 9/2002 |
| JP | 2002-288125 | A | 10/2002 |
| JP | 2002-342356 | A | 11/2002 |
| JP | 2002-351768 | A | 12/2002 |
| JP | 2002-366485 | A | 12/2002 |
| JP | 2003-30245 | A | 1/2003 |
| JP | 2003-141050 | A | 5/2003 |
| JP | 2004-104813 | A | 4/2004 |
| JP | 2004-177148 | A | 6/2004 |
| JP | 2004-519033 | A | 6/2004 |
| JP | 2004-184396 | A | 7/2004 |
| JP | 2004-356816 | A | 12/2004 |
| JP | 2005-532607 | A | 10/2005 |
| JP | 2005-332368 | A | 12/2005 |
| JP | 2006-72489 | A | 3/2006 |
| JP | 2006-79427 | A | 3/2006 |
| JP | 2006-101505 | A | 4/2006 |
| JP | 2006-113637 | A | 4/2006 |
| JP | 2006-129429 | A | 5/2006 |
| JP | 2006-135667 | A | 5/2006 |
| JP | 2006-185154 | A | 7/2006 |
| JP | 3830956 | B1 | 10/2006 |
| JP | 2007-41976 | A | 2/2007 |
| JP | 2007-243275 | A | 9/2007 |
| JP | 2007-304854 | A | 11/2007 |
| JP | 2008-97202 | A | 4/2008 |
| JP | 2008-526156 | A | 7/2008 |
| JP | 2008-546069 | A | 12/2008 |
| JP | 2009-50471 | A | 3/2009 |
| JP | 2009-95030 | A | 4/2009 |
| JP | 2009-193455 | A | 8/2009 |
| JP | 2009-239867 | A | 10/2009 |
| JP | 2009-296577 | A | 12/2009 |
| JP | 2009-543166 | A | 12/2009 |
| JP | 2010-503082 | A | 1/2010 |
| JP | 2010-503126 | A | 1/2010 |
| JP | 2010-503332 | A | 1/2010 |
| JP | 2010-60355 | A | 3/2010 |
| JP | 2010-61491 | A | 3/2010 |
| JP | 2010-109789 | A | 5/2010 |
| JP | 2010-124181 | A | 6/2010 |
| JP | 3162246 | U | 8/2010 |
| JP | 2010-198341 | A | 9/2010 |
| JP | 2010-245940 | A | 10/2010 |
| JP | 2010-257051 | A | 11/2010 |
| JP | 2010-271779 | A | 12/2010 |
| JP | 2011-60281 | A | 3/2011 |
| JP | 2011-65590 | A | 3/2011 |
| JP | 2011-65654 | A | 3/2011 |
| JP | 2011-107823 | A | 6/2011 |
| JP | 2011-118662 | A | 6/2011 |
| JP | 3168099 | U | 6/2011 |
| JP | 2011-525648 | A | 9/2011 |
| JP | 2011-209786 | A | 10/2011 |
| JP | 2011-237857 | A | 11/2011 |
| JP | 2011-530101 | A | 12/2011 |
| JP | 2012-505478 | A | 3/2012 |
| JP | 2012-68494 | A | 4/2012 |
| JP | 2012-508530 | A | 4/2012 |
| JP | 2012-123475 | A | 6/2012 |

(56)            References Cited

FOREIGN PATENT DOCUMENTS

| | | | |
|---|---|---|---|
| JP | 2012-147432 A | 8/2012 |
| JP | 2012-517630 A | 8/2012 |
| JP | 2012-168966 A | 9/2012 |
| JP | 2012-198369 A | 10/2012 |
| JP | 2012-203832 A | 10/2012 |
| JP | 2012-215938 A | 11/2012 |
| JP | 2012-234529 A | 11/2012 |
| JP | 2012-247283 A | 12/2012 |
| JP | 2012-531607 A | 12/2012 |
| JP | 2013-12802 A | 1/2013 |
| JP | 2013-25357 A | 2/2013 |
| JP | 2013-37688 A | 2/2013 |
| JP | 2013-506225 A | 2/2013 |
| JP | 2013-48389 A | 3/2013 |
| JP | 2013-74499 A | 4/2013 |
| JP | 2013-511900 A | 4/2013 |
| JP | 2013-93699 A | 5/2013 |
| JP | 2013-105468 A | 5/2013 |
| JP | 2013-127800 A | 6/2013 |
| JP | 2013-530433 A | 7/2013 |
| JP | 2013-530458 A | 7/2013 |
| JP | 2013-175188 A | 9/2013 |
| JP | 2013-191065 A | 9/2013 |
| JP | 2013-542522 A | 11/2013 |
| JP | 2014-503861 A | 2/2014 |
| JP | 2014-44483 A | 3/2014 |
| JP | 2014-44724 A | 3/2014 |
| JP | 2014-57129 A | 3/2014 |
| JP | 2014-512044 A | 5/2014 |
| JP | 2014-110638 A | 6/2014 |
| JP | 2014-123197 A | 7/2014 |
| JP | 2014-128032 A | 7/2014 |
| JP | 2014-131359 A | 7/2014 |
| JP | 2014-135000 A | 7/2014 |
| JP | 2014-519126 A | 8/2014 |
| JP | 2015-8001 A | 1/2015 |
| JP | 2015-14923 A | 1/2015 |
| JP | 2015-501022 A | 1/2015 |
| JP | 2015-61318 A | 3/2015 |
| JP | 2015-520456 A | 7/2015 |
| JP | 2015-524974 A | 8/2015 |
| JP | 2015-526776 A | 9/2015 |
| JP | 2015-210587 A | 11/2015 |
| JP | 2015-533441 A | 11/2015 |
| JP | 6023162 B2 | 11/2016 |
| JP | 2017-34563 A | 2/2017 |
| JP | 2017-143357 A | 8/2017 |
| JP | 2017-537361 A | 12/2017 |
| JP | 2018-147265 A | 9/2018 |
| KR | 10-2004-0089329 A | 10/2004 |
| KR | 20-0425314 Y1 | 9/2006 |
| KR | 10-2007-0086374 A | 8/2007 |
| KR | 10-2007-0120125 A | 12/2007 |
| KR | 10-0805341 B1 | 2/2008 |
| KR | 10-0810379 B1 | 3/2008 |
| KR | 20-2008-0004775 U | 10/2008 |
| KR | 10-2009-0089472 A | 8/2009 |
| KR | 10-2010-0036351 A | 4/2010 |
| KR | 10-2011-0013653 A | 2/2011 |
| KR | 10-2012-0003323 A | 1/2012 |
| KR | 10-2012-0003537 A | 1/2012 |
| KR | 10-2012-0088746 A | 8/2012 |
| KR | 10-2012-0100433 A | 9/2012 |
| KR | 10-1253392 B1 | 4/2013 |
| KR | 10-2013-0063019 A | 6/2013 |
| KR | 10-2013-0075783 A | 7/2013 |
| KR | 10-2013-0082190 A | 7/2013 |
| KR | 10-2013-0108563 A | 10/2013 |
| KR | 10-2013-0141688 A | 12/2013 |
| KR | 10-1342208 B1 | 12/2013 |
| KR | 10-1352713 B1 | 1/2014 |
| KR | 10-2014-0016244 A | 2/2014 |
| KR | 10-2014-0026263 A | 3/2014 |
| KR | 10-2014-0031283 A | 3/2014 |
| KR | 10-2014-0043370 A | 4/2014 |
| KR | 10-2014-0064687 A | 5/2014 |
| KR | 10-2014-0073232 A | 6/2014 |
| KR | 10-2014-0074824 A | 6/2014 |
| KR | 10-2014-0137400 A | 12/2014 |
| KR | 10-2015-0001287 A | 1/2015 |
| KR | 10-2015-0031010 A | 3/2015 |
| KR | 10-2015-0121177 A | 10/2015 |
| KR | 10-2016-0012008 A | 2/2016 |
| KR | 10-2016-0045633 A | 4/2016 |
| KR | 10-2016-0092363 A | 8/2016 |
| KR | 10-2016-0141847 A | 12/2016 |
| KR | 10-2017-0027435 A | 3/2017 |
| KR | 10-2017-0027999 A | 3/2017 |
| KR | 10-2017-0082022 A | 7/2017 |
| KR | 10-2017-0107058 A | 9/2017 |
| KR | 10-2017-0124954 A | 11/2017 |
| KR | 10-1820573 B1 | 1/2018 |
| KR | 10-2019-0022883 A | 3/2019 |
| KR | 10-2011177 B1 | 8/2019 |
| SG | 130285 A1 | 4/2007 |
| TW | 200532429 A | 10/2005 |
| TW | 201131471 A | 9/2011 |
| TW | 201137722 A | 11/2011 |
| TW | D144158 S | 12/2011 |
| TW | 201214268 A | 4/2012 |
| TW | M435665 U1 | 8/2012 |
| TW | 201316247 A | 4/2013 |
| TW | 201324310 A | 6/2013 |
| TW | 201409345 A | 3/2014 |
| TW | 201415345 A | 4/2014 |
| TW | 201416959 A | 5/2014 |
| TW | 201419115 A | 5/2014 |
| TW | 201629750 A | 8/2016 |
| WO | 99/44114 A1 | 9/1999 |
| WO | 1999/66394 A1 | 12/1999 |
| WO | 1999/66395 A2 | 12/1999 |
| WO | 2001/71433 A1 | 9/2001 |
| WO | 02/01864 A1 | 1/2002 |
| WO | 02/11022 A2 | 2/2002 |
| WO | 2002/054157 A1 | 7/2002 |
| WO | 03/058589 A2 | 7/2003 |
| WO | 2004/047440 A2 | 6/2004 |
| WO | 2004/056107 A1 | 7/2004 |
| WO | 2004/095414 A1 | 11/2004 |
| WO | 2004/104813 A1 | 12/2004 |
| WO | 2005/053225 A1 | 6/2005 |
| WO | 2005/103863 A2 | 11/2005 |
| WO | 2005/109829 A1 | 11/2005 |
| WO | 2006/012343 A2 | 2/2006 |
| WO | 2006/094308 A2 | 9/2006 |
| WO | 2006/112641 A1 | 10/2006 |
| WO | 2006/113834 A2 | 10/2006 |
| WO | 2006/094308 A3 | 12/2006 |
| WO | 2007/018881 A2 | 2/2007 |
| WO | 2007/073422 A1 | 6/2007 |
| WO | 2007/076210 A1 | 7/2007 |
| WO | 2007/102110 A2 | 9/2007 |
| WO | 2007/142703 A1 | 12/2007 |
| WO | 2007/149731 A1 | 12/2007 |
| WO | 2008/027924 A2 | 3/2008 |
| WO | 2008/030776 A2 | 3/2008 |
| WO | 2008/030972 A1 | 3/2008 |
| WO | 2008/051472 A1 | 5/2008 |
| WO | 2008/086302 A1 | 7/2008 |
| WO | 2008/151229 A1 | 12/2008 |
| WO | 2009/005563 A1 | 1/2009 |
| WO | 2009/010827 A2 | 1/2009 |
| WO | 2009/067670 A1 | 5/2009 |
| WO | 2009/071112 A1 | 6/2009 |
| WO | 2009/085378 A1 | 7/2009 |
| WO | 2009/086599 A1 | 7/2009 |
| WO | 2009/123428 A2 | 10/2009 |
| WO | 2010/017627 A1 | 2/2010 |
| WO | 2010/054373 A2 | 5/2010 |
| WO | 2010/087988 A1 | 8/2010 |
| WO | 2010/120972 A1 | 10/2010 |
| WO | 2010/128442 A2 | 11/2010 |
| WO | 2010/129221 A1 | 11/2010 |
| WO | 2011/000893 A1 | 1/2011 |

(56)  References Cited

FOREIGN PATENT DOCUMENTS

| | | | |
|---|---|---|---|
| WO | 2011/011224 | A1 | 1/2011 |
| WO | 2011/041427 | A2 | 4/2011 |
| WO | 2011/062871 | A2 | 5/2011 |
| WO | 2011/084857 | A1 | 7/2011 |
| WO | 2011/084859 | A1 | 7/2011 |
| WO | 2011/126502 | A1 | 10/2011 |
| WO | 2011/127457 | A1 | 10/2011 |
| WO | 2011/128416 | A2 | 10/2011 |
| WO | 2011/149231 | A2 | 12/2011 |
| WO | 2011/163350 | A1 | 12/2011 |
| WO | 2012/004288 | A1 | 1/2012 |
| WO | 2012/028773 | A1 | 3/2012 |
| WO | 2012/051052 | A1 | 4/2012 |
| WO | 2011/130849 | A8 | 5/2012 |
| WO | 2012/058124 | A2 | 5/2012 |
| WO | 2012/079530 | A1 | 6/2012 |
| WO | 2012/104288 | A1 | 8/2012 |
| WO | 2012/126078 | A1 | 9/2012 |
| WO | 2012/127484 | A1 | 9/2012 |
| WO | 2012/128361 | A1 | 9/2012 |
| WO | 2012/128824 | A1 | 9/2012 |
| WO | 2012/154748 | A1 | 11/2012 |
| WO | 2012/161434 | A2 | 11/2012 |
| WO | 2012/166277 | A1 | 12/2012 |
| WO | 2012/166976 | A2 | 12/2012 |
| WO | 2012/170446 | A2 | 12/2012 |
| WO | 2013/000150 | A1 | 1/2013 |
| WO | 2013/021385 | A2 | 2/2013 |
| WO | 2013/048880 | A1 | 4/2013 |
| WO | 2013/049346 | A1 | 4/2013 |
| WO | 2013/051048 | A1 | 4/2013 |
| WO | 2013/093558 | A1 | 6/2013 |
| WO | 2013/097882 | A1 | 7/2013 |
| WO | 2013/097895 | A1 | 7/2013 |
| WO | 2013/097896 | A1 | 7/2013 |
| WO | 2013/126078 | A1 | 8/2013 |
| WO | 2013111239 | A1 | 8/2013 |
| WO | 2013/132144 | A1 | 9/2013 |
| WO | 2013/135270 | A1 | 9/2013 |
| WO | 2013/137503 | A1 | 9/2013 |
| WO | 2013/153405 | A2 | 10/2013 |
| WO | 2013/169842 | A2 | 11/2013 |
| WO | 2013/169849 | A2 | 11/2013 |
| WO | 2013/169851 | A2 | 11/2013 |
| WO | 2013/169854 | A2 | 11/2013 |
| WO | 2013/169865 | A2 | 11/2013 |
| WO | 2013/169870 | A1 | 11/2013 |
| WO | 2013/169875 | A2 | 11/2013 |
| WO | 2013/169877 | A2 | 11/2013 |
| WO | 2013/169882 | A2 | 11/2013 |
| WO | 2013/173504 | A1 | 11/2013 |
| WO | 2013/173838 | A2 | 11/2013 |
| WO | 2013/176847 | A1 | 11/2013 |
| WO | 2014/004180 | A1 | 1/2014 |
| WO | 2014/004182 | A1 | 1/2014 |
| WO | 2014/018242 | A1 | 1/2014 |
| WO | 2014/021967 | A1 | 2/2014 |
| WO | 2014/024000 | A1 | 2/2014 |
| WO | 2014/030320 | A1 | 2/2014 |
| WO | 2014/032461 | A1 | 3/2014 |
| WO | 2014/046475 | A1 | 3/2014 |
| WO | 2014/057795 | A1 | 4/2014 |
| WO | 2014/078114 | A1 | 5/2014 |
| WO | 2014/078965 | A1 | 5/2014 |
| WO | 2014/081181 | A1 | 5/2014 |
| WO | 2014/083001 | A2 | 6/2014 |
| WO | 2014/088475 | A1 | 6/2014 |
| WO | 2014/092980 | A1 | 6/2014 |
| WO | 2014/105274 | A1 | 7/2014 |
| WO | 2014/105276 | A1 | 7/2014 |
| WO | 2014/105278 | A1 | 7/2014 |
| WO | 2014/105279 | A1 | 7/2014 |
| WO | 2014/107469 | A2 | 7/2014 |
| WO | 2014/115605 | A1 | 7/2014 |
| WO | 2014/129655 | A1 | 8/2014 |
| WO | 2014/143776 | A2 | 9/2014 |
| WO | 2014/147297 | A1 | 9/2014 |
| WO | 2014/151089 | A1 | 9/2014 |
| WO | 2014/159581 | A1 | 10/2014 |
| WO | 2013/173504 | A8 | 12/2014 |
| WO | 2014/197279 | A1 | 12/2014 |
| WO | 2014/200730 | A1 | 12/2014 |
| WO | 2014/204960 | A1 | 12/2014 |
| WO | 2015/038684 | A1 | 3/2015 |
| WO | 2015/062410 | A1 | 5/2015 |
| WO | 2015/076930 | A1 | 5/2015 |
| WO | 2015/102572 | A1 | 7/2015 |
| WO | 2015/120358 | A1 | 8/2015 |
| WO | 2015/124831 | A1 | 8/2015 |
| WO | 2015/134692 | A1 | 9/2015 |
| WO | 2015/183755 | A1 | 12/2015 |
| WO | 2015/183828 | A1 | 12/2015 |
| WO | 2015/185123 | A1 | 12/2015 |
| WO | 2016/003509 | A1 | 1/2016 |
| WO | 2016/022203 | A1 | 2/2016 |
| WO | 2016/033400 | A1 | 3/2016 |
| WO | 2016/036472 | A1 | 3/2016 |
| WO | 2016/036522 | A2 | 3/2016 |
| WO | 2016/036541 | A2 | 3/2016 |
| WO | 2016/039992 | A1 | 3/2016 |
| WO | 2016/040405 | A1 | 3/2016 |
| WO | 2016/040535 | A1 | 3/2016 |
| WO | 2016/057117 | A1 | 4/2016 |
| WO | 2016/130230 | A1 | 8/2016 |
| WO | 2016/144983 | A1 | 9/2016 |
| WO | 2016/200603 | A1 | 12/2016 |
| WO | 2016/204186 | A1 | 12/2016 |
| WO | 2017/058442 | A1 | 4/2017 |
| WO | 2017/112003 | A1 | 6/2017 |
| WO | 2017/173155 | A1 | 10/2017 |
| WO | 2017/218070 | A1 | 12/2017 |
| WO | 2017/218192 | A1 | 12/2017 |
| WO | 2017/218199 | A1 | 12/2017 |
| WO | 2018/048510 | A1 | 3/2018 |
| WO | 2018/084802 | A1 | 5/2018 |
| WO | 2018/098136 | A1 | 5/2018 |
| WO | 2018/198136 | A1 | 11/2018 |
| WO | 2018/209146 | A2 | 11/2018 |
| WO | 2018/213401 | A1 | 11/2018 |
| WO | 2018/213415 | A1 | 11/2018 |
| WO | 2020/063762 | A1 | 4/2020 |
| WO | 2020/242589 | A1 | 12/2020 |
| WO | 2020/243691 | A1 | 12/2020 |
| WO | 2021/010993 | A1 | 1/2021 |
| WO | 2024/186519 | A1 | 9/2024 |

OTHER PUBLICATIONS

Non-Final Office Action received for U.S. Appl. No. 17/975,141, mailed on Jul. 6, 2023, 22 pages.

Notice of Allowance received for Chinese Patent Application No. 201911099970.0, mailed on Jun. 25, 2023, 4 pages (1 page of English Translation and 3 pages of Official Copy).

Advisory Action received for U.S. Appl. No. 17/835,334, mailed on Feb. 8, 2023, 3 pages.

Applicant-Initiated Interview Summary received for U.S. Appl. No. 17/181,089, mailed on Apr. 7, 2023, 5 pages.

Applicant-Initiated Interview Summary received for U.S. Appl. No. 17/181,089, mailed on May 16, 2023, 4 pages.

Applicant-Initiated Interview Summary received for U.S. Appl. No. 17/951,875, mailed on Feb. 28, 2023, 2 pages.

Board Decision received for Chinese Patent Application No. 201810654707.2, mailed on Apr. 13, 2023, 2 pages (1 page of English Translation and 1 page of Official Copy).

Corrected Notice of Allowance received for U.S. Appl. No. 16/922,675, mailed on Apr. 14, 2023, 6 pages.

Corrected Notice of Allowance received for U.S. Appl. No. 16/935,002, mailed on Mar. 2, 2023, 2 pages.

Corrected Notice of Allowance received for U.S. Appl. No. 16/935,002, mailed on Mar. 28, 2023, 2 pages.

Corrected Notice of Allowance received for U.S. Appl. No. 17/509,356, mailed on Jun. 13, 2023, 2 pages.

(56)             References Cited

OTHER PUBLICATIONS

Corrected Notice of Allowance received for U.S. Appl. No. 17/509,356, mailed on May 24, 2023, 2 pages.

Decision to Refuse received for European Patent Application No. 22209306.4, mailed on Mar. 20, 2023, 2 pages.

Extended European Search Report received for European Patent Application No. 22188724.3, mailed on Mar. 2, 2023, 14 pages.

Final Office Action received for U.S. Appl. No. 17/181,089, mailed on Apr. 19, 2023, 13 pages.

Final Office Action received for U.S. Appl. No. 17/951,875, mailed on May 30, 2023, 12 pages.

Non-Final Office Action received for U.S. Appl. No. 16/943,737, mailed on Mar. 28, 2023, 28 pages.

Non-Final Office Action received for U.S. Appl. No. 17/181,089, mailed on Feb. 17, 2023, 14 pages.

Non-Final Office Action received for U.S. Appl. No. 17/306,354, mailed on Jun. 2, 2023, 21 pages.

Non-Final Office Action received for U.S. Appl. No. 17/824,510, mailed on May 22, 2023, 15 pages.

Non-Final Office Action received for U.S. Appl. No. 17/835,334, mailed on Mar. 1, 2023, 11 pages.

Non-Final Office Action received for U.S. Appl. No. 17/989,086, mailed on Apr. 12, 2023, 21 pages.

Notice of Acceptance received for Australian Patent Application No. 2021277718, mailed on Mar. 3, 2023, 3 pages.

Notice of Acceptance received for Australian Patent Application No. 2022204555, mailed on May 11, 2023, 3 pages.

Notice of Acceptance received for Australian Patent Application No. 2022209277, mailed on Apr. 28, 2023, 3 pages.

Notice of Allowance received for Chinese Patent Application No. 202080039642.6, mailed on Apr. 17, 2023, 6 pages (2 pages of English Translation and 4 pages of Official Copy).

Notice of Allowance received for Japanese Patent Application No. 2021-166451, mailed on Jun. 5, 2023, 4 pages (1 pages of English Translation and 3 pages of Official Copy).

Notice of Allowance received for Korean Patent Application No. 10-2022-7006175, mailed on Jan. 12, 2023, 7 pages (2 pages of English Translation and 5 pages of Official Copy).

Notice of Allowance received for U.S. Appl. No. 16/888,775, mailed on Feb. 21, 2023, 5 pages.

Notice of Allowance received for U.S. Appl. No. 16/922,675, mailed on Mar. 22, 2023, 8 pages.

Notice of Allowance received for U.S. Appl. No. 16/935,002, mailed on Feb. 15, 2023, 15 pages.

Notice of Allowance received for U.S. Appl. No. 17/509,356, mailed on Apr. 7, 2023, 11 pages.

Notice of Allowance received for U.S. Appl. No. 17/516,537, mailed on Apr. 17, 2023, 8 pages.

Notice of Allowance received for U.S. Appl. No. 17/572,117, mailed on Apr. 4, 2023, 9 pages.

Notice of Allowance received for U.S. Appl. No. 17/989,086, mailed on Jun. 9, 2023, 8 pages.

Office Action received for Australian Patent Application No. 2022203957, mailed on May 12, 2023, 5 pages.

Office Action received for Australian Patent Application No. 2022204555, mailed on Feb. 17, 2023, 5 pages.

Office Action received for Australian Patent Application No. 2022209277, mailed on Mar. 10, 2023, 6 pages.

Office Action received for Chinese Patent Application No. 201810654707.2, mailed on Dec. 28, 2022, 13 pages (5 pages of English Translation and 8 pages of Official Copy).

Office Action received for Chinese Patent Application No. 201911099970.0, mailed on Feb. 23, 2023, 15 pages (5 pages of English Translation and 10 pages of Official Copy).

Office Action received for Chinese Patent Application No. 202010295272.4, mailed on Feb. 27, 2023, 15 pages (6 pages of English Translation and 9 pages of Official Copy).

Office Action received for European Patent Application No. 20720310.0, mailed on Apr. 11, 2023, 8 pages.

Office Action received for European Patent Application No. 20760624.5, mailed on Mar. 7, 2023, 13 pages.

Supplemental Notice of Allowance received for U.S. Appl. No. 16/888,775, mailed on Mar. 1, 2023, 2 pages.

Applicant-Initiated Interview Summary received for U.S. Appl. No. 18/119,789, mailed on Sep. 27, 2023, 3 pages.

Notice of Acceptance received for Australian Patent Application No. 2022203957, mailed on Sep. 27, 2023, 3 pages.

Notice of Allowance received for Chinese Patent Application No. 201810654707.2, mailed on Sep. 24, 2023, 2 pages (1 page of English Translation and 1 page of Official Copy).

Office Action received for Chinese Patent Application No. 202010295272.4, mailed on Aug. 28, 2023, 8 pages (4 pages of English Translation and 4 pages of Official Copy).

Decision to Grant received for European Patent Application No. 19203942.8, mailed on Nov. 16, 2023, 2 pages.

Notice of Acceptance received for Australian Patent Application No. 2023202432, mailed on Nov. 6, 2023, 3 pages.

Office Action received for Chinese Patent Application No. 201910875660.7, mailed on Oct. 18, 2023, 6 pages (3 pages of English Translation and 3 pages of Official Copy).

Office Action received for Chinese Patent Application No. 202111432087.6, mailed on Oct. 12, 2023, 10 pages (4 pages of English Translation and 6 pages of Official Copy).

Office Action received for Japanese Patent Application No. 2022-129377, mailed on Nov. 10, 2023, 6 pages (3 pages of English Translation and 3 pages of Official Copy).

Office Action received for Japanese Patent Application No. 2022-149476, mailed on Nov. 2, 2023, 9 pages (4 pages of English Translation and 5 pages of Official Copy).

Office Action received for Chinese Patent Application No. 202111429825.1, mailed on Oct. 19, 2023, 11 pages (5 pages of English Translation and 6 pages of Official Copy).

Office Action received for Chinese Patent Application No. 202211081603.X, mailed on Oct. 20, 2023, 15 pages (7 pages of English Translation and 8 pages of Official Copy).

Office Action received for Chinese Patent Application No. 202211096369.8, mailed on Sep. 29, 2023, 13 pages (6 pages of English Translation and 7 pages of Official Copy).

Office Action received for Chinese Patent Application No. 202211110081.1, mailed on Oct. 13, 2023, 16 pages (7 pages of English Translation and 9 pages of Official Copy).

"How to use popular SNS confidence (wechat) in China 2 _ voice message, press together, shake function etc.", Available at: http://seechina365.com/2014/04/05/wechat02/, Apr. 5, 2014, 27 pages.

"WhatsApp" users over 400 million people! I tried to investigate the most used messaging application in the world, Available at "http://www.appps.jp/2128786/", Jan. 24, 2014, 10 pages.

3C Blogger Kisplay Share, Samsung Galaxy Tab S Hands-on SideSync 3.0 Is Amazing, http://www.samsung.com/tw/article/galaxy-tab-s-blogger-kisplay, Jul. 4, 2014, 4 pages.

Accepted Outlook Meetings Move to Deleted Folder, Available online at: https://social.technet.microsoft.com/Forums/office/en-US/f3301c9a-a93f-49f7-be13-c642e285f150/accepted-outlook-meetings-move-to-deleted-folder?forum=outlook, Jan. 12, 2011, 4 pages.

Advisory Action received for U.S. Appl. No. 14/752,776, mailed on Aug. 31, 2018, 3 pages.

Advisory Action received for U.S. Appl. No. 14/815,898, mailed on Aug. 30, 2016, 3 pages.

Advisory Action received for U.S. Appl. No. 14/822,769, mailed on Apr. 30, 2018, 4 pages.

Advisory Action received for U.S. Appl. No. 14/833,014, mailed on Jan. 27, 2017, 3 pages.

Advisory Action received for U.S. Appl. No. 15/405,122, mailed on Apr. 18, 2022, 5 pages.

Advisory Action received for U.S. Appl. No. 16/377,892, mailed on Apr. 9, 2021, 4 pages.

Advisory Action received for U.S. Appl. No. 16/378,136, mailed on Apr. 12, 2021, 4 pages.

Advisory Action received for U.S. Appl. No. 16/583,989, mailed on Sep. 22, 2020, 5 pages.

Advisory Action received for U.S. Appl. No. 16/806,981, mailed on Jun. 14, 2021, 6 pages.

(56) References Cited

OTHER PUBLICATIONS

Advisory Action received for U.S. Appl. No. 16/935,002, mailed on May 6, 2022, 3 pages.
Advisory Action received for U.S. Appl. No. 16/943,737, mailed on Jun. 1, 2022, 6 pages.
Advisory Action received for U.S. Appl. No. 17/181,089, mailed on Dec. 20, 2022, 4 pages.
Airize, "Notification & Control Center Problem Issue Solution", Available online at: https://www.youtube.com/watch?v=K0zCueYlaTA, Dec. 6, 2013, 1 page.
Airshow, "Airshow App for Mobile Devices", 2012, 4 pages.
Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.
Ambrogi Robert, "Send Secure, Self-Destructing Messages with Wickr", Lawsites Blog, Available online at: https://www.lawsitesblog.com/2013/11/send-secure-self-destructing-messages-wickr.html, Nov. 5, 2013, 3 pages.
Android 2.3.4 User's Guide, online available at: https://static.googleusercontent.com/media/www.google.com/en//help/hc/pdfs/mobile/AndroidUsersGuide-2.3.4.pdf, May 20, 2011, 384 pages.
Android Central, "BeWeather weather app for Android", Available online at: https://www.youtube.com/watch?v=G2EY2K-XkSI, Sep. 1, 2011, 1 page.
Android Central, "Changing the watchface on your Android Wear device", Retrieved from: https://www.youtube.com/watch?v=YYwFe2K_qil, Jul. 2, 2014, 4 pages.
Androidika, "Butterfly 3D Live Wallpaper 1.0 APK", Available at: http://net-suckga-ilauncher2.apk-dl.com/butterfly-3d-live-wallpaper, Feb. 26, 2013, 7 pages.
Applicant-Initiated Interview Summary received for U.S. Appl. No. 15/405,122, mailed on Dec. 22, 2020, 5 pages.
Applicant-Initiated Interview Summary received for U.S. Appl. No. 15/405,122, mailed on Jul. 7, 2021, 4 pages.
Applicant-Initiated Interview Summary received for U.S. Appl. No. 15/405,122, mailed on Mar. 1, 2022, 4 pages.
Applicant-Initiated Interview Summary received for U.S. Appl. No. 15/405,122, mailed on May 21, 2020, 5 pages.
Applicant-Initiated Interview summary received for U.S. Appl. No. 15/488,093, mailed on Jan. 14, 2020, 4 pages.
Applicant-Initiated Interview Summary received for U.S. Appl. No. 15/902,401, mailed on Oct. 28, 2019, 4 pages.
Applicant-Initiated Interview Summary received for U.S. Appl. No. 16/147,523, mailed on Apr. 27, 2020, 3 pages.
Applicant-Initiated Interview Summary received for U.S. Appl. No. 16/147,523, mailed on Dec. 10, 2021, 4 pages.
Applicant-Initiated Interview Summary received for U.S. Appl. No. 16/147,523, mailed on Jun. 13, 2022, 4 pages.
Applicant-Initiated Interview Summary received for U.S. Appl. No. 16/147,523, mailed on Oct. 26, 2020, 3 pages.
Applicant-Initiated Interview Summary received for U.S. Appl. No. 16/147,523, mailed on Sep. 14, 2021, 3 pages.
Applicant-Initiated Interview Summary received for U.S. Appl. No. 16/259,954, mailed on Mar. 23, 2020, 3 pages.
Applicant-Initiated Interview Summary received for U.S. Appl. No. 16/265,938, mailed on Mar. 11, 2020, 5 pages.
Applicant-Initiated Interview Summary received for U.S. Appl. No. 16/265,938, mailed on May 28, 2020, 5 pages.
Applicant-Initiated Interview Summary received for U.S. Appl. No. 16/377,892, mailed on Mar. 26, 2021, 2 pages.
Applicant-Initiated Interview Summary received for U.S. Appl. No. 16/377,892, mailed on Oct. 13, 2020, 5 pages.
Applicant-Initiated Interview Summary received for U.S. Appl. No. 16/378,136, mailed on Mar. 26, 2021, 2 pages.
Applicant-Initiated Interview Summary received for U.S. Appl. No. 16/378,136, mailed on Oct. 13, 2020, 4 pages.
Applicant-Initiated Interview Summary received for U.S. Appl. No. 16/434,747, mailed on Mar. 18, 2022, 4 pages.

Applicant-Initiated Interview Summary received for U.S. Appl. No. 16/434,747, mailed on Sep. 8, 2021, 4 pages.
Applicant-Initiated Interview Summary received for U.S. Appl. No. 16/583,981, mailed on Mar. 9, 2020, 5 pages.
Applicant-Initiated Interview Summary received for U.S. Appl. No. 16/583,981, mailed on Sep. 14, 2020, 6 pages.
Applicant-Initiated Interview Summary received for U.S. Appl. No. 16/583,989, mailed on Aug. 3, 2020, 6 pages.
Applicant-Initiated Interview Summary received for U.S. Appl. No. 16/583,989, mailed on Mar. 25, 2020, 4 pages.
Applicant-Initiated Interview Summary received for U.S. Appl. No. 16/583,994, mailed on Apr. 3, 2020, 5 pages.
Applicant-Initiated Interview Summary received for U.S. Appl. No. 16/583,994, mailed on May 28, 2021, 5 pages.
Applicant-Initiated Interview Summary received for U.S. Appl. No. 16/583,994, mailed on Nov. 24, 2020, 4 pages.
Applicant-Initiated Interview Summary received for U.S. Appl. No. 16/584,490, mailed on Jan. 31, 2020, 4 pages.
Applicant-Initiated Interview Summary received for U.S. Appl. No. 16/584,490, mailed on Jul. 28, 2020, 4 pages.
Applicant-Initiated Interview Summary received for U.S. Appl. No. 16/806,981, mailed on Jan. 28, 2022, 4 pages.
Applicant-Initiated Interview Summary received for U.S. Appl. No. 16/922,675, mailed on Dec. 16, 2020, 3 pages.
Applicant-Initiated Interview Summary received for U.S. Appl. No. 16/922,675, mailed on Nov. 2, 2020, 3 pages.
Applicant-Initiated Interview Summary received for U.S. Appl. No. 16/922,675, mailed on Nov. 15, 2022, 2 pages.
Applicant-Initiated Interview Summary received for U.S. Appl. No. 16/922,675, mailed on Sep. 3, 2021, 2 pages.
Applicant-Initiated Interview Summary received for U.S. Appl. No. 16/935,002, mailed on Sep. 21, 2021, 4 pages.
Applicant-Initiated Interview Summary received for U.S. Appl. No. 16/936,164, mailed on Aug. 23, 2022, 5 pages.
Applicant-Initiated Interview Summary received for U.S. Appl. No. 16/936,164, mailed on Mar. 22, 2022, 4 pages.
Applicant-Initiated Interview Summary received for U.S. Appl. No. 16/943,737, mailed on Apr. 29, 2022, 6 pages.
Applicant-Initiated Interview Summary received for U.S. Appl. No. 16/943,737, mailed on Sep. 7, 2021, 4 pages.
Applicant-Initiated Interview Summary received for U.S. Appl. No. 17/013,778, mailed on Feb. 28, 2022, 2 pages.
Applicant-Initiated Interview Summary received for U.S. Appl. No. 17/103,436, mailed on Sep. 22, 2021, 2 pages.
Applicant-Initiated Interview Summary received for U.S. Appl. No. 17/157,391, mailed on Nov. 23, 2021, 2 pages.
Applicant-Initiated Interview Summary received for U.S. Appl. No. 17/181,089, mailed on Nov. 22, 2022, 3 pages.
Applicant-Initiated Interview Summary received for U.S. Appl. No. 17/181,089, mailed on Oct. 7, 2022, 4 pages.
Applicant-Initiated Interview Summary received for U.S. Appl. No. 17/509,356, mailed on Feb. 3, 2023, 3 pages.
Applicant-Initiated Interview Summary received for U.S. Appl. No. 17/516,537, mailed on Jul. 5, 2022, 4 pages.
Applicant-Initiated Interview Summary received for U.S. Appl. No. 17/516,537, mailed on Nov. 22, 2022, 2 pages.
Applicant-Initiated Interview Summary received for U.S. Appl. No. 17/572,117, mailed on Feb. 1, 2023, 4 pages.
Applicant-Initiated Interview Summary received for U.S. Appl. No. 17/572,117, mailed on Nov. 17, 2022, 4 pages.
Applicant-Initiated Interview Summary received for U.S. Appl. No. 17/835,334, mailed on Jan. 27, 2023, 4 pages.
Applicant-Initiated Interview Summary received for U.S. Appl. No. 17/835,334, mailed on Oct. 31, 2022, 3 pages.
Avdonin Nikita, "Astroviewer 3D", Available at: https://www.youtube.comjwatch?v=zY0tsl x3JHY/, Nov. 5, 2013, 2 pages.
Axiang's Network Notebook, Deep Analysis on Samsung's 2013 New Flagship: tell you what kind of mobile phone Galaxy S4 is!, available at: https://axiang.cc/archives/6115, Apr. 22, 2013, 4 pages.
Basu Saikat, "MS Outlook Tip: How to Automatically Organize Incoming Emails", Available online at: http://www.makeuseof.com/tag/ms-outlook-productivity-tip-how-to-move-emails-to-individual-folders-automatically/, Sep. 27, 2009, pp. 1-6.

(56) References Cited

OTHER PUBLICATIONS

Board Decision received for Chinese Patent Application No. 201580029071.7, mailed on Jul. 13, 2021, 2 pages.
Board Decision received for Chinese Patent Application No. 201580046788.2, mailed on Jun. 6, 2022, 17 pages.
Board Decision received for Chinese Patent Application No. 201580047640.0, mailed on Jun. 29, 2021, 2 pages.
Board Decision received for Chinese Patent Application No. 201680012936.3, mailed on Jun. 16, 2021, 2 pages.
Board Opinion received for Chinese Patent Application No. 201580046788.2, mailed on Dec. 29, 2021, 10 pages.
Bogdanov Alexei, "SKMEI 1016", XP054977588, Available online at: https://www.youtube.com/watch?v=E4q4Fug05Fw, Jun. 21, 2014, 2 pages.
Brief Communication regarding Oral Proceedings received for European Patent Application No. 15730925.3, mailed on Feb. 18, 2020, 7 pages.
Brief Communication Regarding Oral Proceedings received for European Patent Application No. 15760008.1, mailed on Sep. 13, 2021, 8 pages.
Brief Communication Regarding Oral Proceedings received for European Patent Application No. 17167629.9, mailed on Nov. 12, 2020, 2 pages.
Brief Communication Regarding Oral Proceedings received for European Patent Application No. 18170262.2, mailed on Oct. 4, 2021, 2 pages.
Brief Communication Regarding Oral Proceedings received for European Patent Application No. 20176616.9, mailed on Jun. 9, 2022, 1 page.
Brief Communication Regarding Oral Proceedings received for European Patent Application No. 20176616.9, mailed on May 27, 2022, 1 page.
Castellini Rick, "Google Earth", Retrieved from: https://www.youtube.com/watch?v=bgjMSBXsFZQ, How to Use Google Earth for Beginners, Feb. 12, 2013, 3 pages.
Certificate of Examination received for Australian Patent Application No. 2017100760 mailed on Feb. 9, 2018, 2 pages.
Certificate of Examination received for Australian Patent Application No. 2018101855, mailed on Aug. 6, 2019, 2 pages.
Certification of Examination received for Australian Patent Application No. 2018100158, mailed on Oct. 23, 2018, 2 pages.
Chan Christine, "Handoff Your Browser to Your iPhone or iPad! Plus A Chance To Win A Copy!", Apr. 12, 2011, 2 pages.
Clark Josh, "Designing Great iPhone Apps", O'Reilly Japan Co., O'Reilly Tim, vol. 1, May 24, 2012, 5 pages.
Clock & Calendar for SmartWatch 2, https://www.youtube.com/watch?v=Uj-K2vMnrj8, Nov. 20, 2013, 2 pages.
CNET download.com, "WeChat for Android", Available at: http://download.cnet.com/WeChat/3000-2150_4-75739423. html, Jan. 7, 2013, 6 pages.
Codrington Simon, "Intuitive Scrolling Interfaces with CSS Scroll Snap Points", Online Available at: https://www.sitepoint.com/intuitive-scrolling-interfaces-with-css-scroll-snap-points/, Dec. 8, 2015, 14 pages.
Cohn Emily, "Sonos Just Fixed the Most Annoying Thing About Its iPhone App", online available at: https://www.businessinsider.com/sonos-mobile-app-works-on-lock-screen-2016-6, Jun. 27, 2016, 2 pages.
Communication of the Board of Appeal received for European Patent Application No. 15728307.8, mailed on Sep. 14, 2022, 9 pages.
Communication of the Board of Appeal received for European Patent Application No. 15729286.3, mailed on Oct. 6, 2022, 8 pages.
Corrected Notice of Allowance received for U.S. Appl. No. 14/815,879, mailed on Jul. 13, 2017, 3 pages.
Corrected Notice of Allowance received for U.S. Appl. No. 14/815,879, mailed on Jul. 28, 2017, 3 pages.
Corrected Notice of Allowance received for U.S. Appl. No. 14/815,879, mailed on Sep. 21, 2017, 2 pages.
Corrected Notice of Allowance received for U.S. Appl. No. 14/822,769, mailed on Jan. 17, 2019, 8 pages.
Corrected Notice of Allowance received for U.S. Appl. No. 14/841,402, mailed on May 4, 2018, 2 pages.
Corrected Notice of Allowance received for U.S. Appl. No. 14/841,614, mailed on Jan. 8, 2019, 3 pages.
Corrected Notice of Allowance received for U.S. Appl. No. 14/928,865, mailed on Aug. 5, 2019, 2 pages.
Corrected Notice of Allowance received for U.S. Appl. No. 14/928,865, mailed on May 16, 2019, 2 pages.
Corrected Notice of Allowance received for U.S. Appl. No. 15/355,956, mailed on Jan. 3, 2020, 2 pages.
Corrected Notice of Allowance received for U.S. Appl. No. 15/366,763, mailed on Jan. 2, 2020, 5 pages.
Corrected Notice of Allowance received for U.S. Appl. No. 15/366,890, mailed on Feb. 12, 2020, 2 pages.
Corrected Notice of Allowance received for U.S. Appl. No. 15/488,093, mailed on Jun. 15, 2020, 2 pages.
Corrected Notice of Allowance received for U.S. Appl. No. 15/488,093, mailed on Jun. 30, 2020, 2 pages.
Corrected Notice of Allowance received for U.S. Appl. No. 15/798,257, mailed on Aug. 26, 2019, 2 pages.
Corrected Notice of Allowance received for U.S. Appl. No. 15/798,257, mailed on Jul. 9, 2019, 2 pages.
Corrected Notice of Allowance received for U.S. Appl. No. 15/798,257, mailed on Jun. 12, 2019, 2 pages.
Corrected Notice of Allowance received for U.S. Appl. No. 16/103,699, mailed on May 29, 2019, 2 pages.
Corrected Notice of Allowance received for U.S. Appl. No. 16/377,892, mailed on Aug. 11, 2021, 3 pages.
Corrected Notice of Allowance received for U.S. Appl. No. 16/378,136, mailed on Aug. 11, 2021, 2 pages.
Corrected Notice of Allowance received for U.S. Appl. No. 16/378,136, mailed on Jun. 11, 2021, 2 pages.
Corrected Notice of Allowance received for U.S. Appl. No. 16/583,981, mailed on Apr. 6, 2021, 3 pages.
Corrected Notice of Allowance received for U.S. Appl. No. 16/583,981, mailed on May 17, 2021, 3 pages.
Corrected Notice of Allowance received for U.S. Appl. No. 16/583,994, mailed on Jul. 6, 2021, 3 pages.
Corrected Notice of Allowance received for U.S. Appl. No. 16/841,352, mailed on Dec. 2, 2020, 2 pages.
Corrected Notice of Allowance received for U.S. Appl. No. 16/922,675, mailed on Jan. 9, 2023, 3 pages.
Corrected Notice of Allowance received for U.S. Appl. No. 16/922,675, mailed on Jan. 20, 2023, 3 pages.
Corrected Notice of Allowance received for U.S. Appl. No. 16/922,675, mailed on Mar. 4, 2022, 6 pages.
Corrected Notice of Allowance received for U.S. Appl. No. 16/936,164, mailed on Oct. 13, 2022, 3 pages.
Corrected Notice of Allowance received for U.S. Appl. No. 16/936,164, mailed on Oct. 28, 2022, 3 pages.
Corrected Notice of Allowance received for U.S. Appl. No. 17/013,778, mailed on Mar. 7, 2023, 5 pages.
Corrected Notice of Allowance received for U.S. Appl. No. 17/103,436, mailed on Dec. 22, 2021, 2 pages.
Corrected Notice of Allowance received for U.S. Appl. No. 17/157,391, mailed on Dec. 30, 2021, 2 pages.
Customize Notifications and Content on Your Galaxy Phone's Lock Screen, Online Available at: https://www.samsung.com/us/support/answer/ANS00062636, Oct. 4, 2017, 5 pages.
Decision of Board of Appeal received for European Patent Application No. 15728307.8, mailed on Dec. 8, 2022, 17 pages.
Decision on Acceptance received for Australian Patent Application No. 2015298710, mailed on Jul. 19, 2019, 18 pages.
Decision on Acceptance received for Australian Patent Application No. 2018201089, mailed on Apr. 20, 2021, 28 pages.
Decision on Appeal received for U.S. Appl. No. 14/833,014, mailed on Oct. 30, 2019, 10 pages.
Decision on Appeal received for U.S. Appl. No. 14/503,355, mailed on Aug. 25, 2020, 10 pages.
Decision on Appeal received for U.S. Appl. No. 14/815,890, mailed on Nov. 24, 2020, 13 pages.

(56) References Cited

OTHER PUBLICATIONS

Decision on Appeal received for U.S. Appl. No. 15/128,952, mailed on Dec. 28, 2020, 23 pages.
Decision on Opposition received for Australian Patent Application No. 2015298710, mailed on Aug. 9, 2019, 4 pages.
Decision on Opposition received for Australian Patent Application No. 2015298710, mailed on Aug. 20, 2018, 20 pages.
Decision to Grant received for Danish Patent Application No. PA201670320, mailed on Oct. 18, 2018, 2 pages.
Decision to Grant received for Danish Patent Application No. PA201770126, mailed on Mar. 27, 2018, 2 pages.
Decision to Grant received for European Patent Application No. 15711969.4, mailed on Sep. 26, 2019, 2 pages.
Decision to Grant received for European Patent Application No. 15730925.3, mailed on Dec. 9, 2021, 2 pages.
Decision to Grant received for European Patent Application No. 15739110.3, mailed on Sep. 19, 2019, 2 pages.
Decision to Grant received for European Patent Application No. 15747595.5, mailed on Jul. 16, 2020, 2 pages.
Decision to Grant received for European Patent Application No. 15759981.2, mailed on Jan. 8, 2020, 2 pages.
Decision to Grant received for European Patent Application No. 15759998.6, mailed on Jun. 18, 2020, 2 pages.
Decision to Grant received for European Patent Application No. 15760008.1, mailed on Aug. 11, 2022, 2 pages.
Decision to Grant received for European Patent Application No. 18170262.2, mailed on Mar. 11, 2022, 2 pages.
Decision to Grant received for European Patent Application No. 19185318.3, mailed on Mar. 31, 2022, 3 pages.
Decision to Grant received for European Patent Application No. 20185974.1, mailed on Aug. 19, 2022, 3 pages.
Decision to Refuse received for European Patent Application No. 15728307.8, mailed on Dec. 18, 2019, 14 pages.
Decision to Refuse received for European Patent Application No. 15729286.3, mailed on Dec. 18, 2019, 13 pages.
Decision to Refuse received for European Patent Application No. 15730924.6, mailed on Mar. 15, 2019, 12 pages.
Decision to Refuse received for European Patent Application No. 17167629.9, mailed on Nov. 24, 2020, 2 pages.
Decision to Refuse received for European Patent Application No. 17810749.6, mailed on Jan. 29, 2021, 24 pages.
Deluxe Moon-Guide, available online at: https://web.archive.org/web/20130520161057/http://www.lifewaresolutions.com/deluxe_moon_guide_ip.html, May 20, 2013, 5 pages.
digitalstreetsa.com, "Why WeChat might kill Whatsapp's future . . . ", Available at: http://digitalstreetsa.com/why-wechatmight-kill-whatsapps-future/, Jul. 3, 2013, 10 pages.
Ebpman Tech Reviews, "LG G3 Tips: How to customize the clock face", Available online at: https://www.youtube.com/watch?v=evraMWFb1fY, Jul. 25, 2014, 1 page.
Ellis Benus, "Use a Phone Number in the Google Calendar Where Line for One Click Calling", Available online at: https://ellisbenus.com/ellis-benus/use-a-phone-number-in-the-google-calender-where-line-for-one-click-calling, Ellis Benus-Small Business Web Guru, Oct. 3, 2012, 2 pages.
Ergonomic requirements for office work with visual display terminals (VDTs), Part 13: User guidance, International Standard ISO, Zuerich, CH, vol. 9241-13, Jul. 15, 1998, 40 pages.
European Search Report received for European Patent Application No. 21165295.3, mailed on Jun. 18, 2021, 4 pages.
Evgenyevich Sergey, "Earth & Moon in HD Gyro 3D", Available at: https://www.youtube.com/watch?v=IRwNcaSYrls/, Dec. 1, 2013, 2 pages.
Examiner Interview Summary received for U.S. Appl. No. 16/806,981, mailed on Mar. 26, 2021, 2 pages.
Examiner-Initiated Interview Summary received for U.S. Appl. No. 16/806,981, mailed on Jan. 13, 2022, 4 pages.
Examiner-Initiated Interview Summary received for U.S. Appl. No. 16/806,981, mailed on May 24, 2021, 4 pages.

Examiner's Answer to Appeal Brief received for U.S. Appl. No. 14/503,355, mailed on Apr. 17, 2020, 17 pages.
Examiner's Answer to Appeal Brief received for U.S. Appl. No. 14/815,890, mailed on Mar. 20, 2020, 16 pages.
Examiner's Answer to Appeal Brief received for U.S. Appl. No. 14/833,014, mailed on Nov. 2, 2017, 48 pages.
Examiner's Answer to Appeal Brief received for U.S. Appl. No. 15/128,952, mailed on Jan. 8, 2020, 9 pages.
Examiner's Answer to Appeal Brief received for U.S. Appl. No. 15/405,122, mailed on Jan. 11, 2023, 16 pages.
Examiner's Answer to Appeal Brief received for U.S. Appl. No. 17/013,778, mailed on Dec. 20, 2022, 9 pages.
Examiner's Pre-Review Report received for Japanese Patent Application No. 2018-080122, mailed on Feb. 25, 2020, 6 pages.
Extended European Search Report (includes Partial European Search Report and European Search Opinion) received for European Patent Application No. 16190252.3, mailed on Mar. 1, 2017, 10 pages.
Extended European Search Report for European Application No. 19185318.3, mailed on Nov. 20, 2019, 8 pages.
Extended European Search Report received for European Patent Application No. 17167629.9, mailed on Jun. 2, 2017, 7 pages.
Extended European Search Report received for European Patent Application No. 18170262.2, mailed on Jul. 25, 2018, 8 pages.
Extended European Search Report received for European Patent Application No. 19203942.8, mailed on Apr. 1, 2020, 10 pages.
Extended European Search Report received for European Patent Application No. 20176616.9, mailed on Sep. 8, 2020, 7 pages.
Extended European Search Report received for European Patent Application No. 20185974.1, mailed on Oct. 28, 2020, 7 pages.
Extended European Search Report received for European Patent Application No. 22157106.0, mailed on Jun. 27, 2022, 8 pages.
Extended European Search Report received for European Patent Application No. 22158560.7, mailed on Jun. 10, 2022, 12 pages.
Extended European Search Report received for European Patent Application No. 22169639.6, mailed on Jul. 19, 2022, 14 pages.
Extended European Search Report received for European Patent Application No. 22179347.4, mailed on Oct. 13, 2022, 7 pages.
Extended European Search Report received for European Patent Application No. 22195584.2, mailed on Jan. 5, 2023, 13 pages.
Extended European Search Report received for European Patent Application No. 22197186.4, mailed on Jan. 19, 2023, 9 pages.
Feldman Ari, "Excerpts from: Designing Arcade Computer Game Graphics", Available online at: http://www.phatcode.net/res/269/files/dacgg.pdf, Jan. 1, 2001, 35 pages.
Final Office Action received for U.S. Appl. No. 14/503,355, mailed on May 20, 2019, 27 pages.
Final Office Action received for U.S. Appl. No. 14/503,355, mailed on Sep. 8, 2017, 25 pages.
Final Office Action received for U.S. Appl. No. 14/752,776, mailed on May 29, 2018, 36 pages.
Final Office Action received for U.S. Appl. No. 14/815,890, mailed on Feb. 26, 2018, 20 pages.
Final Office Action received for U.S. Appl. No. 14/815,890, mailed on May 14, 2019, 22 pages.
Final Office Action received for U.S. Appl. No. 14/815,890, mailed on Nov. 21, 2016, 18 pages.
Final Office Action received for U.S. Appl. No. 14/815,898, mailed on Jun. 9, 2016, 19 pages.
Final Office Action received for U.S. Appl. No. 14/817,572, mailed on Mar. 23, 2017, 14 pages.
Final Office Action received for U.S. Appl. No. 14/822,769, mailed on Jan. 4, 2018, 25 pages.
Final Office Action received for U.S. Appl. No. 14/833,014, mailed on Oct. 26, 2016, 32 pages.
Final Office Action received for U.S. Appl. No. 14/838,235, mailed on Jun. 15, 2016, 18 pages.
Final Office Action received for U.S. Appl. No. 14/841,402, mailed on Aug. 25, 2017, 17 pages.
Final Office Action received for U.S. Appl. No. 14/841,614, mailed on May 10, 2018, 13 pages.
Final Office Action received for U.S. Appl. No. 14/841,623, mailed on Sep. 5, 2017, 16 pages.

(56) References Cited

OTHER PUBLICATIONS

Final Office Action received for U.S. Appl. No. 14/928,865, mailed on Dec. 5, 2018, 15 pages.

Final Office Action received for U.S. Appl. No. 15/128,952, mailed on Jul. 18, 2018, 19 pages.

Final Office Action received for U.S. Appl. No. 15/352,215, mailed on Mar. 7, 2019, 22 pages.

Final Office Action received for U.S. Appl. No. 15/405,122, mailed on Jan. 21, 2020, 36 pages.

Final Office Action received for U.S. Appl. No. 15/405,122, mailed on Nov. 5, 2021, 45 pages.

Final Office Action received for U.S. Appl. No. 16/147,523, mailed on Aug. 4, 2020, 15 pages.

Final Office Action received for U.S. Appl. No. 16/147,523, mailed on Oct. 14, 2021, 22 pages.

Final Office Action received for U.S. Appl. No. 16/265,938, mailed on Apr. 7, 2020, 45 pages.

Final Office Action received for U.S. Appl. No. 16/377,892, mailed on Jan. 28, 2021, 11 pages.

Final Office Action received for U.S. Appl. No. 16/378,136, mailed on Jan. 28, 2021, 9 pages.

Final Office Action received for U.S. Appl. No. 16/434,747, mailed on Nov. 26, 2021, 14 pages.

Final Office Action received for U.S. Appl. No. 16/583,981, mailed on Apr. 16, 2020, 19 pages.

Final Office Action received for U.S. Appl. No. 16/583,989, mailed on Jul. 10, 2020, 23 pages.

Final Office Action received for U.S. Appl. No. 16/583,994, mailed on Jul. 23, 2020, 16 pages.

Final Office Action received for U.S. Appl. No. 16/584,490, mailed on May 1, 2020, 48 pages.

Final Office Action received for U.S. Appl. No. 16/806,981, mailed on Apr. 14, 2021, 24 pages.

Final Office Action received for U.S. Appl. No. 16/806,981, mailed on Mar. 1, 2022, 33 pages.

Final Office Action received for U.S. Appl. No. 16/922,675, mailed on Dec. 3, 2020, 21 pages.

Final Office Action received for U.S. Appl. No. 16/922,675, mailed on Nov. 30, 2020, 12 pages.

Final Office Action received for U.S. Appl. No. 16/935,002, mailed on Jan. 5, 2022, 25 pages.

Final Office Action received for U.S. Appl. No. 16/936,164, mailed on Jul. 6, 2022, 21 pages.

Final Office Action received for U.S. Appl. No. 16/943,737, mailed on Feb. 4, 2022, 24 pages.

Final Office Action received for U.S. Appl. No. 17/013,778, mailed on Apr. 1, 2022, 11 pages.

Final Office Action received for U.S. Appl. No. 17/181,089, mailed on Oct. 21, 2022, 15 pages.

Final Office Action received for U.S. Appl. No. 17/516,537, mailed on Oct. 11, 2022, 9 pages.

Final Office Action received for U.S. Appl. No. 17/572,117, mailed on Dec. 22, 2022, 16 pages.

Final Office Action received for U.S. Appl. No. 17/835,334, mailed on Dec. 22, 2022, 11 pages.

Final Office Action received for U.S. Appl. No. 14/815,879, mailed on Mar. 24, 2016, 46 pages.

Final Office Action received for U.S. Appl. No. 14/822,769, mailed on Nov. 9, 2016, 18 pages.

Fingas Jon, "Sonos Puts Speaker Controls on Your iPhone's Lock Screen", online available at: https://www.engadget.com/2016-06-21-sonos-ios-lock-screen-controls.html, Jun. 21, 2016, 3 pages.

First Action Interview received for U.S. Appl. No. 14/815,890, mailed on Aug. 12, 2016, 3 pages.

Frakes Dan, "How to Get Started with Airplay", available at: https://www.macworld.com/article/2039770/how-to-get-started-with-airplay.html, Macworld, May 27, 2013, 8 pages.

Fuchphone Extras, "LG G Watch—Designs | Watch Faces", Available online at: https://www.youtube.com/watch?v=yqxzqdi_MSE, Jul. 27, 2014, 1 page.

Fuchphone Extras, "Samsung Gear Live—Designs | Watch Faces", Available online at: https://www.youtube.com/watch?v=fFjtVAxyimE, Jul. 26, 2014, 1 page.

Fukuda Kazuhiro, "Xperia Z1 Perfect Manual", Sotec Co., Ltd., No. 1, Nov. 15, 2013, pp. 217-218.

Gazer, "iPhone 4S Super Manual", Shuwa System Co., Saito Kazukuni, vol. 1, Jun. 6, 2013, 7 pages.

Geary David, "Programming HTML5 Canvas", O'Reilly Japan, Inc., No. 1, Jul. 23, 2014, pp. 327-330.

Google Earth 7.0.1.8244, retrieved from the Internet: http://dl.google.com/dl/earth/client/ge7/release_7_0_1/googleearth-win-bundle-7.0.1.8244.exe, Oct. 29, 2012, 1 page.

Google Earth on Android—AndroidCentral.com, Available online at: https://www.youtube.com/watch?v=1WxN1RunrE4, Feb. 22, 2010, 1 page.

Gookin Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.

Gottabemobile, "How to Change Watch Faces on Android Wear", available online at: https://www.youtube.com/watch?v=B8iRGkGq6a8, Jul. 9, 2014, 4 pages.

Grothaus Michael, "WhatsApp Introduces Major New Audio Features", Engadget, Available at: http://www.engadget.com/2013/08/07/whatsapp-introduces-major-new-audio-features/, Aug. 7, 2013, 4 pages.

GT-I9500(Galaxy S4) User Manual, Samsung, Rev.1.1, http://org.downloadcenter.samsung.com/downloadfile/ContentsFile.aspx?CDSite=UNI_TW&CttFileID=5406113&CDCttType=UM&ModelType=N&ModelName=GTI9500& VPath=UM/201305/20130520173017063/GTI9500_UM_Open_Taiwan_Jellybean_Chi_Rev.1.1_130520.pdf., May 2013, 14 pages.

Horowitz Paul, "Always Show Scroll Bars in Mac OS X", OS X Daily, available online at: http://osxdaily.com/2011/08/03/show-scroll-bars-mac-os-x-lion/, Aug. 3, 2011, 7 pages.

How to Move Mail Different in Gmail, Available at: https://web.archive.org/web/20140731230338/http://www.wikihow.com/Move-Mail-to-Different-Folders-in-Gmail, Jul. 31, 2014, pp. 1-4.

Instruction Manual, Detailed version, KDDI Corporation, No. 1, vol. 1, Jun. 2014, 4 pages.

Intention to Grant received for Danish Patent Application No. PA201570496, mailed on Feb. 17, 2016, 6 pages.

Intention to Grant received for Danish Patent Application No. PA201570550, mailed on Dec. 22, 2016, 2 pages.

Intention To Grant received for Danish Patent Application No. PA201570563, mailed on Mar. 17, 2016, 7 pages.

Intention to Grant received for Danish Patent Application No. PA201670320, mailed on May 17, 2018, 2 pages.

Intention to Grant received for Denmark Patent Application No. PA201770126, mailed on Jan. 19, 2018, 2 pages.

Intention to Grant received for European Patent Application No. 15711969.4, mailed on May 29, 2019, 11 pages.

Intention to Grant received for European Patent Application No. 15730925.3, mailed on Aug. 16, 2021, 10 pages.

Intention to Grant received for European Patent Application No. 15730925.3, mailed on May 28, 2020, 10 pages.

Intention to Grant received for European Patent Application No. 15739110.3, mailed on Mar. 7, 2019, 8 pages.

Intention to Grant received for European Patent Application No. 15739110.3, mailed on Sep. 11, 2019, 6 pages.

Intention to Grant received for European Patent Application No. 15747595.5, mailed on Feb. 17, 2020, 8 pages.

Intention to Grant received for European Patent Application No. 15759981.2, mailed on Aug. 12, 2019, 8 pages.

Intention to Grant received for European Patent Application No. 15759981.2, mailed on Mar. 21, 2019, 8 pages.

Intention to Grant received for European Patent Application No. 15759998.6, mailed on Apr. 17, 2020, 10 pages.

Intention to Grant received for European Patent Application No. 15759998.6, mailed on Nov. 21, 2019, 12 pages.

Intention to Grant received for European Patent Application No. 15760008.1, mailed on Apr. 6, 2022, 11 pages.

(56) References Cited

OTHER PUBLICATIONS

Intention to Grant received for European Patent Application No. 15760008.1, mailed on Oct. 5, 2021, 11 pages.
Intention to Grant received for European Patent Application No. 16708014.2, mailed on May 10, 2022, 8 pages.
Intention to Grant received for European Patent Application No. 18170262.2, mailed on Jun. 30, 2020, 8 pages.
Intention to Grant received for European Patent Application No. 18170262.2, mailed on Oct. 27, 2021, 8 pages.
Intention to Grant received for European Patent Application No. 19185318.3, mailed on Dec. 10, 2021, 12 pages.
Intention to Grant received for European Patent Application No. 20185974.1, mailed on Apr. 28, 2022, 8 pages.
International Preliminary Report on Patentability received for PCT Patent Application No. PCT/US2015/019317, mailed on Dec. 15, 2016, 18 pages.
International Preliminary Report on Patentability received for PCT Patent Application No. PCT/US2015/032305, mailed on Dec. 15, 2016, 8 pages.
International Preliminary Report on Patentability received for PCT Patent Application No. PCT/US2015/032309, mailed on Dec. 15, 2016, 8 pages.
International Preliminary Report on Patentability received for PCT Patent Application No. PCT/US2015/034604, mailed on Feb. 16, 2017, 21 pages.
International Preliminary Report on Patentability received for PCT Patent Application No. PCT/US2015/034606, mailed on Feb. 16, 2017, 11 pages.
International Preliminary Report on Patentability received for PCT Patent Application No. PCT/US2015/034607, mailed on Feb. 16, 2017, 18 pages.
International Preliminary Report on Patentability received for PCT Patent Application No. PCT/US2015/038173, mailed on Jan. 5, 2017, 10 pages.
International Preliminary Report on Patentability received for PCT Patent Application No. PCT/US2015/038174, mailed on Jan. 5, 2017, 27 pages.
International Preliminary Report on Patentability received for PCT Patent Application No. PCT/US2015/041424, mailed on Feb. 2, 2017, 13 pages.
International Preliminary Report on Patentability received for PCT Patent Application No. PCT/US2015/043487, mailed on Feb. 16, 2017, 13 pages.
International Preliminary Report on Patentability received for PCT Patent Application No. PCT/US2015/044083, mailed on Mar. 16, 2017, 24 pages.
International Preliminary Report on Patentability received for PCT Patent Application No. PCT/US2015/044517, mailed on Mar. 16, 2017, 10 pages.
International Preliminary Report on Patentability received for PCT Patent Application No. PCT/US2015/046262, mailed on Mar. 16, 2017, 26 pages.
International Preliminary Report on Patentability received for PCT Patent Application No. PCT/US2016/017271, mailed on Sep. 21, 2017, 13 pages.
International Preliminary Report on Patentability received for PCT Patent Application No. PCT/US2016/046828, mailed on Mar. 1, 2018, 19 pages.
International Preliminary Report on Patentability received for PCT Patent Application No. PCT/US2017/035554, mailed on Dec. 20, 2018, 39 pages.
International Preliminary Report on Patentability received for PCT Patent Application No. PCT/US2020/026044, mailed on Dec. 9, 2021, 18 pages.
International Preliminary Report on Patentability received for PCT Patent Application No. PCT/US2020/035488, mailed on Dec. 9, 2021, 16 pages.
International Preliminary Report on Patentability received for PCT Patent Application No. PCT/US2015/046787, mailed on Mar. 16, 2017, 19 pages.

International Search Report and Written Opinion received for PCT Application No. PCT/US2015/034604, mailed on Nov. 9, 2015, 30 pages.
International Search Report and Written Opinion received for PCT Patent Application No. PCT/US2015/019317, mailed on Aug. 25, 2015, 24 pages.
International Search Report and Written Opinion received for PCT Patent Application No. PCT/US2015/032305, mailed on Sep. 10, 2015, 10 pages.
International Search Report and Written Opinion received for PCT Patent Application No. PCT/US2015/032309, mailed on Sep. 2, 2015, 10 pages.
International Search Report and Written Opinion received for PCT Patent Application No. PCT/US2015/034606, mailed on Dec. 2, 2015, 17 pages.
International Search Report and Written Opinion received for PCT Patent Application No. PCT/US2015/038173 mailed on Sep. 25, 2015, 13 pages.
International Search Report and Written Opinion received for PCT Patent Application No. PCT/US2015/038174, mailed on Jan. 18, 2016, 38 pages.
International Search Report and Written Opinion received for PCT Patent Application No. PCT/US2015/041424, mailed on Mar. 31, 2016, 18 pages.
International Search Report and Written Opinion received for PCT Patent Application No. PCT/US2015/043487, mailed on Jan. 29, 2016, 19 pages.
International Search Report and Written Opinion received for PCT Patent Application No. PCT/US2015/044083, mailed on Feb. 4, 2016, 33 pages.
International Search Report and Written Opinion received for PCT Patent Application No. PCT/US2015/044517, mailed on Oct. 28, 2015, 13 pages.
International Search Report and Written Opinion received for PCT Patent Application No. PCT/US2015/046262, mailed on Mar. 15, 2016, 34 pages.
International Search Report and Written Opinion received for PCT Patent Application No. PCT/US2015/046787, mailed on Apr. 1, 2016, 26 pages.
International Search Report and Written Opinion received for PCT Patent Application No. PCT/US2016/017271, mailed on Sep. 1, 2016, 18 pages.
International Search Report and Written Opinion received for PCT Patent Application No. PCT/US2016/046828, mailed on Dec. 15, 2016, 22 pages.
International Search Report and Written Opinion received for PCT Patent Application No. PCT/US2017/035554, mailed on Sep. 22, 2017, 42 pages.
International Search Report and Written Opinion received for PCT Patent Application No. PCT/US2020/026044, mailed on Sep. 9, 2020, 26 pages.
International Search Report and Written Opinion received for PCT Patent Application No. PCT/US2020/035488, mailed on Nov. 17, 2020, 21 pages.
International Search Report and Written Opinion received for PCT Patent Application No. PCT/US2022/031252, mailed on Oct. 7, 2022, 18 pages.
International Search Report and Written Opinion received for PCT Patent Application No. PCT/US2015/034607, mailed on Dec. 1, 2015, 23 pages.
Inventerium, "Tropical Fish 14", Available online at: https://www.turbosquid.com/3d-models/tropical-fish-3d-model/388510, Feb. 4, 2008, 2 pages.
Invitation to Additional Fees and Partial International Search Report received for PCT Patent Application No. PCT/US2015/034604 mailed on Sep. 4, 2015, 6 pages.
Invitation to Additional Fees and Partial International Search Report received for PCT Patent Application No. PCT/US2015/034606 mailed on Sep. 9, 2015, 6 pages.
Invitation to Pay Additional Fee received for European Patent Application No. 15747595.5, mailed on Feb. 9, 2018, 6 pages.

(56) References Cited

OTHER PUBLICATIONS

Invitation to Pay Additional Fees and Partial Search Report received for PCT Patent Application No. PCT/US2015/043487, mailed on Nov. 9, 2015, 4 pages.
Invitation to Pay Additional Fees received for PCT Patent Application No. PCT/US2015/019317, mailed on May 22, 2015, 7 pages.
Invitation to Pay Additional Fees received for PCT Patent Application No. PCT/US2015/034607, mailed on Sep. 30, 2015, 4 pages.
Invitation to Pay Additional Fees received for PCT Patent Application No. PCT/US2015/038174, mailed on Oct. 5, 2015, 5 pages.
Invitation to Pay Additional Fees received for PCT Patent Application No. PCT/US2015/041424, mailed on Nov. 12, 2015, 6 pages.
Invitation to Pay Additional Fees received for PCT Patent Application No. PCT/US2015/044083, mailed on Nov. 4, 2015, 11 pages.
Invitation to Pay Additional Fees received for PCT Patent Application No. PCT/US2015/046262, mailed on Nov. 23, 2015, 7 pages.
Invitation to Pay Additional Fees received for PCT Patent Application No. PCT/US2015/046787, mailed on Dec. 15, 2015, 8 pages.
Invitation to Pay Additional Fees received for PCT Patent Application No. PCT/US2016/017271, mailed on May 25, 2016, 7 pages.
Invitation to Pay Additional Fees received for PCT Patent Application No. PCT/US2016/046828, mailed on Sep. 23, 2016, 2 pages.
Invitation to Pay Additional Fees received for PCT Patent Application No. PCT/US2017/035554, mailed on Jul. 20, 2017, 2 pages.
Invitation to Pay Additional Fees received for PCT Patent Application No. PCT/US2020/026044, mailed on Jun. 25, 2020, 12 pages.
Invitation to Pay Additional Fees received for PCT Patent Application No. PCT/US2020/035488, mailed on Sep. 23, 2020, 15 pages.
Invitation to Pay Search Fees received for European Patent Application No. 15753796.0, mailed on Mar. 24, 2020, 3 pages.
Invitation to Pay Search Fees received for European Patent Application No. 20760624.5, mailed on Jan. 2, 2023, 3 pages.
IOSVlog Daily, "iOS 7 Notification Center Complete Walkthrough", Available online at: "https://www.youtube.com/watch?v=gATXt-o42LA", Jun. 10, 2013, 1 page.
IPhone, "User Guide for iOS 7.1 Software", Mar. 2014, 162 pages.
ITJungles, "iPhone 6: How to Pair with Another Bluetooth Device", Available Online at: https://www.youtube.com/watch?v=9setanYtHAk, Aug. 5, 2015, 3 pages.
Jepson Tom, "How to auto-forward specific emails in gmail?", Available online at: http://www.tomjepson.co.uk/how-to-auto-forward-specific-emails-in-gmail/, May 19, 2013, 7 pages.
Kazmucha Allyson, "Sonos Controller App for iPhone and iPad Review", online available at https://www.imore.com/sonos-controller-app-iphone-and-ipad-review, Mar. 1, 2018, 4 pages.
Kenney Briley, "How to Customize a Smartwatch and other Personalization Questions", Available online at: https://smartwatches.org/learn/customize-smartwatch/, Jan. 23, 2014, 3 pages.
Kidizoom Smartwatch, Available online at: https://www.vtechnl.com/media/downloads/Kidizoom-Smart-Watch.pdf, Jun. 24, 2014, 23 pages.
Kinect Gesture Commands—Kinect Voice Commands, Xbox Wire, Available Online at: https://hwcdn.libsyn.com/p/4/4/c/44c89c7f273167b4/Xbox_One_Kinect_Voice_Gesture.pdf?c_id=6458139&cs_id=6458139&expiration=1555411736&hwt=fe78eb09654ea677c9fbf836ad2ed82b, 2013, 2 pages.
Leonard Jonathano, "How to: dismiss banner notifications or toast notifications on ios7", Available online at: "https://www.youtube.com/watch?v=vSjHnBFIW_M", Dec. 17, 2013, 1 page.
Lewis Jeffery, "iOS Notification Banner Pull Down to Notification Center in iOS 7 Beta 5", Available online at: "https://www.youtube.com/watch?v=nP0s6ETPxDg", Aug. 6, 2013, 1 page.
Link to Wayback Machine with link to Google Play showing different layouts of complications associated with a clock face, available online at: https://play.google.com/store/apps/details?id=com.levelup.beautifulwidgets.free&hl=da, Sep. 9, 2013, 6 pages.
Living Earth, available at: http;//www.livingcarthapp.com/, 2014, 6 pages.

Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low Cherlynn, "So you bought a smartwatch. Now what?", Online available at: https://www.engadget.com/2018-02-06-how-to-set-up-your-smartwatch.html, Feb. 6, 2018, 19 pages.
Lyons et al., "Facet: A Multi-Segment Wrist Worn System", Online available at: <http://fetlab.io/publications/2012-Facet-a%20multi-segment%20wrist%20worn%20system.pdf>, Oct. 7-10, 2012, pp. 123-129.
Microsoft Outlook 2010(TM) A Beginners Guide, Available online at: http://www.reading.ac.uk/web/files/its/outlook2010.pdf, Apr. 1, 2012, 24 pages.
Minutes of Oral Proceedings received for European Patent Application No. 15728307.8, mailed on Dec. 13, 2019, 4 pages.
Minutes of Oral Proceedings received for European Patent Application No. 15728307.8, mailed on Nov. 11, 2022, 4 pages.
Minutes of Oral Proceedings received for European Patent Application No. 15729286.3, mailed on Dec. 13, 2019, 4 pages.
Minutes of Oral Proceedings received for European Patent Application No. 15730924.6, mailed on Mar. 13, 2019, 4 pages.
Minutes of Oral Proceedings received for European Patent Application No. 15730925.3, mailed on May 26, 2020, 11 pages.
Minutes of the Oral Proceedings received for European Application No. 15711969.4, mailed on May 16, 2019, 7 pages.
Minutes of the Oral Proceedings received for European Patent Application No. 15729286.3, mailed on Dec. 6, 2022, 5 pages.
Minutes of the Oral Proceedings received for European Patent Application No. 15760008.1, mailed on Sep. 21, 2021, 6 pages.
Minutes of the Oral Proceedings received for European Patent Application No. 17810749.6, mailed on Jan. 26, 2021, 8 pages.
Mobile How To, "How to Send a Picture Message/MMS—Samsung Galaxy Note 3", Online Available at: https://www.youtube.com/watch?v=-3d0z8-KeDw, Published on Nov. 3, 2013, 1 page.
Mugs, Online Available at: https://web.archive.org/web/20151029034349/http://le-mugs.com/, Oct. 29, 2015, 14 pages.
Nerdtalk, "The Best Android Clock Widgets", available at: https://www.youtube.com/watch?v=E1bAprWByfU, Apr. 25, 2011, 1 page.
Netsapiens, "Click to Call in MS Outlook", Available online at: https://netsapiens.com/click-to-call-in-ms-outlook-windows-apps/, May 4, 2012, 8 pages.
New, but unsigned—Easy StopWatch for Symbian, XP55393563, Available online at: http://www.allaboutsymbian.com/flow/item/19490_New_but_unsigned-Easy_StopWatc.php, Mar. 15, 2014, 15 pages.
Non-Final Office Action received for U.S. Appl. No. 14/817,572, mailed on Sep. 12, 2016, 9 pages.
Non-Final Office Action received for U.S. Appl. No. 17/013,778, mailed on Aug. 20, 2021, 9 pages.
Non-Final Office Action received for U.S. Appl. No. 14/503,355, mailed on Dec. 30, 2016, 23 pages.
Non-Final Office Action received for U.S. Appl. No. 14/503,355, mailed on Sep. 4, 2018, 25 pages.
Non-Final Office Action received for U.S. Appl. No. 14/503,376, mailed on Dec. 22, 2014, 21 pages.
Non-Final Office Action received for U.S. Appl. No. 14/503,386, mailed on Jan. 7, 2015, 19 pages.
Non-Final Office Action received for U.S. Appl. No. 14/752,776, mailed on Jan. 2, 2018, 30 pages.
Non-Final Office Action received for U.S. Appl. No. 14/752,776, mailed on Nov. 5, 2018, 48 pages.
Non-Final Office Action received for U.S. Appl. No. 14/805,403, mailed on Nov. 16, 2017, 21 pages.
Non-Final Office Action received for U.S. Appl. No. 14/815,879, mailed on Dec. 15, 2016, 33 pages.
Non-Final Office Action received for U.S. Appl. No. 14/815,890, mailed on Dec. 18, 2018, 21 pages.
Non-Final Office Action received for U.S. Appl. No. 14/815,890, mailed on Jun. 6, 2017, 19 pages.
Non-Final Office Action received for U.S. Appl. No. 14/815,890, mailed on Oct. 19, 2015, 5 pages.

(56) References Cited

OTHER PUBLICATIONS

Non-Final Office Action received for U.S. Appl. No. 14/822,769, mailed on Feb. 5, 2016, 14 pages.

Non-Final Office Action received for U.S. Appl. No. 14/822,769, mailed on Jun. 29, 2016, 14 pages.

Non-Final Office Action received for U.S. Appl. No. 14/822,769, mailed on May 4, 2017, 21 pages.

Non-Final Office Action received for U.S. Appl. No. 14/822,769, mailed on May 24, 2018, 30 pages.

Non-Final Office Action received for U.S. Appl. No. 14/833,014, mailed on Mar. 21, 2016, 26 pages.

Non-Final Office Action received for U.S. Appl. No. 14/841,402, mailed on Jan. 25, 2017, 18 pages.

Non-Final Office Action received for U.S. Appl. No. 14/841,608, mailed on Apr. 12, 2017, 9 pages.

Non-Final Office Action received for U.S. Appl. No. 14/841,614, mailed on Jul. 27, 2017, 13 pages.

Non-Final Office Action received for U.S. Appl. No. 14/841,623, mailed on Feb. 2, 2017, 17 pages.

Non-Final Office Action received for U.S. Appl. No. 14/928,865, mailed on Mar. 27, 2018, 15 pages.

Non-Final Office Action received for U.S. Appl. No. 15/128,952, mailed on Apr. 1, 2019, 20 pages.

Non-Final Office Action received for U.S. Appl. No. 15/128,952, mailed on Dec. 29, 2017, 13 pages.

Non-Final Office Action received for U.S. Appl. No. 15/142,661, mailed on Jan. 25, 2017, 29 pages.

Non-Final Office Action received for U.S. Appl. No. 15/352,215, mailed on Sep. 20, 2018, 31 pages.

Non-Final Office Action received for U.S. Appl. No. 15/355,956, mailed on May 31, 2019, 32 pages.

Non-Final Office Action received for U.S. Appl. No. 15/366,763, mailed on Mar. 8, 2019, 14 pages.

Non-Final Office Action received for U.S. Appl. No. 15/366,890, mailed on May 8, 2019, 16 pages.

Non-Final Office Action received for U.S. Appl. No. 15/405,122, mailed on Apr. 2, 2021, 35 pages.

Non-Final Office Action received for U.S. Appl. No. 15/405,122, mailed on May 31, 2019, 43 pages.

Non-Final Office Action received for U.S. Appl. No. 15/405,122, mailed on Sep. 24, 2020, 30 pages.

Non-Final Office Action received for U.S. Appl. No. 15/425,273, mailed on Oct. 3, 2018, 10 pages.

Non-Final Office Action received for U.S. Appl. No. 15/431,435, mailed on Jun. 8, 2017, 13 pages.

Non-Final Office Action received for U.S. Appl. No. 15/488,093, mailed on Oct. 4, 2019, 18 pages.

Non-Final Office Action received for U.S. Appl. No. 15/902,401, mailed on Jul. 19, 2019, 11 pages.

Non-Final Office Action received for U.S. Appl. No. 16/103,699, mailed on Nov. 30, 2018, 14 pages.

Non-Final Office Action received for U.S. Appl. No. 16/147,523, mailed on Apr. 26, 2022, 22 pages.

Non-Final Office Action received for U.S. Appl. No. 16/147,523, mailed on Dec. 27, 2019, 11 pages.

Non-Final Office Action received for U.S. Appl. No. 16/147,523, mailed on Jul. 21, 2021, 20 pages.

Non-Final Office Action received for U.S. Appl. No. 16/259,954, mailed on Feb. 5, 2020, 10 pages.

Non-Final Office Action received for U.S. Appl. No. 16/265,938, mailed on Nov. 4, 2019, 28 pages.

Non-Final Office Action received for U.S. Appl. No. 16/377,892, mailed on May 21, 2020, 9 pages.

Non-Final Office Action received for U.S. Appl. No. 16/378,136, mailed on Jun. 2, 2020, 8 pages.

Non-Final Office Action received for U.S. Appl. No. 16/434,747, mailed on Jun. 10, 2021, 13 pages.

Non-Final Office Action received for U.S. Appl. No. 16/583,981, mailed on Dec. 6, 2019, 14 pages.

Non-Final Office Action received for U.S. Appl. No. 16/583,989, mailed on Jan. 24, 2020, 20 pages.

Non-Final Office Action received for U.S. Appl. No. 16/583,994, mailed on Dec. 23, 2020, 17 pages.

Non-Final Office Action received for U.S. Appl. No. 16/583,994, mailed on Dec. 30, 2019, 14 pages.

Non-Final Office Action received for U.S. Appl. No. 16/584,490, mailed on Dec. 10, 2019, 27 pages.

Non-Final Office Action received for U.S. Appl. No. 16/806,981, mailed on Nov. 13, 2020, 22 pages.

Non-Final Office Action received for U.S. Appl. No. 16/806,981, mailed on Sep. 1, 2021, 27 pages.

Non-Final Office Action received for U.S. Appl. No. 16/922,675, mailed on Aug. 13, 2020, 17 pages.

Non-Final Office Action received for U.S. Appl. No. 16/922,675, mailed on Jun. 8, 2022, 21 pages.

Non-Final Office Action received for U.S. Appl. No. 16/922,675, mailed on May 4, 2021, 23 pages.

Non-Final Office Action received for U.S. Appl. No. 16/935,002, mailed on Jun. 25, 2021, 20 pages.

Non-Final Office Action received for U.S. Appl. No. 16/936,164, mailed on Jan. 18, 2022, 18 pages.

Non-Final Office Action received for U.S. Appl. No. 16/943,737, mailed on Jun. 25, 2021, 18 pages.

Non-Final Office Action received for U.S. Appl. No. 17/013,778, mailed on Dec. 9, 2021, 11 pages.

Non-Final Office Action received for U.S. Appl. No. 17/103,436, mailed on Aug. 18, 2021, 16 pages.

Non-Final Office Action received for U.S. Appl. No. 17/157,391, mailed on Aug. 23, 2021, 12 pages.

Non-Final Office Action received for U.S. Appl. No. 17/181,089, mailed on May 13, 2022, 12 pages.

Non-Final Office Action received for U.S. Appl. No. 17/509,356, mailed on Dec. 22, 2022, 16 pages.

Non-Final Office Action received for U.S. Appl. No. 17/516,537, mailed on May 5, 2022, 8 pages.

Non-Final Office Action received for U.S. Appl. No. 17/572,117, mailed on Oct. 6, 2022, 15 pages.

Non-Final Office Action received for U.S. Appl. No. 17/583,657, mailed on Sep. 13, 2022, 13 pages.

Non-Final Office Action received for U.S. Appl. No. 17/827,004, mailed on Nov. 9, 2022, 27 pages.

Non-Final Office Action received for U.S. Appl. No. 17/835,334, mailed on Sep. 22, 2022, 11 pages.

Non-Final Office Action received for U.S. Appl. No. 17/951,875, mailed on Jan. 23, 2023, 12 pages.

Non-Final Office Action received for U.S. Appl. No. 14/815,879, mailed on Nov. 6, 2015, 35 pages.

Non-Final Office Action received for U.S. Appl. No. 14/815,898, mailed on Dec. 1, 2015, 22 pages.

Non-Final Office Action received for U.S. Appl. No. 14/815,907, mailed on Jan. 12, 2016, 22 pages.

Non-Final Office Action received for U.S. Appl. No. 14/815,909, mailed on Nov. 27, 2015, 12 pages.

Non-Final Office Action received for U.S. Appl. No. 14/838,235, mailed on Jan. 5, 2016, 3 pages.

Norman Don, "Affordances and Design", Jng.org, Available at: http://jnd.org/dn.mss/affordances_and.html, Jan. 14, 2006, 5 pages.

Notice of Acceptance received for Australian Patent Application No. 2015267259, mailed on Jan. 30, 2018, 3 pages.

Notice of Acceptance received for Australian Patent Application No. 2015267260, mailed on Jan. 30, 2018, 3 pages.

Notice of Acceptance received for Australian Patent Application No. 2015267671, mailed on Apr. 4, 2018, 3 pages.

Notice of Acceptance received for Australian Patent Application No. 2015279544, mailed on Mar. 1, 2018, 3 pages.

Notice of Acceptance received for Australian Patent Application No. 2015298710, mailed on Oct. 8, 2019, 3 pages.

Notice of Acceptance received for Australian Patent Application No. 2016231598, mailed on Mar. 1, 2018, 3 pages.

Notice of Acceptance received for Australian Patent Application No. 2017277971, mailed on Feb. 17, 2021, 3 pages.

(56)     References Cited

OTHER PUBLICATIONS

Notice of Acceptance received for Australian Patent Application No. 2018201089, mailed on May 28, 2021, 3 pages.

Notice of Acceptance received for Australian Patent Application No. 2018202751, mailed on Sep. 4, 2019, 3 pages.

Notice of Acceptance received for Australian Patent Application No. 2018203215, mailed on Nov. 20, 2019, 3 pages.

Notice of Acceptance received for Australian Patent Application No. 2018204286, mailed on Feb. 27, 2020, 3 pages.

Notice of Acceptance received for Australian Patent Application No. 2018204430, mailed on Jun. 26, 2019, 3 pages.

Notice of Acceptance received for Australian Patent Application No. 2019246830, mailed on Oct. 24, 2019, 3 pages.

Notice of Acceptance received for Australian Patent Application No. 2020201575, mailed on Mar. 15, 2021, 3 pages.

Notice of Acceptance received for Australian Patent Application No. 2020203919, mailed on Sep. 3, 2021, 3 pages.

Notice of Acceptance received for Australian Patent Application No. 2020250323, mailed on Feb. 28, 2022, 3 pages.

Notice of Acceptance received for Australian Patent Application No. 2020282362, mailed on Jan. 4, 2022, 3 pages.

Notice of Acceptance received for Australian Patent Application No. 2020285524, mailed on Dec. 17, 2021, 3 pages.

Notice of Acceptance received for Australian Patent Application No. 2021202815, mailed on Jun. 16, 2022, 3 pages.

Notice of Acceptance received for Australian Patent Application No. 2021203636, mailed on Apr. 14, 2022, 3 pages.

Notice of Acceptance received for Australian Patent Application No. 2022201369, mailed on Mar. 17, 2022, 3 pages.

Notice of Acceptance received for Australian Patent Application No. 2022202458, mailed on May 6, 2022, 3 pages.

Notice of Acceptance received for Australian Patent Application No. 2015279545, mailed on Feb. 9, 2018, 3 pages.

Notice of Acceptance received for Australian Patent Application No. 2015312369, mailed on Mar. 21, 2018, 3 pages.

Notice of Allowance received for Chinese Patent Application No. 201510290133.1, mailed on Jan. 9, 2019, 2 pages.

Notice of Allowance received for Chinese Patent Application No. 201510291012.9, mailed on Jan. 9, 2019, 2 pages.

Notice of Allowance received for Chinese Patent Application No. 201510479088.4, mailed on Jan. 21, 2021, 2 pages.

Notice of Allowance received for Chinese Patent Application No. 201510481525.6, mailed on May 27, 2019, 2 pages.

Notice of Allowance received for Chinese Patent Application No. 201510483268.X, mailed on Nov. 6, 2019, 2 pages.

Notice of Allowance received for Chinese Patent Application No. 201510483305.7, mailed on Jan. 8, 2019, 3 pages.

Notice of Allowance received for Chinese Patent Application No. 201510484514.3, mailed on Jun. 6, 2019, 2 pages.

Notice of Allowance received for Chinese Patent Application No. 201510549056.7, mailed on Jul. 2, 2019, 2 pages.

Notice of Allowance received for Chinese Patent Application No. 201510557356.X, mailed on Mar. 5, 2020, 2 pages.

Notice of Allowance received for Chinese Patent Application No. 201520365358.4, mailed on Nov. 20, 2015, 4 pages.

Notice of Allowance received for Chinese Patent Application No. 201520365843.1 issued on Feb. 15, 2016, 5 pages.

Notice of Allowance received for Chinese Patent Application No. 201520594249.X, mailed on Jul. 12, 2016, 4 pages.

Notice of Allowance received for Chinese Patent Application No. 201520669842.6, mailed on May 18, 2016, 4 pages.

Notice of Allowance received for Chinese Patent Application No. 201580028505.1, mailed on Sep. 19, 2019, 2 pages.

Notice of Allowance received for Chinese Patent Application No. 201580029054.3, mailed on Jul. 19, 2019, 2 pages.

Notice of Allowance received for Chinese Patent Application No. 201580029071.7, mailed on Aug. 19, 2021, 5 pages.

Notice of Allowance received for Chinese Patent Application No. 201580047640.0, mailed on Sep. 18, 2021, 2 pages.

Notice of Allowance received for Chinese Patent Application No. 201620830403.3, mailed on Sep. 8, 2017, 2 pages.

Notice of Allowance received for Chinese Patent Application No. 201680012936.3, mailed on Jul. 13, 2021, 4 pages.

Notice of Allowance received for Chinese Patent Application No. 201710267617.3, mailed on May 8, 2021, 2 pages.

Notice of Allowance received for Chinese Patent Application No. 201710439448.7, mailed on Jan. 26, 2021, 2 pages.

Notice of Allowance received for Chinese Patent Application No. 201780034203.4, mailed on Jan. 17, 2022, 2 pages.

Notice of Allowance received for Chinese Patent Application No. 202111612841.4, mailed on Jan. 5, 2023, 3 pages.

Notice of Allowance received for Danish Patent Application No. PA201570495, mailed on Feb. 22, 2017, 1 page.

Notice of Allowance received for Danish Patent Application No. PA201570496, mailed on Apr. 18, 2016, 2 pages.

Notice of Allowance received for Danish Patent Application No. PA201570550, mailed on Mar. 20, 2017, 2 pages.

Notice of Allowance received for Danish Patent Application No. PA201570563, mailed on May 24, 2016, 2 pages.

Notice of Allowance received for Danish Patent Application No. PA201570667, mailed on Nov. 11, 2016, 2 pages.

Notice of Allowance received for Japanese Patent Application No. 2016-569669, mailed on Mar. 19, 2018, 4 pages.

Notice of Allowance received for Japanese Patent Application No. 2017-505450, mailed on Mar. 9, 2018, 10 pages.

Notice of Allowance received for Japanese Patent Application No. 2017-505842, mailed on Mar. 16, 2020, 4 pages.

Notice of Allowance received for Japanese Patent Application No. 2017-505847, mailed on May 20, 2019, 4 pages.

Notice of Allowance received for Japanese Patent Application No. 2017-510297, mailed on May 7, 2018, 4 pages.

Notice of Allowance received for Japanese Patent Application No. 2017-514992, mailed on Feb. 15, 2019, 4 pages.

Notice of Allowance received for Japanese Patent application No. 2017-514993, mailed on Jan. 12, 2018, 4 pages.

Notice of Allowance received for Japanese Patent Application No. 2018-018497, mailed on Jun. 21, 2019, 4 pages.

Notice of Allowance received for Japanese Patent Application No. 2018-072632, mailed on Dec. 7, 2018, 4 pages.

Notice of Allowance received for Japanese Patent Application No. 2018-074971, mailed on Apr. 23, 2019, 4 pages.

Notice of Allowance received for Japanese Patent Application No. 2018-080122, mailed on May 7, 2021, 28 pages.

Notice of Allowance received for Japanese Patent Application No. 2018-107114, mailed on Mar. 22, 2019, 4 pages.

Notice of Allowance received for Japanese Patent Application No. 2019-000698, mailed on Feb. 8, 2021, 4 pages.

Notice of Allowance received for Japanese Patent Application No. 2019-050138, mailed on Jun. 15, 2020, 5 pages.

Notice of Allowance received for Japanese Patent Application No. 2019-096219, mailed on Jun. 26, 2020, 4 pages.

Notice of Allowance received for Japanese Patent Application No. 2020-118723, mailed on Oct. 16, 2020, 4 pages.

Notice of Allowance received for Japanese Patent Application No. 2020-124605, mailed on Dec. 5, 2022, 4 pages.

Notice of Allowance received for Japanese Patent Application No. 2020-187397, mailed on Sep. 10, 2021, 4 pages.

Notice of Allowance received for Japanese Patent Application No. 2021-037591, mailed on Nov. 18, 2022, 4 pages.

Notice of Allowance received for Japanese Patent Application No. 2021-563716, mailed on Mar. 14, 2022, 4 pages.

Notice of Allowance received for Japanese Patent Application No. 2021-571464, mailed on May 30, 2022, 4 pages.

Notice of Allowance received for Japanese Patent Application No. 2022-079682, mailed on Jul. 15, 2022, 4 pages.

Notice of Allowance received for Japanese Patent Application No. 2022-102840, mailed on Aug. 19, 2022, 4 pages.

Notice of Allowance received for Korean Patent Application No. 10-2016-7032902, mailed on Sep. 7, 2018, 3 pages.

Notice of Allowance received for Korean Patent Application No. 10-2017-7005628, mailed on Jun. 18, 2018, 5 pages.

(56) References Cited

OTHER PUBLICATIONS

Notice of Allowance received for Korean Patent Application No. 10-2017-7005939, mailed on Mar. 30, 2018, 5 pages.
Notice of Allowance received for Korean Patent Application No. 10-2018-7018904, mailed on Jun. 26, 2020, 4 pages.
Notice of Allowance received for Korean Patent Application No. 10-2018-7027006, mailed on May 23, 2019, 4 pages.
Notice of Allowance received for Korean Patent Application No. 10-2018-7035747, mailed on Dec. 9, 2020, 5 pages.
Notice of Allowance received for Korean Patent Application No. 10-2019-7024901, mailed on May 12, 2020, 5 pages.
Notice of Allowance received for Korean Patent Application No. 10-2020-7026036, mailed on Jul. 26, 2021, 4 pages.
Notice of Allowance received for Korean Patent Application No. 10-2021-7034748, mailed on Jan. 27, 2022, 6 pages.
Notice of Allowance received for Korean Patent Application No. 10-2021-7035472, mailed on Nov. 23, 2021, 4 pages.
Notice of Allowance received for Korean Patent Application No. 10-2021-7039234, mailed on Dec. 20, 2021, 4 pages.
Notice of Allowance received for Korean Patent Application No. 10-2022-7008567, mailed on Jul. 4, 2022, 9 pages.
Notice of Allowance received for Korean Patent Application No. 10-2022-7014529, mailed on Dec. 13, 2022, 8 pages.
Notice of Allowance received for Netherland Patent Application No. 2019753, mailed on Jul. 6, 2018, 6 pages.
Notice of Allowance received for Taiwanese Patent Application No. 104107332, mailed on Jun. 21, 2019, 5 pages.
Notice of Allowance received for Taiwanese Patent Application No. 104108223, mailed on Jan. 10, 2017, 3 pages.
Notice of Allowance received for Taiwanese Patent Application No. 104123593, mailed on Oct. 1, 2018, 4 pages.
Notice of Allowance received for Taiwanese Patent Application No. 104124962, mailed on Jul. 27, 2017, 3 pages.
Notice of Allowance received for Taiwanese Patent Application No. 104124963, mailed on Sep. 28, 2017, 5 pages.
Notice of Allowance received for Taiwanese Patent Application No. 104124995, mailed on Jul. 27, 2017, 3 pages.
Notice of Allowance received for Taiwanese Patent Application No. 104124997, mailed on Jun. 16, 2017, 5 pages.
Notice of Allowance received for Taiwanese Patent Application No. 104124998, mailed on Mar. 31, 2017, 3 pages.
Notice of Allowance received for Taiwanese Patent Application No. 104128519, mailed on Nov. 20, 2017, 5 pages.
Notice of Allowance received for Taiwanese Patent Application No. 104128684, mailed on Feb. 23, 2017, 3 pages.
Notice of Allowance received for Taiwanese Patent Application No. 104128704, mailed on Feb. 21, 2018, 5 pages.
Notice of Allowance received for U.S. Appl. No. 14/503,376, mailed on Jul. 29, 2015, 13 pages.
Notice of Allowance received for U.S. Appl. No. 14/503,376, mailed on Sep. 2, 2015, 2 pages.
Notice of Allowance received for U.S. Appl. No. 14/503,376, mailed on Sep. 24, 2015, 5 pages.
Notice of Allowance received for U.S. Appl. No. 14/503,386, mailed on Jul. 30, 2015, 12 pages.
Notice of Allowance received for U.S. Appl. No. 14/503,386, mailed on Sep. 24, 2015, 5 pages.
Notice of Allowance received for U.S. Appl. No. 14/805,403, mailed on Jul. 11, 2018, 15 pages.
Notice of Allowance received for U.S. Appl. No. 14/815,879, mailed on Jun. 26, 2017, 8 pages.
Notice of Allowance received for U.S. Appl. No. 14/815,890, mailed on Feb. 12, 2021, 8 pages.
Notice of Allowance received for U.S. Appl. No. 14/815,898, mailed on Dec. 5, 2016, 3 pages.
Notice of Allowance received for U.S. Appl. No. 14/815,898, mailed on Oct. 24, 2016, 14 pages.
Notice of Allowance received for U.S. Appl. No. 14/815,907, mailed on Jul. 28, 2016, 9 pages.
Notice of Allowance received for U.S. Appl. No. 14/815,907, mailed on Nov. 30, 2016, 2 pages.
Notice of Allowance received for U.S. Appl. No. 14/815,909, mailed on Jun. 9, 2016, 3 pages.
Notice of Allowance received for U.S. Appl. No. 14/815,909, mailed on May 3, 2016, 12 pages.
Notice of Allowance received for U.S. Appl. No. 14/815,909, mailed on May 20, 2016, 2 pages.
Notice of Allowance received for U.S. Appl. No. 14/815,909, mailed on Sep. 6, 2016, 2 pages.
Notice of Allowance received for U.S. Appl. No. 14/817,572, mailed on Nov. 30, 2017, 26 pages.
Notice of Allowance received for U.S. Appl. No. 14/822,769, mailed on Nov. 29, 2018, 12 pages.
Notice of Allowance received for U.S. Appl. No. 14/833,014, mailed on Nov. 20, 2019, 5 pages.
Notice of Allowance received for U.S. Appl. No. 14/838,235, mailed on Dec. 29, 2016, 4 pages.
Notice of Allowance received for U.S. Appl. No. 14/838,235, mailed on Oct. 4, 2016, 7 pages.
Notice of Allowance received for U.S. Appl. No. 14/841,402, mailed on Apr. 26, 2018, 16 pages.
Notice of Allowance received for U.S. Appl. No. 14/841,608, mailed on Nov. 14, 2017, 5 pages.
Notice of Allowance received for U.S. Appl. No. 14/841,614, mailed on Oct. 24, 2018, 10 pages.
Notice of Allowance received for U.S. Appl. No. 14/841,623, mailed on Feb. 23, 2018, 8 pages.
Notice of Allowance received for U.S. Appl. No. 14/928,865, mailed on Apr. 3, 2019, 7 pages.
Notice of Allowance received for U.S. Appl. No. 14/928,865, mailed on Jul. 22, 2019, 7 pages.
Notice of Allowance received for U.S. Appl. No. 15/142,661, mailed on Feb. 15, 2018, 9 pages.
Notice of Allowance received for U.S. Appl. No. 15/142,661, mailed on Oct. 4, 2017, 22 pages.
Notice of Allowance received for U.S. Appl. No. 15/352,215, mailed on Nov. 27, 2019, 20 pages.
Notice of Allowance received for U.S. Appl. No. 15/355,956, mailed on Nov. 22, 2019, 29 pages.
Notice of Allowance received for U.S. Appl. No. 15/366,763, mailed on Oct. 8, 2019, 10 pages.
Notice of Allowance received for U.S. Appl. No. 15/366,890, mailed on Nov. 14, 2019, 9 pages.
Notice of Allowance received for U.S. Appl. No. 15/425,273, mailed on Mar. 7, 2019, 8 pages.
Notice of Allowance received for U.S. Appl. No. 15/431,435, mailed on Jan. 23, 2018, 8 pages.
Notice of Allowance received for U.S. Appl. No. 15/488,093, mailed on Apr. 22, 2020, 8 pages.
Notice of Allowance received for U.S. Appl. No. 15/616,480, mailed on Jan. 3, 2019, 8 pages.
Notice of Allowance received for U.S. Appl. No. 15/798,257, mailed on May 22, 2019, 14 pages.
Notice of Allowance received for U.S. Appl. No. 15/902,401, mailed on Dec. 4, 2019, 8 pages.
Notice of Allowance received for U.S. Appl. No. 16/103,699, mailed on Apr. 11, 2019, 8 pages.
Notice of Allowance received for U.S. Appl. No. 16/147,523, mailed on Aug. 4, 2022, 9 pages.
Notice of Allowance received for U.S. Appl. No. 16/147,523, mailed on Nov. 28, 2022, 8 pages.
Notice of Allowance received for U.S. Appl. No. 16/147,523, mailed on Oct. 4, 2022, 8 pages.
Notice of Allowance received for U.S. Appl. No. 16/259,954, mailed on May 7, 2020, 9 pages.
Notice of Allowance received for U.S. Appl. No. 16/265,938, mailed on Oct. 15, 2020, 8 pages.
Notice of Allowance received for U.S. Appl. No. 16/377,892, mailed on May 24, 2021, 9 pages.
Notice of Allowance received for U.S. Appl. No. 16/377,892, mailed on Sep. 9, 2021, 9 pages.

(56) References Cited

OTHER PUBLICATIONS

Notice of Allowance received for U.S. Appl. No. 16/378,136, mailed on Jun. 3, 2021, 7 pages.
Notice of Allowance received for U.S. Appl. No. 16/378,136, mailed on Sep. 22, 2021, 7 pages.
Notice of Allowance received for U.S. Appl. No. 16/434,747, mailed on Apr. 28, 2022, 8 pages.
Notice of Allowance received for U.S. Appl. No. 16/583,981, mailed on Mar. 26, 2021, 10 pages.
Notice of Allowance received for U.S. Appl. No. 16/583,989, mailed on Apr. 1, 2021, 5 pages.
Notice of Allowance received for U.S. Appl. No. 16/583,989, mailed on Dec. 24, 2020, 7 pages.
Notice of Allowance received for U.S. Appl. No. 16/583,994, mailed on Jun. 24, 2021, 10 pages.
Notice of Allowance received for U.S. Appl. No. 16/584,490, mailed on Aug. 27, 2020, 13 pages.
Notice of Allowance received for U.S. Appl. No. 16/584,490, mailed on Mar. 26, 2021, 13 pages.
Notice of Allowance received for U.S. Appl. No. 16/841,352, mailed on Oct. 27, 2020, 13 pages.
Notice of Allowance received for U.S. Appl. No. 16/888,775, mailed on Jan. 12, 2022, 5 pages.
Notice of Allowance received for U.S. Appl. No. 16/888,775, mailed on Jul. 26, 2021, 5 pages.
Notice of Allowance received for U.S. Appl. No. 16/888,775, mailed on Jun. 3, 2021, 11 pages.
Notice of Allowance received for U.S. Appl. No. 16/888,775, mailed on Oct. 19, 2022, 6 pages.
Notice of Allowance received for U.S. Appl. No. 16/922,675, mailed on Dec. 8, 2022, 9 pages.
Notice of Allowance received for U.S. Appl. No. 16/922,675, mailed on Feb. 10, 2022, 8 pages.
Notice of Allowance received for U.S. Appl. No. 16/922,675, mailed on Jan. 21, 2021, 7 pages.
Notice of Allowance received for U.S. Appl. No. 16/922,675, mailed on Sep. 27, 2021, 10 pages.
Notice of Allowance received for U.S. Appl. No. 16/936,164, mailed on Sep. 21, 2022, 9 pages.
Notice of Allowance received for U.S. Appl. No. 17/013,778, mailed on Feb. 23, 2023, 8 pages.
Notice of Allowance received for U.S. Appl. No. 17/103,436, mailed on Dec. 8, 2021, 12 pages.
Notice of Allowance received for U.S. Appl. No. 17/157,391, mailed on Dec. 17, 2021, 8 pages.
Notice of Allowance received for U.S. Appl. No. 17/516,537, mailed on Dec. 27, 2022, 7 pages.
Notice of Allowance received for U.S. Appl. No. 17/583,657, mailed on Nov. 16, 2022, 8 pages.
Nova, "Tour of the Solar System", Retrieved from: http://www.pbs.org/wgbh/nova/space/tour-solar-system.html, May 24, 2013, 14 pages.
Obara Yuuta, "iPhone Application Selection for Univesity Students", Shuwa System Co., Saito Kazukuni, vol. 1, May 16, 2013, 4 pages.
Octoba, "Just Install It—Utilizing Method for Android Application Business", ASCII Media Works Co. Takano Kiyoshi, vol. 1, Apr. 25, 2013, 6 pages.
Office Action received for Australian Patent Application No. 2015101019, issued on Oct. 14, 2015, 3 pages.
Office Action received for Australian Patent Application No. 2015100711, issued on Jul. 27, 2015, 7 pages.
Office Action received for Australian Patent Application No. 2015100711, mailed on Nov. 19, 2015, 6 pages.
Office Action received for Australian Patent Application No. 2015101019, issued on Apr. 7, 2016, 4 pages.
Office Action received for Australian Patent Application No. 2015101020, mailed on Oct. 26, 2015, 8 pages.
Office Action received for Australian Patent Application No. 2015101021, issued on Apr. 26, 2016, 4 pages.

Office Action received for Australian Patent Application No. 2015101021, issued on Oct. 28, 2015, 10 pages.
Office Action received for Australian Patent Application No. 2015101188, issued on Apr. 14, 2016, 3 pages.
Office Action received for Australian Patent Application No. 2015267259, mailed on Jun. 2, 2017, 2 pages.
Office Action received for Australian Patent Application No. 2015267260, mailed on Jun. 2, 2017, 2 pages.
Office Action received for Australian Patent Application No. 2015267671, mailed on Apr. 5, 2017, 2 pages.
Office Action received for Australian Patent Application No. 2015279544, mailed on Apr. 18, 2017, 4 pages.
Office Action received for Australian Patent Application No. 2015279544, mailed on Feb. 13, 2018, 5 pages.
Office Action received for Australian Patent Application No. 2015298710, mailed on Apr. 13, 2017, 3 pages.
Office Action received for Australian Patent Application No. 2015298710, mailed on Feb. 15, 2017, 2 pages.
Office Action received for Australian Patent Application No. 2015298710, mailed on Nov. 6, 2018, 4 pages.
Office Action received for Australian Patent Application No. 2015298710, mailed on Sep. 24, 2018, 4 pages.
Office Action received for Australian Patent Application No. 2016100411, mailed on Jun. 10, 2016, 3 pages.
Office Action received for Australian Patent Application No. 2016100476, mailed on Jun. 9, 2016, 4 pages.
Office Action received for Australian Patent Application No. 2016100765, issued on Aug. 5, 2016, 2 pages.
Office Action received for Australian Patent Application No. 2016100765, mailed on Dec. 16, 2016, 3 pages.
Office Action received for Australian Patent Application No. 2016102028, mailed on Feb. 13, 2017, 4 pages.
Office Action received for Australian Patent Application No. 2016102029, mailed on Feb. 22, 2017, 4 pages.
Office Action received for Australian Patent Application No. 2016231598, mailed on Apr. 7, 2017, 5 pages.
Office Action received for Australian Patent Application No. 2017100197, mailed on Apr. 28, 2017, 4 pages.
Office Action received for Australian Patent Application No. 2017100198, mailed on Apr. 20, 2017, 4 pages.
Office Action received for Australian Patent Application No. 2017100667, mailed on Aug. 3, 2017, 9 pages.
Office Action received for Australian Patent Application No. 2017100760, mailed on Aug. 10, 2017, 4 pages.
Office Action received for Australian Patent Application No. 2017100760, mailed on Jan. 30, 2018, 3 pages.
Office Action received for Australian Patent Application No. 2017277971, mailed on Aug. 12, 2020, 3 pages.
Office Action received for Australian Patent Application No. 2017277971, mailed on Jun. 3, 2020, 3 pages.
Office Action received for Australian Patent Application No. 2018100158, mailed on Apr. 23, 2018, 5 pages.
Office Action received for Australian Patent Application No. 2018101855, mailed on Feb. 22, 2019, 4 pages.
Office Action received for Australian Patent Application No. 2018201089, mailed on Jul. 23, 2020, 4 pages.
Office Action received for Australian Patent Application No. 2018201089, mailed on Oct. 11, 2019, 4 pages.
Office Action received for Australian Patent Application No. 2018202751, mailed on Apr. 2, 2019, 4 pages.
Office Action received for Australian Patent Application No. 2018203215, mailed on Mar. 29, 2019, 3 pages.
Office Action received for Australian Patent Application No. 2018204286, mailed on Apr. 17, 2019, 5 pages.
Office Action received for Australian Patent Application No. 2018204286, mailed on Nov. 12, 2019, 5 pages.
Office Action received for Australian Patent Application No. 2018204286, mailed on Sep. 5, 2019, 5 pages.
Office Action received for Australian Patent Application No. 2018204430, mailed on Aug. 15, 2018, 5 pages.
Office Action received for Australian Patent Application No. 2020201575, mailed on Dec. 22, 2020, 3 pages.

(56) References Cited

OTHER PUBLICATIONS

Office Action received for Australian Patent Application No. 2020203919, mailed on Dec. 23, 2020, 5 pages.
Office Action received for Australian Patent Application No. 2020203919, mailed on Jul. 19, 2021, 7 pages.
Office Action received for Australian Patent Application No. 2020203919, mailed on Mar. 30, 2021, 5 pages.
Office Action received for Australian Patent Application No. 2020203919, mailed on Oct. 19, 2020, 5 pages.
Office Action received for Australian Patent Application No. 2020250323, mailed on Dec. 14, 2021, 2 pages.
Office Action received for Australian Patent Application No. 2020282362, mailed on Nov. 25, 2021, 3 pages.
Office Action received for Australian Patent Application No. 2021202815, mailed on Apr. 11, 2022, 2 pages.
Office Action received for Australian Patent Application No. 2021203636, mailed on Mar. 23, 2022, 3 pages.
Office Action received for Australian Patent Application No. 2021277718, mailed on Dec. 5, 2022, 3 pages.
Office Action received for Australian Patent Application No. 2021277718, mailed on Jan. 23, 2023, 4 pages.
Office Action received for Australian Patent Application No. 2021277718, mailed on Oct. 17, 2022, 4 pages.
Office Action received for Australian Patent Application No. 2015101019, mailed on Feb. 12, 2016, 4 pages.
Office Action received for Australian Patent Application No. 2015101183, issued on Nov. 6, 2015, 4 pages.
Office Action received for Australian Patent Application No. 2015279545, mailed on Apr. 13, 2017, 3 pages.
Office Action received for Australian Patent Application No. 2015312369, mailed on Mar. 29, 2017, 3 pages.
Office Action received for Chinese Patent Application No. 201520595384.6, mailed on Mar. 25, 2016, 3 pages.
Office Action received for Chinese Patent Application No. 201510290133.1, mailed on Feb. 9, 2018, 10 pages.
Office Action received for Chinese Patent Application No. 201510291012.9, mailed on Feb. 8, 2018, 10 pages.
Office Action received for Chinese Patent Application No. 201510479088.4, mailed on Apr. 22, 2020, 7 pages.
Office Action received for Chinese Patent Application No. 201510479088.4, mailed on Mar. 12, 2018, 20 pages.
Office Action received for Chinese Patent Application No. 201510479088.4, mailed on May 7, 2019, 6 pages.
Office Action received for Chinese Patent Application No. 201510481525.6, mailed on Aug. 29, 2018, 10 pages.
Office Action received for Chinese Patent Application No. 201510481525.6, mailed on Nov. 29, 2017, 9 pages.
Office Action received for Chinese Patent Application No. 201510483268.X, mailed on Apr. 16, 2019, 6 pages.
Office Action received for Chinese Patent Application No. 201510483268.X, mailed on Dec. 1, 2017, 11 pages.
Office Action received for Chinese Patent Application No. 201510483268.X, mailed on Oct. 19, 2018, 10 pages.
Office action received for Chinese Patent Application No. 201510483305.7, mailed on Aug. 31, 2018, 10 pages.
Office action received for Chinese Patent Application No. 201510483305.7, mailed on Dec. 1, 2017, 13 pages.
Office Action received for Chinese Patent Application No. 201510484514.3, mailed on Apr. 4, 2018, 12 pages.
Office Action received for Chinese Patent Application No. 201510484514.3, mailed on Dec. 24, 2018, 13 pages.
Office Action received for Chinese Patent Application No. 201510549056.7, mailed on Aug. 7, 2018, 7 pages.
Office Action received for Chinese Patent Application No. 201510549056.7, mailed on Mar. 15, 2019, 7 pages.
Office Action received for Chinese Patent Application No. 2015105490567, mailed on Nov. 24, 2017, 15 pages.
Office Action received for Chinese Patent Application No. 201510557356.X, mailed on Aug. 15, 2019, 12 pages.
Office Action received for Chinese Patent Application No. 201510557356.X, mailed on Dec. 29, 2017, 11 pages.
Office Action received for Chinese Patent Application No. 201510557356.X, mailed on Nov. 23, 2018, 12 pages.
Office Action received for Chinese Patent Application No. 201520365358.4, mailed on Aug. 11, 2015, 4 pages.
Office Action received for Chinese Patent Application No. 201520365843.1, mailed on Aug. 25, 2015, 4 pages.
Office Action received for Chinese Patent Application No. 201520365843.1, mailed on Nov. 16, 2015, 3 pages.
Office Action received for Chinese Patent Application No. 201520594249.X, mailed on Mar. 25, 2016, 3 pages.
Office Action received for Chinese Patent Application No. 201520595384.6, mailed on Dec. 30, 2016, 2 pages.
Office Action received for Chinese Patent Application No. 201520595384.6, mailed on Jul. 22, 2016, 3 pages.
Office Action received for Chinese Patent Application No. 201520595385.0, mailed on Dec. 30, 2016, 2 pages.
Office Action received for Chinese Patent Application No. 201520595385.0, mailed on Jul. 22, 2016, 3 pages.
Office Action received for Chinese Patent Application No. 201520595385.0, mailed on Mar. 25, 2016, 3 pages.
Office Action received for Chinese Patent Application No. 201520595408.8, mailed on Dec. 9, 2015, 4 pages.
Office Action received for Chinese Patent Application No. 201520595408.8, mailed on Dec. 30, 2016, 2 pages.
Office Action received for Chinese Patent Application No. 201520595408.8, mailed on Jul. 25, 2016, 3 pages.
Office Action received for Chinese Patent Application No. 201520595408.8, mailed on Mar. 25, 2016, 3 pages.
Office Action received for Chinese Patent Application No. 201520595538.1, mailed on Dec. 30, 2016, 2 pages.
Office Action received for Chinese Patent Application No. 201520595538.1, mailed on Jul. 22, 2016, 3 pages.
Office Action received for Chinese Patent Application No. 201520595538.1, mailed on Mar. 25, 2016, 3 pages.
Office Action received for Chinese Patent Application No. 201520669842.6, mailed on Dec. 4, 2015, 7 pages.
Office Action received for Chinese Patent Application No. 201520679198.0, mailed on Jun. 24, 2016, 5 pages.
Office Action received for Chinese Patent Application No. 2015206791980, mailed on Mar. 7, 2016, 6 pages.
Office Action received for Chinese Patent Application No. 2015206791980, mailed on Nov. 18, 2015, 4 pages.
Office Action received for Chinese Patent Application No. 201580028505.1, mailed on Jan. 16, 2019, 15 pages.
Office Action received for Chinese Patent Application No. 201580028505.1, mailed on Jun. 20, 2019, 7 pages.
Office Action received for Chinese Patent Application No. 201580029054.3, mailed on Dec. 5, 2018, 12 pages.
Office Action received for Chinese Patent Application No. 201580029071.7, mailed on Apr. 2, 2021, 19 pages.
Office Action received for Chinese Patent Application No. 201580029071.7, mailed on Apr. 9, 2020, 33 pages.
Office Action received for Chinese Patent Application No. 201580029071.7, mailed on Jul. 2, 2019, 29 pages.
Office Action received for Chinese Patent Application No. 201580029071.7, mailed on Oct. 29, 2020, 20 pages.
Office Action received for Chinese Patent Application No. 201580046788.2, mailed on Apr. 15, 2019, 13 pages.
Office Action received for Chinese Patent Application No. 201580046788.2, mailed on Feb. 25, 2020, 14 pages.
Office Action received for Chinese Patent Application No. 201580046788.2, mailed on Mar. 25, 2021, 9 pages.
Office Action received for Chinese Patent Application No. 201580046788.2, mailed on Sep. 22, 2020, 10 pages.
Office Action received for Chinese Patent Application No. 201580047640.0, mailed on Aug. 5, 2019, 18 pages.
Office Action received for Chinese Patent Application No. 201580047640.0, mailed on Jul. 6, 2021, 10 pages.
Office Action received for Chinese Patent Application No. 201580047640.0, mailed on Mar. 3, 2021, 11 pages.

(56)　　　　　References Cited

OTHER PUBLICATIONS

Office Action received for Chinese Patent Application No. 201580047640.0, mailed on Oct. 16, 2020, 20 pages.

Office Action received for Chinese Patent Application No. 201620393549.6, mailed on Aug. 18, 2016, 2 pages.

Office Action received for Chinese Patent Application No. 201620393549.6, mailed on Jan. 13, 2017, 2 pages.

Office Action received for Chinese Patent Application No. 201620393748.7, mailed on Aug. 18, 2016, 2 pages.

Office Action received for Chinese Patent Application No. 201620393748.7, mailed on Jan. 13, 2017, 2 pages.

Office Action received for Chinese Patent Application No. 201620830403.3, mailed on Jun. 7, 2017, 2 pages.

Office Action received for Chinese Patent Application No. 201620830403.3, mailed on Mar. 7, 2017, 3 pages.

Office Action received for Chinese Patent Application No. 201621208900.6, mailed on Apr. 26, 2017, 2 pages.

Office Action received for Chinese Patent Application No. 201680012936.3, mailed on Aug. 18, 2020, 15 pages.

Office Action received for Chinese Patent Application No. 201680012936.3, mailed on Dec. 1, 2020, 21 pages.

Office Action received for Chinese Patent Application No. 201680012936.3, mailed on Mar. 3, 2021, 12 pages.

Office Action received for Chinese Patent Application No. 201680012936.3, mailed on Mar. 20, 2020, 23 pages.

Office Action received for Chinese Patent Application No. 201710267617.3, mailed on Apr. 17, 2020, 23 pages.

Office Action received for Chinese Patent Application No. 201710267617.3, mailed on Jul. 10, 2019, 18 pages.

Office Action received for Chinese Patent Application No. 201710267617.3, mailed on Nov. 2, 2020, 6 pages.

Office Action received for Chinese Patent Application No. 201710439448.7, mailed on Mar. 27, 2020, 13 pages.

Office Action received for Chinese Patent Application No. 201710439448.7, mailed on Oct. 10, 2020, 19 pages.

Office Action received for Chinese Patent Application No. 201780034203.4, mailed on Jul. 14, 2021, 12 pages.

Office Action received for Chinese Patent Application No. 201780034203.4, mailed on Sep. 24, 2021, 7 pages.

Office Action received for Chinese Patent Application No. 201810411708.4, mailed on Feb. 24, 2022, 10 pages.

Office Action received for Chinese Patent Application No. 201810411708.4, mailed on Feb. 26, 2021, 16 pages.

Office Action received for Chinese Patent Application No. 201810411708.4, mailed on Nov. 12, 2021, 12 pages.

Office Action received for Chinese Patent Application No. 201810654707.2 mailed on Apr. 2, 2022, 16 pages.

Office Action received for Chinese Patent Application No. 201810654707.2 mailed on Jan. 11, 2022, 11 pages.

Office Action received for Chinese Patent Application No. 201810654707.2, mailed on Jun. 22, 2022, 14 pages.

Office Action received for Chinese Patent Application No. 201810654707.2, mailed on Mar. 1, 2021, 23 pages.

Office Action received for Chinese Patent Application No. 201910875660.7, mailed on Dec. 26, 2022, 7 pages.

Office Action received for Chinese Patent Application No. 202080039642.6, mailed on Sep. 5, 2022, 12 pages.

Office Action received for Chinese Patent Application No. 202111612841.4, mailed on Jul. 22, 2022, 13 pages.

Office Action received for Chinese Patent Application No. 201520594249.X, mailed on Dec. 9, 2015, 4 pages.

Office Action received for Chinese Patent Application No. 201520595384.6, mailed on Dec. 9, 2015, 4 pages.

Office Action received for Chinese Patent Application No. 201520595385.0, mailed on Dec. 9, 2015, 4 pages.

Office Action received for Chinese Patent Application No. 201520595538.1, mailed on Dec. 9, 2015, 4 pages.

Office Action received for Danish Patent Application No. PA201570495, mailed on Dec. 9, 2016, 2 pages.

Office action received for Danish Patent Application No. PA201570495, mailed on May 4, 2016, 8 pages.

Office Action received for Danish Patent Application No. PA201570495, mailed on Oct. 29, 2015, 7 pages.

Office Action received for Danish Patent Application No. PA201570497, mailed on Feb. 21, 2017, 3 pages.

Office Action received for Danish Patent Application No. PA201570497, mailed on May 17, 2016, 6 pages.

Office Action received for Danish Patent Application No. PA201570497, mailed on Nov. 15, 2016, 2 pages.

Office Action received for Danish Patent Application No. PA201570497, mailed on Oct. 24, 2017, 2 pages.

Office Action received for Danish Patent Application No. PA201570498, mailed on Feb. 6, 2017, 2 pages.

Office Action received for Danish Patent Application No. PA201570498, mailed on Jun. 2, 2016, 8 pages.

Office Action received for Danish Patent Application No. PA201570498, mailed on Oct. 26, 2017, 5 pages.

Office Action received for Danish Patent Application No. PA201570498, mailed on Oct. 30, 2015, 7 pages.

Office Action received for Danish Patent Application No. PA201570499, mailed on Feb. 14, 2017, 2 pages.

Office Action received for Danish Patent Application No. PA201570499, mailed on Jun. 16, 2016, 8 pages.

Office Action received for Danish Patent Application No. PA201570499, mailed on Jun. 19, 2018, 4 pages.

Office Action received for Danish Patent Application No. PA201570499, mailed on Nov. 1, 2017, 6 pages.

Office Action received for Danish Patent Application No. PA201570499, mailed on Nov. 3, 2015, 7 pages.

Office Action received for Danish Patent Application No. PA201570550, mailed on Dec. 7, 2015, 6 pages.

Office Action received for Danish Patent Application No. PA201570550, mailed on Jan. 19, 2016, 2 pages.

Office Action received for Danish Patent Application No. PA201570550, mailed on Oct. 19, 2016, 3 pages.

Office Action received for Danish Patent Application No. PA201570667, mailed on Apr. 1, 2016, 7 pages.

Office Action received for Danish Patent Application No. PA201570667, mailed on Sep. 2, 2016, 2 pages.

Office Action received for Danish Patent Application No. PA201670319, mailed on Aug. 2, 2016, 6 pages.

Office Action received for Danish Patent Application No. PA201670319, mailed on Jun. 21, 2017, 6 pages.

Office Action received for Danish Patent Application No. PA201670319, mailed on Nov. 24, 2016, 7 pages.

Office Action received for Danish Patent Application No. PA201670320, mailed on Aug. 4, 2016, 9 pages.

Office Action received for Danish Patent Application No. PA201670320, mailed on Dec. 5, 2016, 4 pages.

Office Action received for Danish Patent Application No. PA201670320, mailed on Jan. 18, 2018, 2 pages.

Office Action received for Danish Patent Application No. PA201670320, mailed on Jul. 3, 2017, 4 pages.

Office Action received for Danish Patent Application No. PA201770089, mailed on Apr. 25, 2017, 10 pages.

Office Action received for Danish Patent Application No. PA201770125, mailed on Jan. 26, 2018, 5 pages.

Office Action received for Danish Patent Application No. PA201770125, mailed on Jul. 20, 2018, 2 pages.

Office Action received for Danish Patent Application No. PA201770126, mailed on Oct. 18, 2017, 3 pages.

Office Action received for Danish Patent Application No. PA201770423, mailed on Jun. 12, 2018, 7 pages.

Office Action received for Danish Patent Application No. PA201770423, mailed on Mar. 29, 2019, 6 pages.

Office Action received for Danish Patent Application No. PA201970533, mailed on Apr. 20, 2021, 2 pages.

Office Action received for Danish Patent Application No. PA201970533, mailed on Jul. 17, 2020, 6 pages.

Office Action received for Danish Patent Application No. PA201570496, mailed on Oct. 29, 2015, 6 pages.

(56)     References Cited

OTHER PUBLICATIONS

Office Action received for Danish Patent Application No. PA201570497, mailed on Oct. 30, 2015, 6 pages.
Office Action received for European Patent Application No. 15729286.3, mailed on Feb. 7, 2018, 7 pages.
Office Action received for European Patent Application No. 15711969.4, mailed on Nov. 17, 2017, 9 pages.
Office Action received for European Patent Application No. 15728307.8, mailed on Feb. 8, 2018, 7 pages.
Office Action received for European Patent Application No. 15730924.6, mailed on Dec. 12, 2017, 8 pages.
Office Action received for European Patent Application No. 15730925.3, mailed on Apr. 12, 2018, 8 pages.
Office Action received for European Patent Application No. 15739109.5, mailed on Jan. 31, 2018, 7 pages.
Office Action received for European Patent Application No. 15739110.3, mailed on Jan. 31, 2018, 8 pages.
Office Action received for European Patent Application No. 15747595.5, mailed on Apr. 15, 2019, 4 pages.
Office Action received for European Patent Application No. 15747595.5, mailed on Jun. 27, 2018, 8 pages.
Office Action received for European Patent Application No. 15753796.0, mailed on Aug. 4, 2020, 9 pages.
Office Action received for European Patent Application No. 15753796.0, mailed on Jun. 2, 2022, 2 pages.
Office Action received for European Patent Application No. 15759981.2, mailed on Apr. 19, 2018, 6 pages.
Office Action received for European Patent Application No. 15759981.2, mailed on Aug. 6, 2018, 10 pages.
Office Action received for European Patent Application No. 15759981.2, mailed on May 16, 2018, 6 pages.
Office Action received for European Patent Application No. 15759998.6, mailed on Dec. 19, 2018, 6 pages.
Office Action received for European Patent Application No. 15759998.6, mailed on Jul. 16, 2018, 6 pages.
Office Action received for European Patent Application No. 15759998.6, mailed on May 29, 2019, 6 pages.
Office Action received for European Patent Application No. 15760008.1, mailed on Jul. 16, 2019, 9 pages.
Office Action received for European Patent Application No. 16190252.3, mailed on Feb. 19, 2018, 7 pages.
Office Action received for European Patent Application No. 16708014.2, mailed on Apr. 3, 2019, 7 pages.
Office Action received for European Patent Application No. 16708014.2, mailed on Mar. 4, 2021, 7 pages.
Office Action received for European Patent Application No. 17167629.9, mailed on Jan. 25, 2019, 7 pages.
Office Action received for European Patent Application No. 17810749.6, mailed on Aug. 20, 2019, 9 pages.
Office Action received for European Patent Application No. 18170262.2, mailed on Dec. 9, 2019, 3 pages.
Office Action received for European Patent Application No. 18170262.2, mailed on May 16, 2019, 6 pages.
Office Action received for European Patent Application No. 18170262.2, mailed on May 27, 2019, 6 pages.
Office Action received for European Patent Application No. 19203942.8, mailed on Oct. 29, 2021, 6 pages.
Office Action received for European Patent Application No. 20176616.9, mailed on Jun. 10, 2021, 4 pages.
Office Action received for European Patent Application No. 20720310.0, mailed on Oct. 4, 2022, 9 pages.
Office Action received for European Patent Application No. 21165295.3, mailed on Jul. 1, 2021, 10 pages.
Office Action received for European Patent Application No. 15730925.3, mailed on Feb. 27, 2019, 5 pages.
Office Action received for German Patent Application No. 112015003083.2, mailed on Mar. 9, 2018, 12 pages.
Office Action received for German Patent Application No. 212015000194.6, mailed on Mar. 16, 2017, 2 pages.

Office Action received for Japanese Patent Application No. 2017-505450, mailed on Jun. 20, 2017, 8 pages.
Office Action received for Japanese Patent Application No. 2017-505842, mailed on Feb. 22, 2019, 11 pages.
Office Action received for Japanese Patent Application No. 2017-505842, mailed on Sep. 9, 2019, 7 pages.
Office Action received for Japanese Patent Application No. 2017-505847, mailed on Feb. 12, 2019, 13 pages.
Office Action received for Japanese Patent Application No. 2017-510297, mailed on Dec. 4, 2017, 5 pages.
Office Action received for Japanese Patent Application No. 2017-510297, mailed on Jul. 10, 2017, 10 pages.
Office Action received for Japanese Patent Application No. 2017-510631, mailed on Mar. 2, 2018, 12 pages.
Office Action received for Japanese Patent Application No. 2017-514992, mailed on Apr. 6, 2018, 11 pages.
Office Action received for Japanese Patent Application No. 2018-018497, mailed on Dec. 10, 2018, 8 pages.
Office Action received for Japanese Patent Application No. 2018-072632, mailed on Jul. 9, 2018, 5 pages.
Office Action received for Japanese Patent Application No. 2018-074971, mailed on Jan. 28, 2019, 6 pages.
Office Action received for Japanese Patent Application No. 2018-080122, mailed on Aug. 9, 2019, 5 pages.
Office Action received for Japanese Patent Application No. 2018-080122, mailed on Jan. 28, 2019, 11 pages.
Office Action received for Japanese Patent Application No. 2018-080122, mailed on Nov. 27, 2020, 16 pages.
Office Action received for Japanese Patent Application No. 2018-107114, mailed on Oct. 9, 2018, 4 pages.
Office Action received for Japanese Patent Application No. 2019-000698, mailed on Mar. 9, 2020, 8 pages.
Office Action received for Japanese Patent Application No. 2019000698, mailed on Oct. 23, 2020, 4 pages.
Office Action received for Japanese Patent Application No. 2019-050138, mailed on Jan. 27, 2020, 9 pages.
Office Action received for Japanese Patent Application No. 2020-124605, mailed on Dec. 17, 2021, 2 pages.
Office Action received for Japanese Patent Application No. 2020-124605, mailed on May 13, 2022, 6 pages.
Office Action received for Japanese Patent Application No. 2020-124605, mailed on Sep. 3, 2021, 5 pages.
Office Action received for Japanese Patent Application No. 2020-187397, mailed on Mar. 12, 2021, 8 pages.
Office Action received for Japanese Patent Application No. 2021-037591, mailed on Jun. 6, 2022, 6 pages.
Office Action received for Japanese Patent Application No. 2021-166451, mailed on Jan. 5, 2023, 6 pages.
Office Action received for Korean Patent Application No. 10-2017-7005628, mailed on Jan. 30, 2018, 6 pages.
Office Action received for Korean Patent Application No. 10-2017-7005628, mailed on May 10, 2017, 12 pages.
Office Action received for Korean Patent Application No. 10-2017-7005939, mailed on Jun. 30, 2017, 6 pages.
Office Action received for Korean Patent Application No. 10-2018-7018904, mailed on Aug. 20, 2019, 8 pages.
Office Action received for Korean Patent Application No. 10-2018-7027006, mailed on Jan. 14, 2019, 6 pages.
Office Action received for Korean Patent Application No. 10-2018-7035747, mailed on Apr. 9, 2020, 11 pages.
Office Action received for Korean Patent Application No. 10-2018-7035747, mailed on Oct. 14, 2020, 6 pages.
Office Action received for Korean Patent Application No. 10-2019-7024901, mailed on Sep. 26, 2019, 6 pages.
Office Action received for Korean Patent Application No. 10-2020-7026036, mailed on Dec. 7, 2020, 8 pages.
Office Action received for Korean Patent Application No. 10-2022-7006175, mailed on May 27, 2022, 7 pages.
Office Action received for Korean Patent Application No. 10-2022-7008567, mailed on Mar. 28, 2022, 5 pages.
Office Action received for Netherland Patent Application No. 2015245, mailed on Jan. 24, 2017, 11 pages.

(56) References Cited

OTHER PUBLICATIONS

Office Action received for Netherland Patent Application No. 2019753, mailed on Apr. 12, 2018, 8 pages.
Office Action received for Netherlands Patent Application No. 2015239, mailed on Oct. 28, 2016, 13 pages.
Office Action received for Taiwanese Patent Application No. 104107332, mailed on Oct. 29, 2018, 12 pages.
Office Action received for Taiwanese Patent Application No. 104108223, mailed on Apr. 25, 2016, 10 pages.
Office Action received for Taiwanese Patent Application No. 104123593, mailed on May 24, 2016, 57 pages.
Office Action received for Taiwanese Patent Application No. 104123593, mailed on Sep. 13, 2016, 8 pages.
Office Action received for Taiwanese Patent Application No. 104124962, issued on Nov. 29, 2016, 6 pages.
Office Action received for Taiwanese Patent Application No. 104124963, mailed on Jan. 5, 2017, 11 pages.
Office Action received for Taiwanese Patent Application No. 104124995, issued on Dec. 1, 2016, 6 pages.
Office Action received for Taiwanese Patent Application No. 104124997, issued on Dec. 8, 2016, 12 pages.
Office Action received for Taiwanese Patent Application No. 104124998, mailed on Nov. 29, 2016, 6 pages.
Office Action received for Taiwanese Patent Application No. 104128519, mailed on Mar. 29, 2017, 16 pages.
Office Action received for Taiwanese Patent Application No. 104128684, mailed on Nov. 8, 2016, 24 pages.
Office Action received for Taiwanese Patent Application No. 104128704, mailed on Jul. 31, 2017, 7 pages.
Office Action received for Taiwanese Patent Application No. 104128704, mailed on Nov. 2, 2016, 12 pages.
Office Action received for Taiwanese Patent Application No. 104128705, mailed on Aug. 29, 2016, 18 pages.
Office Action received for Taiwanese Patent Application No. 104128705, mailed on Mar. 16, 2017, 3 pages.
Office Action received for Taiwanese Patent Application No. 104120843, mailed on Jan. 30, 2016, 5 pages.
Olson Parmy, "Delete by Default: Why More Snapchat-Like Messaging Is on Its Way", Forbes.com, Available Online at https://www.forbes.com/sites/parmyolson/2013/11/22/delete-by-default-why-more-snapchat-like-messaging-is-on-its-way, Nov. 22, 2013, 6 pages.
Omar Romero, "Sony Smartwatch 2 Custom Watchfaces Tutorial", retrieved From: https://www.youtube.com/watch?v=8odbxqwSQR8, May 1, 2014, 2 pages.
Partial Supplementary European Search Report received for European Patent Application No. 17810749.6, mailed on Apr. 25, 2019, 8 pages.
Patterson Ben, "iOS 7 tip: Alerts, banners, and badgesawhats the difference?", Available online at: https://web.archive.org/web/20140128072440/http://heresthethingblog.com/2014/01/22/ios-7-tip-whats-difference-alert/, Jan. 22, 2014, 5 pages.
Pentax K20D Operating Manual, http://www.ricoh-imaging.eu/en/operating-manuals-download.html, Pentax Corporation, 2008, pp. 173-174.
Phonebuff, "Hybrid Stopwatch & Timer Android App Review", Available Online at: https://www.youtube.com/watch?v=B43oCFPiWvY, Apr. 4, 2012, 7 pages.
Pre-Interview First Office Action received for U.S. Appl. No. 14/815,890, mailed on May 26, 2016, 4 pages.
Razykdreviews, "In Depth Review of Apple Watch Activity and Workout App", available at: https://www.youtube.com/watch?v=GkKI3qIK0ow, Category: X Claims: 1-5 Category: L Reason: Internet citation/video, May 11, 2015, 1 page.
Record of Oral Hearing received for U.S. Appl. No. 14/815,890, mailed on Nov. 20, 2020, 18 pages.
Rehman A, "Install Android 4.2 Gesture-Based Keyboard & Clock App On Jelly Bean 4.1 Or Higher", Excerpts From, Available online at: http://www.addictivetips.com/android/install-android-4-2-keyboard-clock-app-apk-on-jelly-bean-4-1-x/, Nov. 3, 2012, 4 pages.

Remote Phone Call, Available online at: https://web.archive.org/web/20140625104844/https://www.justremotephone.com/, Jun. 25, 2014, 22 pages.
Responding to a meeting invitation, Available online at: https://web.archive.org/web/20121128174157/https://www.zimbra.com/desktop7/help/en_US/Calendar/Responding_to_an_invitation.htm, Nov. 28, 2012, 1 page.
Restriction Requirement received for U.S. Appl. No. 14/815,890, mailed on Feb. 22, 2016, 5 pages, 5 pages.
Result of Consultation received for European Patent Application No. 15728307.8, mailed on Nov. 21, 2019, 7 pages.
Result of Consultation received for European Patent Application No. 15729286.3, mailed on Nov. 21, 2019, 6 pages.
Result of Consultation received for European Patent Application No. 15760008.1, mailed on Sep. 9, 2021, 7 pages.
Result of Consultation received for European Patent Application No. 17167629.9, mailed on Nov. 10, 2020, 3 pages.
Result of Consultation received for European Patent Application No. 17810749.6, mailed on Dec. 15, 2020, 3 pages.
Result of Consultation received for European Patent Application No. 17810749.6, mailed on Jan. 18, 2021, 3 pages.
Result of Consultation received for European Patent Application No. 17810749.6, mailed on Jan. 21, 2021, 18 pages.
Result of Consultation received for European Patent Application No. 18170262.2, mailed on Jan. 18, 2021, 3 pages.
Result of Consultation received for European Patent Application No. 20185974.1, mailed on Apr. 4, 2022, 4 pages.
Result of Consultation received for European Patent Application No. 15730925.3, mailed on Nov. 24, 2020, 4 pages.
Rizknows, "Garmin Connect Mobile App—Review #2", https://www.youtube.com/watch?v=7my3wMpeRbE, Category: X Claims: 1-5 Category: L Reason: Internet citation/video, Oct. 22, 2015, 1 page.
Rowinski Dan, "Why the All-In-One Smartwatch Isn't Happening Any Time Soon", Online available at: https://web.archive.org/web/20140123074218if_/https://readwrite.com/2014/01/20/smartwatch-wearable-fitness-remote-control/, Jan. 20, 2014, 6 pages.
S. Rohan, "WeChat Review—Communication Application with Screenshots", Absolute Blogger, Available at: http://www.absoluteblogger.com/2012/10/wechat-review-communication-application.html, Oct. 19, 2010, 5 pages.
Samsung User Manual, SM-R380_UM_EU_Eng_D13_140411.pdf, Apr. 2014, 78 pages.
Samsung, "Control an individual smart device on your watch", Online Available at: https://www.samsung.com/us/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung—User manual—Galaxy Watch", Online available at: https://content.abt.com/documents/90234/SM-R810NZDAXAR-use.pdf, Aug. 24, 2018, 102 pages.
Samsung, "Samsung Gear 2 User manual", Online Available: https://data2.manualslib.com/pdf3/76/7550/754923-samsung/gear_2.pdf?7eb313a9f65b1566bcf9ff58661c6b3a&take=binary>, XP055464984, retrieved on Apr. 5, 2018, Apr. 9, 2014, pp. 1-97.
Samsung, "SM-G900F User Manual", English (EU). Rev.1.0, Mar. 2014, 249 pages.
Search Report and Opinion received for Danish Patent Application No. PA201770423, mailed on Oct. 4, 2017, 10 pages.
Search Report and Opinion received for Danish Patent Application No. PA201970533, mailed on Oct. 25, 2019, 9 pages.
Search Report and Opinion received for Netherland Patent Application No. 2015232, mailed on Jan. 25, 2017, 9 pages.
Search Report and Opinion received for Netherlands Patent Application No. 2015242, issued on Jul. 4, 2017, 20 pages.
Search Report and Opinion received for Netherlands Patent Application No. 2015354, completed on Jun. 22, 2017, 24 pages.
Search Report and Opinion received for Netherlands Patent Application No. 2015364, issued on Jul. 4, 2017, 12 pages.
Search Report and Opinion received for Netherlands Patent Application No. 2018531, issued on Jul. 27, 2017, 14 pages.

(56)　　　　　　References Cited

OTHER PUBLICATIONS

Search Report and Opinion received for Netherlands Patent Application No. 2019878, mailed on Apr. 6, 2018, 24 pages.
Search Report received for Danish Patent Application No. PA201770125, mailed on May 5, 2017, 10 pages.
Search Report received for Danish Patent Application No. PA201770126, mailed on Apr. 26, 2017, 8 pages.
Search Report received for Netherlands Patent Application No. 2015236, mailed on Apr. 21, 2021, 19 pages.
Shankland Stephen, "Chrome OS Gets 'OK Google' Voice Search Control", available online at: http://www.cnet.com/news/chrome-os-gets-ok-google-voice-search-control/, May 21, 2014, 4 pages.
Shiota Shinji, "Windows 7 Dojo", Weekly ASCII, Ascii Mediaworks Inc., vol. 798, Aug. 31, 2010, 3 pages.
Siewiorek et al., "SenSay: A context-aware mobile phone", Retrieved from: http://www.cs.cmu.edu/aura/docdir/sensay_iswc.pdf sensay_iswc.pdf, 2003, 10 pages.
Smart Home App—What is the Widget, Online Available at: https://support.vivint.com/s/article/Vivint-Smart-Home-App-What-is-the-Widget, Jan. 26, 2019, 4 pages.
Smartwatch, "App Earth Space HD Live Wallpaper APK for Smart Watch", Version 1.7, Android version 2.2, Aug. 27, 2013, 1 page.
Softonic, "Beginners Guide to WhatsApp", Retrieved from the Internet: https://www.youtube.com/watch?v=1YN36kYDgrk, Apr. 29, 2013, 2 pages.
Solar Walk Free, Vito Technology, Jun. 19, 2014, 9 pages.
Sony Smartwatch 2 update—new feartures and watchface creator!!! New!!!, Online available at: https://www.youtube.com/watch?v=k3jjBv7QZSk, May 8, 2014, 3 pages.
Sony, "Live View™ micro display", Extended User Guide, Aug. 2010, 27 pages.
Sony, "Sony Smartwatch 3 SWR50", User Guide, Jul. 2014, 31 pages.
Sony, "Sony SmartWatch", User Guide, Dec. 2011, 18 pages.
Stateoftech, "Samsung Galaxy Gear Tips—Installing and Customizing Clock Faces", Online available at: https://www.youtube.com/watch?v=p2GzpL3xlUo, Dec. 12, 2013, 3 pages.
Stateoftech, "Samsung Galaxy Gear Tips—Change the Clock Face", Retrieved from: https://www.youtube.com/watch?v=GOom7AZUAjY, Dec. 11, 2013, 2 pages.
Stroud Forrest, "Screen Lock Meaning & Definition", Online Available at: https://www.webopedia.com/definitions/screen-lock, Jan. 30, 2014, 3 pages.
Summons to Attend Oral Proceedings received for European Patent Application No. 15711969.4, mailed on Oct. 22, 2018, 12 pages.
Summons to Attend Oral Proceedings received for European Patent Application No. 15728307.8, mailed on Jun. 28, 2019, 10 pages.
Summons to Attend Oral Proceedings received for European Patent Application No. 15728307.8, mailed on Mar. 7, 2022, 4 pages.
Summons to Attend Oral Proceedings received for European Patent Application No. 15729286.3, mailed on Jun. 27, 2019, 9 pages.
Summons to Attend Oral Proceedings received for European Patent Application No. 15729286.3, mailed on Mar. 10, 2022, 3 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 15739109.5, mailed on Aug. 23, 2018, 9 pages.
Summons to Attend Oral Proceedings received for European Patent Application No. 15739109.5, mailed on Oct. 4, 2018, 3 pages.
Summons to Attend Oral Proceedings received for European Patent Application No. 15739110.3, mailed on Aug. 23, 2018, 10 pages.
Summons to Attend Oral Proceedings received for European Patent Application No. 15739110.3, mailed on Oct. 2, 2018, 3 pages.
Summons to Attend Oral Proceedings received for European Patent Application No. 15760008.1, mailed on Feb. 5, 2021, 11 pages.
Summons to Attend Oral Proceedings received for European Patent Application No. 16190252.3, mailed on Jan. 8, 2019, 3 pages.

Summons to Attend Oral Proceedings received for European Patent Application No. 16190252.3, mailed on Oct. 30, 2018, 13 pages.
Summons to Attend Oral Proceedings received for European Patent Application No. 16708014.2, mailed on Oct. 10, 2022, 5 pages.
Summons to Attend Oral Proceedings received for European Patent Application No. 17167629.9, mailed on Jun. 3, 2020, 11 pages.
Summons to Attend Oral Proceedings received for European Patent Application No. 17810749.6, mailed on Aug. 12, 2020, 11 pages.
Summons to Attend Oral Proceedings received for European Patent Application No. 18170262.2, mailed on Dec. 15, 2020, 5 pages.
Summons to Attend Oral Proceedings received for European Patent Application No. 20176616.9, mailed on Dec. 17, 2021, 7 pages.
Sun Set, "Sun Set solar image clock", Available at: https://web.archive.orgjweb/2014071900 5410/http://www.sunsetclock.com/, 2013, 5 pages.
Supplemental Notice of Allowance received for U.S. Appl. No. 14/805,403, mailed on Oct. 4, 2018, 3 pages.
Supplemental Notice of Allowance received for U.S. Appl. No. 14/815,890, mailed on Mar. 10, 2021, 2 pages.
Supplemental Notice of Allowance received for U.S. Appl. No. 14/833,014, mailed on Mar. 12, 2020, 2 pages.
Supplemental Notice of Allowance received for U.S. Appl. No. 14/841,608, mailed on Jan. 25, 2018, 2 pages.
Supplemental Notice of Allowance received for U.S. Appl. No. 15/616,480, mailed on Mar. 28, 2019, 2 pages.
Supplemental Notice of Allowance received for U.S. Appl. No. 15/902,401, mailed on Feb. 3, 2020, 2 pages.
Supplemental Notice of Allowance received for U.S. Appl. No. 15/902,401, mailed on Feb. 13, 2020, 2 pages.
Supplemental Notice of Allowance received for U.S. Appl. No. 16/147,523, mailed on Aug. 23, 2022, 2 pages.
Supplemental Notice of Allowance received for U.S. Appl. No. 16/584,490, mailed on Apr. 13, 2021, 2 pages.
Supplementary European Search Report received for European Patent Application No. 17810749.6, mailed on Aug. 6, 2019, 6 pages.
Tablet Talk, "Tablet Talk App: Frequently Asked Questions—Tablet Talk.", available at https://web.archive.org/web/20140625102903/http://1www.tablettal app.com/faq, Jun. 25, 2014, pp. 1-6.
Talkandroid, "Android Wear walkthrough", Available online at: https://www.youtube.com/watch?v=4xntpZac4sw, Jun. 30, 2014, 1 page.
Techcloud, "How to Create Custom Watch Face for Samsung Galaxy Gear Smartwatch just in Few Seconds", Online available at: https://www.youtube.com/watch?v=6rO-_SREDjQ, Oct. 9, 2013, 3 pages.
Techniqued, "How to sent Voice Messages in WhatsApp", Published on YouTube.com, Available at: https://www.youtube.com/watch?v=mkJqYO984v0, Aug. 12, 2013, 1 page.
Theunlockr, "How to Change the Watch Face on the Galaxy Gear", Online available at: https://www.youtube.com/watch?v=Z7EBG5aBiZg, Jan. 3, 2014, 3 pages.
UIKit User Interface Catalog: Page Controls, Available online at: https://web.archive.org/web/20140703123442/https://developer.apple.com/library/ios/documentation/userexperience/conceptual/UIKitUICatalog/UIPageControl.html, Dec. 16, 2013, 4 pages.
User Manual, Available onine at: http://www.manualslib.com/download/754923/Samsung-Gear-2.html, 2014, pp. 1-97.
Vanhemert Kyle, "Why Siri Could Be the Killer App for Smartwatches", XP002798416, Retrieved from the Internet: URL: https://www.wired.com/2013/12/what-can-a-smartwatch-really-do/, Dec. 19, 2013, 14 pages.
Viticci Frederico, "Checking Time Zones with Living Earth—MacStories", Available at: https://www.macstories.net/reviews/checking-time-zones-with-living-earth/, Dec. 11, 2013, pp. 1-5.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The watch every father needs: M-I-C-K-E-Y, M-O-U-S-E. Mickey Mouse . . . ?", Online Available at: https://forums.watchuseek.com/f2/watch-every-father-needs-m-i-c-k-e-y-m-o-u-s-e-mickey-mouse-855069.html, 2013, 3 pages.

(56)                    References Cited

OTHER PUBLICATIONS

WeChat Philippines, "WeChat TVC—Hold to Talk", available at: https://www.youtube.com/watch?v=E_UxteOWVSo, May 11, 2013, 1 page.

WeChat Wiki, available on: http://web.archive.org/web/20130514131044/http://wechat.wikia.com/wiki/WeChat_Wiki, May 14, 2013, 12 pages.

You can use LINE perfectly if you just read this!!, How to use & set up LINE, LINE convenience book for 50 million people, Japan, El Publishing Co., Ltd., Mar. 10, 2014, pp. 16-55.

Yundanfengqingdeqing, "A light cloud and light breeze; How to upload multiple pictures on Sina Weibo", Baidu Experience, Available Online at: https://jingyan.baidu.com/article/6181c3e074ad0d152ff15353.html, Jan. 13, 2014, 12 pages.

Zelgadis, "Reuse Animations—Synfig Animation Studio", Available online at: https://wiki.synfig.org/index.php?title=Doc:Reuse_Animations&oldid=18173, May 20, 2013, 5 pages.

Zukerman Erez, "6 Beautiful, Interesting & Versatile Timer Apps [Android]", available at: http://www.makeuseof.com/tag/beautiful-interesting-versatile-timer-apps-android/, May 18, 2012, 5 pages.

Final Office Action received for U.S. Appl. No. 17/181,089, mailed on Oct. 13, 2023, 15 pages.

Notice of Acceptance received for Australian Patent Application No. 2022218540, mailed on Oct. 16, 2023, 3 pages.

Notice of Allowance received for Chinese Patent Application No. 202111483033.2, mailed on Oct. 7, 2023, 4 pages (1 page of English Translation and 3 pages of Official Copy).

Notice of Allowance received for U.S. Appl. No. 17/951,875, mailed on Oct. 20, 2023, 8 pages.

Applicant Initiated Interview Summary received for U.S. Appl. No. 17/824,510, mailed on Jun. 16, 2023, 4 pages.

Applicant-Initiated Interview Summary received for U.S. Appl. No. 17/306,354, mailed on Jun. 28, 2023, 3 pages.

Applicant-Initiated Interview Summary received for U.S. Appl. No. 17/951,875, mailed on Jun. 27, 2023, 2 pages.

Corrected Notice of Allowance received for U.S. Appl. No. 17/989,086, mailed on Jun. 22, 2023, 2 pages.

Extended European Search Report received for European Patent Application No. 23158566.2, mailed on Jun. 14, 2023, 10 pages.

Non-Final Office Action received for U.S. Appl. No. 18/119,789, mailed on Jun. 28, 2023, 31 pages.

Notice of Allowance received for U.S. Appl. No. 16/935,002, mailed on Jun. 28, 2023, 8 pages.

Wikipedia, "Emoji", Online Available at: https://web.archive.org/web/20140829025736/https://en.wikipedia.org/wiki/Emoji, 2014, 13 pages.

Applicant-Initiated Interview Summary received for U.S. Appl. No. 18/119,789, mailed on Jul. 31, 2023, 4 pages.

Extended European Search Report received for European Patent Application No. 23168537.1, mailed on Jul. 25, 2023, 13 pages.

Non-Final Office Action received for U.S. Appl. No. 17/181,089, mailed on Aug. 4, 2023, 15 pages.

Notice of Allowance received for U.S. Appl. No. 16/922,675, mailed on Jul. 19, 2023, 13 pages.

Notice of Allowance received for U.S. Appl. No. 17/306,354, mailed on Jul. 24, 2023, 7 pages.

Notice of Allowance received for U.S. Appl. No. 17/824,510, mailed on Jul. 19, 2023, 9 pages.

Notice of Allowance received for U.S. Appl. No. 17/951,875, mailed on Jul. 26, 2023, 7 pages.

Office Action received for European Patent Application No. 20720310.0, mailed on Jul. 25, 2023, 11 pages.

Summons to Attend Oral Proceedings received for European Patent Application No. 21165295.3, mailed on Jul. 25, 2023, 14 pages.

Applicant-Initiated Interview Summary received for U.S. Appl. No. 17/181,089, mailed on Sep. 18, 2023, 3 pages.

Office Action received for Australian Patent Application No. 2023202432, mailed on Sep. 18, 2023, 4 pages.

Office Action received for Chinese Patent Application No. 201910875660.7, mailed on Aug. 12, 2023, 15 pages (6 pages of English Translation and 9 pages of Official Copy).

Record of Oral Hearing received for U.S. Appl. No. 15/405,122, mailed on Sep. 12, 2023, 20 pages.

Applicant-Initiated Interview Summary received for U.S. Appl. No. 17/975,141, mailed on Aug. 30, 2023, 4 pages.

Final Office Action received for U.S. Appl. No. 18/119,789, mailed on Aug. 30, 2023, 29 pages.

Supplemental Notice of Allowance received for U.S. Appl. No. 17/951,875, mailed on Aug. 25, 2023, 2 pages.

Corrected Notice of Allowance received for U.S. Appl. No. 17/989,086, mailed on Aug. 7, 2023, 2 pages.

Extended European Search Report received for European Patent Application No. 23173355.1, mailed on Aug. 4, 2023, 8 pages.

Intention to Grant received for European Patent Application No. 19203942.8, mailed on Aug. 1, 2023, 8 pages.

Notice of Allowance received for U.S. Appl. No. 17/835,334, mailed on Aug. 16, 2023, 8 pages.

Office Action received for Australian Patent Application No. 2022218540, mailed on Aug. 3, 2023, 5 pages.

Office Action received for Chinese Patent Application No. 201810654707.2, mailed on Jul. 6, 2023, 10 pages (5 pages of English Translation and 5 pages of Official Copy).

Advisory Action received for U.S. Appl. No. 17/479,974, mailed on Apr. 25, 2024, 4 pages.

Advisory Action received for U.S. Appl. No. 17/479,974, mailed on May 6, 2024, 4 pages.

Applicant-Initiated Interview Summary received for U.S. Appl. No. 17/978,930, mailed on Apr. 26, 2024, 4 pages Decision to Refuse received for European Patent Application No. 21165295.3, mailed on Apr. 29, 2024, 14 pages.

Minutes of Oral Proceedings received for European Patent Application No. 21165295.3, mailed on Apr. 26, 2024, 6 pages.

Notice of Allowance received for Japanese Patent Application No. 2022-129377, mailed on Apr. 26, 2024, 4 pages (1 page of English Translation and 3 pages of Official Copy).

Notice of Allowance received for U.S. Appl. No. 17/975,141, mailed on Apr. 29, 2024, 9 pages.

Office Action received for Australian Patent Application No. 2022218517, mailed on Apr. 24, 2024, 4 pages.

Office Action received for Japanese Patent Application No. 2022-149476, mailed on Apr. 22, 2024, 8 pages (4 pages of English Translation and 4 pages of Official Copy).

Examiner's Answer to Appeal Brief received for U.S. Appl. No. 16/943,737, mailed on Feb. 2, 2024, 15 pages.

Non-Final Office Action received for U.S. Appl. No. 18/211,150, mailed on Feb. 14, 2024, 11 pages.

Non-Final Office Action received for U.S. Appl. No. 18/237,341, mailed on Feb. 14, 2024, 13 pages.

Office Action received for Chinese Patent Application No. 202211110081.1, mailed on Jan. 8, 2024, 14 pages (6 pages of English Translation and 8 pages of Official Copy).

Office Action received for Chinese Patent Application No. 202211558100.7, mailed on Jan. 8, 2024, 12 pages (6 pages of English Translation and 6 pages of Official Copy).

Office Action received for Indian Patent Application No. 202117048581, mailed on Feb. 1, 2024, 6 pages.

Examiner's Answer to Appeal Brief received for U.S. Appl. No. 17/181,089, mailed on Apr. 15, 2024, 11 pages.

Final Office Action received for U.S. Appl. No. 18/237,341, mailed on Apr. 23, 2024, 15 pages.

Hayakawa, Atsushi, "An On-Line Wear Club", Mac People, ASCII Corp, Japan, vol. 8, No. 20., Oct. 15, 2002, 4 pages (Official Copy Only) {See Communication Under Rule 37 CFR § 1.98(a) (3)}.

Office Action received for Chinese Patent Application No. 202111430197.9, mailed on Mar. 6, 2024, 13 pages (3 pages of English Translation and 10 pages of Official Copy).

Office Action received for European Patent Application No. 23158566.2, mailed on Apr. 9, 2024, 7 pages.

Office Action received for Indian Patent Application No. 202118049678, mailed on Apr. 18, 2024, 8 pages.

(56) References Cited

OTHER PUBLICATIONS

Result of Consultation received for European Patent Application No. 20720310.0, mailed on Apr. 17, 2024, 9 pages.

Result of Consultation received for European Patent Application No. 21165295.3, mailed on Apr. 18, 2024, 3 pages.

Applicant-Initiated Interview Summary received for U.S. Appl. No. 18/211,150, mailed on Apr. 3, 2024, 3 pages.

Decision to Grant received for European Patent Application No. 15714698.6, mailed on Apr. 5, 2024, 2 pages.

Final Office Action received for U.S. Appl. No. 17/978,930, mailed on Apr. 5, 2024, 28 pages.

Intention to Grant received for European Patent Application No. 21166718.3, mailed on Mar. 25, 2024, 8 pages.

Invitation to Pay Search Fees received for European Patent Application No. 21789897.2, mailed on Mar. 14, 2024, 3 pages.

Non-Final Office Action received for U.S. Appl. No. 18/088,309, mailed on Apr. 9, 2024, 14 pages.

Notice of Allowance received for Chinese Patent Application No. 202211558100.7, mailed on Mar. 29, 2024, 3 pages (2 pages of English Translation and 1 page of Official Copy).

Office Action received for Australian Patent Application No. 2023214377, mailed on Mar. 27, 2024, 3 pages.

Office Action received for Chinese Patent Application No. 201911128105.4, mailed on Mar. 16, 2024, 7 pages (4 pages of English Translation and 3 pages of Official Copy).

Office Action received for Chinese Patent Application No. 201911128105.4, mailed on Mar. 19, 2024, 16 pages (8 pages of English Translation and 8 pages of Official Copy).

Office Action received for Chinese Patent Application No. 202010728711.6, mailed on Feb. 1, 2024, 30 pages (18 pages of English Translation and 12 pages of Official Copy).

Office Action received for Chinese Patent Application No. 202311321231.8, mailed on Mar. 10, 2024, 15 pages (9 pages of English Translation and 6 pages of Official Copy).

Office Action received for Japanese Patent Application No. 2022-202284, mailed on Mar. 25, 2024, 6 pages (3 pages of English Translation and 3 pages of Official Copy).

Office Action received for Japanese Patent Application No. 2022-205934, mailed on Mar. 11, 2024, 4 pages (2 pages of English Translation and 2 pages of Official Copy).

Office Action received for Korean Patent Application No. 10-2022-7032414, mailed on Mar. 26, 2024, 11 pages (5 pages of English Translation and 6 pages of Official Copy).

Brief Communication Regarding Oral Proceedings received for European Patent Application No. 21197457.1, mailed on May 23, 2024, 5 pages.

Non-Final Office Action received for U.S. Appl. No. 17/747,804, mailed on Jun. 4, 2024, 20 pages.

Non-Final Office Action received for U.S. Appl. No. 18/067,350, mailed on May 28, 2024, 43 pages.

Non-Final Office Action received for U.S. Appl. No. 18/229,989, mailed on May 31, 2024, 18 pages.

Notice of Allowance received for Chinese Patent Application No. 201911128105.4, mailed on May 24, 2024, 2 pages (1 page of English Translation and 1 page of Official Copy).

Office Action received for Chinese Patent Application No. 202211081603.X, mailed on Apr. 29, 2024, 6 pages (3 pages of English Translation and 3 pages of Official Copy).

Office Action received for Chinese Patent Application No. 202211110081.1, mailed on Apr. 28, 2024, 6 pages (3 pages of English Translation and 3 pages of Official Copy).

Office Action received for European Patent Application No. 21207736.6, mailed on May 31, 2024, 4 pages.

Office Action received for European Patent Application No. 21789897.2, mailed on May 23, 2024, 12 pages.

Applicant-Initiated Interview Summary received for U.S. Appl. No. 17/479,974, mailed on Mar. 14, 2024, 2 pages.

Applicant-Initiated Interview Summary received for U.S. Appl. No. 18/237,341, mailed on Mar. 22, 2024, 4 pages.

Office Action received for European Patent Application No. 22201007.6, mailed on Mar. 13, 2024, 4 pages.

"13 questions and answers about using Apple Pay online", online available at: http://www.it528.com/apple/1356.html, Feb. 18, 2016, 5 pages (Official Copy Only). {See Communication under 37 CFR § 1.98(a) (3)}.

Advisory Action received for U.S. Appl. No. 14/863,099, mailed on Sep. 8, 2016, 3 pages.

Advisory Action received for U.S. Appl. No. 16/422,736, mailed on Mar. 12, 2021, 3 pages.

Advisory Action received for U.S. Appl. No. 17/747,804, mailed on Jun. 23, 2023, 6 pages.

Advisory Action received for U.S. Appl. No. 15/250,152, mailed on Mar. 25, 2019, 5 pages.

Akhgari, Ehsan, "Don't Leave a Trace: Private Browsing in Firefox", available online at: "http://ehsanakhgari.org/blog/2008-11-04/dont-leave-trace-private-browsing-firefox", Nov. 4, 2008, 71 pages.

Alba, Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.

Applicant-Initiated Interview Summary received for U.S. Appl. No. 14/641,304, mailed on Dec. 2, 2019, 5 pages.

Applicant-Initiated Interview Summary received for U.S. Appl. No. 14/641,304, mailed on Jul. 28, 2020, 5 pages.

Applicant-Initiated Interview Summary received for U.S. Appl. No. 15/433,320, mailed on Feb. 11, 2020, 5 pages.

Applicant-Initiated Interview Summary received for U.S. Appl. No. 16/702,968, mailed on Jul. 1, 2020, 5 pages.

Applicant-Initiated Interview Summary received for U.S. Appl. No. 17/666,971, mailed on Jun. 9, 2023, 2 pages.

Applicant-Initiated Interview Summary received for U.S. Appl. No. 15/433,320, mailed on Nov. 25, 2020, 4 pages.

Applicant-Initiated Interview Summary received for U.S. Appl. No. 15/910,263, mailed on Nov. 18, 2020, 6 pages.

Applicant-Initiated Interview Summary received for U.S. Appl. No. 16/422,736, mailed on Feb. 24, 2021, 3 pages.

Applicant-Initiated Interview Summary received for U.S. Appl. No. 16/422,736, mailed on Sep. 28, 2020, 3 pages.

Applicant-Initiated Interview Summary received for U.S. Appl. No. 16/670,949, mailed on Apr. 6, 2021, 2 pages.

Applicant-Initiated Interview Summary received for U.S. Appl. No. 16/679,967, mailed on Feb. 10, 2022, 2 pages.

Applicant-Initiated Interview Summary received for U.S. Appl. No. 16/679,967, mailed on Jun. 1, 2022, 2 pages.

Applicant-Initiated Interview Summary received for U.S. Appl. No. 16/679,967, mailed on Oct. 25, 2021, 2 pages.

Applicant-Initiated Interview Summary received for U.S. Appl. No. 16/702,968, mailed on Sep. 28, 2020, 6 pages.

Applicant-Initiated Interview Summary received for U.S. Appl. No. 16/803,849, mailed on Aug. 21, 2020, 5 pages.

Applicant-Initiated Interview Summary received for U.S. Appl. No. 16/803,849, mailed on Dec. 21, 2020, 5 pages.

Applicant-Initiated Interview Summary received for U.S. Appl. No. 16/803,849, mailed on Feb. 28, 2022, 9 pages.

Applicant-Initiated Interview Summary received for U.S. Appl. No. 16/803,849, mailed on Oct. 12, 2021, 6 pages.

Applicant-Initiated Interview Summary received for U.S. Appl. No. 16/807,604, mailed on Dec. 21, 2020, 7 pages.

Applicant-Initiated Interview Summary received for U.S. Appl. No. 16/807,604, mailed on Jul. 24, 2020, 5 pages.

Applicant-Initiated Interview Summary received for U.S. Appl. No. 16/836,571, mailed on Jul. 7, 2021, 6 pages.

Applicant-Initiated Interview Summary received for U.S. Appl. No. 17/031,833, mailed on Dec. 21, 2020, 5 pages.

Applicant-Initiated Interview Summary received for U.S. Appl. No. 17/031,833, mailed on May 24, 2021, 6 pages.

Applicant-Initiated Interview Summary received for U.S. Appl. No. 17/168,069, mailed on Nov. 17, 2021, 2 pages.

Applicant-Initiated Interview Summary received for U.S. Appl. No. 17/320,900, mailed on Apr. 17, 2023, 4 pages.

(56)　　　　　References Cited

OTHER PUBLICATIONS

Applicant-Initiated Interview Summary received for U.S. Appl. No. 17/461,103, mailed on Jan. 26, 2022, 6 pages.
Applicant-Initiated Interview Summary received for U.S. Appl. No. 17/479,974, mailed on Apr. 4, 2023, 2 pages.
Applicant-Initiated Interview Summary received for U.S. Appl. No. 17/479,974, mailed on Jul. 21, 2023, 2 pages.
Applicant-Initiated Interview Summary received for U.S. Appl. No. 17/479,974, mailed on Nov. 1, 2023, 2 pages.
Applicant-Initiated Interview Summary received for U.S. Appl. No. 17/747,804, mailed on Mar. 17, 2023, 4 pages.
Applicant-Initiated Interview Summary received for U.S. Appl. No. 17/747,804, mailed on May 31, 2023, 4 pages.
Applicant-Initiated Interview Summary received for U.S. Appl. No. 17/752,582, mailed on Apr. 17, 2023, 3 pages.
Applicant-Initiated Interview Summary received for U.S. Appl. No. 17/867,317, mailed on May 30, 2023, 4 pages.
Applicant-Initiated Interview Summary received for U.S. Appl. No. 18/067,350, mailed on Sep. 11, 2023, 4 pages.
Applicant-Initiated Interview Summary received for U.S. Appl. No. 18/088,309, mailed on Feb. 28, 2024, 2 pages.
Applicant-Initiated Interview Summary received for U.S. Appl. No. 18/088,309, mailed on Oct. 27, 2023, 2 pages.
Beard, Chris, "Mozilla Labs Introducing Weave", available online at: <https://blog.mozilla.org/labs/2007/12/introducing-weave/>, Dec. 21, 2007, 57 pages.
Bell, Killian, "Twitter Notifications, iCloud Tabs & Location-Based Reminders Appear In Latest OS X 10.8 Beta", available online at: "http://www.cultofmac.com/154522/twitter-notifications-icloud-tabs-location-based-reminders-appear-in-latest-os-x-10-8-beta/", Mar. 19, 2012, 10 pages.
Board Decision received for Chinese Patent Application No. 201510288981.9, mailed on May 6, 2021, 31 pages (3 pages of English Translation and 28 pages of Official Copy).
Board Decision received for Chinese Patent Application No. 201580043701.6, mailed on Aug. 19, 2021, 2 pages (1 page of English Translation and 1 page of Official Copy).
Board Decision received for Chinese Patent Application No. 201810338826.7, mailed on May 30, 2022, 20 pages (2 pages of English Translation and 18 pages of Official Copy).
Board Opinion received for Chinese Patent Application No. 201510288981.9, mailed on Jan. 4, 2021, 21 pages (9 pages of English Translation and 12 pages of Official Copy).
Board Opinion received for Chinese Patent Application No. 201810338826.7, mailed on Jan. 19, 2022, 18 pages (6 pages of English Translation and 12 pages of Official Copy).
Boxer, David, "Change the permissions of the Google Drive file or folder or Share the file or folder", Blake School Website, Online Available at: https://support.blakeschool.org/hc/en-us/articles/231790648-Change-the-permissions-of-the-Google-Drive-file-or-folder-or-Share-the-file-or-folder, Oct. 31, 2016, 2 pages.
Brief Communication Regarding Oral Proceedings received for European Patent Application No. 17799904.2, mailed on Sep. 13, 2022, 1 page.
Brief Communication Regarding Oral Proceedings received for European Patent Application No. 17813737.8, mailed on Sep. 19, 2022, 1 page.
Brief Communication Regarding Oral Proceedings received for European Patent Application No. 18197583.0, mailed on Feb. 18, 2021, 2 pages.
Brief Communication Regarding Oral Proceedings received for European Patent Application No. 18728002.9, mailed on Dec. 7, 2022, 1 page.
Brief Communication Regarding Oral Proceedings received for European Patent Application No. 18728002.9, mailed on Nov. 28, 2022, 7 pages.
Brief Communication Regarding Oral Proceedings received for European Patent Application No. 19150528.8, mailed on Sep. 5, 2022, 2 pages.
Brief Communication Regarding Oral Proceedings received for European Patent Application No. 20158824.1, mailed on May 30, 2022, 1 page.
Brumberg et al., "The Unlock Project: A Python-based framework for practical brain-computer interface communication "app" development", Conf Proc IEEE Eng Med Biol Soc. 2012, doi:10.1109/EMBC.2012.6346473, Institute of Electrical and Electronics Engineers, 2012, 11 pages.
Call Me, "Samsung R3 speaker gives you a delicious 360-degree sound experience—with WiFi and Bluetooth | Call me", 0:24 / 3:22, Available Online at: <https://www.youtube.com/watch?v=4Uv_sOhrlro>, Sep. 22, 2016, 3 pages.
Certificate of Examination received for Australian Patent Application No. 2017100553, mailed on Jan. 17, 2018, 2 pages.
Certificate of Examination received for Australian Patent Application No. 2018101014, mailed on Mar. 20, 2019, 2 pages.
Computer Adv, "Sonos App Navigation & Menu on iPhone", Available online at: https://www.youtube.com/watch?v=Jhz9XvWQ204, Aug. 4, 2015, 1 page.
Corrected Notice of Allowance received for U.S. Appl. No. 14/641,298, mailed on Dec. 9, 2021, 5 pages.
Corrected Notice of Allowance received for U.S. Appl. No. 14/719,217, mailed on Apr. 22, 2019, 2 pages.
Corrected Notice of Allowance received for U.S. Appl. No. 14/719,217, mailed on Mar. 20, 2019, 2 pages.
Corrected Notice of Allowance received for U.S. Appl. No. 15/269,801, mailed on Oct. 3, 2017, 4 pages.
Corrected Notice of Allowance received for U.S. Appl. No. 15/845,794, mailed on Feb. 25, 2019, 2 pages.
Corrected Notice of Allowance received for U.S. Appl. No. 15/910,263, mailed on Feb. 10, 2021, 3 pages.
Corrected Notice of Allowance received for U.S. Appl. No. 15/910,263, mailed on Mar. 17, 2021, 3 pages.
Corrected Notice of Allowance received for U.S. Appl. No. 15/910,263, mailed on Mar. 18, 2021, 3 pages.
Corrected Notice of Allowance received for U.S. Appl. No. 15/952,736, mailed on Nov. 19, 2018, 2 pages.
Corrected Notice of Allowance received for U.S. Appl. No. 16/229,959, mailed on Mar. 3, 2020, 3 pages.
Corrected Notice of Allowance received for U.S. Appl. No. 16/422,736, mailed on Jul. 9, 2021, 2 pages.
Corrected Notice of Allowance received for U.S. Appl. No. 16/434,865, mailed on Apr. 28, 2020, 2 pages.
Corrected Notice of Allowance received for U.S. Appl. No. 16/434,865, mailed on Jun. 4, 2020, 2 pages.
Corrected Notice of Allowance received for U.S. Appl. No. 16/670,949, mailed on Sep. 8, 2021, 2 pages.
Corrected Notice of Allowance received for U.S. Appl. No. 16/702,968, mailed on Jun. 8, 2021, 3 pages.
Corrected Notice of Allowance received for U.S. Appl. No. 16/702,968, mailed on Jun. 16, 2021, 4 pages.
Corrected Notice of Allowance received for U.S. Appl. No. 16/702,968, mailed on Jun. 28, 2021, 4 pages.
Corrected Notice of Allowance received for U.S. Appl. No. 16/702,968, mailed on May 26, 2021, 4 pages.
Corrected Notice of Allowance received for U.S. Appl. No. 16/702,968, mailed on May 28, 2021, 4 pages.
Corrected Notice of Allowance received for U.S. Appl. No. 16/803,849, mailed on Jul. 7, 2022, 3 pages.
Corrected Notice of Allowance received for U.S. Appl. No. 16/803,849, mailed on Jun. 8, 2022, 3 pages.
Corrected Notice of Allowance received for U.S. Appl. No. 16/807,604, mailed on Jul. 26, 2021, 3 pages.
Corrected Notice of Allowance received for U.S. Appl. No. 16/807,604, mailed on Jun. 28, 2021, 3 pages.
Corrected Notice of Allowance received for U.S. Appl. No. 16/807,604, mailed on May 28, 2021, 3 pages.
Corrected Notice of Allowance received for U.S. Appl. No. 16/807,604, mailed on Oct. 4, 2021, 5 pages.
Corrected Notice of Allowance received for U.S. Appl. No. 16/807,604, mailed on Oct. 14, 2021, 3 pages.
Corrected Notice of Allowance received for U.S. Appl. No. 16/807,604, mailed on Oct. 22, 2021, 3 pages.

(56) References Cited

OTHER PUBLICATIONS

Corrected Notice of Allowance received for U.S. Appl. No. 16/836,571, mailed on Dec. 6, 2021, 5 pages.

Corrected Notice of Allowance received for U.S. Appl. No. 16/836,571, mailed on Mar. 25, 2022, 2 pages.

Corrected Notice of Allowance received for U.S. Appl. No. 16/836,571, mailed on Nov. 4, 2021, 4 pages.

Corrected Notice of Allowance received for U.S. Appl. No. 16/836,571, mailed on Nov. 18, 2021, 3 pages.

Corrected Notice of Allowance received for U.S. Appl. No. 16/836,571, mailed on Oct. 12, 2021, 4 pages.

Corrected Notice of Allowance received for U.S. Appl. No. 16/987,003, mailed on Sep. 1, 2021, 3 pages.

Corrected Notice of Allowance received for U.S. Appl. No. 17/031,833, mailed on Aug. 2, 2021, 3 pages.

Corrected Notice of Allowance received for U.S. Appl. No. 17/168,069, mailed on Feb. 9, 2022, 2 pages.

Corrected Notice of Allowance received for U.S. Appl. No. 17/320,900, mailed on Sep. 18, 2023, 5 pages.

Corrected Notice of Allowance received for U.S. Appl. No. 17/461,103, mailed on Apr. 14, 2022, 2 pages.

Corrected Notice of Allowance received for U.S. Appl. No. 17/461,103, mailed on Aug. 3, 2022, 2 pages.

Corrected Notice of Allowance received for U.S. Appl. No. 17/461,103, mailed on May 10, 2022, 2 pages.

Corrected Notice of Allowance received for U.S. Appl. No. 17/666,971, mailed on Jan. 16, 2024, 2 pages.

Corrected Notice of Allowance received for U.S. Appl. No. 17/666,971, mailed on Sep. 29, 2023, 2 pages.

Corrected Notice of Allowance received for U.S. Appl. No. 17/752,582, mailed on Jul. 17, 2023, 3 pages.

Corrected Notice of Allowance received for U.S. Appl. No. 18/077,905, mailed on Apr. 10, 2023, 2 pages.

Corrected Notice of Allowance received for U.S. Appl. No. 18/077,905, mailed on Apr. 19, 2023, 2 pages.

Corrected Notice of Allowance received for U.S. Appl. No. 18/077,905, mailed on Apr. 26, 2023, 3 pages.

Corrected Notice of Allowance received for U.S. Appl. No. 18/077,905, mailed on May 4, 2023, 2 pages.

Crutnacker, "Amazon Echo Tips and Tricks: Playing Music Demonstration", Available Online at: https://www.youtube.com/watch?v=W_bqq2ynUll, Nov. 4, 2015, 1 page.

Decision on Appeal received for U.S. Appl. No. 14/641,298, mailed on Nov. 1, 2021, 9 pages.

Decision on Appeal received for U.S. Appl. No. 14/774,664, mailed on Sep. 12, 2019, 8 pages.

Decision on Appeal received for U.S. Appl. No. 14/863,099, mailed on Aug. 22, 2019, 9 pages.

Decision on Opposition received for Australian Patent Application No. 2018271366, mailed on Mar. 3, 2023, 3 pages.

Decision to Grant received for Danish Patent Application No. PA201670628, mailed on Nov. 20, 2017, 2 pages.

Decision to Grant received for Danish Patent Application No. PA201770392, mailed on Oct. 24, 2018, 2 pages.

Decision to Grant received for Danish Patent Application No. PA201770401, mailed on Oct. 24, 2018, 2 pages.

Decision to Grant received for Danish Patent Application No. PA201770403, mailed on Oct. 24, 2018, 2 pages.

Decision to Grant received for Danish Patent Application No. PA201770404, mailed on Nov. 11, 2019, 3 pages.

Decision to Grant received for Danish Patent Application No. PA201770406, mailed on May 15, 2020, 2 pages.

Decision to Grant received for Danish Patent Application No. PA201770782, mailed on Oct. 25, 2019, 2 pages.

Decision to Grant received for Danish Patent Application No. PA202070560, mailed on Oct. 21, 2021, 2 pages.

Decision to Grant received for Danish Patent Application No. PA202170320, mailed on Nov. 10, 2022, 2 pages.

Decision to Grant received for Danish Patent Application No. PA202270464, mailed on May 9, 2023, 1 page.

Decision to Grant received for European Patent Application No. 12773460.6, mailed on Jun. 27, 2019, 2 pages.

Decision to Grant received for European Patent Application No. 13171047.7, mailed on Jun. 27, 2019, 2 pages.

Decision to Grant received for European Patent Application No. 15713062.6, mailed on Apr. 11, 2019, 2 pages.

Decision to Grant received for European Patent Application No. 15719347.5, mailed on Jun. 24, 2021, 2 pages.

Decision to Grant received for European Patent Application No. 15724160.5, mailed on Jun. 14, 2018, 2 pages.

Decision to Grant received for European Patent Application No. 16710590.7, mailed on Oct. 28, 2021, 2 pages.

Decision to Grant received for European Patent Application No. 18197583.0, mailed on Feb. 3, 2022, 3 pages.

Decision to Grant received for European Patent Application No. 18197589.7, mailed on Jun. 10, 2021, 2 pages.

Decision to Grant received for European Patent Application No. 18728002.9, mailed on Aug. 31, 2023, 4 pages.

Decision to Grant received for European Patent Application No. 19207753.5, mailed on Jun. 2, 2022, 3 pages.

Decision to Grant received for European Patent Application No. 20158824.1, mailed on Dec. 15, 2022, 3 pages.

Decision to Grant received for German Patent Application No. 102015208532.5, mailed on Sep. 22, 2020, 10 pages (1 page of English Translation and 9 pages of Official Copy).

Decision to Grant received for Japanese Patent Application No. 2017-075031, mailed on Jul. 1, 2019, 3 pages (1 page of English Translation and 2 pages of Official Copy).

Decision to Grant received for Japanese Patent Application No. 2019-124728, mailed on Apr. 2, 2021, 4 pages (1 page of English Translation and 3 pages of Official Copy).

Decision to Refuse received for European Patent Application No. 12770400.5, mailed on Nov. 8, 2018, 12 pages.

Decision to Refuse received for European Patent Application No. 17799904.2, mailed on Sep. 19, 2022, 4 pages.

Decision to Refuse received for European Patent Application No. 17813737.8, mailed on Sep. 30, 2022, 5 pages.

Decision to Refuse received for European Patent Application No. 18208881.5, mailed on Dec. 23, 2022, 12 pages.

Decision to Refuse received for European Patent Application No. 19150528.8, mailed on Sep. 9, 2022, 4 pages.

Decision to Refuse received for Japanese Patent Application No. 2022-116534, mailed on Jan. 29, 2024, 5 pages (2 pages of English Translation and 3 pages of Official Copy).

Dharmasena, Anusha, "iMessage-send as text message Option", YouTube, Available online at: <https://www.youtube.com/watch?v=hXG-MdlW6FA>, Feb. 18, 2013, 1 page.

Dybwad, Barb, "Google Chrome Gets Bookmark Syncing", available online at: "http://mashable.com/2009/11/02/chrome-bookmark-sync/", Nov. 3, 2009, 6 pages.

Evaluation Report for Utility Model Patent received for Chinese Patent Application No. 201620051290.7, completed on Sep. 19, 2016, 11 pages (6 pages of English translation and 5 pages of Official Copy).

Examiner's Answer to Appeal Brief received for U.S. Appl. No. 14/641,298, mailed on Mar. 22, 2021, 19 pages.

Examiner's Answer to Appeal Brief received for U.S. Appl. No. 14/774,664, mailed on May 31, 2018, 28 pages.

Examiner's Answer to Appeal Brief received for U.S. Appl. No. 14/863,099, mailed on Jul. 28, 2017, 31 pages.

Examiner's Initiated Interview Summary received for U.S. Appl. No. 14/641,298, mailed on Mar. 10, 2020, 4 pages.

Extended European Search Report for European Application No. 17813737.8, mailed on Nov. 22, 2019, 9 pages.

Extended European Search Report received for European Patent Application No. 13171047.7, mailed on Oct. 29, 2014, 8 pages.

Extended European Search Report received for European Patent Application No. 17799904.2, mailed on Jul. 30, 2018, 7 pages.

Extended European Search Report received for European Patent Application No. 18178147.7, mailed on Oct. 4, 2018, 8 pages.

Extended European Search Report received for European Patent Application No. 18197583.0, mailed on Jun. 4, 2019, 20 pages.

(56)  References Cited

OTHER PUBLICATIONS

Extended European Search Report received for European Patent Application No. 18197589.7, mailed on Jan. 7, 2019, 9 pages.
Extended European Search Report received for European Patent Application No. 18208881.5, mailed on Jan. 8, 2019, 7 pages.
Extended European Search Report received for European Patent Application No. 19150528.8, mailed on May 15, 2019, 9 pages.
Extended European Search Report received for European Patent Application No. 19186538.5, mailed on Oct. 9, 2019, 10 pages.
Extended European Search Report received for European Patent Application No. 19207753.5, mailed on Dec. 18, 2019, 9 pages.
Extended European Search Report received for European Patent Application No. 20158824.1, mailed on Aug. 10, 2020, 13 pages.
Extended European Search Report received for European Patent Application No. 21166718.3, mailed on Jul. 6, 2021, 11 pages.
Extended European Search Report received for European Patent Application No. 21197457.1, mailed on Nov. 15, 2021, 8 pages.
Extended European Search Report received for European Patent Application No. 21207736.6, mailed on Feb. 22, 2022, 11 pages.
Extended European Search Report received for European Patent Application No. 22188377.0, mailed on Oct. 27, 2022, 8 pages.
Extended European Search Report received for European Patent Application No. 22198071.7, mailed on Dec. 5, 2022, 8 pages.
Extended European Search Report received for European Patent Application No. 22201007.6, mailed on Jan. 12, 2023, 7 pages.
Extended European Search Report received for European Patent Application No. 23157906.1, mailed on Apr. 6, 2023, 10 pages.
Extended European Search Report received for European Patent Application No. 23172038.4, mailed on Oct. 11, 2023, 10 pages.
Extended European Search Report received for European Patent Application No. 23190753.6, mailed on Nov. 22, 2023, 13 pages.
Extended European Search Report received for European patent Application No. 23191379.9, mailed on Sep. 18, 2023, 8 pages.
Final Office Action received for U.S. Appl. No. 13/248,882, mailed on Dec. 4, 2013, 22 pages.
Final Office Action received for U.S. Appl. No. 13/492,057, mailed on Apr. 8, 2016, 29 pages.
Final Office Action received for U.S. Appl. No. 13/492,057, mailed on Mar. 30, 2015, 18 pages.
Final Office Action received for U.S. Appl. No. 14/285,378, mailed on Jul. 23, 2015, 19 pages.
Final Office Action received for U.S. Appl. No. 14/503,327, mailed on May 18, 2017, 10 pages.
Final Office Action received for U.S. Appl. No. 14/641,289, mailed on Jul. 1, 2016, 32 pages.
Final Office Action received for U.S. Appl. No. 14/641,298, mailed on Jun. 26, 2020, 50 pages.
Final Office Action received for U.S. Appl. No. 14/641,298, mailed on May 16, 2019, 50 pages.
Final Office Action received for U.S. Appl. No. 14/641,298, mailed on Oct. 4, 2017, 30 pages.
Final Office Action received for U.S. Appl. No. 14/641,304, mailed on Jul. 24, 2018, 19 pages.
Final Office Action received for U.S. Appl. No. 14/641,304, mailed on Oct. 15, 2019, 21 pages.
Final Office Action received for U.S. Appl. No. 14/719,217, mailed on Feb. 23, 2017, 37 pages.
Final Office Action received for U.S. Appl. No. 14/774,664, mailed on Aug. 25, 2017, 23 pages.
Final Office Action received for U.S. Appl. No. 14/841,455, mailed on Nov. 6, 2018, 14 pages.
Final Office Action received for U.S. Appl. No. 14/863,099, mailed on Apr. 21, 2016, 20 pages.
Final Office Action received for U.S. Appl. No. 15/433,320, mailed on Dec. 31, 2019, 30 pages.
Final Office Action received for U.S. Appl. No. 15/910,263, mailed on Aug. 28, 2019, 32 pages.
Final Office Action received for U.S. Appl. No. 16/422,736, mailed on Jan. 11, 2021, 39 pages.

Final Office Action received for U.S. Appl. No. 16/679,967, mailed on Nov. 10, 2021, 14 pages.
Final Office Action received for U.S. Appl. No. 16/702,968, mailed on Jul. 27, 2020, 21 pages.
Final Office Action received for U.S. Appl. No. 16/803,849, mailed on Nov. 2, 2021, 37 pages.
Final Office Action received for U.S. Appl. No. 16/803,849, mailed on Sep. 24, 2020, 29 pages.
Final Office Action received for U.S. Appl. No. 16/807,604, mailed on Aug. 19, 2020, 35 pages.
Final Office Action received for U.S. Appl. No. 17/031,833, mailed on Jan. 26, 2021, 17 pages.
Final Office Action received for U.S. Appl. No. 17/479,974, mailed on Jan. 19, 2024, 16 pages.
Final Office Action received for U.S. Appl. No. 17/479,974, mailed on Jun. 28, 2023, 32 pages.
Final Office Action received for U.S. Appl. No. 17/666,971, mailed on May 12, 2023, 29 pages.
Final Office Action received for U.S. Appl. No. 17/747,804, mailed on Apr. 28, 2023, 17 pages.
Final Office Action received for U.S. Appl. No. 18/067,350, mailed on Dec. 13, 2023, 44 pages.
Final Office Action received for U.S. Appl. No. 18/088,309, mailed on Jan. 9, 2024, 13 pages.
Final Office Action received for U.S. Appl. No. 15/250,152, mailed on Aug. 23, 2017, 24 pages.
Final Office Action received for U.S. Appl. No. 15/250,152, mailed on Nov. 16, 2018, 30 pages.
"Firefox Sync—Take Your Bookmarks, Tabs and Personal Information with You", available online at; https://web.archive.org/web/20120601020556/http://support.mozilla.org/en-US/kb/firefox-sync-take-your-bookmarks-and-tabs-with-you?redirectlocale=en-US&redirectslug=what-firefox-sync, Jun. 1, 2012, 3 pages.
G Pad, "LG's latest Uls that shine even more on the G-Pad", Online available at: http://bungq.com/1014, Nov. 19, 2013, 49 pages (30 pages of English Translation and 19 pages of Official Copy).
Google Labs, "Google Browser Sync", available online at: "https://web.archive.org/web/20120518050142/http://www.google.com/tools/firefox/browsersync/faq.html", May 18, 2012, 5 pages.
Google, "Google Home Help, Listen to music", Datasheet [online], Available Online at: <https://web.archive.org/web/20170326051235/https://support.google.com/googlehome/answer/7030379?hl=en&ref_topic=7030084>, Mar. 26, 2017, 3 pages.
Han, Hailing, "Research on Testing Method on Computer Interlocking Software", "Electronic World" vol. 2012 No. 17, Key Laboratory of Optoelectronic Technology and Intelligent Control of Ministry of Education, Lanzhou Jiaotong University, Sep. 2012, 2 pages (Official Copy only). {See Communication under 37 CFR § 1.98(a) (3)}.
Hoffberger, Chase, "Spotify's Collaborative Playlists Let Friends Listen Together", Evolver.fm, available online at: http://www.evolver.fm/2011/08/22/spotify-collaborative-playlists/, Aug. 22, 2011, 4 pages.
Intention to Grant received for Danish Patent Application No. PA201670628, mailed on Aug. 28, 2017, 2 pages.
Intention to Grant received for Danish Patent Application No. PA201770392, mailed on Aug. 31, 2018, 2 pages.
Intention to Grant received for Danish Patent Application No. PA201770392, mailed on Jul. 2, 2018, 2 pages.
Intention to Grant received for Danish Patent Application No. PA201770401, mailed on Jun. 14, 2018, 2 pages.
Intention to Grant received for Danish Patent Application No. PA201770401, mailed on Sep. 17, 2018, 2 pages.
Intention to Grant received for Danish Patent Application No. PA201770403, mailed on May 7, 2018, 2 pages.
Intention to Grant received for Danish Patent Application No. PA201770403, mailed on Oct. 3, 2018, 2 pages.
Intention to Grant received for Danish Patent Application No. PA201770404, mailed on Sep. 23, 2019, 3 pages.
Intention to Grant received for Danish Patent Application No. PA201770406, mailed on Feb. 6, 2020, 3 pages.
Intention to Grant received for Danish Patent Application No. PA201770408, mailed on Nov. 30, 2018, 3 pages.

(56)        References Cited

OTHER PUBLICATIONS

Intention to Grant received for Danish Patent Application No. PA201770782, mailed on Aug. 8, 2019, 2 pages.
Intention to Grant received for Danish Patent Application No. PA202070560, mailed on Apr. 26, 2021, 2 pages.
Intention to Grant received for Danish Patent Application No. PA202170320, mailed on Jul. 27, 2022, 2 pages.
Intention to Grant received for Danish Patent Application No. PA202270464, mailed on Feb. 20, 2023, 2 pages.
Intention to Grant received for European Patent Application No. 12773460.6, mailed on Feb. 4, 2019, 8 pages.
Intention to Grant received for European Patent Application No. 12773460.6, mailed on Jun. 17, 2019, 4 pages.
Intention to Grant received for European Patent Application No. 13171047.7, mailed on Jan. 23, 2019, 8 pages.
Intention to Grant received for European Patent Application No. 15713062.6, mailed on Mar. 25, 2019, 7 pages.
Intention to Grant received for European Patent Application No. 15713062.6, mailed on Oct. 8, 2018, 8 pages.
Intention to Grant received for European Patent Application No. 15714698.6, mailed on Dec. 8, 2023, 9 pages.
Intention to Grant received for European Patent Application No. 15719347.5, mailed on Dec. 8, 2020, 7 pages.
Intention to Grant received for European Patent Application No. 15719347.5, mailed on Jun. 8, 2021, 7 pages.
Intention to Grant received for European Patent Application No. 15719347.5, mailed on May 11, 2021, 8 pages.
Intention to Grant received for European Patent Application No. 15724160.5, mailed on Mar. 7, 2018, 8 pages.
Intention to Grant received for European Patent Application No. 16710590.7, mailed on Jun. 14, 2021, 8 pages.
Intention to Grant received for European Patent Application No. 18197583.0, mailed on Jan. 17, 2022, 9 pages.
Intention to Grant received for European Patent Application No. 18197583.0, mailed on Jul. 23, 2021, 9 pages.
Intention to Grant received for European Patent Application No. 18197589.7, mailed on Jan. 21, 2021, 8 pages.
Intention to Grant received for European Patent Application No. 18728002.9, mailed on Apr. 12, 2023, 9 pages.
Intention to Grant received for European Patent Application No. 19207753.5, mailed on Jan. 28, 2022, 8 pages.
Intention to Grant received for European Patent Application No. 19207753.5, mailed on Sep. 3, 2021, 8 pages.
Intention to Grant received for European Patent Application No. 20158824.1, mailed on Aug. 11, 2022, 10 pages.
International Preliminary Report on Patentability received for PCT Patent Application No. PCT/US2012/057319, mailed on Apr. 10, 2014, 6 pages.
International Preliminary Report on Patentability received for PCT Patent Application No. PCT/US2012/057656, mailed on Apr. 10, 2014, 6 pages.
International Preliminary Report on Patentability received for PCT Patent Application No. PCT/US2013/044710, mailed on Dec. 18, 2014, 11 pages.
International Preliminary Report on Patentability received for PCT Patent Application No. PCT/US2014/027882, mailed on Sep. 24, 2015, 8 pages.
International Preliminary Report on Patentability Received for PCT Patent Application No. PCT/US2015/019306, mailed on Dec. 15, 2016, 10 pages.
International Preliminary Report on Patentability Received for PCT Patent Application No. PCT/US2015/019309, mailed on Dec. 15, 2016, 10 pages.
International Preliminary Report on Patentability received for PCT Patent Application No. PCT/US2015/025188, mailed on Mar. 2, 2017, 8 pages.
International Preliminary Report on Patentability received for PCT Patent Application No. PCT/US2015/030199, mailed on Dec. 15, 2016, 7 pages.

International Preliminary Report on Patentability received for PCT Patent Application No. PCT/US2016/021012, mailed on Sep. 21, 2017, 11 pages.
International Preliminary Report on Patentability received for PCT Patent Application No. PCT/US2017/031086, mailed on Dec. 27, 2018, 12 pages.
International Preliminary Report on Patentability received for PCT Patent Application No. PCT/US2017/032240, mailed on Nov. 29, 2018, 29 pages.
International Preliminary Report on Patentability received for PCT Patent Application No. PCT/US2018/032904, mailed on Nov. 28, 2019, 14 pages.
International Preliminary Report on Patentability received for PCT Patent Application No. PCT/US2021/048358, mailed on Apr. 6, 2023, 15 pages.
International Search Report and Written Opinion received for PCT Application No. PCT/US2015/019309, mailed on Jun. 25, 2015, 15 pages.
International Search Report and Written Opinion received for PCT Patent Application No. PCT/US17/31086, mailed on Sep. 8, 2017, 15 pages.
International Search Report and Written Opinion received for PCT Patent Application No. PCT/US2012/057319, mailed on Feb. 25, 2013, 7 pages.
International Search Report and Written Opinion received for PCT Patent Application No. PCT/US2012/057656, mailed on Feb. 25, 2013, 7 pages.
International Search Report and Written Opinion received for PCT Patent Application No. PCT/US2013/032498, mailed on Feb. 10, 2014, 18 pages.
International Search Report and Written Opinion received for PCT Patent Application No. PCT/US2013/044710, mailed on Aug. 15, 2013, 11 pages.
International Search Report and Written Opinion received for PCT Patent Application No. PCT/US2014/027882, mailed on Oct. 10, 2014, 11 pages.
International Search Report and Written Opinion received for PCT Patent Application No. PCT/US2015/019306, mailed on Jun. 17, 2015, 15 pages.
International Search Report and Written Opinion received for PCT Patent Application No. PCT/US2015/025188, mailed on Jun. 23, 2015, 11 pages.
International Search Report and Written Opinion received for PCT Patent Application No. PCT/US2015/030199, mailed on Aug. 14, 2015, 11 pages.
International Search Report and Written Opinion received for PCT Patent Application No. PCT/US2016/021012, mailed on Jun. 2, 2016, 15 pages.
International Search Report and Written Opinion received for PCT Patent Application No. PCT/US2017/032240, mailed on Sep. 21, 2017, 33 pages.
International Search Report and Written Opinion received for PCT Patent Application No. PCT/US2018/032904, mailed on Oct. 1, 2018, 21 pages.
International Search Report and Written Opinion received for PCT Patent Application No. PCT/US2021/048358, mailed on Feb. 24, 2022, 21 pages.
International Search Report and Written Opinion received for PCT Patent Application No. PCT/US2023/017280, mailed on Jun. 26, 2023, 20 pages.
International Search Report and Written Opinion received for PCT Patent Application No. PCT/US2023/020569, mailed on Nov. 13, 2023, 23 pages.
Invitation to Pay Additional Fees and Partial International Search Report received for PCT Patent Application No. PCT/US2018/032904, mailed on Jul. 31, 2018, 18 pages.
Invitation to Pay Additional Fees received for PCT Patent Application No. PCT/US17/31086, mailed on Jul. 14, 2017, 2 pages.
Invitation to Pay Additional Fees received for PCT Patent Application No. PCT/US17/32240, mailed on Jul. 12, 2017, 2 pages.
Invitation to Pay Additional Fees and Partial International Search Report received for PCT Patent Application No. PCT/US2023/020569, mailed on Sep. 21, 2023, 14 pages.

(56)  References Cited

OTHER PUBLICATIONS

Invitation to Pay Additional Fees received for PCT Patent Application No. PCT/US2014/027882, mailed on Aug. 5, 2014, 2 pages.
Invitation to Pay Additional Fees received for PCT Patent Application No. PCT/US2021/048358, mailed on Dec. 23, 2021, 14 pages.
Invitation to Pay Search Fees received for European Patent Application No. 15714698.6, mailed on Dec. 16, 2022, 4 pages.
Invitation to Pay Search Fees received for European Patent Application No. 18728002.9, mailed on Sep. 2, 2020, 8 pages.
Jarvie, "Alexa plays me music", Available online at: https://www.youtube.com/watch?v=bR2ZC8Sy8YQ, Feb. 23, 2015, 1 page.
Kimura, Ryoji, "Keynote presentation practice guide for iPad & iPhone", K.K. Rutles, first edition, Feb. 29, 2012, 4 pages (Official Copy Only). {See Communication under 37 CFR § 1.98(a) (3)}.
"LG G Pad 8.3 Tablet Q Remote User", Available at: <https://mushroomprincess.tistory.com/1320>, Dec. 26, 2013, 37 pages (20 pages of English Translation and 17 pages of Official Copy).
Mackie, Simon, "Emulate Safari's Reader Mode in Other Browsers With Readability", available online at "https://gigaom.com/2010/06/21/emulate-safaris-reader-mode-in-other-browsers-with-readability/", Jun. 21, 2010, 5 pages.
Minutes of Oral Hearing received for German Patent Application No. 102015208532.5, mailed on Dec. 13, 2019, 21 pages (3 pages of English Translation and 18 pages of Official Copy).
Minutes of Oral Proceedings received for European Patent Application No. 18208881.5, mailed on Dec. 22, 2022, 4 pages.
Minutes of Oral Proceedings received for European Patent Application No. 18728002.9, mailed on Dec. 22, 2022, 7 pages.
Minutes of the Oral Proceedings received for European Application No. 12770400.5, mailed on Nov. 6, 2018, 7 pages.
Minutes of the Oral Proceedings received for European Patent Application No. 18197583.0, mailed on Mar. 9, 2021, 6 pages.
Mozilla Services, "Firefox Sync Terms of Service (for versions prior to Firefox 29)", available online at <https://services.mozilla.com/tos/>, Aug. 19, 2010, 4 pages.
NBC News, "NBC News—YouTube Democratic Debate (full)", Online available at: https://www.youtube.com/watch?v=ti2Nokoq1J4, Jan. 17, 2016, 1 page.
Non-Final Office Action received for U.S. Appl. No. 15/952,736, mailed on Jun. 1, 2018, 12 pages.
Non-Final Office Action received for U.S. Appl. No. 13/492,057, mailed on Dec. 17, 2015, 25 pages.
Non-Final Office Action received for U.S. Appl. No. 14/503,327, mailed on Sep. 12, 2016, 10 pages.
Non-Final Office Action received for U.S. Appl. No. 13/492,057, mailed on Jul. 8, 2014, 14 pages.
Non-Final Office Action received for U.S. Appl. No. 14/641,289, mailed on Jul. 16, 2015, 31 pages.
Non-Final Office Action received for U.S. Appl. No. 14/641,289, mailed on Mar. 11, 2016, 26 pages.
Non-Final Office Action received for U.S. Appl. No. 14/841,455, mailed on Apr. 25, 2018, 13 pages.
Non-Final Office Action received for U.S. Appl. No. 16/679,967, mailed on Sep. 2, 2021, 12 pages.
Non-Final Office Action received for U.S. Appl. No. 13/248,872, mailed on May 19, 2014, 6 pages.
Non-Final Office Action received for U.S. Appl. No. 13/248,882, mailed on Jul. 10, 2013, 14 pages.
Non-Final Office Action received for U.S. Appl. No. 14/285,378, mailed on Dec. 21, 2015, 18 pages.
Non-Final Office Action received for U.S. Appl. No. 14/285,378, mailed on Jan. 21, 2015, 19 pages.
Non-Final Office Action received for U.S. Appl. No. 14/641,298, mailed on Mar. 6, 2017, 26 pages.
Non-Final Office Action received for U.S. Appl. No. 14/641,298, mailed on Nov. 29, 2019, 47 pages.
Non-Final Office Action received for U.S. Appl. No. 14/641,298, mailed on Sep. 19, 2018, 41 pages.
Non-Final Office Action received for U.S. Appl. No. 14/641,304, mailed on Feb. 27, 2019, 18 pages.
Non-Final Office Action received for U.S. Appl. No. 14/641,304, mailed on Mar. 4, 2020, 21 pages.
Non-Final Office Action received for U.S. Appl. No. 14/641,304, mailed on Sep. 11, 2017, 18 pages.
Non-Final Office Action received for U.S. Appl. No. 14/642,366, mailed on Aug. 24, 2015, 7 pages.
Non-Final Office Action received for U.S. Appl. No. 14/719,217, mailed on Jul. 26, 2018, 40 pages.
Non-Final Office Action received for U.S. Appl. No. 14/719,217, mailed on Jul. 28, 2016, 28 pages.
Non-Final Office Action received for U.S. Appl. No. 14/774,664, mailed on Mar. 7, 2017, 23 pages.
Non-Final Office Action received for U.S. Appl. No. 14/863,099, mailed on Dec. 2, 2015, 12 pages.
Non-Final Office Action received for U.S. Appl. No. 15/134,638, mailed on Sep. 20, 2016, 6 pages.
Non-Final Office Action received for U.S. Appl. No. 15/269,801, mailed on Dec. 30, 2016, 17 pages.
Non-Final Office Action received for U.S. Appl. No. 15/433,320, mailed on Jul. 31, 2020, 13 pages.
Non-Final Office Action received for U.S. Appl. No. 15/620,666, mailed on Mar. 28, 2018, 14 pages.
Non-Final Office Action received for U.S. Appl. No. 15/845,794, mailed on Oct. 15, 2018, 8 pages.
Non-Final Office Action received for U.S. Appl. No. 15/910,263, mailed on Jun. 15, 2020, 38 pages.
Non-Final Office Action received for U.S. Appl. No. 15/910,263, mailed on Mar. 4, 2019, 26 pages.
Non-Final Office Action received for U.S. Appl. No. 16/229,959, mailed on Oct. 31, 2019, 10 pages.
Non-Final Office Action received for U.S. Appl. No. 16/422,736, mailed on Jun. 23, 2020, 24 pages.
Non-Final Office Action received for U.S. Appl. No. 16/434,865, mailed on Jan. 16, 2020, 9 pages.
Non-Final Office Action received for U.S. Appl. No. 16/670,949, mailed on Dec. 9, 2020, 11 pages.
Non-Final Office Action received for U.S. Appl. No. 16/679,967, mailed on Apr. 19, 2022, 13 pages.
Non-Final Office Action received for U.S. Appl. No. 16/702,968, mailed on Apr. 8, 2020, 20 pages.
Non-Final Office Action received for U.S. Appl. No. 16/803,849, mailed on Jul. 13, 2020, 23 pages.
Non-Final Office Action received for U.S. Appl. No. 16/803,849, mailed on May 14, 2021, 34 pages.
Non-Final Office Action received for U.S. Appl. No. 16/807,604, mailed on Jun. 2, 2020, 28 pages.
Non-Final Office Action received for U.S. Appl. No. 16/836,571, mailed on Mar. 25, 2021, 28 pages.
Non-Final Office Action received for U.S. Appl. No. 16/987,003, mailed on May 10, 2021, 20 pages.
Non-Final Office Action received for U.S. Appl. No. 17/031,833, mailed on Dec. 7, 2020, 13 pages.
Non-Final Office Action received for U.S. Appl. No. 17/168,069, mailed on Jul. 21, 2021, 17 pages.
Non-Final Office Action received for U.S. Appl. No. 17/320,900, mailed on Dec. 22, 2022, 30 pages.
Non-Final Office Action received for U.S. Appl. No. 17/461,103, mailed on Nov. 22, 2021, 15 pages.
Non-Final Office Action received for U.S. Appl. No. 17/479,974, mailed on Feb. 22, 2023, 30 pages.
Non-Final Office Action received for U.S. Appl. No. 17/479,974, mailed on Oct. 10, 2023, 20 pages.
Non-Final Office Action received for U.S. Appl. No. 17/666,971, mailed on Dec. 8, 2022, 26 pages.
Non-Final Office Action received for U.S. Appl. No. 17/747,804, mailed on Mar. 1, 2023, 14 pages.
Non-Final Office Action received for U.S. Appl. No. 17/752,582, mailed on Mar. 6, 2023, 17 pages.
Non-Final Office Action received for U.S. Appl. No. 17/835,110, mailed on Apr. 3, 2023, 28 pages.

(56) References Cited

OTHER PUBLICATIONS

Non-Final Office Action received for U.S. Appl. No. 17/867,317, mailed on Feb. 28, 2023, 18 pages.

Non-Final Office Action received for U.S. Appl. No. 17/978,930, mailed on Feb. 12, 2024, 25 pages.

Non-Final Office Action received for U.S. Appl. No. 18/067,350, mailed on Aug. 3, 2023, 41 pages.

Non-Final Office Action received for U.S. Appl. No. 18/077,971, mailed on Apr. 3, 2023, 24 pages.

Non-Final Office Action received for U.S. Appl. No. 18/088,309, mailed on Sep. 21, 2023, 11 pages.

Non-Final Office Action received for U.S. Appl. No. 14/841,455, mailed on Apr. 11, 2019, 13 pages.

Non-Final Office Action received for U.S. Appl. No. 15/250,152, mailed on Apr. 6, 2018, 31 pages.

Non-Final Office Action received for U.S. Appl. No. 15/250,152, mailed on Mar. 2, 2017, 26 pages.

Non-Final Office Action received for U.S. Appl. No. 15/433,320, mailed on May 2, 2019, 27 pages.

Non-Final Office Action received for U.S. Appl. No. 15/945,610, mailed on Sep. 20, 2018, 9 pages.

Notice of Acceptance received for Australian Patent Application No. 2015201884, mailed on Oct. 4, 2016, 3 pages.

Notice of Acceptance received for Australian Patent Application No. 2016230001, mailed on May 25, 2018, 3 pages.

Notice of Acceptance received for Australian Patent Application No. 2017266867, mailed on Mar. 6, 2019, 3 pages.

Notice of Acceptance received for Australian Patent Application No. 2017284013, mailed on Aug. 26, 2020, 3 pages.

Notice of Acceptance received for Australian Patent Application No. 2018220115, mailed on Jun. 29, 2020, 3 pages.

Notice of Acceptance received for Australian Patent Application No. 2018223051, mailed on Oct. 30, 2018, 3 pages.

Notice of Acceptance received for Australian Patent Application No. 2018229544, mailed on May 4, 2020, 3 pages.

Notice of Acceptance received for Australian Patent Application No. 2018236872, mailed on Jul. 9, 2019, 3 pages.

Notice of Acceptance received for Australian Patent Application No. 2018271366, mailed on Mar. 31, 2023, 3 pages.

Notice of Acceptance received for Australian Patent Application No. 2019203473, mailed on Nov. 7, 2019, 3 pages.

Notice of Acceptance received for Australian Patent Application No. 2019268111, mailed on Feb. 18, 2021, 3 pages.

Notice of Acceptance received for Australian Patent Application No. 2020207785, mailed on May 4, 2022, 3 pages.

Notice of Acceptance received for Australian Patent Application No. 2020273355, mailed on Jan. 17, 2022, 3 pages.

Notice of Acceptance received for Australian Patent Application No. 2021201243, mailed on Feb. 23, 2023, 3 pages.

Notice of Acceptance received for Australian Patent Application No. 2021203669, mailed on May 25, 2022, 3 pages.

Notice of Acceptance received for Australian Patent Application No. 2021204454, mailed on Feb. 25, 2022, 3 pages.

Notice of Acceptance received for Australian Patent Application No. 2022200515, mailed on Dec. 21, 2022, 3 pages.

Notice of Acceptance received for Australian Patent Application No. 2022200901, mailed on Mar. 9, 2023, 3 pages.

Notice of Acceptance received for Australian Patent Application No. 2022241590, mailed on Nov. 14, 2023, 3 pages.

Notice of Allowance received for Chinese Patent Application No. 201280047459.6, mailed on Jan. 31, 2018, 2 pages (1 page of English Translation and 1 page of Official Copy).

Notice of Allowance received for Chinese Patent Application No. 201580028491.3, mailed on Mar. 29, 2019, 2 pages (1 page of English Translation and 1 page of Official Copy).

Notice of Allowance received for Chinese Patent Application No. 201580043701.6, mailed on Jan. 26, 2022, 2 pages (1 page of English Translation and 1 page of Official Copy).

Notice of Allowance received for Chinese Patent Application No. 201620051290.7, mailed on Jun. 22, 2016, 2 pages (Official Copy only). {See Communication under 37 CFR § 1.98(a) (3)}.

Notice of Allowance received for Chinese Patent Application No. 201680011682.3, mailed on Aug. 5, 2020, 2 pages (1 page of English Translation and 1 page of Official Copy).

Notice of Allowance received for Chinese Patent Application No. 201780002398.4, mailed on Jun. 17, 2019, 2 pages (1 page of English Translation and 1 page of Official Copy).

Notice of Allowance received for Chinese Patent Application No. 201780033899.9, mailed on Feb. 8, 2022, 2 pages (1 page of English Translation and 1 page of Official Copy).

Notice of Allowance received for Chinese Patent Application No. 201810338038.8, mailed on Jun. 30, 2020, 2 pages (1 page of English Translation and 1 page of Official Copy).

Notice of Allowance received for Chinese Patent Application No. 201810338040.5, mailed on Mar. 30, 2022, 6 pages (2 pages of English Translation and 4 pages of Official Copy).

Notice of Allowance received for Chinese Patent Application No. 201810339290.0, mailed on Mar. 9, 2022, 2 pages (1 page of English Translation and 1 page of Official Copy).

Notice of Allowance received for Chinese Patent Application No. 201811460172.1, mailed on Jan. 11, 2021, 2 pages (1 page of English Translation and 1 page of Official Copy).

Notice of Allowance received for Chinese Patent Application No. 201811539260.0, mailed on Mar. 15, 2021, 2 pages (1 page of English Translation and 1 page of Official Copy).

Notice of Allowance received for Chinese Patent Application No. 201880001436.9, mailed on May 8, 2020, 3 pages (2 pages of English Translation and 1 page of Official Copy).

Notice of Allowance received for Chinese Patent Application No. 201910475434.X, mailed on Mar. 10, 2021, 2 pages (1 page of English Translation and 1 page of Official Copy).

Notice of Allowance received for Chinese Patent Application No. 202010125114.4, mailed on Nov. 24, 2021, 2 pages (1 page of English Translation and 1 page of Official Copy).

Notice of Allowance received for Chinese Patent Application No. 202111432087.6, mailed on Feb. 9, 2024, 2 pages (1 page of English Translation and 1 page of Official Copy).

Notice of Allowance received for Chinese Patent Application No. 201520364847.8, mailed on Nov. 5, 2015, 9 pages (7 page of English Translation and 2 pages of Official Copy).

Notice of Allowance received for Danish Patent Application No. PA201770408, mailed on Feb. 8, 2019, 2 pages.

Notice of Allowance received for Japanese Patent Application No. 2015-095183, mailed on Apr. 21, 2017, 3 pages (Official Copy Only). {See Communication under 37 CFR § 1.98(a) (3)}.

Notice of Allowance received for Japanese Patent Application No. 2017-101107, mailed on Jun. 3, 2019, 5 pages (1 page of English Translation and 4 pages of Official Copy).

Notice of Allowance received for Japanese Patent Application No. 2017-507413, mailed on Jul. 22, 2019, 4 pages (1 page of English Translation and 3 pages of Official Copy).

Notice of Allowance received for Japanese Patent Application No. 2017-543762, mailed on Mar. 30, 2020, 4 pages (1 page of English Translation and 3 pages of Official Copy).

Notice of Allowance received for Japanese Patent Application No. 2018-560107, mailed on Dec. 6, 2019, 4 pages (1 page of English Translation and 3 pages of Official Copy).

Notice of Allowance received for Japanese Patent Application No. 2019-116580, mailed on Oct. 2, 2020, 4 pages (1 page of English Translation and 3 pages of Official Copy).

Notice of Allowance received for Japanese Patent Application No. 2019-238894, mailed on Oct. 5, 2020, 4 pages (1 page of English Translation and 3 pages of Official Copy).

Notice of Allowance received for Japanese Patent Application No. 2020-183773, mailed on Dec. 23, 2021, 4 pages (1 page of English Translation and 3 pages of Official Copy).

Notice of Allowance received for Japanese Patent Application No. 2020-184605, mailed on Oct. 10, 2023, 4 pages (1 page of English Translation and 3 pages of Official Copy).

(56) References Cited

OTHER PUBLICATIONS

Notice of Allowance received for Japanese Patent Application No. 2021-074395, mailed on Jun. 27, 2022, 4 pages (1 page of English Translation and 3 pages of Official Copy).

Notice of Allowance received for Japanese Patent Application No. 2022-007217, mailed on Apr. 10, 2023, 4 pages (1 page of English Translation and 3 pages of Official Copy).

Notice of Allowance received for Korean Patent Application No. 10-2015-0072162, mailed on Dec. 27, 2017, 4 pages (2 pages of English Translation and 2 pages of Official Copy).

Notice of Allowance received for Korean Patent Application No. 10-2016-7035555, mailed on Sep. 23, 2019, 3 pages (1 page of English Translation and 2 pages of Official Copy).

Notice of Allowance received for Korean Patent Application No. 10-2017-7012145, mailed on Oct. 30, 2019, 3 pages (1 page of English Translation and 2 pages of Official Copy).

Notice of Allowance received for Korean Patent Application No. 10-2017-7022905, mailed on Jul. 31, 2019, 4 pages (2 pages of English Translation and 2 pages of Official Copy).

Notice of Allowance received for Korean Patent Application No. 10-2018-0035949, mailed on Nov. 28, 2019, 3 pages (1 page of English Translation and 2 pages of Official Copy).

Notice of Allowance received for Korean Patent Application No. 10-2018-7033301, mailed on Feb. 20, 2019, 5 pages (2 pages of English Translation and 3 pages of Official Copy).

Notice of Allowance received for Korean Patent Application No. 10-2019-7014494, mailed on Mar. 19, 2020, 4 pages (1 page of English Translation and 3 pages of Official Copy).

Notice of Allowance received for Korean Patent Application No. 10-2020-0024632, mailed on Jul. 26, 2021, 3 pages (1 page of English Translation and 2 pages of Official Copy).

Notice of Allowance received for Korean Patent Application No. 10-2020-7002929, mailed on Nov. 26, 2020, 3 pages (1 page of English Translation and 2 pages of Official Copy).

Notice of Allowance received for Korean Patent Application No. 10-2020-7017803, mailed on Nov. 5, 2020, 6 pages (2 pages of English Translation and 4 pages of Official Copy).

Notice of Allowance received for Korean Patent Application No. 10-2021-0143923, mailed on Jan. 27, 2022, 4 pages (1 page of English Translation and 3 pages of Official Copy).

Notice of Allowance received for Korean Patent Application No. 10-2021-7005691, mailed on Mar. 29, 2021, 3 pages (1 page of English Translation and 2 pages of Official Copy).

Notice of Allowance received for Korean Patent Application No. 10-2021-7020549, mailed on Jul. 13, 2021, 3 pages (1 page of English Translation and 2 pages of Official Copy).

Notice of Allowance received for Korean Patent Application No. 10-2021-7032984, mailed on Jun. 29, 2022, 5 pages (2 pages of English Translation and 3 pages of Official Copy).

Notice of Allowance received for Korean Patent Application No. 10-2022-7033655, mailed on Nov. 29, 2023, 6 pages (2 pages of English Translation and 4 pages of Official Copy).

Notice of Allowance received for Korean Patent Application No. 10-2014-7008348, mailed on Feb. 21, 2019, 5 pages (2 pages of English Translation and 3 pages of Official Copy).

Notice of Allowance received for Taiwanese Patent Application No. 102120412, mailed on Oct. 28, 2015, 5 pages (2 pages of English Translation and 3 pages of Official copy).

Notice of Allowance received for Taiwanese Patent Application No. 104114953, mailed on Oct. 17, 2017, 3 pages (Official Copy only). {See Communication under 37 CFR § 1.98(a) (3)}.

Notice of Allowance Received for Taiwanese Patent Application No. 104117041, mailed on Feb. 24, 2017, 3 pages (Official Copy only). {See Communication under 37 CFR § 1.98(a) (3)}.

Notice of Allowance received for Taiwanese Patent Application No. 106144804, mailed on Jun. 27, 2018, 6 pages (2 pages of English Translation and 4 pages of Official Copy).

Notice of Allowance received for Taiwanese Patent Application No. 104117042, mailed on Nov. 17, 2017, 5 pages (2 pages of English Translation and 3 pages of Official Copy).

Notice of Allowance received for U.S. Appl. No. 16/702,968, mailed on Apr. 21, 2021, 20 pages.

Notice of Allowance received for U.S. Appl. No. 13/248,872, mailed on Dec. 4, 2014, 7 pages.

Notice of Allowance received for U.S. Appl. No. 13/248,882, mailed on Mar. 13, 2014, 16 pages.

Notice of Allowance received for U.S. Appl. No. 13/492,057, mailed on Jan. 3, 2017, 5 pages.

Notice of Allowance received for U.S. Appl. No. 13/492,057, mailed on May 18, 2017, 3 pages.

Notice of Allowance received for U.S. Appl. No. 14/285,378, mailed May 19, 2016, 10 pages.

Notice of Allowance received for U.S. Appl. No. 14/503,327, mailed on Mar. 22, 2018, 5 pages.

Notice of Allowance received for U.S. Appl. No. 14/503,327, mailed on Nov. 30, 2017, 5 pages.

Notice of Allowance received for U.S. Appl. No. 14/641,289, mailed on Aug. 24, 2017, 6 pages.

Notice of Allowance received for U.S. Appl. No. 14/641,289, mailed on Dec. 12, 2017, 5 pages.

Notice of Allowance received for U.S. Appl. No. 14/641,298, mailed on Nov. 29, 2021, 8 pages.

Notice of Allowance received for U.S. Appl. No. 14/641,304, mailed on Sep. 9, 2020, 15 pages.

Notice of Allowance received for U.S. Appl. No. 14/642,366, mailed on Jan. 14, 2016, 8 pages.

Notice of Allowance received for U.S. Appl. No. 14/719,217, mailed on Feb. 13, 2019, 13 pages.

Notice of Allowance received for U.S. Appl. No. 15/134,638, mailed on Apr. 10, 2018, 7 pages.

Notice of Allowance received for U.S. Appl. No. 15/134,638, mailed on Jul. 27, 2018, 7 pages.

Notice of Allowance received for U.S. Appl. No. 15/250,152, mailed on May 1, 2019, 12 pages.

Notice of Allowance received for U.S. Appl. No. 15/269,801, mailed on May 3, 2017, 6 pages.

Notice of Allowance received for U.S. Appl. No. 15/269,801, mailed on Sep. 7, 2017, 5 pages.

Notice of Allowance received for U.S. Appl. No. 15/433,320, mailed on Apr. 1, 2021, 19 pages.

Notice of Allowance received for U.S. Appl. No. 15/845,794, mailed on Feb. 14, 2019, 6 pages.

Notice of Allowance received for U.S. Appl. No. 15/910,263, mailed on Feb. 18, 2021, 3 pages.

Notice of Allowance received for U.S. Appl. No. 15/910,263, mailed on Jan. 22, 2021, 33 pages.

Notice of Allowance received for U.S. Appl. No. 15/945,610, mailed on May 20, 2019, 7 pages.

Notice of Allowance received for U.S. Appl. No. 15/952,736, mailed on Sep. 11, 2018, 16 pages.

Notice of Allowance received for U.S. Appl. No. 16/131,767, mailed on Sep. 6, 2019, 7 pages.

Notice of Allowance received for U.S. Appl. No. 16/229,959, mailed on Dec. 4, 2019, 6 pages.

Notice of Allowance received for U.S. Appl. No. 16/422,736, mailed on Apr. 20, 2021, 12 pages.

Notice of Allowance received for U.S. Appl. No. 16/422,736, mailed on Jun. 15, 2021, 13 pages.

Notice of Allowance received for U.S. Appl. No. 16/434,865, mailed on Apr. 7, 2020, 5 pages.

Notice of Allowance received for U.S. Appl. No. 16/670,949, mailed on May 27, 2021, 7 pages.

Notice of Allowance received for U.S. Appl. No. 16/670,949, mailed on Sep. 14, 2021, 7 pages.

Notice of Allowance received for U.S. Appl. No. 16/679,967, mailed on Jun. 15, 2022, 7 pages.

Notice of Allowance received for U.S. Appl. No. 16/679,967, mailed on Nov. 2, 2022, 7 pages.

Notice of Allowance received for U.S. Appl. No. 16/803,849, mailed on May 17, 2022, 12 pages.

Notice of Allowance received for U.S. Appl. No. 16/807,604, mailed on Apr. 30, 2021, 25 pages.

(56) References Cited

OTHER PUBLICATIONS

Notice of Allowance received for U.S. Appl. No. 16/836,571, mailed on Feb. 14, 2022, 31 pages.
Notice of Allowance received for U.S. Appl. No. 16/836,571, mailed on Sep. 8, 2021, 25 pages.
Notice of Allowance received for U.S. Appl. No. 16/987,003, mailed on Aug. 18, 2021, 9 pages.
Notice of Allowance received for U.S. Appl. No. 17/031,833, mailed on Jun. 25, 2021, 15 pages.
Notice of Allowance received for U.S. Appl. No. 17/031,833, mailed on Sep. 20, 2021, 6 pages.
Notice of Allowance received for U.S. Appl. No. 17/168,069, mailed on Jan. 19, 2022, 12 pages.
Notice of Allowance received for U.S. Appl. No. 17/168,069, mailed on Mar. 22, 2022, 5 pages.
Notice of Allowance received for U.S. Appl. No. 17/320,900, mailed on Aug. 29, 2023, 14 pages.
Notice of Allowance received for U.S. Appl. No. 17/320,900, mailed on Nov. 6, 2023, 9 pages.
Notice of Allowance received for U.S. Appl. No. 17/461,103, mailed on Jun. 20, 2022, 6 pages.
Notice of Allowance received for U.S. Appl. No. 17/461,103, mailed on Mar. 17, 2022, 10 pages.
Notice of Allowance received for U.S. Appl. No. 17/519,025, mailed on Jun. 22, 2023, 7 pages.
Notice of Allowance received for U.S. Appl. No. 17/519,025, mailed on Mar. 2, 2023, 8 pages.
Notice of Allowance received for U.S. Appl. No. 17/666,971, mailed on Aug. 16, 2023, 8 pages.
Notice of Allowance received for U.S. Appl. No. 17/666,971, mailed on Dec. 15, 2023, 8 pages.
Notice of Allowance received for U.S. Appl. No. 17/752,582, mailed on Jun. 13, 2023, 18 pages.
Notice of Allowance received for U.S. Appl. No. 17/867,317, mailed on Aug. 30, 2023, 6 pages.
Notice of Allowance received for U.S. Appl. No. 17/867,317, mailed on Jul. 6, 2023, 11 pages.
Notice of Allowance received for U.S. Appl. No. 18/077,891, mailed on Oct. 19, 2023, 18 pages.
Notice of Allowance received for U.S. Appl. No. 18/077,905, mailed on Mar. 24, 2023, 18 pages.
Notice of Allowance received for U.S. Appl. No. 14/841,455, mailed on Oct. 22, 2019, 10 pages.
Office Action received for Australian Patent Application No. 2016230001, mailed on Feb. 7, 2018, 3 pages.
Office Action received for Australian Patent Application No. 2015201884, mailed on Oct. 12, 2015, 4 pages.
Office Action received for Australian Patent Application No. 2015100490, issued on Jun. 9, 2015, 6 pages.
Office Action received for Australian Patent Application No. 2015100490, mailed on Dec. 15, 2016, 2 pages.
Office Action received for Australian Patent Application No. 2015302298, mailed on Apr. 4, 2018, 3 pages.
Office Action received for Australian Patent Application No. 2015302298, mailed on Jul. 20, 2018, 3 pages.
Office Action received for Australian Patent Application No. 2015302298, mailed on Sep. 14, 2017, 3 pages.
Office Action received for Australian Patent Application No. 2015302298, mailed on Sep. 4, 2018, 5 pages.
Office Action received for Australian Patent Application No. 2016266010, mailed on Aug. 23, 2018, 4 pages.
Office Action received for Australian Patent Application No. 2016266010, mailed on May 4, 2018, 4 pages.
Office Action received for Australian Patent Application No. 2016266010, mailed on Nov. 28, 2018, 5 pages.
Office Action received for Australian Patent Application No. 2016266010, mailed on Nov. 30, 2017, 5 pages.
Office Action received for Australian Patent Application No. 2017100553, mailed on Aug. 4, 2017, 5 pages.

Office Action received for Australian Patent Application No. 2017101563, mailed on Jan. 22, 2018, 2 pages.
Office Action received for Australian Patent Application No. 2017101563, mailed on Jun. 26, 2018, 3 pages.
Office Action received for Australian Patent Application No. 2017266867, mailed on Dec. 6, 2018, 3 pages.
Office Action received for Australian Patent Application No. 2017284013, mailed on Mar. 19, 2020, 3 pages.
Office Action received for Australian Patent Application No. 2018101014, mailed on Jan. 18, 2019, 5 pages.
Office Action received for Australian Patent Application No. 2018101014, mailed on Sep. 19, 2018, 4 pages.
Office Action received for Australian Patent Application No. 2018220115, mailed on Apr. 21, 2020, 3 pages.
Office Action received for Australian Patent Application No. 2018220115, mailed on Oct. 4, 2019, 3 pages.
Office Action received for Australian Patent Application No. 2018229544, mailed on Nov. 15, 2019, 4 pages.
Office Action received for Australian Patent Application No. 2018236870, mailed on Jul. 29, 2019, 7 pages.
Office Action received for Australian Patent Application No. 2018236870, mailed on Nov. 21, 2018, 10 pages.
Office Action received for Australian Patent Application No. 2018236870, mailed on Oct. 31, 2019, 8 pages.
Office Action received for Australian Patent Application No. 2018236872, mailed on Nov. 23, 2018, 4 pages.
Office Action received for Australian Patent Application No. 2018271366, mailed on Feb. 25, 2020, 5 pages.
Office Action received for Australian Patent Application No. 2018271366, mailed on Jan. 19, 2021, 5 pages.
Office Action received for Australian Patent Application No. 2018271366, mailed on May 17, 2021, 5 pages.
Office Action received for Australian Patent Application No. 2018271366, mailed on Oct. 26, 2020, 5 pages.
Office Action received for Australian Patent Application No. 2019203473, mailed on Oct. 25, 2019, 2 pages.
Office Action received for Australian Patent Application No. 2019268111, mailed on Oct. 27, 2020, 7 pages.
Office Action received for Australian Patent Application No. 2020207785, mailed on Dec. 14, 2021, 5 pages.
Office Action received for Australian Patent Application No. 2020207785, mailed on Jul. 13, 2021, 3 pages.
Office Action received for Australian Patent Application No. 2020273355, mailed on Jul. 6, 2021, 3 pages.
Office Action received for Australian Patent Application No. 2020273355, mailed on Nov. 23, 2021, 6 pages.
Office Action received for Australian Patent Application No. 2021201243, mailed on Dec. 12, 2022, 3 pages.
Office Action received for Australian Patent Application No. 2021201243, mailed on Feb. 17, 2022, 4 pages.
Office Action received for Australian Patent Application No. 2021201243, mailed on Jun. 1, 2022, 5 pages.
Office Action received for Australian Patent Application No. 2021203669, mailed on Apr. 5, 2022, 3 pages.
Office Action received for Australian Patent Application No. 2021204454, mailed on Aug. 9, 2021, 7 pages.
Office Action received for Australian Patent Application No. 2022200515, mailed on Nov. 2, 2022, 2 pages.
Office Action received for Australian Patent Application No. 2022200901, mailed on Dec. 19, 2022, 4 pages.
Office Action received for Australian Patent Application No. 2022218517, mailed on Apr. 27, 2023, 7 pages.
Office Action received for Australian Patent Application No. 2022218517, mailed on Dec. 21, 2023, 5 pages.
Office Action received for Australian Patent Application No. 2022218517, mailed on Jul. 24, 2023, 6 pages.
Office Action received for Australian Patent Application No. 2022241590, mailed on Aug. 15, 2023, 6 pages.
Office Action received for Australian Patent Application No. 2022241590, mailed on Jun. 7, 2023, 7 pages.
Office Action received for Australian Patent Application No. 2022241590, mailed on Mar. 17, 2023, 5 pages.

(56)         References Cited

OTHER PUBLICATIONS

Office Action received for Australian Patent Application No. 2022241590, mailed on Nov. 18, 2022, 8 pages.

Office Action received for Australian Patent Application No. 2023201057, mailed on Jan. 25, 2024, 6 pages.

Office Action received for Chinese Patent Application No. 201510288981.9, mailed on Jul. 1, 2019, 16 pages (8 pages of English Translation and 8 pages of Official Copy).

Office Action received for Chinese Patent Application No. 201510288981.9, mailed on Jul. 3, 2018, 19 pages (8 pages of English Translation and 11 pages of official Copy).

Office Action received for Chinese Patent Application No. 201510288981.9, mailed on Mar. 6, 2019, 20 pages (10 pages of English Translation and 10 pages of Official Copy).

Office Action received for Chinese Patent Application No. 201580028491.3, mailed on Oct. 8, 2018, 9 pages (3 pages of English Translation and 6 pages of Official Copy).

Office Action received for Chinese Patent Application No. 201580043701.6, mailed on Dec. 24, 2018, 20 pages (5 pages of English Translation and 15 pages of Official Copy).

Office Action received for Chinese Patent Application No. 201580043701.6, mailed on May 8, 2021, 10 pages (1 page of English Translation and 9 pages of Official Copy).

Office Action received for Chinese Patent Application No. 201580043701.6, mailed on Nov. 4, 2019, 20 pages (6 pages of English Translation and 14 pages of Official Copy).

Office Action received for Chinese Patent Application No. 201580043701.6, mailed on Oct. 12, 2020, 22 pages (5 pages of English Translation and 17 pages of Official Copy).

Office Action received for Chinese Patent Application No. 201580043701.6, mailed on Sep. 10, 2021, 10 pages (5 pages of English Translation and 5 pages of Official Copy).

Office Action received for Chinese Patent Application No. 201680011682.3, mailed on Dec. 2, 2019, 14 pages (7 pages of English Translation and 7 pages of Official Copy).

Office Action received for Chinese Patent Application No. 201711292804.3, mailed on Aug. 5, 2020, 26 pages (16 pages of English Translation and 10 pages of Official Copy).

Office Action received for Chinese Patent Application No. 201711292804.3, mailed on Feb. 23, 2021, 17 pages (8 pages of English Translation and 9 pages of Official Copy).

Office Action received for Chinese Patent Application No. 201711292804.3, mailed on Sep. 10, 2021, 19 pages (8 pages of English Translation and 11 pages of Official Copy).

Office Action received for Chinese Patent Application No. 201780002398.4, mailed on Feb. 27, 2019, 6 pages (3 pages of English Translation and 3 pages of Official Copy).

Office Action received for Chinese Patent Application No. 201780002398.4, mailed on Sep. 12, 2018, 17 pages (5 pages of English Translation and 12 pages of Official Copy).

Office Action received for Chinese Patent Application No. 201780033899.9, mailed on Sep. 3, 2021, 12 pages (6 pages of English Translation and 6 pages of Official Copy).

Office Action received for Chinese Patent Application No. 201810338038.8, mailed on Jan. 21, 2020, 26 pages (13 pages of English Translation and 13 pages of Official Copy).

Office Action received for Chinese Patent Application No. 201810338038.8, mailed on May 14, 2019, 26 pages (13 pages of English Translation and 13 pages of Official Copy).

Office Action received for Chinese Patent Application No. 201810338040.5, mailed on Jun. 3, 2021, 25 pages (15 pages of English Translation and 10 pages of Official Copy).

Office Action received for Chinese Patent Application No. 201810338040.5, mailed on Oct. 25, 2021, 22 pages (13 pages of English Translation and 9 pages of Official Copy).

Office Action received for Chinese Patent Application No. 201810338826.7, mailed on Apr. 3, 2019, 21 pages (13 pages of English Translation and 8 pages of Official Copy).

Office Action received for Chinese Patent Application No. 201810338826.7, mailed on Jan. 16, 2020, 16 Pages (10 pages of English Translation and 6 pages of Official Copy).

Office Action received for Chinese Patent Application No. 201810338826.7, mailed on Oct. 21, 2019, 19 pages (12 pages of English Translation and 7 pages of Official Copy).

Office Action received for Chinese Patent Application No. 201810339290.0, mailed on Jun. 4, 2021, 20 pages (11 pages of English Translation and 9 pages of Official Copy).

Office Action received for Chinese Patent Application No. 201810339290.0, mailed on Oct. 18, 2021, 20 pages (11 pages of English Translation and 9 pages of Official Copy).

Office Action received for Chinese Patent Application No. 201811460172.1, mailed on Jan. 21, 2020, 17 pages (8 pages of English Translation and 9 pages of Official Copy).

Office Action received for Chinese Patent Application No. 201811460172.1, mailed on Oct. 14, 2020, 7 pages (4 pages of English Translation and 3 pages of Official Copy).

Office Action received for Chinese Patent Application No. 201811539259.8, mailed on Apr. 3, 2020, 10 pages (6 pages of English Translation and 4 pages of Official Copy).

Office Action received for Chinese Patent Application No. 201811539259.8, mailed on Mar. 13, 2023, 16 pages (8 pages of English Translation and 8 pages of Official Copy).

Office Action received for Chinese Patent Application No. 201811539259.8, mailed on May 24, 2023, 25 pages (5 pages of English Translation and 20 pages of Official Copy).

Office Action received for Chinese Patent Application No. 201811539259.8, mailed on Sep. 3, 2020, 10 pages (6 pages of English Translation and 4 pages of Official Copy).

Office Action received for Chinese Patent Application No. 201811539259.8, mailed on Sep. 18, 2019, 12 pages (6 pages of English Translation and 6 pages of Official Copy).

Office Action received for Chinese Patent Application No. 201811539260.0, mailed on Jun. 3, 2020, 8 pages (5 pages of English Translation and 3 pages of Official Copy).

Office Action received for Chinese Patent Application No. 201811539260.0, mailed on Nov. 4, 2020, 9 pages (5 pages of English Translation and 4 pages of Official Copy).

Office Action received for Chinese Patent Application No. 201811539260.0, mailed on Oct. 8, 2019, 14 pages (7 pages of English Translation and 7 pages of Official Copy).

Office Action received for Chinese Patent Application No. 201880001436.9, mailed on Apr. 28, 2019, 19 pages (11 pages of English Translation and 8 pages of Official Copy).

Office Action received for Chinese Patent Application No. 201880001436.9, mailed on Nov. 6, 2019, 24 pages (15 pages of English Translation and 9 pages of Official Copy).

Office Action received for Chinese Patent Application No. 201910475434.X, mailed on Dec. 4, 2019, 14 pages (8 pages of English Translation and 6 pages of Official Copy).

Office Action received for Chinese Patent Application No. 201910475434.X, mailed on Jun. 3, 2020, 9 pages (5 pages of English Translation and 4 pages of Official Copy).

Office Action received for Chinese Patent Application No. 201910475434.X, mailed on Oct. 30, 2020, 9 pages (5 pages of English Translation and 4 pages of Official Copy).

Office Action received for Chinese Patent Application No. 201911128105.4, mailed on Apr. 8, 2021, 10 pages (5 pages of English Translation and 5 pages of Official Copy).

Office Action received for Chinese Patent Application No. 201911128105.4, mailed on Jan. 4, 2021, 14 pages (7 pages of English Translation and 7 pages of Official Copy).

Office Action received for Chinese Patent Application No. 201911128105.4, mailed on Jul. 3, 2020, 18 pages (9 pages of English Translation and 9 pages of Official Copy).

Office Action received for Chinese Patent Application No. 202010125114.4, mailed on Aug. 21, 2020, 16 pages (8 pages of English Translation and 8 pages of Official Copy).

Office Action received for Chinese Patent Application No. 202010125114.4, mailed on Jun. 7, 2021, 7 pages (4 pages of English Translation and 3 pages of Official Copy).

(56) References Cited

OTHER PUBLICATIONS

Office Action received for Chinese Patent Application No. 202010125114.4, mailed on Mar. 1, 2021, 15 pages (9 pages of English Translation and 6 pages of Official Copy).

Office Action received for Chinese Patent Application No. 202011083486.1, mailed on Jan. 16, 2024, 21 pages (7 pages of English Translation and 14 pages of Official Copy).

Office Action received for Chinese Patent Application No. 202211081603.X, mailed on Jan. 10, 2024, 10 pages (5 pages of English Translation and 5 pages of Official Copy).

Office Action received for Danish Patent Application No. PA201570256, mailed on Jul. 7, 2015, 2 pages.

Office Action received for Danish Patent Application No. PA201570256, mailed on Mar. 17, 2016, 5 pages.

Office Action received for Danish Patent Application No. PA201570256, mailed on May 23, 2017, 3 pages.

Office Action received for Danish Patent Application No. PA201570256, mailed on Oct. 10, 2016, 3 pages.

Office Action received for Danish Patent Application No. PA201670622, mailed on Aug. 17, 2018, 4 pages.

Office Action received for Danish Patent Application No. PA201670622, mailed on May 30, 2017, 4 pages.

Office Action received for Danish Patent Application No. PA201670622, mailed on Nov. 1, 2017, 5 pages.

Office Action Received for Danish Patent Application No. PA201670622, mailed on Oct. 31, 2016, 11 pages.

Office Action received for Danish Patent Application No. PA201670628, mailed on Jun. 6, 2017, 3 pages.

Office Action received for Danish Patent Application No. PA201670628, mailed on Oct. 26, 2016, 7 pages.

Office Action received for Danish Patent Application No. PA201770392, mailed on Apr. 17, 2018, 2 pages.

Office Action received for Danish Patent Application No. PA201770392, mailed on Dec. 8, 2017, 4 pages.

Office Action received for Danish Patent Application No. PA201770392, mailed on Jun. 20, 2017, 11 pages.

Office Action received for Danish Patent Application No. PA201770401, mailed on Jan. 31, 2018, 3 pages.

Office Action received for Danish Patent Application No. PA201770401, mailed on May 17, 2018, 3 pages.

Office Action received for Danish Patent Application No. PA201770402, mailed on Apr. 16, 2018, 5 pages.

Office Action received for Danish Patent Application No. PA201770402, mailed on Dec. 18, 2017, 6 pages.

Office Action received for Danish Patent Application No. PA201770402, mailed on Jun. 19, 2017, 11 pages.

Office Action received for Danish Patent Application No. PA201770403, mailed on Dec. 12, 2017, 3 pages.

Office Action received for Danish Patent Application No. PA201770403, mailed on Jun. 16, 2017, 8 pages.

Office Action received for Danish Patent Application No. PA201770404, mailed on Aug. 8, 2018, 4 pages.

Office Action received for Danish Patent Application No. PA201770404, mailed on Dec. 1, 2017, 5 pages.

Office Action received for Danish Patent Application No. PA201770404, mailed on Feb. 21, 2019, 2 pages.

Office Action received for Danish Patent Application No. PA201770404, mailed on May 1, 2019, 2 pages.

Office Action received for Danish Patent Application No. PA201770406, mailed on Feb. 27, 2018, 7 pages.

Office Action received for Danish Patent Application No. PA201770406, mailed on Jan. 25, 2019, 8 pages.

Office Action received for Danish Patent Application No. PA201770406, mailed on Jun. 22, 2017, 11 pages.

Office Action received for Danish Patent Application No. PA201770406, mailed on Mar. 26, 2019, 3 pages.

Office Action received for Danish Patent Application No. PA201770406, mailed on Nov. 11, 2019, 4 pages.

Office Action received for Danish Patent Application No. PA201770408, mailed on Dec. 21, 2017, 6 pages.

Office Action received for Danish Patent Application No. PA201770408, mailed on Jun. 20, 2017, 9 pages.

Office Action received for Danish Patent Application No. PA201770408, mailed on May 3, 2018, 7 pages.

Office Action received for Danish Patent Application No. PA201770410, mailed on Apr. 9, 2018, 5 pages.

Office Action received for Danish Patent Application No. PA201770410, mailed on Jun. 23, 2017, 9 pages.

Office Action received for Danish Patent Application No. PA201770410, mailed on Nov. 22, 2018, 5 pages.

Office Action received for Danish Patent Application No. PA201770782, mailed on Jan. 26, 2018, 8 pages.

Office Action received for Danish Patent Application No. PA201770782, mailed on Nov. 22, 2018, 3 pages.

Office Action received for Danish Patent Application No. PA201870060, mailed on Jan. 15, 2019, 4 pages.

Office Action received for Danish Patent Application No. PA201870060, mailed on Jul. 25, 2019, 2 pages.

Office Action received for Danish Patent Application No. PA201870419, mailed on Feb. 27, 2020, 8 pages.

Office Action received for Danish Patent Application No. PA201870419, mailed on Sep. 30, 2019, 4 pages.

Office Action received for Danish Patent Application No. PA201870598, mailed on May 1, 2019, 3 pages.

Office Action received for Danish Patent Application No. PA201870598, mailed on Nov. 8, 2019, 4 pages.

Office Action received for Danish Patent Application No. PA202070560, mailed on Dec. 11, 2020, 7 pages.

Office Action received for Danish Patent Application No. PA202070560, mailed on Mar. 10, 2021, 7 pages.

Office Action received for Danish Patent Application No. PA202170320, mailed on May 3, 2022, 3 pages.

Office Action received for Danish Patent Application No. PA202270464, mailed on Dec. 20, 2022, 3 pages.

Office Action received for Danish Patent Application No. PA202270464, mailed on Oct. 25, 2022, 9 pages.

Office Action received for European Patent Application No. 12770400.5, mailed on Mar. 10, 2015, 5 pages.

Office Action received for European Patent Application No. 12773460.6, mailed on Feb. 19, 2018, 6 pages.

Office Action received for European Patent Application No. 13171047.7, mailed on May 24, 2017, 7 pages.

Office Action received for European Patent Application No. 15713062.6, mailed on Dec. 6, 2017, 7 pages.

Office Action received for European Patent Application No. 15714698.6, mailed on Apr. 18, 2023, 14 pages.

Office Action received for European Patent Application No. 15714698.6, mailed on Oct. 13, 2021, 2 pages.

Office Action received for European Patent Application No. 15719347.5, mailed on Apr. 9, 2020, 4 pages.

Office Action received for European Patent Application No. 15719347.5, mailed on Jun. 17, 2019, 4 pages.

Office Action received for European Patent Application No. 16710590.7, mailed on Mar. 15, 2019, 10 pages.

Office Action received for European Patent Application No. 17799904.2, mailed on Oct. 21, 2020, 6 pages.

Office Action received for European Patent Application No. 17813737.8, mailed on Apr. 16, 2021, 7 pages.

Office Action received for European Patent Application No. 18178147.7, mailed on Mar. 20, 2020, 4 pages.

Office Action received for European Patent Application No. 18197583.0, mailed on Feb. 28, 2020, 8 pages.

Office Action received for European Patent Application No. 18197589.7, mailed on Oct. 1, 2019, 5 pages.

Office Action received for European Patent Application No. 18208881.5, mailed on Jun. 11, 2019, 5 pages.

Office Action received for European Patent Application No. 18208881.5, mailed on May 7, 2021, 6 pages.

Office Action received for European Patent Application No. 18728002.9, mailed on Dec. 14, 2020, 15 pages.

Office Action received for European Patent Application No. 19150528.8, mailed on Jul. 1, 2020, 6 pages.

(56) References Cited

OTHER PUBLICATIONS

Office Action received for European Patent Application No. 19186538. 5, mailed on Oct. 12, 2020, 7 pages.

Office Action received for European Patent Application No. 19186538. 5, mailed on Oct. 22, 2021, 7 pages.

Office Action received for European Patent Application No. 19207753. 5, mailed on May 10, 2021, 4 pages.

Office Action received for European Patent Application No. 19207753. 5, mailed on Nov. 12, 2020, 5 pages.

Office Action received for European Patent Application No. 20158824. 1, mailed on Jun. 13, 2022, 5 pages.

Office Action received for European Patent Application No. 20158824. 1, mailed on May 18, 2021, 10 pages.

Office Action received for European Patent Application No. 21166718. 3, mailed on Feb. 20, 2023, 7 pages.

Office Action received for European Patent Application No. 21197457. 1, mailed on May 30, 2023, 8 pages.

Office Action received for European Patent Application No. 21197457. 1, mailed on Sep. 2, 2022, 8 pages.

Office Action received for European Patent Application No. 22158560. 7, mailed on Feb. 13, 2024, 10 pages.

Office Action received for European Patent Application No. 22198071. 7, mailed on Feb. 13, 2024, 4 pages.

Office Action received for European Patent Application No. 22201007. 6, mailed on Oct. 9, 2023, 5 pages.

Office Action received for German Patent Application No. 102015208532.5, mailed on Apr. 1, 2019, 20 pages (10 pages of English Translation and 10 pages of Official Copy).

Office Action received for German Patent Application No. 102015208532.5, mailed on Apr. 21, 2020, 3 pages (1 page of English Translation and 2 pages of Official Copy).

Office Action received for German Patent Application No. 102015208532.5, mailed on Aug. 21, 2019, 15 pages (5 pages of English Translation and 10 pages of Official Copy).

Office Action received for Hong Kong Patent Application No. 151051633, mailed on Jun. 5, 2015, 11 pages (Official Copy Only). {See Communication under 37 CFR § 1.98(a) (3)}.

Office Action received for Japanese Patent Application No. 2015-095183, mailed on Jun. 3, 2016, 13 pages (6 pages of English Translation and 7 pages of Official Copy).

Office Action received for Japanese Patent Application No. 2017-075031, mailed on Jul. 30, 2018, 16 pages (8 pages of English Translation and 8 pages of Official Copy).

Office Action received for Japanese Patent Application No. 2017-101107, mailed on Sep. 7, 2018, 14 pages (7 pages of English Translation and 7 pages of Official Copy).

Office Action received for Japanese Patent Application No. 2017-507413, mailed on Feb. 22, 2019, 11 pages (5 pages of English Translation and 6 pages of Official Copy).

Office Action received for Japanese Patent Application No. 2017-507413, mailed on May 25, 2018, 14 pages (7 pages of English Translation and 7 pages of Official Copy).

Office Action received for Japanese Patent Application No. 2017-543762, mailed on Apr. 8, 2019, 5 pages (2 pages of English Translation and 3 pages of Official Copy).

Office Action received for Japanese Patent Application No. 2017-543762, mailed on Jul. 9, 2018, 8 pages (4 pages of English Translation and 4 pages of Official Copy).

Office Action received for Japanese Patent Application No. 2018-560107, mailed on Jun. 14, 2019, 26 pages (13 pages of English Translation and 13 pages of Official Copy).

Office Action received for Japanese Patent Application No. 2019-124728, mailed on Dec. 14, 2020, 4 pages (2 pages of English Translation and 2 pages of Official Copy).

Office Action received for Japanese Patent Application No. 2019-124728, mailed on Sep. 18, 2020, 6 pages (3 pages of English Translation and 3 pages of Official Copy).

Office Action received for Japanese Patent Application No. 2019-238894, mailed on Mar. 6, 2020, 7 pages (3 pages of English Translation and 4 pages of Official Copy).

Office Action received for Japanese Patent Application No. 2020-184605, mailed on Dec. 12, 2022, 9 pages (4 pages of English Translation and 5 pages of Official Copy).

Office Action received for Japanese Patent Application No. 2020-184605, mailed on Feb. 14, 2022, 24 pages (11 pages of English Translation and 13 pages of Official Copy).

Office Action received for Japanese Patent Application No. 2020-184605, mailed on Jul. 3, 2023, 6 pages (3 pages of English Translation and 3 pages of Official Copy).

Office Action received for Japanese Patent Application No. 2022-116534, mailed on Aug. 28, 2023, 10 pages (5 pages of English Translation and 5 pages of Official Copy).

Office Action received for Korean Patent Application No. 10-2014-7008348, mailed on Jan. 22, 2019, 16 pages (1 page of English Translation and 15 pages of Official Copy).

Office Action received for Korean Patent Application No. 10-2015-0072162, mailed on Apr. 20, 2016, 11 pages (6 pages of English Translation and 5 pages of Official Copy).

Office Action received for Korean Patent Application No. 10-2015-0072162, mailed on Feb. 27, 2017, 12 pages (6 pages of English Translation and 6 pages of Official Copy).

Office Action received for Korean Patent Application No. 10-2016-7035555, mailed on Dec. 26, 2017, 5 pages (2 pages of English Translation and 3 pages of Official Copy).

Office Action received for Korean Patent Application No. 10-2016-7035555, mailed on Jul. 18, 2019, 9 pages (4 pages of English Translation and 5 pages of Official Copy).

Office Action received for Korean Patent Application No. 10-2016-7035555, mailed on Sep. 18, 2018, 9 pages (4 pages of English Translation and 5 pages of Official Copy).

Office Action received for Korean Patent Application No. 10-2017-7012145, mailed on Jul. 18, 2019, 5 pages (2 pages of English Translation and 3 pages of Official Copy).

Office Action received for Korean Patent Application No. 10-2017-7012145, mailed on Sep. 13, 2018, 6 pages (3 pages of English Translation and 3 pages of Official Copy).

Office Action received for Korean Patent Application No. 10-2017-7022905, mailed on Oct. 22, 2018, 9 pages (4 pages of English Translation and 5 pages of Official Copy).

Office Action received for Korean Patent Application No. 10-2018-0035949, mailed on Apr. 24, 2019, 9 pages (4 pages of English Translation and 5 pages of Official Copy).

Office Action received for Korean Patent Application No. 10-2018-0035949, mailed on Dec. 24, 2018, 7 pages (3 pages of English Translation and 4 pages of Official Copy).

Office Action received for Korean Patent Application No. 10-2018-0035949, mailed on Jun. 20, 2018, 9 pages (4 pages of English Translation and 5 pages of Official Copy).

Office Action received for Korean Patent Application No. 10-2018-7033301, mailed on Dec. 14, 2018, 6 pages (2 pages of English Translation and 4 pages of Official Copy).

Office Action received for Korean Patent Application No. 10-2019-7014494, mailed on Jun. 14, 2019, 11 pages (5 pages of English Translation and 6 pages of Official Copy).

Office Action received for Korean Patent Application No. 10-2020-0024632, mailed on Dec. 29, 2020, 11 pages (5 pages of English Translation and 6 pages of Official Copy).

Office Action received for Korean Patent Application No. 10-2020-0024632, mailed on May 18, 2020, 11 pages (5 pages of English Translation and 6 pages of Official Copy).

Office Action received for Korean Patent Application No. 10-2020-7002929, mailed on Mar. 22, 2020, 5 pages (2 pages of English Translation and 3 pages of Official Copy).

Office Action received for Korean Patent Application No. 10-2021-7032984, mailed on Feb. 22, 2022, 8 pages (4 pages of English Translation and 4 pages of Official Copy).

Office Action received for Korean Patent Application No. 10-2022-0053111, mailed on Dec. 12, 2022, 9 pages (4 pages of English Translation and 5 pages of Official Copy).

Office Action received for Korean Patent Application No. 10-2022-0053111, mailed on Jun. 29, 2023, 7 pages (3 pages of English Translation and 4 pages of Official Copy).

(56) References Cited

OTHER PUBLICATIONS

Office Action received for Korean Patent Application No. 10-2022-0053111, mailed on Oct. 23, 2023, 10 pages (5 pages of English Translation and 5 pages of Official Copy).

Office Action received for Korean Patent Application No. 10-2022-7033655, mailed on Jul. 27, 2023, 5 pages (2 pages of English Translation and 3 pages of Official Copy).

Office Action received for Taiwanese Patent Application No. 102120412, mailed on Feb. 25, 2015, 15 pages (6 pages of English Translation and 9 pages of Official Copy).

Office Action received for Taiwanese Patent Application No. 104114953, issued on Feb. 18, 2017, 9 pages (4 pages of English Translation and 5 pages of Official Copy).

Office Action received for Taiwanese Patent Application No. 104114953, mailed on Jun. 8, 2016, 11 pages (5 pages of English Translation and 6 pages of Official Copy).

Office Action received for Taiwanese Patent Application No. 104117041, mailed on Aug. 22, 2016, 6 pages (3 pages of English Translation and 3 pages of Official Copy).

Office Action received for Taiwanese Patent Application No. 104117042, mailed on Apr. 20, 2017, 18 pages (7 pages of English Translation and 11 pages of Official Copy).

Partial European Search Report received for European Patent Application No. 20158824.1, mailed on May 8, 2020, 14 pages.

Partial European Search Report received for European Patent Application No. 18197583.0, mailed on Jan. 14, 2019, 18 pages.

"PartyShare—turn your Xperia into a jukebox", Available at: https://forum.xda-developers.com/crossdevice-dev/sony/app-partyshare-xperia-jukebox-t2877807, Sep. 15, 2014, 5 pages.

Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.

Philips Support Website, "How to switch to preferred audio language in Philips TV from a broadcast with multiple languages audio stream?", Available Online at: https://www.usa.philips.com/c-f/XC000010105/how-to-switch-to-preferred-audio-language-in-philips-tv-from-a-broadcast-with-multiple-languages-audio-stream, Dec. 29, 2016, 5 pages.

Pu, Fang, "Research on Location-aware Service in Pervasive Computing", Issue No. 7, Information Technology Series, China Doctoral Dissertations, Jul. 15, 2008, 140 pages (Official Copy only). {See Communication under 37 CFR § 1.98(a) (3)}.

Punchkick Interactive, "Punchkick hands-on review: Fitbit Surge", URL: https://www.youtube.com/watch?v=K2G7aebUYcA, Mar. 25, 2015, 3 pages.

"Q Pair, When I connected to LG G Pad 8.3 Q pair G Flex-G Pad 8.3 review", Posting of a blog, Online Available at: <http://www.leaderyou.co.kr/2595>, Dec. 7, 2013, 28 pages (15 page of English Translation and 13 pages of Official Copy).

Qiye, Wang, "Design and Implementation of SAN Device Access Control in Unified Storage Platform", Master's Theses, Huazhong University of Science & Technology, Wuhan, Jun. 2008, 63 pages (Official Copy only). {See Communication under 37 CFR § 1.98(a) (3)}.

"Q Pair", online available at: http://mongri.net/entry/G-Pad-83-Qpair, Retrieved on Mar. 6, 2017, Dec. 20, 2013, 22 pages (10 pages of English translation and 12 pages of Official Copy).

Record of Oral Hearing received for U.S. Appl. No. 14/641,298, mailed on Oct. 8, 2021, 17 pages.

Result of Consultation received for European Patent Application No. 16710590.7, mailed on Dec. 7, 2020, 4 pages.

Result of Consultation received for European Patent Application No. 18197583.0, mailed on Feb. 24, 2021, 3 pages.

Result of Consultation received for European Patent Application No. 18197589.7, mailed on Dec. 1, 2020, 9 pages.

Result of Consultation received for European Patent Application No. 18197589.7, mailed on Dec. 17, 2020, 6 pages.

Result of Consultation received for European Patent Application No. 18208881.5, mailed on Dec. 6, 2022, 10 pages.

Result of Consultation received for European Patent Application No. 20158824.1, mailed on May 17, 2022, 7 pages.

Result of Consultation received for European Patent Application No. 21207736.6, mailed on Nov. 23, 2023, 5 pages.

"Review: Samsung Radiant R3 Wireless Speakers", Available Online at: <https://www.youtube.com/watch?v=ZBICVE1WdKE>, Jan. 19, 2016, 3 pages.

Samsung, "Samsung R3 Wireless 360° Smart Speaker (Black)", User Manual ver. 1.0 (English), User manual [online], Available Online at: <https://www.samsung.com/uk/support/model/WAM3500/XU/>, Dec. 16, 2016, 3 pages.

Search Report and Opinion received for Danish Patent Application No. PA201770401, mailed on Jun. 19, 2017, 6 pages.

Search Report and Opinion received for Danish Patent Application No. PA201870060 mailed on Apr. 30, 2018, 7 pages.

Search Report and Opinion received for Danish Patent Application No. PA201870419, mailed on Aug. 27, 2018, 7 pages.

Search Report and Opinion received for Danish Patent Application No. PA201870419, mailed on Sep. 10, 2018, 9 pages.

Search Report and Opinion received for Danish Patent Application No. PA201870598, mailed on Dec. 5, 2018, 8 pages.

Search Report and Opinion received for Danish Patent Application No. PA202170320, mailed on Oct. 6, 2021, 9 pages.

Search Report received for Danish Patent Application No. PA201770404, mailed on Jun. 20, 2017, 8 pages.

Search Report received for Danish Patent Application No. PA201770409, mailed on Jun. 20, 2017, 9 pages.

Search Report received For Netherlands Patent Application No. 2014737, mailed on Oct. 29, 2015, 9 pages.

Seifert, Dan, "Google Home review: Home is where the smart is", The Verge, Available Online at: <https://www.theverge.com/2016/11/3/13504658/google-home-review-speaker-assistant-amazon-echo-competitor>, Nov. 3, 2016, 11 pages.

Smarttricks, "Top 3 Music Player for Android", Available online at: <https://www.youtube.com/watch?v=He7RTn4CL34>, Feb. 22, 2017, 4 pages.

Smith, Eddie, "The expert's guide to Instapaper", available online at "http://www.macworld.com/article/1166898/the_experts_guide_to_instapaper.html", May 23, 2012, 8 pages.

Sonos, "Sonos Controller App for iPad Product Guide", Available online at: https://www.sonos.com/documents/productguides/en/iPadGuide_EN.pdf, Nov. 2014, 47 pages.

Sony Ericsson Mobile Comm., "User guide SmartWatch MN2", Available online at: https://manualzz.com/doc/23127468/sony-smartwatch-mn2-user-guide, Dec. 2011, 19 pages.

Summons to Attend Oral Proceedings received for European Patent Application No. 20158824.1, mailed on Dec. 7, 2021, 6 pages.

Summons to Attend Oral Proceedings received for European Patent Application No. 12770400.5, mailed on Mar. 19, 2018, 10 pages.

Summons to Attend Oral Proceedings received for European Patent Application No. 13171047.7, mailed on Jul. 9, 2018, 12 pages.

Summons to Attend Oral Proceedings received for European Patent Application No. 17799904.2, mailed on Dec. 20, 2021, 8 pages.

Summons to Attend Oral Proceedings received for European Patent Application No. 17813737.8, mailed on Jan. 4, 2022, 12 pages.

Summons to Attend Oral Proceedings received for European Patent Application No. 18178147.7, mailed on Jun. 28, 2021, 8 pages.

Summons to Attend Oral Proceedings received for European Patent Application No. 18197583.0, mailed on Aug. 14, 2020, 12 pages.

Summons to attend Oral proceedings received for European Patent Application No. 18197589.7, mailed on Apr. 9, 2020, 7 pages.

Summons to Attend Oral Proceedings received for European Patent Application No. 18208881.5, mailed on Jun. 29, 2022, 9 pages.

Summons to Attend Oral Proceedings received for European Patent Application No. 18728002.9, mailed on Jun. 3, 2022, 15 pages.

Summons to Attend Oral Proceedings received for European Patent Application No. 19150528.8, mailed on Mar. 15, 2022, 7 pages.

Summons to Attend Oral Proceedings received for European Patent Application No. 21197457.1, mailed on Nov. 23, 2023, 12 pages.

Supplemental Notice of Allowance received for U.S. Appl. No. 17/168,069, mailed on Apr. 20, 2022, 2 pages.

Supplemental Notice of Allowance received for U.S. Appl. No. 17/168,069, mailed on Feb. 2, 2022, 2 pages.

(56) References Cited

OTHER PUBLICATIONS

Supplemental Notice of Allowance received for U.S. Appl. No. 17/975,141, mailed on Feb. 26, 2024, 2 pages.

Wikipedia, "QR code", Available online at: https://en.wikipedia. org/w/index.php?title=OR_code&oldid=452939488, Sep. 28, 2011, pp. 1-9.

Woolsey, Amanda, "Apple Watch Tips—How to Add and Play Music", Available online at: <https://www.youtube.com/watch?v= E0QEuqMaoi8>, Apr. 26, 2015, 3 pages.

Board Decision received for Chinese Patent Application No. 202010295272.4, mailed on Dec. 14, 2023, 2 pages (1 page of English Translation and 1 page of Official Copy).

International Preliminary Report on Patentability received for PCT Patent Application No. PCT/US2022/031252, mailed on Dec. 21, 2023, 13 pages.

Notice of Allowance received for U.S. Appl. No. 17/835,334, mailed on Jan. 5, 2024, 8 pages.

Notice of Allowance received for U.S. Appl. No. 17/951,875, mailed on Dec. 26, 2023, 7 pages.

Office Action received for European Patent Application No. 22157106. 0, mailed on Dec. 21, 2023, 6 pages.

Summons to Attend Oral Proceedings received for European Patent Application No. 20720310.0, mailed on Jan. 3, 2024, 12 pages.

Office Action received for Chinese Patent Application No. 202110744146.7, mailed on Apr. 1, 2024, 13 pages (6 pages of English Translation and 7 pages of Official Copy).

Office Action received for Chinese Patent Application No. 202110744381.4, mailed on Mar. 25, 2024, 17 pages (6 pages of English Translation and 11 pages of Official Copy).

Examiner's Answer to Appeal Brief received for U.S. Appl. No. 18/119,789, mailed on Jan. 22, 2024, 45 pages.

Intention to Grant received for European Patent Application No. 15753796.0, mailed on Jan. 12, 2024, 9 pages.

Notice of Allowance received for Chinese Patent Application No. 201910875660.7, mailed on Jan. 4, 2024, 2 pages (1 page of English Translation and 1 page of Official Copy).

Applicant-Initiated Interview Summary received for U.S. Appl. No. 17/978,930, mailed on Mar. 13, 2024, 3 pages.

Applicant-Initiated Interview Summary received for U.S. Appl. No. 18/067,350, mailed on Mar. 13, 2024, 4 pages.

Brief Communication Regarding Oral Proceedings received for European Patent Application No. 21165295.3, mailed on Feb. 27, 2024, 1 page.

International Search Report and Written Opinion received for PCT Patent Application No. PCT/US2023/032084, mailed on Nov. 27, 2023, 10 pages.

Notice of Allowance received for Chinese Patent Application No. 202111429825.1, mailed on Feb. 9, 2024, 2 pages (1 page of English Translation and 1 page of Official Copy).

Notice of Allowance received for Korean Patent Application No. 10-2023-7008877, mailed on Feb. 20, 2024, 7 pages (2 pages of English Translation and 5 pages of Official Copy).

Office Action received for Chinese Patent Application No. 202010295272.4, mailed on Feb. 5, 2024, 14 pages (6 pages of English Translation and 8 pages of Official Copy).

Office Action received for Chinese Patent Application No. 202010728844.3, mailed on Jan. 27, 2024, 16 pages (8 pages of English Translation and 8 pages of Official Copy).

Office Action received for European Patent Application No. 22188377. 0, mailed on Mar. 7, 2024, 7 pages.

Advisory Action received for U.S. Appl. No. 17/181,089, mailed on Dec. 8, 2023, 3 pages.

Applicant-Initiated Interview Summary received for U.S. Appl. No. 17/181,089, mailed on Nov. 28, 2023, 3 pages.

Decision on Appeal received for U.S. Appl. No. 15/405,122, mailed on Dec. 12, 2023, 18 pages.

Notice of Allowance received for U.S. Appl. No. 17/975,141, mailed on Dec. 7, 2023, 10 pages.

Office Action received for Chinese Patent Application No. 202111430197.9, mailed on Oct. 13, 2023, 20 pages (7 pages of English Translation and 13 pages of Official Copy).

Office Action received for Korean Patent Application No. 10-2023-7008854, mailed on Nov. 15, 2023, 6 pages (2 pages of English Translation and 4 pages of Official Copy).

Office Action received for Korean Patent Application No. 10-2023-7008877, mailed on Nov. 29, 2023, 7 pages (3 pages of English Translation and 4 pages of Official Copy).

Advisory Action received for U.S. Appl. No. 18/228,597, mailed on Jul. 7, 2025, 3 pages.

Applicant-Initiated Interview Summary received for U.S. Appl. No. 17/991,708, mailed on Dec. 16, 2024, 5 pages.

Applicant-Initiated Interview Summary received for U.S. Appl. No. 18/067,350, mailed on Jul. 29, 2024, 3 pages.

Applicant-Initiated Interview Summary received for U.S. Appl. No. 18/067,350, mailed on Nov. 26, 2024, 3 pages.

Applicant-Initiated Interview Summary received for U.S. Appl. No. 18/077,154, mailed on Jul. 2, 2025, 2 pages.

Applicant-Initiated Interview Summary received for U.S. Appl. No. 18/088,309, mailed on Aug. 27, 2024, 2 pages.

Applicant-Initiated Interview Summary received for U.S. Appl. No. 18/088,309, mailed on Jun. 7, 2024, 2 pages.

Applicant-Initiated Interview Summary received for U.S. Appl. No. 18/211,150, mailed on Jul. 24, 2024, 3 pages.

Applicant-Initiated Interview Summary received for U.S. Appl. No. 18/211,150, mailed on Oct. 8, 2024, 3 pages.

Applicant-Initiated Interview Summary received for U.S. Appl. No. 18/228,597, mailed on Apr. 1, 2025, 5 pages.

Applicant-Initiated Interview Summary received for U.S. Appl. No. 18/228,597, mailed on Aug. 8, 2024, 4 pages.

Applicant-Initiated Interview Summary received for U.S. Appl. No. 18/228,597, mailed on Jan. 29, 2025, 4 pages.

Applicant-Initiated Interview Summary received for U.S. Appl. No. 18/228,597, mailed on Jun. 23, 2025, 4 pages.

Applicant-Initiated Interview Summary received for U.S. Appl. No. 18/229,989, mailed on Jun. 28, 2024, 2 pages.

Applicant-Initiated Interview Summary received for U.S. Appl. No. 18/237,310, mailed on Oct. 2, 2025, 2 pages.

Applicant-Initiated Interview Summary received for U.S. Appl. No. 18/383,371, mailed on Jul. 10, 2025, 2 pages.

Applicant-Initiated Interview Summary received for U.S. Appl. No. 18/433,262, mailed on Nov. 10, 2025, 6 pages.

Applicant-Initiated Interview Summary received for U.S. Appl. No. 18/674,435, mailed on Sep. 29, 2025, 4 pages.

Applicant-Initiated Interview Summary received for U.S. Appl. No. 18/892,251, mailed on Sep. 17, 2025, 4 pages.

Board Decision received for Chinese Patent Application No. 202110368426.2, mailed on Jul. 2, 2025, 2 pages (1 page of English Translation and 1 page of Official Copy).

Board Opinion received for Chinese Patent Application No. 201810411708.4, mailed on Sep. 15, 2025, 4 pages (1 page of English Translation and 3 pages of Official Copy).

Brief Communication Regarding Oral Proceedings received for European Patent Application No. 21197457.1, mailed on Jun. 19, 2024, 1 page.

Corrected Notice of Allowance received for U.S. Appl. No. 16/943,737, mailed on Jun. 20, 2025, 3 pages.

Corrected Notice of Allowance received for U.S. Appl. No. 17/181,089, mailed on Jul. 15, 2025, 3 pages.

Corrected Notice of Allowance received for U.S. Appl. No. 18/211,150, mailed on Feb. 20, 2025, 2 pages.

Corrected Notice of Allowance received for U.S. Appl. No. 18/211,150, mailed on Mar. 26, 2025, 2 pages.

Corrected Notice of Allowance received for U.S. Appl. No. 18/228,597, mailed on Nov. 5, 2025, 2 pages.

Corrected Notice of Allowance received for U.S. Appl. No. 18/228,597, mailed on Sep. 17, 2025, 2 pages.

Corrected Notice of Allowance received for U.S. Appl. No. 18/234,613, mailed on Jan. 10, 2025, 5 pages.

Corrected Notice of Allowance received for U.S. Appl. No. 18/234,613, mailed on Nov. 20, 2024, 2 pages.

(56) References Cited

OTHER PUBLICATIONS

Corrected Notice of Allowance received for U.S. Appl. No. 18/234,613, mailed on Oct. 28, 2024, 2 pages.
Corrected Notice of Allowance received for U.S. Appl. No. 18/535,820, mailed on Sep. 3, 2025, 2 pages.
Corrected Notice of Allowance received for U.S. Appl. No. 18/589,265, mailed on Feb. 26, 2025, 2 pages.
Corrected Notice of Allowance received for U.S. Appl. No. 18/892,251, mailed on Nov. 4, 2025, 2 pages.
Corrected Notice of Allowance received for U.S. Appl. No. 19/030,831, mailed on May 19, 2025, 2 pages.
"Create Confirmation Dialog Box—Matlab UIconfirm", Online available at: https://www.mathworks.com/help/matlab/ref/uiconfirm.html, 2017, 19 pages.
Decision on Appeal received for U.S. Appl. No. 16/943,737, mailed on Mar. 4, 2025, 10 pages.
Decision on Appeal received for U.S. Appl. No. 17/181,089, mailed on Apr. 17, 2025, 19 pages.
Decision on Appeal received for U.S. Appl. No. 17/479,974, mailed on Jul. 8, 2025, 14 pages.
Decision on Appeal received for U.S. Appl. No. 17/747,804, mailed on Sep. 26, 2025, 11 pages.
Decision on Appeal received for U.S. Appl. No. 18/119,789, mailed on Feb. 20, 2025, 16 pages.
Decision to Grant received for European Patent Application No. 15753796.0, mailed on Sep. 26, 2024, 3 pages.
Decision to Grant received for European Patent Application No. 20720310.0, mailed on Dec. 5, 2024, 2 pages.
Decision to Grant received for European Patent Application No. 21166718.3, mailed on Aug. 8, 2024, 2 pages.
Decision to Grant received for European Patent Application No. 21197457.1, mailed on Jan. 7, 2025, 4 pages.
Decision to Grant received for European Patent Application No. 21207736.6, mailed on Oct. 9, 2025, 2 pages.
Decision to Grant received for European Patent Application No. 21789897.2, mailed on Jun. 5, 2025, 3 pages.
Decision to Grant received for European Patent Application No. 22201007.6, mailed on Jul. 17, 2025, 4 pages.
Decision to Grant received for European Patent Application No. 22737681.1, mailed on Oct. 23, 2025, 2 pages.
Decision to Grant received for European Patent Application No. 23168537.1, mailed on Mar. 20, 2025, 4 pages.
Decision to Grant received for European Patent Application No. 23173355.1, mailed on Oct. 24, 2024, 3 pages.
Decision to Grant received for European Patent Application No. 24164409.5, mailed on May 22, 2025, 3 pages.
Decision to Grant received for European Patent Application No. 24211972.5, mailed on Jul. 31, 2025, 2 pages.
Decision to Refuse received for Japanese Patent Application No. 2023-077990, mailed on Dec. 13, 2024, 6 pages (3 pages of English Translation and 3 pages of Official Copy).
Examiner-Initiated Interview Summary received for U.S. Appl. No. 18/234,613, mailed on Aug. 9, 2024, 2 pages.
Examiner-Initiated Interview Summary received for U.S. Appl. No. 18/067,350, mailed on Jun. 26, 2025, 4 pages.
Examiner's Answer to Appeal Brief received for U.S. Appl. No. 17/479,974, mailed on Oct. 24, 2024, 18 pages.
Examiner's Answer to Appeal Brief received for U.S. Appl. No. 17/747,804, mailed on Mar. 5, 2025, 23 pages.
Extended European Search Report received for European Patent Application No. 24164409.5, mailed on Jun. 14, 2024, 5 pages.
Extended European Search Report received for European Patent Application No. 24179066.6, mailed on Aug. 8, 2024, 10 pages.
Extended European Search Report received for European Patent Application No. 24194531.0, mailed on Nov. 12, 2024, 8 pages.
Extended European Search Report received for European Patent Application No. 24197852.7, mailed on Dec. 5, 2024, 11 pages.
Extended European Search Report received for European Patent Application No. 24203946.9, mailed on Oct. 24, 2024, 9 pages.

Extended European Search Report received for European Patent Application No. 24211972.5, mailed on Jan. 2, 2025, 7 pages.
Extended European Search Report received for European Patent Application No. 25154475.5, mailed on Apr. 28, 2025, 11 pages.
Extended European Search Report received for European Patent Application No. 25166659.0, mailed on Apr. 15, 2025, 9 pages.
Extended European Search Report received for European Patent Application No. 25174339.9, mailed on Jun. 26, 2025, 9 pages.
Final Office Action received for U.S. Appl. No. 17/991,708, mailed on Dec. 30, 2024, 22 pages.
Final Office Action received for U.S. Appl. No. 18/067,350, mailed on Oct. 16, 2025, 55 pages.
Final Office Action received for U.S. Appl. No. 18/067,350, mailed on Oct. 31, 2024, 44 pages.
Final Office Action received for U.S. Appl. No. 18/088,309, mailed on Aug. 1, 2024, 16 pages.
Final Office Action received for U.S. Appl. No. 18/211,150, mailed on Jul. 2, 2024, 11 pages.
Final Office Action received for U.S. Appl. No. 18/228,597, mailed on Jan. 8, 2025, 19 pages.
Final Office Action received for U.S. Appl. No. 18/228,597, mailed on May 9, 2025, 22 pages.
Final Office Action received for U.S. Appl. No. 18/535,820, mailed on Feb. 27, 2025, 35 pages.
Intention to Grant received for European Patent Application No. 15753796.0, mailed on Jun. 5, 2024, 8 pages.
Intention to Grant received for European Patent Application No. 20720310.0, mailed on Jun. 13, 2024, 13 pages.
Intention to Grant received for European Patent Application No. 20720310.0, mailed on Oct. 7, 2024, 14 pages.
Intention to Grant received for European Patent Application No. 21197457.1, mailed on Jul. 9, 2024, 12 pages.
Intention to Grant received for European Patent Application No. 21197457.1, mailed on Nov. 21, 2024, 12 pages.
Intention to Grant received for European Patent Application No. 21197457.1, mailed on Oct. 24, 2024, 12 pages.
Intention to Grant received for European Patent Application No. 21207736.6, mailed on May 30, 2025, 8 pages.
Intention to Grant received for European Patent Application No. 21789897.2, mailed on Feb. 13, 2025, 9 pages.
Intention to Grant received for European Patent Application No. 21789897.2, mailed on Nov. 12, 2024, 9 pages.
Intention to Grant received for European Patent Application No. 22201007.6, mailed on Apr. 4, 2025, 8 pages.
Intention to Grant received for European Patent Application No. 22201007.6, mailed on Jan. 29, 2025, 9 pages.
Intention to Grant received for European Patent Application No. 22737681.1, mailed on Jul. 9, 2025, 8 pages.
Intention to Grant received for European Patent Application No. 22737681.1, mailed on May 14, 2025, 8 pages.
Intention to Grant received for European Patent Application No. 23158566.2, mailed on Jul. 30, 2025, 9 pages.
Intention to Grant received for European Patent Application No. 23158566.2, mailed on Mar. 19, 2025, 9 pages.
Intention to Grant received for European Patent Application No. 23158566.2, mailed on Sep. 30, 2024, 8 pages.
Intention to Grant received for European Patent Application No. 23168537.1, mailed on Dec. 2, 2024, 8 pages.
Intention to Grant received for European Patent Application No. 23168537.1, mailed on Jul. 25, 2024, 8 pages.
Intention to Grant received for European Patent Application No. 23173355.1, mailed on Jun. 28, 2024, 9 pages.
Intention to Grant received for European Patent Application No. 23190753.6, mailed on Jun. 18, 2025, 9 pages.
Intention to Grant received for European Patent Application No. 24164409.5, mailed on Jan. 14, 2025, 8 pages.
Intention to Grant received for European Patent Application No. 24203946.9, mailed on Sep. 5, 2025, 9 pages.
Intention to Grant received for European Patent Application No. 24211972.5, mailed on Apr. 10, 2025, 9 pages.
Intention to Grant received for European Patent Application No. 24211972.5, mailed on Jun. 16, 2025, 9 pages.

(56) References Cited

OTHER PUBLICATIONS

International Preliminary Report on Patentability received for PCT Patent Application No. PCT/US2023/017280, mailed on Oct. 17, 2024, 15 pages.

International Preliminary Report on Patentability received for PCT Patent Application No. PCT/US2023/020569, mailed on Nov. 21, 2024, 16 pages.

International Preliminary Report on Patentability received for PCT Patent Application No. PCT/US2023/032084, mailed on Mar. 20, 2025, 7 pages.

International Search Report and Written Opinion received for PCT Patent Application No. PCT/US2024/023231, mailed on Oct. 23, 2024, 24 pages.

International Search Report and Written Opinion received for PCT Patent Application No. PCT/US2025/010440, mailed on Jul. 4, 2025, 20 pages.

Invitation to Pay Additional Fees and Partial International Search Report received for PCT Patent Application No. PCT/US2024/023231, mailed on Aug. 29, 2024, 17 pages.

Invitation to Pay Additional Fees and Partial International Search Report received for PCT Patent Application No. PCT/US2025/010440, mailed on May 13, 2025, 15 pages.

Lin Wei, "Can Apple Watch Lead the Wearable Market", Financial Economics, Issue 23, Dec. 31, 2014, 1 page (Official Copy Only). {See Communication under Rule 37 CFR § 1.98(a) (3)}.

Loomba et al., "Energy-aware collaborative sensing for multiple applications in mobile cloud computing", Sustainable Computing: Informatics and Systems, Issue 8, Online Available at: https://www.sciencedirect.com/science/article/abs/pii/S2210537915000384?via%3Dihub, Dec. 31, 2015, pp. 47-59.

Megasafetyfirst, "How to pair Bluetooth Headphones to your TV / SmartTV / Television (How To)", XP093245538, Available online at: https://www.youtube.com/watch?v=19VNMySYouY, Feb. 15, 2020, 2 pages.

Minority_14, "The Ultimate Beautiful Holo Stopwatch: Ultimate Stopwatch & Timer", Available online at: https://sspai.com/post/21699, Mar. 1, 2013, 4 pages (Official Copy only). {See Communication under Rule 37 CFR § 1.98(a) (3)}.

Minutes of the Oral Proceedings received for European Patent Application No. 20720310.0, mailed on Jun. 7, 2024, 7 pages.

Minutes of the Oral Proceedings received for European Patent Application No. 21197457.1, mailed on Jul. 3, 2024, 9 pages.

Non-Final Office Action received for U.S. Appl. No. 17/991,708, mailed on Oct. 22, 2024, 20 pages.

Non-Final Office Action received for U.S. Appl. No. 18/067,350, mailed on Apr. 17, 2025, 49 pages.

Non-Final Office Action received for U.S. Appl. No. 18/077,154, mailed on Apr. 10, 2025, 27 pages.

Non-Final Office Action received for U.S. Appl. No. 18/211,150, mailed on Sep. 16, 2024, 11 pages.

Non-Final Office Action received for U.S. Appl. No. 18/228,597, mailed on Jul. 8, 2024, 17 pages.

Non-Final Office Action received for U.S. Appl. No. 18/228,597, mailed on Mar. 6, 2025, 20 pages.

Non-Final Office Action received for U.S. Appl. No. 18/234,613, mailed on Jul. 1, 2024, 19 pages.

Non-Final Office Action received for U.S. Appl. No. 18/237,310, mailed on Aug. 27, 2025, 10 pages.

Non-Final Office Action received for U.S. Appl. No. 18/383,371, mailed on Jun. 12, 2025, 9 pages.

Non-Final Office Action received for U.S. Appl. No. 18/433,262, mailed on Oct. 1, 2025, 10 pages.

Non-Final Office Action received for U.S. Appl. No. 18/535,820, mailed on Sep. 25, 2024, 27 pages.

Non-Final Office Action received for U.S. Appl. No. 18/674,435, mailed on Sep. 10, 2025, 29 pages.

Non-Final Office Action received for U.S. Appl. No. 18/892,251, mailed on Jul. 11, 2025, 28 pages.

Notice of Acceptance received for Australian Patent Application No. 2023204647, mailed on Oct. 28, 2024, 3 pages.

Notice of Acceptance received for Australian Patent Application No. 2023266353, mailed on Oct. 1, 2024, 3 pages.

Notice of Acceptance received for Australian Patent Application No. 2024200283, mailed on Nov. 13, 2024, 3 pages.

Notice of Allowance received for Chinese Patent Application No. 202010697187.0, mailed on Nov. 18, 2024, 6 pages (1 page of English Translation and 5 pages of Official Copy).

Notice of Allowance received for Chinese Patent Application No. 202010728711.6, mailed on Jul. 1, 2024, 2 pages (1 page of English Translation and 1 page of Official Copy).

Notice of Allowance received for Chinese Patent Application No. 202010728844.3, mailed on Sep. 29, 2024, 2 pages (1 page of English Translation and 1 page of Official Copy).

Notice of Allowance received for Chinese Patent Application No. 202110367834.6, mailed on Jan. 2, 2025, 4 pages (1 page of English Translation and 3 pages of Official Copy).

Notice of Allowance received for Chinese Patent Application No. 202110368164.X, mailed on Mar. 13, 2025, 4 pages (1 page of English Translation and 3 pages of Official Copy).

Notice of Allowance received for Chinese Patent Application No. 202110368426.2, mailed on Jul. 7, 2025, 4 pages (1 page of English Translation and 3 pages of Official Copy).

Notice of Allowance received for Chinese Patent Application No. 202110368460.X, mailed on Mar. 13, 2025, 4 pages (1 page of English Translation and 3 pages of Official Copy).

Notice of Allowance received for Chinese Patent Application No. 202110369341.6, mailed on Nov. 4, 2024, 4 pages (1 page of English Translation and 3 pages of Official Copy).

Notice of Allowance received for Chinese Patent Application No. 202110369363.2, mailed on Nov. 22, 2024, 4 pages (1 page of English Translation and 3 pages of Official Copy).

Notice of Allowance received for Chinese Patent Application No. 202110369386.3, mailed on Jul. 9, 2024, 5 pages (1 page of English Translation and 4 pages of Official Copy).

Notice of Allowance received for Chinese Patent Application No. 202110369387.8, mailed on Aug. 30, 2024, 2 pages (1 page of English Translation and 1 page of Official Copy).

Notice of Allowance received for Chinese Patent Application No. 202110744146.7, mailed on Jul. 9, 2024, 2 pages (1 page of English Translation and 1 page of Official Copy).

Notice of Allowance received for Chinese Patent Application No. 202110744381.4, mailed on Jul. 15, 2024, 2 pages (1 page of English Translation and 1 page of Official Copy).

Notice of Allowance received for Chinese Patent Application No. 202110894284.3, mailed on May 13, 2025, 4 pages (1 page of English Translation and 3 pages of Official Copy).

Notice of Allowance received for Chinese Patent Application No. 202210312598.2, mailed on Nov. 6, 2024, 4 pages (1 page of English Translation and 3 pages of Official Copy).

Notice of Allowance received for Chinese Patent Application No. 202210312775.7, mailed on Sep. 23, 2024, 5 pages (1 page of English Translation and 4 pages of Official Copy).

Notice of Allowance received for Chinese Patent Application No. 202210326960.1, mailed on Jun. 21, 2024, 5 pages (1 page of English Translation and 4 pages of Official Copy).

Notice of Allowance received for Chinese Patent Application No. 202210384721.1, mailed on Nov. 8, 2024, 4 pages (1 page of English Translation and 3 pages of Official Copy).

Notice of Allowance received for Chinese Patent Application No. 202211081603.X, mailed on Jul. 29, 2024, 2 pages (1 page of English Translation and 1 page of Official Copy).

Notice of Allowance received for Chinese Patent Application No. 202211110081.1, mailed on Jul. 24, 2024, 2 pages (1 page of English Translation and 1 page of Official Copy).

Notice of Allowance received for Chinese Patent Application No. 202310794146.7, mailed on Sep. 29, 2025, 4 pages (1 page of English Translation and 3 pages of Official Copy).

Notice of Allowance received for Chinese Patent Application No. 202311305998.1, mailed on Jan. 2, 2025, 2 pages (1 page of English Translation and 1 page of Official Copy).

Notice of Allowance received for Chinese Patent Application No. 202311312328.2, mailed on Jan. 3, 2025, 2 pages (1 page of English Translation and 1 page of Official Copy).

(56) References Cited

OTHER PUBLICATIONS

Notice of Allowance received for Chinese Patent Application No. 202411713875.6, mailed on Oct. 13, 2025, 4 pages (1 page of English Translation and 3 pages of Official Copy).

Notice of Allowance received for Japanese Patent Application No. 2022-116534, mailed on Jun. 24, 2024, 4 pages (1 page of English Translation and 3 pages of Official Copy).

Notice of Allowance received for Japanese Patent Application No. 2022-149476, mailed on Aug. 2, 2024, 4 pages (1 page of English Translation and 3 pages of Official Copy).

Notice of Allowance received for Japanese Patent Application No. 2022-202284, mailed on Feb. 7, 2025, 4 pages (1 page of English Translation and 3 pages of Official Copy).

Notice of Allowance received for Japanese Patent Application No. 2022-205934, mailed on Jun. 10, 2024, 4 pages (1 page of English Translation and 3 pages of Official Copy).

Notice of Allowance received for Japanese Patent Application No. 2023-077990, mailed on Jul. 7, 2025, 4 pages (1 page of English Translation and 3 pages of Official Copy).

Notice of Allowance received for Japanese Patent Application No. 2023-147860, mailed on Feb. 25, 2025, 4 pages (1 page of English Translation and 3 pages of Official Copy).

Notice of Allowance received for Japanese Patent Application No. 2024-081986, mailed on Oct. 6, 2025, 4 pages (1 page of English Translation and 3 pages of Official Copy).

Notice of Allowance received for Korean Patent Application No. 10-2022-0053111, mailed on Jun. 25, 2024, 7 pages (2 pages of English Translation and 5 pages of Official Copy).

Notice of Allowance received for Korean Patent Application No. 10-2022-7032414, mailed on Nov. 27, 2024, 7 pages (2 pages of English Translation and 5 pages of Official Copy).

Notice of Allowance received for Korean Patent Application No. 10-2023-7008854, mailed on Jul. 26, 2024, 8 pages (2 pages of English Translation and 6 pages of Official Copy).

Notice of Allowance received for Korean Patent Application No. 10-2024-7006601, mailed on Apr. 29, 2025, 6 pages (2 pages of English Translation and 4 pages of Official Copy).

Notice of Allowance received for U.S. Appl. No. 16/943,737, mailed on Aug. 25, 2025, 5 pages.

Notice of Allowance received for U.S. Appl. No. 16/943,737, mailed on Jun. 3, 2025, 6 pages.

Notice of Allowance received for U.S. Appl. No. 17/181,089, mailed on Jul. 3, 2025, 12 pages.

Notice of Allowance received for U.S. Appl. No. 17/747,804, mailed on Nov. 12, 2025, 9 pages.

Notice of Allowance received for U.S. Appl. No. 17/978,930, mailed on Aug. 19, 2024, 9 pages.

Notice of Allowance received for U.S. Appl. No. 18/077,154, mailed on Jul. 28, 2025, 14 pages.

Notice of Allowance received for U.S. Appl. No. 18/077,891, mailed on Dec. 10, 2024, 9 pages.

Notice of Allowance received for U.S. Appl. No. 18/211,150, mailed on Jan. 15, 2025, 11 pages.

Notice of Allowance received for U.S. Appl. No. 18/211,150, mailed on Jan. 29, 2025, 2 pages.

Notice of Allowance received for U.S. Appl. No. 18/228,597, mailed on Sep. 10, 2025, 10 pages.

Notice of Allowance received for U.S. Appl. No. 18/229,989, mailed on Jul. 24, 2024, 5 pages.

Notice of Allowance received for U.S. Appl. No. 18/234,613, mailed on Dec. 12, 2024, 7 pages.

Notice of Allowance received for U.S. Appl. No. 18/234,613, mailed on Oct. 11, 2024, 10 pages.

Notice of Allowance received for U.S. Appl. No. 18/237,310, mailed on Nov. 10, 2025, 10 pages.

Notice of Allowance received for U.S. Appl. No. 18/383,371, mailed on Jul. 30, 2025, 8 pages.

Notice of Allowance received for U.S. Appl. No. 18/535,820, mailed on Aug. 20, 2025, 9 pages.

Notice of Allowance received for U.S. Appl. No. 18/589,265, mailed on Dec. 6, 2024, 9 pages.

Notice of Allowance received for U.S. Appl. No. 18/589,265, mailed on Feb. 18, 2025, 10 pages.

Notice of Allowance received for U.S. Appl. No. 18/892,251, mailed on Oct. 22, 2025, 8 pages.

Notice of Allowance received for U.S. Appl. No. 19/030,831, mailed on May 8, 2025, 12 pages.

Office Action received for Australian Patent Application No. 2023201057, mailed on Dec. 19, 2024, 4 pages.

Office Action received for Australian Patent Application No. 2023201057, mailed on Jan. 28, 2025, 3 pages.

Office Action received for Australian Patent Application No. 2023201057, mailed on Jun. 19, 2024, 5 pages.

Office Action received for Australian Patent Application No. 2023201057, mailed on Oct. 24, 2024, 3 pages.

Office Action received for Australian Patent Application No. 2023204647, mailed on Jul. 5, 2024, 3 pages.

Office Action received for Australian Patent Application No. 2023204647, mailed on Sep. 19, 2024, 2 pages.

Office Action received for Australian Patent Application No. 2023214377, mailed on Jan. 17, 2025, 3 pages.

Office Action received for Australian Patent Application No. 2023214377, mailed on Jun. 5, 2024, 4 pages.

Office Action received for Australian Patent Application No. 2023214377, mailed on Sep. 25, 2024, 4 pages.

Office Action received for Australian Patent Application No. 2023266353, mailed on Sep. 19, 2024, 2 pages.

Office Action received for Australian Patent Application No. 2023285697, mailed on Dec. 16, 2024, 2 pages.

Office Action received for Australian Patent Application No. 2024200283, mailed on Oct. 8, 2024, 2 pages.

Office Action received for Australian Patent Application No. 2024200958, mailed on Apr. 1, 2025, 5 pages.

Office Action received for Australian Patent Application No. 2024200958, mailed on Dec. 20, 2024, 5 pages.

Office Action received for Australian Patent Application No. 2024202748, mailed on Jul. 4, 2025, 4 pages.

Office Action received for Australian Patent Application No. 2024202748, mailed on Oct. 1, 2025, 3 pages.

Office Action received for Australian Patent Application No. 2024278098, mailed on Jan. 22, 2025, 3 pages.

Office Action received for Australian Patent Application No. 2024278098, mailed on Mar. 6, 2025, 3 pages.

Office Action received for Chinese Patent Application No. 202010295272.4, mailed on Jun. 11, 2024, 12 pages (5 pages of English Translation and 7 pages of Official Copy).

Office Action received for Chinese Patent Application No. 202010295272.4, mailed on Oct. 10, 2024, 9 pages (4 pages of English Translation and 5 pages of Official Copy).

Office Action received for Chinese Patent Application No. 202010697187.0, mailed on Jul. 25, 2024, 16 pages (5 pages of English Translation and 11 pages of Official Copy).

Office Action received for Chinese Patent Application No. 202011083486.1, mailed on Aug. 19, 2024, 12 pages (4 pages of English Translation and 8 pages of Official Copy).

Office Action received for Chinese Patent Application No. 202011083486.1, mailed on May 22, 2024, 15 pages (5 pages of English Translation and 10 pages of Official Copy).

Office Action received for Chinese Patent Application No. 202110367769.7, mailed on Dec. 27, 2024, 22 pages (7 pages of English Translation and 15 pages of Official Copy).

Office Action received for Chinese Patent Application No. 202110367769.7, mailed on Sep. 30, 2024, 21 pages (6 pages of English Translation and 15 pages of Official Copy).

Office Action received for Chinese Patent Application No. 202110367834.6, mailed on Nov. 4, 2024, 10 pages (5 pages of English Translation and 5 pages of Official Copy).

Office Action received for Chinese Patent Application No. 202110368164.X, mailed on Nov. 15, 2024, 27 pages (6 pages of English Translation and 21 pages of Official Copy).

(56) References Cited

OTHER PUBLICATIONS

Office Action received for Chinese Patent Application No. 202110368426.2, mailed on Aug. 23, 2024, 17 pages (8 pages of English Translation and 9 pages of Official Copy).

Office Action received for Chinese Patent Application No. 202110368426.2, mailed on Feb. 24, 2025, 9 pages (5 pages of English Translation and 4 pages of Official Copy).

Office Action received for Chinese Patent Application No. 202110368460.X, mailed on Nov. 9, 2024, 11 pages (5 pages of English Translation and 6 pages of Official Copy).

Office Action received for Chinese Patent Application No. 202110369265.9, mailed on Dec. 27, 2024, 16 pages (5 pages of English Translation and 11 pages of Official Copy).

Office Action received for Chinese Patent Application No. 202110369265.9, mailed on Jul. 31, 2024, 18 pages (6 pages of English Translation and 12 pages of Official Copy).

Office Action received for Chinese Patent Application No. 202110369265.9, mailed on Mar. 27, 2025, 16 pages (4 pages of English Translation and 12 pages of Official Copy).

Office Action received for Chinese Patent Application No. 202110369341.6, mailed on Jul. 24, 2024, 11 pages (5 pages of English Translation and 6 pages of Official Copy).

Office Action received for Chinese Patent Application No. 202110369363.2, mailed on Jul. 9, 2024, 14 pages (6 pages of English Translation and 8 pages of Official Copy).

Office Action received for Chinese Patent Application No. 202110369387.8, mailed on Jul. 2, 2024, 10 pages (4 pages of English Translation and 6 pages of Official Copy).

Office Action received for Chinese Patent Application No. 202110894284.3, mailed on Jan. 10, 2025, 9 pages (4 pages of English Translation and 5 pages of Official Copy).

Office Action received for Chinese Patent Application No. 202110894284.3, mailed on Jun. 27, 2024, 10 pages (5 pages of English Translation and 5 pages of Official Copy).

Office Action received for Chinese Patent Application No. 202210312598.2, mailed on Jun. 27, 2024, 22 pages (7 pages of English Translation and 15 pages of Official Copy).

Office Action received for Chinese Patent Application No. 202210312775.7, mailed on Jun. 19, 2024, 13 pages (6 pages of English Translation and 7 pages of Official Copy).

Office Action received for Chinese Patent Application No. 202210384721.1, mailed on May 23, 2024, 26 pages (14 pages of English Translation and 12 pages of Official Copy).

Office Action received for Chinese Patent Application No. 202211162924.2, mailed on Sep. 22, 2025, 22 pages (9 pages of English Translation and 13 pages of Official Copy).

Office Action received for Chinese Patent Application No. 202310585927.5, mailed on Jun. 27, 2025, 17 pages (9 pages of English Translation and 8 pages of Official Copy).

Office Action received for Chinese Patent Application No. 202310794146.7, mailed on Apr. 10, 2025, 11 pages (6 pages of English Translation and 5 pages of Official Copy).

Office Action received for Chinese Patent Application No. 202310794146.7, mailed on Aug. 30, 2024, 18 pages (11 pages of English Translation and 7 pages of Official Copy).

Office Action received for Chinese Patent Application No. 202310794146.7, mailed on Nov. 13, 2024, 17 pages (11 pages of English Translation and 6 pages of Official Copy).

Office Action received for Chinese Patent Application No. 202311305998.1, mailed on May 29, 2024, 13 pages (7 pages of English Translation and 6 pages of Official Copy).

Office Action received for Chinese Patent Application No. 202311305998.1, mailed on Oct. 19, 2024, 6 pages (3 pages of English Translation and 3 pages of Official Copy).

Office Action received for Chinese Patent Application No. 202311321231.8, mailed on Jul. 28, 2024, 9 pages (5 pages of English Translation and 4 pages of Official Copy).

Office Action received for Chinese Patent Application No. 202411704616.7, mailed on Jul. 30, 2025, 14 pages (7 pages of English Translation and 7 pages of Official Copy).

Office Action received for Chinese Patent Application No. 202411713875.6, mailed on May 10, 2025, 17 pages (9 pages of English Translation and 8 pages of Official Copy).

Office Action received for Chinese Patent Application No. 202411715424.6, mailed on May 17, 2025, 16 pages (8 pages of English Translation and 8 pages of Official Copy).

Office Action received for Chinese Patent Application No. 202411716388.5, mailed on Jun. 8, 2025, 14 pages (7 pages of English Translation and 7 pages of Official Copy).

Office Action received for European Patent Application No. 22188377.0, mailed on Mar. 17, 2025, 6 pages.

Office Action received for European Patent Application No. 22188724.3, mailed on Jul. 24, 2025, 10 pages.

Office Action received for European Patent Application No. 22197186.4, mailed on Jun. 25, 2024, 5 pages.

Office Action received for European Patent Application No. 22198071.7, mailed on Oct. 17, 2025, 4 pages.

Office Action received for European Patent Application No. 22201007.6, mailed on Jul. 18, 2024, 4 pages.

Office Action received for European Patent Application No. 22737681.1, mailed on Feb. 6, 2025, 9 pages.

Office Action received for European Patent Application No. 22737681.1, mailed on Oct. 18, 2024, 10 pages.

Office Action received for European Patent Application No. 23157906.1, mailed on Sep. 10, 2025, 4 pages.

Office Action received for European Patent Application No. 23172038.4, mailed on May 22, 2025, 6 pages.

Office Action received for European Patent Application No. 23190753.6, mailed on Jan. 30, 2025, 9 pages.

Office Action received for European Patent Application No. 23190753.6, mailed on Jun. 25, 2024, 10 pages.

Office Action received for European Patent Application No. 23191379.9, mailed on Mar. 24, 2025, 6 pages.

Office Action received for Japanese Patent Application No. 2022-202284, mailed on Sep. 20, 2024, 7 pages (3 pages of English Translation and 4 pages of Official Copy).

Office Action received for Japanese Patent Application No. 2023-077990, mailed on Jul. 12, 2024, 8 pages (4 pages of English Translation and 4 pages of Official Copy).

Office Action received for Japanese Patent Application No. 2023-147860, mailed on Nov. 18, 2024, 15 pages (7 pages of English Translation and 8 pages of Official Copy).

Office Action received for Japanese Patent Application No. 2024-081986, mailed on May 9, 2025, 6 pages (3 pages of English Translation and 3 pages of Official Copy).

Office Action received for Japanese Patent Application No. 2024-110376, mailed on Jul. 18, 2025, 6 pages (3 pages of English Translation and 3 pages of Official Copy).

Office Action received for Japanese Patent Application No. 2024-147808, mailed on Aug. 1, 2025, 10 pages (5 pages of English Translation and 5 pages of Official Copy).

Office Action received for Korean Patent Application No. 10-2024-7011347, mailed on Jul. 31, 2025, 7 pages (3 pages of English Translation and 4 pages of Official Copy).

Prabeesh RK, "Android Studio Tutorial—17—Highlight selected item in a ListView", Available Online at: https://www.youtube.com/watch?v=W6bBYmXP0HY, Feb. 24, 2015, 5 pages.

Record of Oral Hearing received for U.S. Appl. No. 16/943,737, mailed on Feb. 24, 2025, 22 pages.

Record of Oral Hearing received for U.S. Appl. No. 17/181,089, mailed on Mar. 27, 2025, 15 pages.

Record of Oral Hearing received for U.S. Appl. No. 17/479,974, mailed on Jul. 3, 2025, 17 pages.

Record of Oral Hearing received for U.S. Appl. No. 17/747,804, mailed on Oct. 14, 2025, 10 pages.

Record of Oral Hearing received for U.S. Appl. No. 18/119,789, mailed on Feb. 23, 2025, 14 pages.

Result of Consultation received for European Patent Application No. 20720310.0, mailed on Jun. 4, 2024, 3 pages.

Result of Consultation received for European Patent Application No. 22201007.6, mailed on Aug. 20, 2024, 3 pages.

(56) References Cited

OTHER PUBLICATIONS

Summons to Attend Oral Proceedings received for German Patent Application No. 112015003083.2, mailed on Oct. 28, 2024, 7 pages (3 pages of English Translation and 4 pages of Official Copy).

Summons to Oral Proceedings received for European Patent Application No. 21165295.3, mailed on Jul. 21, 2025, 11 pages.

Supplemental Notice of Allowance received for U.S. Appl. No. 17/975,141, mailed on Aug. 12, 2024, 2 pages.

Supplemental Notice of Allowance received for U.S. Appl. No. 18/229,989, mailed on Aug. 7, 2024, 2 pages.

Supplemental Notice of Allowance received for U.S. Appl. No. 18/589,265, mailed on Dec. 18, 2024, 2 pages.

Szogyenyi, Zina, "Improving the usability of multi-selecting from a long list", Available online at: https://medium.com/tripaneer-techblog/improving-the-usability-of-multi-selecting-from-a-long-list-63e1a67aab35, Jun. 13, 2018, 12 pages.

weifeng.com, "Install and use Apple Pay on your Apple Watch", Available online at: https://www.mpaypass.com.cn/news/201504/28093555.html, Apr. 28, 2015, 3 pages (Official Copy Only). {See Communication under Rule 37 CFR § 1.98(a) (3)}.

"Window confirm( )", Online available at: https://www.w3schools.com/jsref/met_win_confirm.asp, 2014, 5 pages.

Xiaokai, "Apple senior executive", Apple Watch mobile payment is convenient and fast, Available online at: https://it.hebei.com.cn/system/2015/03/09/015101153.shtml, Mar. 9, 2015, 2 pages (Official Copy Only). {See Communication under Rule 37 CFR § 1.98(a) (3)}.

Xuetao, Yang, "WP7 version of the desktop clock literary style Metro Time trial", Online available at: https://tech.sina.com.cn/s/s/2012-02-24/09216764878.shtml, Feb. 24, 2012, 10 pages (6 pages of English Translation and 4 pages of Official Copy).

Corrected Notice of Allowance received for U.S. Appl. No. 17/747,804, mailed on Nov. 21, 2025, 3 pages.

Corrected Notice of Allowance received for U.S. Appl. No. 18/237,310, mailed on Nov. 18, 2025, 2 pages.

Decision to Grant received for European Patent Application No. 23158566.2, mailed on Nov. 20, 2025, 2 pages.

Extended European Search Report received for European Patent Application No. 25186269.4, mailed on Nov. 17, 2025, 12 pages.

International Preliminary Report on Patentability received for PCT Patent Application No. PCT/US2024/023231, mailed on Nov. 20, 2025, 19 pages.

Non-Final Office Action received for U.S. Appl. No. 18/892,230, mailed on Nov. 19, 2025, 25 pages.

Notice of Allowance received for Japanese Patent Application No. 2024-077441, mailed on Oct. 24, 2025, 4 pages (1 page of English Translation and 3 pages of Official Copy).

Notice of Allowance received for U.S. Appl. No. 18/077,154, mailed on Nov. 25, 2025, 14 pages.

Notice of Allowance received for U.S. Appl. No. 18/674,435, mailed on Dec. 3, 2025, 18 pages.

Office Action received for Chinese Patent Application No. 202411716388.5, mailed on Oct. 15, 2025, 12 pages (7 pages of English Translation and 5 pages of Official Copy).

Office Action received for Chinese Patent Application No. 202411726509.4, mailed on Sep. 27, 2025, 17 pages (8 pages of English Translation and 9 pages of Official Copy).

Office Action received for European Patent Application No. 24194531.0, mailed on Nov. 27, 2025, 7 pages.

Office Action received for Japanese Patent Application No. 2024-077441, mailed on May 9, 2025, 8 pages (4 pages of English Translation and 4 pages of Official Copy).

Office Action received for Japanese Patent Application No. 2024-110376, mailed on Oct. 27, 2025, 5 pages (2 pages of English Translation and 3 pages of Official Copy).

Office Action received for Japanese Patent Application No. 2024-147808, mailed on Nov. 10, 2025, 6 pages (3 pages of English Translation and 3 pages of Official Copy).

Noda Yuki, "Windows Vista Perfect Master [Home Basic Home Premium Business Correspondence]", Available in 1st Edition Microsoft Windows Vista, Shuwa System Co. Ltd., Apr. 14, 2007, 3 pages (Official Copy Only). {See Communication under Rule 37 CFR § 1.98(a) (3)}.

Corrected Notice of Allowance received for U.S. Appl. No. 17/747,804, mailed on Dec. 8, 2025, 4 pages.

Notice of Acceptance received for Australian Patent Application No. 2023285697, mailed on Dec. 5, 2025, 3 pages.

Office Action received for Chinese Patent Application No. 202310585927.5, mailed on Oct. 30, 2025, 7 pages (4 pages of English Translation and 3 pages of Official Copy).

Office Action received for European Patent Application No. 25174339.9, mailed on Dec. 4, 2025, 7 pages.

Office Action received for Japanese Patent Application No. 2024-218951, mailed on Dec. 8, 2025, 7 pages (3 pages of English Translation and 4 pages of Official Copy).

Extended European Search Report received for European Patent Application No. 25208555.0, mailed on Dec. 22, 2025, 11 pages.

Notice of Allowance received for Chinese Patent Application No. 202280040345.2, mailed on Aug. 14, 2024, 5 pages (1 page of English Translation and 4 pages of Official Copy).

Notice of Allowance received for U.S. Appl. No. 18/535,820, mailed on Dec. 30, 2025, 10 pages.

Office Action received for Chinese Patent Application No. 202411715424.6, mailed on Nov. 15, 2025, 11 pages (6 pages of English Translation and 5 pages of Official Copy).

Supplemental Notice of Allowance received for U.S. Appl. No. 18/674,435, mailed on Dec. 18, 2025, 2 pages.

* cited by examiner

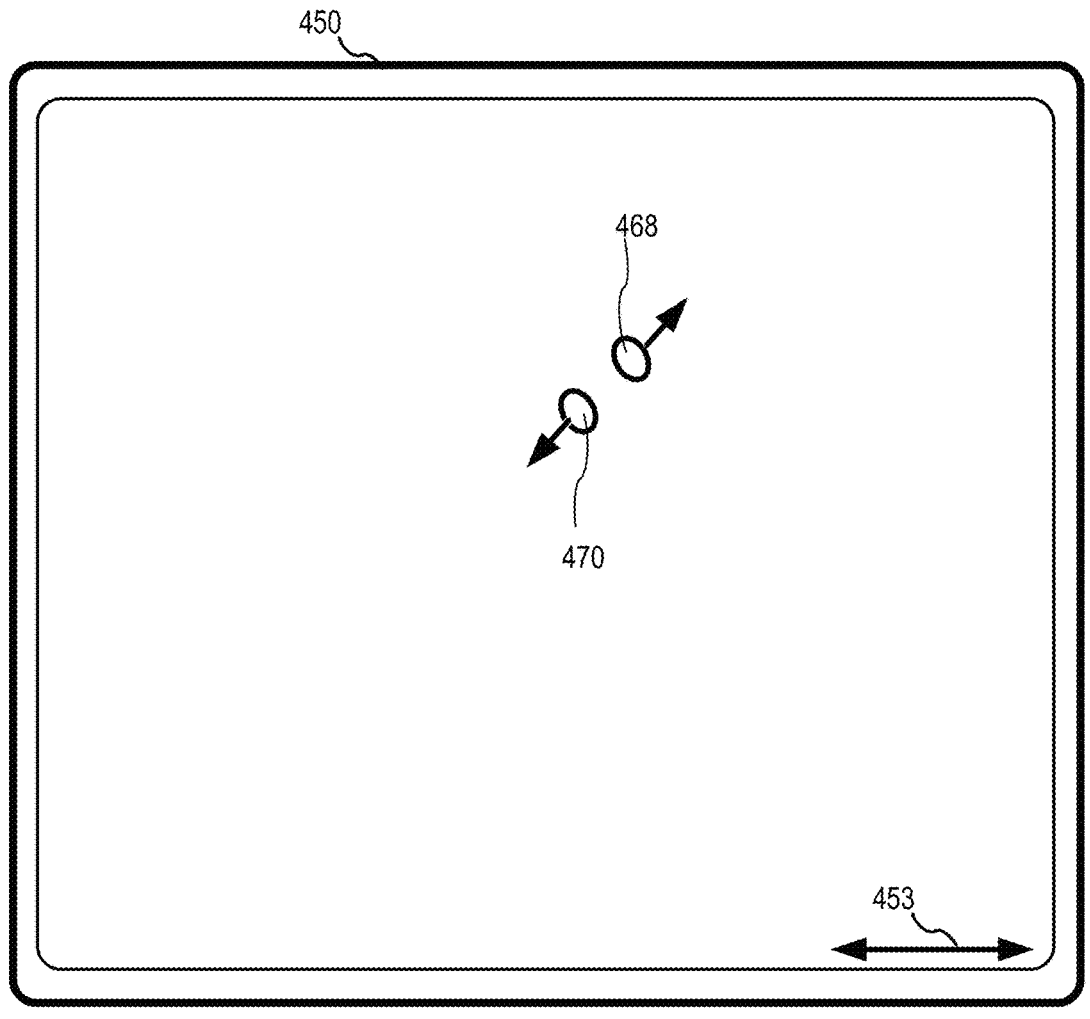
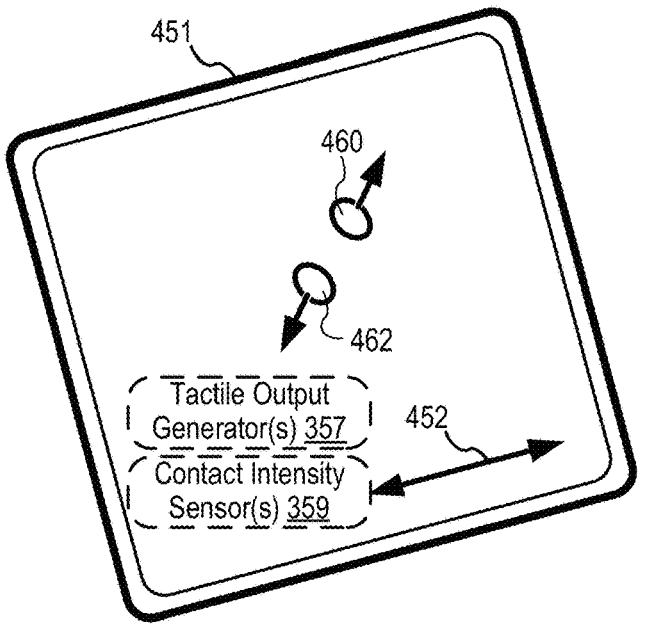
*FIG. 4B*

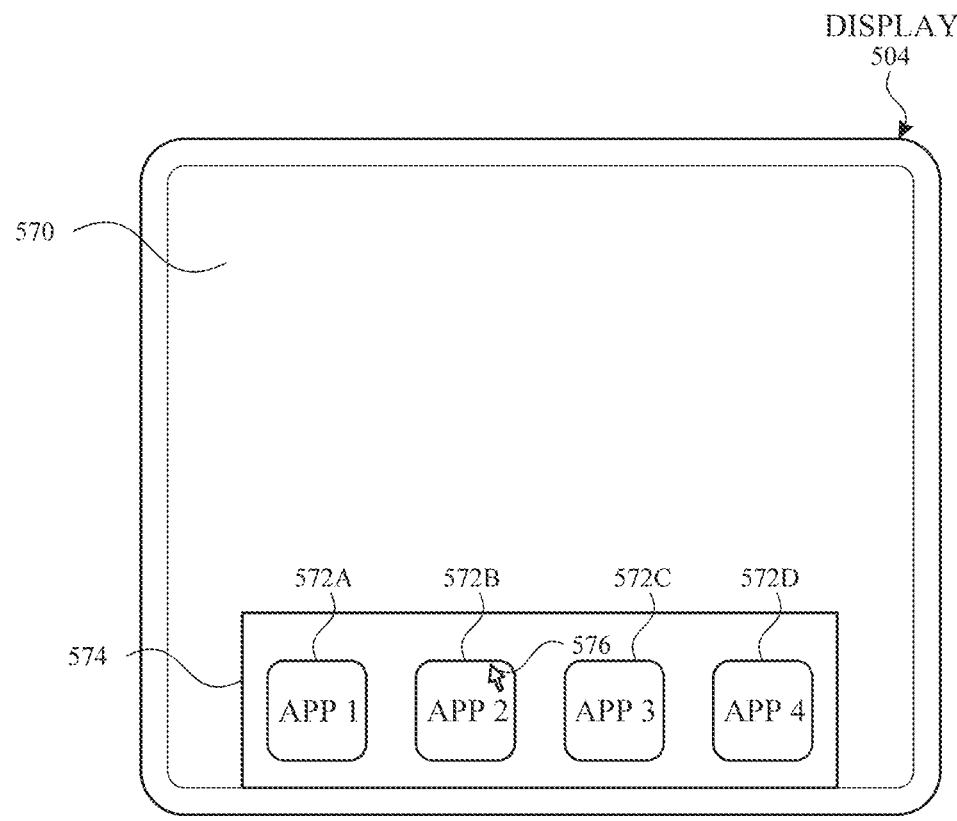
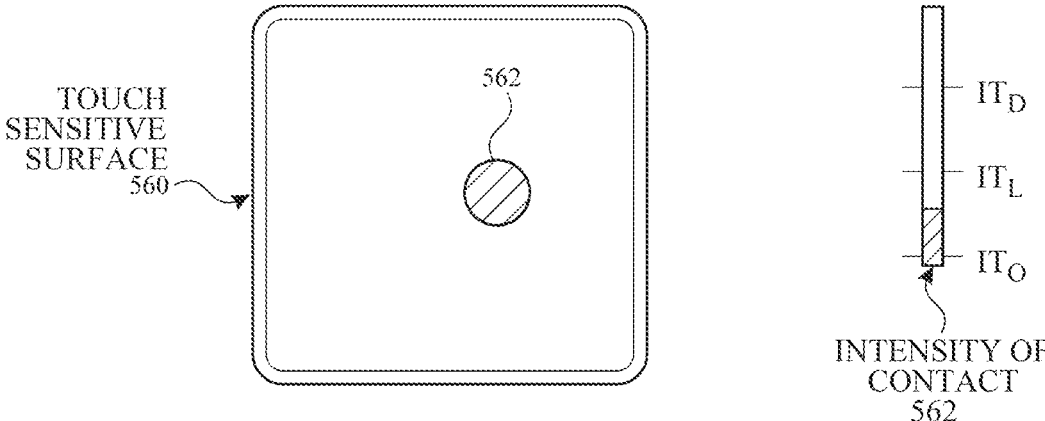
*FIG. 5E*

642

643

644

645

641

640

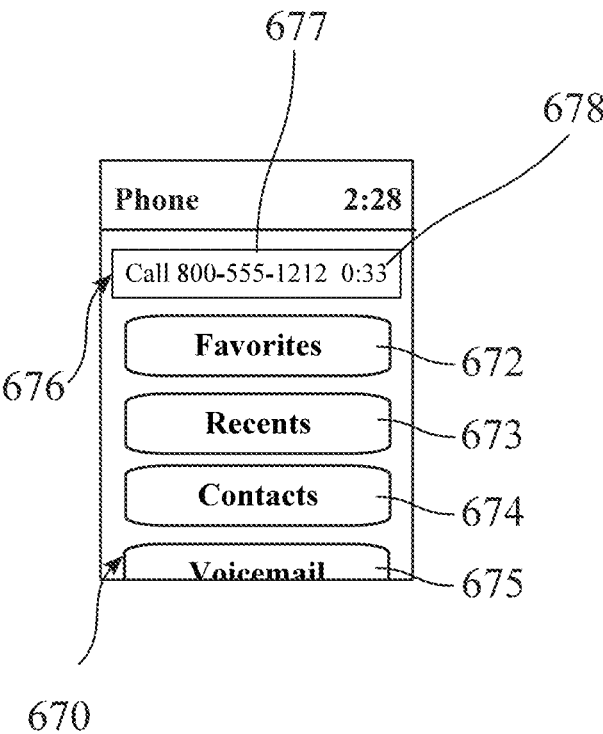
677
678
676
Phone    2:28
Call 800-555-1212  0:33
Favorites ——672
Recents ——673
Contacts ——674
Voicemail ——675
670
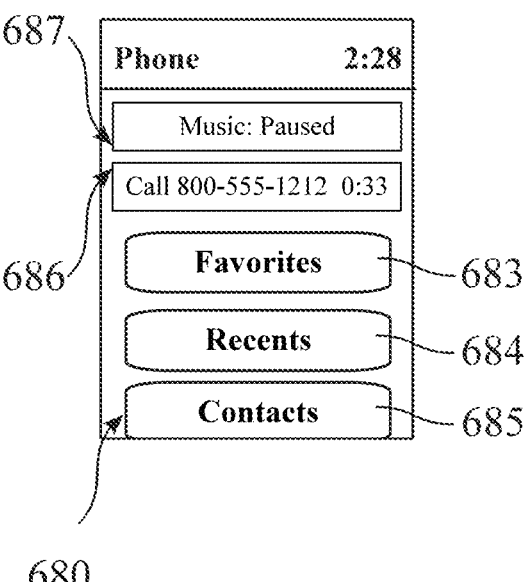
687
686
680
Phone    2:28
Music: Paused
Call 800-555-1212  0:33
Favorites ——683
Recents ——684
Contacts ——685
*FIG. 6G*

Figure 13:
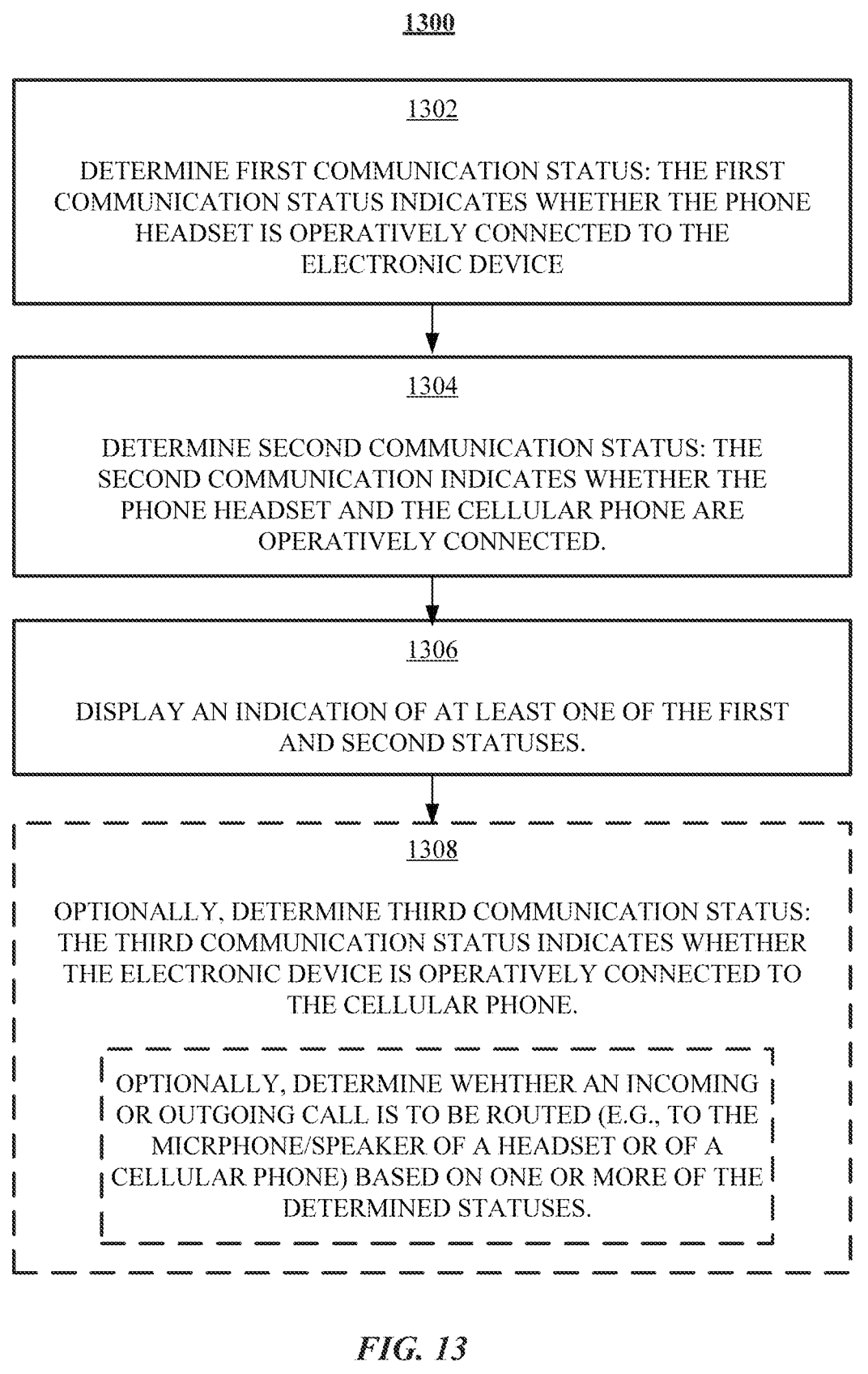

1300

```
┌──────────────────────────────────────────────────────┐
│                        1302                            │
│                                                        │
│  DETERMINE FIRST COMMUNICATION STATUS: THE FIRST       │
│  COMMUNICATION STATUS INDICATES WHETHER THE PHONE      │
│  HEADSET IS OPERATIVELY CONNECTED TO THE               │
│  ELECTRONIC DEVICE                                     │
└──────────────────────────────────────────────────────┘
                         │
                         ▼
┌──────────────────────────────────────────────────────┐
│                        1304                            │
│                                                        │
│  DETERMINE SECOND COMMUNICATION STATUS: THE            │
│  SECOND COMMUNICATION INDICATES WHETHER THE            │
│  PHONE HEADSET AND THE CELLULAR PHONE ARE              │
│  OPERATIVELY CONNECTED.                                │
└──────────────────────────────────────────────────────┘
                         │
                         ▼
┌──────────────────────────────────────────────────────┐
│                        1306                            │
│                                                        │
│  DISPLAY AN INDICATION OF AT LEAST ONE OF THE FIRST    │
│  AND SECOND STATUSES.                                  │
└──────────────────────────────────────────────────────┘
                         │
                         ▼
```

1308

OPTIONALLY, DETERMINE THIRD COMMUNICATION STATUS: THE THIRD COMMUNICATION STATUS INDICATES WHETHER THE ELECTRONIC DEVICE IS OPERATIVELY CONNECTED TO THE CELLULAR PHONE.

OPTIONALLY, DETERMINE WEHTHER AN INCOMING OR OUTGOING CALL IS TO BE ROUTED (E.G., TO THE MICRPHONE/SPEAKER OF A HEADSET OR OF A CELLULAR PHONE) BASED ON ONE OR MORE OF THE DETERMINED STATUSES.

Figure 15:
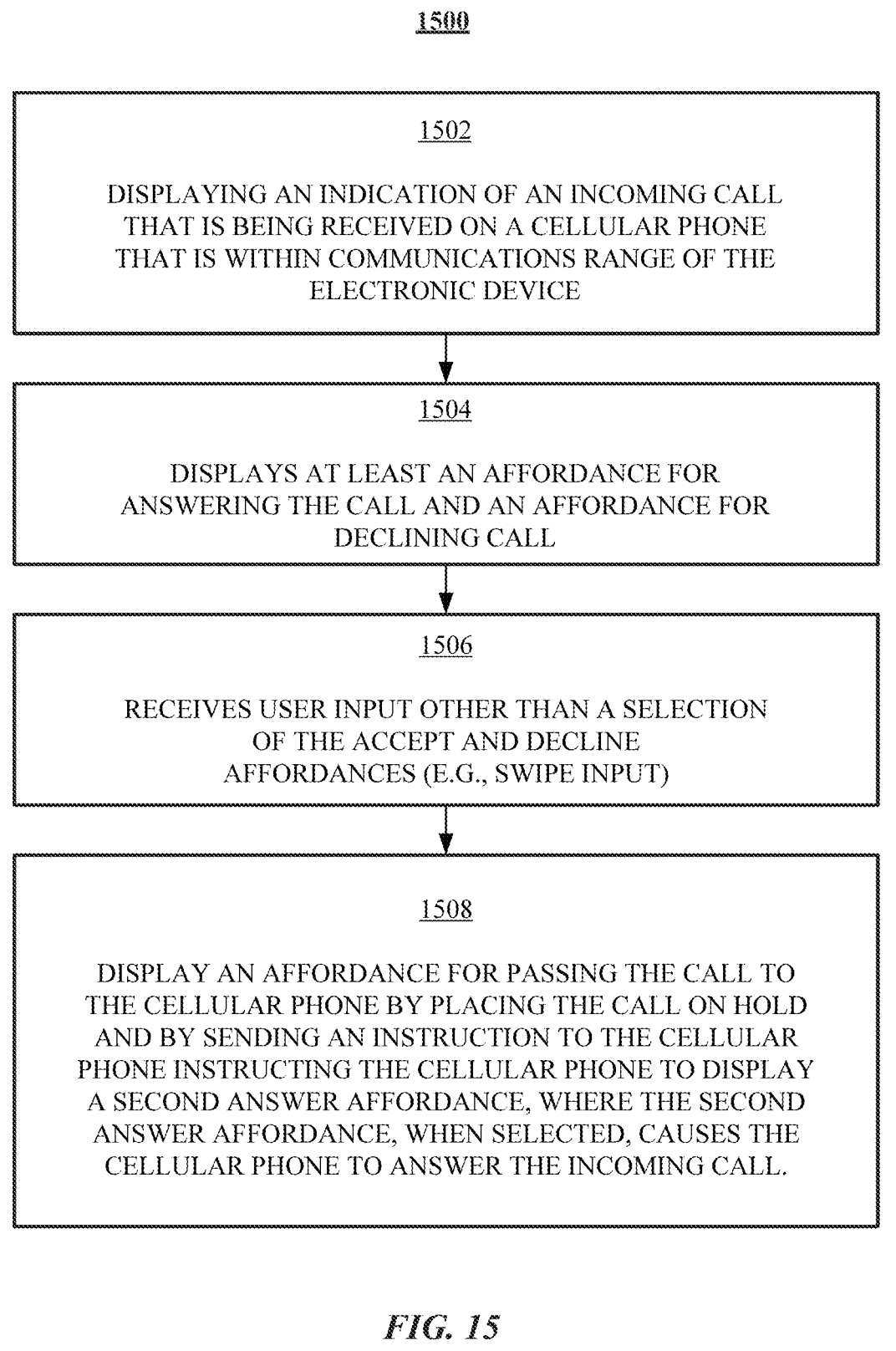

DISPLAYING AN INDICATION OF AN INCOMING CALL
THAT IS BEING RECEIVED ON A CELLULAR PHONE
THAT IS WITHIN COMMUNICATIONS RANGE OF THE
ELECTRONIC DEVICE

---

1504

DISPLAYS AT LEAST AN AFFORDANCE FOR
ANSWERING THE CALL AND AN AFFORDANCE FOR
DECLINING CALL

---

1506

RECEIVES USER INPUT OTHER THAN A SELECTION
OF THE ACCEPT AND DECLINE
AFFORDANCES (E.G., SWIPE INPUT)

---

1508

DISPLAY AN AFFORDANCE FOR PASSING THE CALL TO
THE CELLULAR PHONE BY PLACING THE CALL ON HOLD
AND BY SENDING AN INSTRUCTION TO THE CELLULAR
PHONE INSTRUCTING THE CELLULAR PHONE TO DISPLAY
A SECOND ANSWER AFFORDANCE, WHERE THE SECOND
ANSWER AFFORDANCE, WHEN SELECTED, CAUSES THE
CELLULAR PHONE TO ANSWER THE INCOMING CALL.

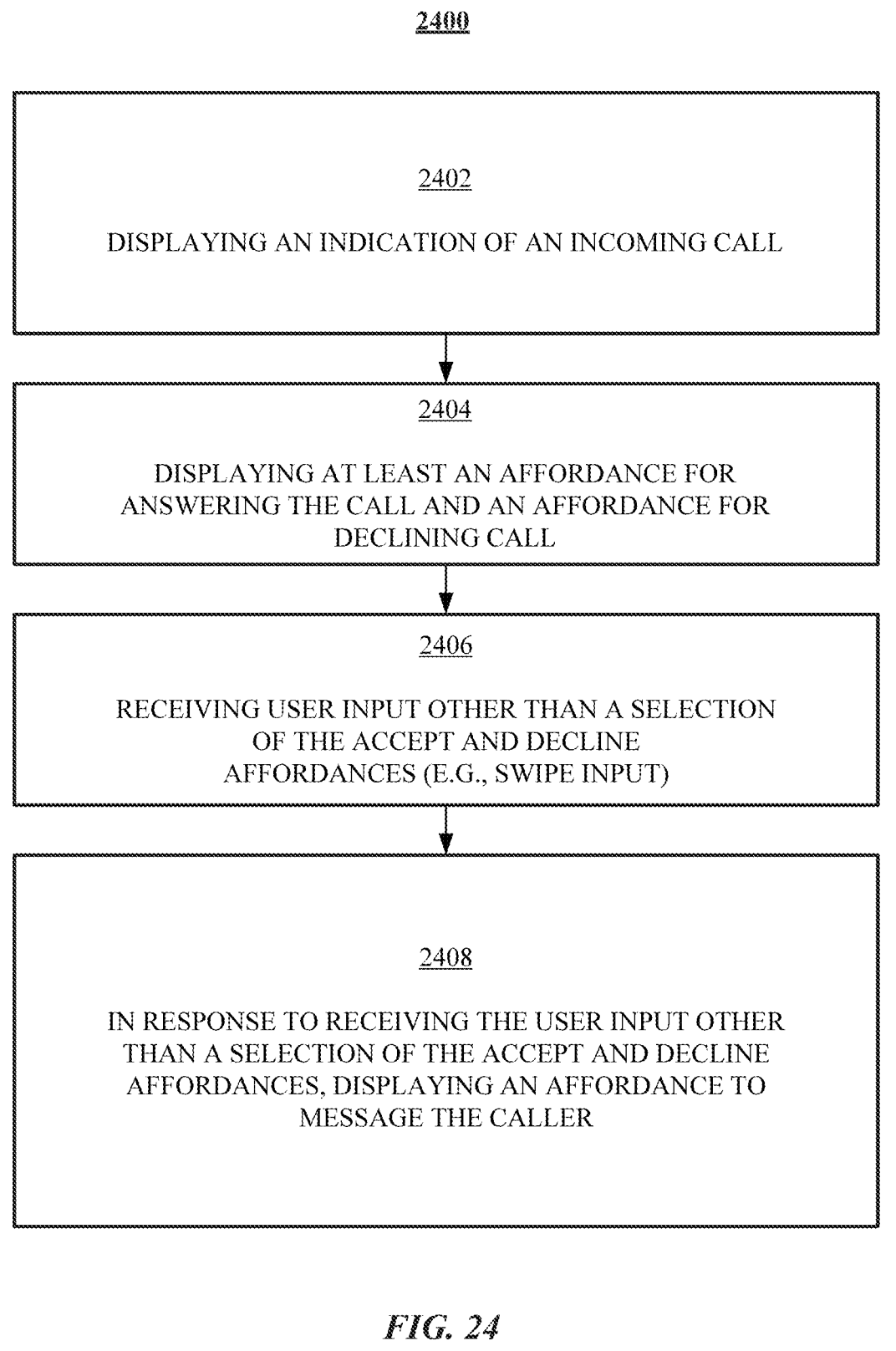

DISPLAYING AN INDICATION OF AN INCOMING CALL

2404

DISPLAYING AT LEAST AN AFFORDANCE FOR
ANSWERING THE CALL AND AN AFFORDANCE FOR
DECLINING CALL

2406

RECEIVING USER INPUT OTHER THAN A SELECTION
OF THE ACCEPT AND DECLINE
AFFORDANCES (E.G., SWIPE INPUT)

2408

IN RESPONSE TO RECEIVING THE USER INPUT OTHER
THAN A SELECTION OF THE ACCEPT AND DECLINE
AFFORDANCES, DISPLAYING AN AFFORDANCE TO
MESSAGE THE CALLER

*FIG. 24*

PHONE USER INTERFACE

CROSS-REFERENCE TO RELATED APPLICATIONS

This application is a continuation of U.S. patent application Ser. No. 17/013,778, entitled "PHONE USER INTERFACE," filed Sep. 7, 2020, which is a continuation of U.S. patent application Ser. No. 16/259,954, entitled "PHONE USER INTERFACE," filed Jan. 28, 2019, which is a continuation of U.S. patent application Ser. No. 14/841,614, entitled "PHONE USER INTERFACE," filed Aug. 31, 2015, which claims the benefit of priority of U.S. Provisional Patent Application Ser. No. 62/044,939, entitled "PHONE USER INTERFACE," filed Sep. 2, 2014; and U.S. Provisional Patent Application Ser. No. 62/129,853, entitled "PHONE USER INTERFACE," filed Mar. 8, 2015. The contents of these applications are hereby incorporated by reference in their entireties.

BACKGROUND

The present disclosure relates generally to computer user interfaces, and more specifically to user interfaces for carrying on phone calls.

BRIEF SUMMARY

Some techniques for controlling phone operations using electronic devices are generally cumbersome and inefficient. For example, some existing techniques use a complex and time-consuming user interface, which may include multiple key presses or keystrokes on multiple devices. Some existing techniques require specific interactions with specific devices even (e.g., headset and phone) when the multiple devices are otherwise capable of communication with one another. Some existing techniques require more time than necessary, wasting user time and device energy. This latter consideration is particularly important in battery-operated devices.

Accordingly, the present technique provides electronic devices with faster, more efficient methods and interfaces for managing phone operations. Such methods and interfaces optionally complement or replace other methods for managing phone operations. Such methods and interfaces reduce the cognitive burden on a user and produce a more efficient human-machine interface. For battery-operated computing devices, such methods and interfaces conserve power and increase the time between battery charges.

In some embodiments, a method of providing phone functionalities comprises: at an electronic device with a touch-sensitive display, wherein the touch-sensitive display comprises one or more sensors to detect the intensity of touches on the touch-sensitive display: during an active phone call, detecting a touch on the touch-sensitive display, wherein the touch has a characteristic intensity and is located at the position of a first affordance; determining whether the characteristic intensity exceeds a predetermined threshold intensity; in response to at least a determination that the characteristic intensity exceeds the predetermined threshold intensity, sending an instruction to a cellular phone instructing the cellular phone to display a second affordance, wherein the second affordance, when selected, causes the cellular phone to retrieve the active phone call; and in response to at least a determination that the characteristic intensity is below the predetermined threshold intensity, performing a function associated with the first affordance.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, a non-transitory computer readable storage medium stores one or more programs, the one or more programs comprising instructions, which when executed by one or more processors of an electronic device with a display, cause the device to: during an active phone call, detect a touch on the display, wherein the touch has a characteristic intensity and is located at the position of a first affordance; determine whether the characteristic intensity exceeds a predetermined threshold intensity; in response to at least a determination that the characteristic intensity exceeds the predetermined threshold intensity, send an instruction to a cellular phone instructing the cellular phone to display a second affordance, wherein the second affordance, when selected, causes the cellular phone to retrieve the active phone call; and in response to at least a determination that the characteristic intensity is below the predetermined threshold intensity, perform a function associated with the first affordance.

In some embodiments, an electronic device, comprises: a display, one or more processors; a memory; and one or more programs, wherein the one or more programs are stored in the memory and configured to be executed by the one or more processors, the one or more programs including instructions for: during an active phone call, detecting a touch on the display, wherein the touch has a characteristic intensity and is located at the position of a first affordance; determining whether the characteristic intensity exceeds a predetermined threshold intensity; in response to at least a determination that the characteristic intensity exceeds the predetermined threshold intensity, sending an instruction to a cellular phone instructing the cellular phone to display a second affordance, wherein the second affordance, when selected, causes the cellular phone to retrieve the active phone call; and in response to at least a determination that the characteristic intensity is below the predetermined threshold intensity, performing a function associated with the first affordance.

Thus, devices are provided with faster, more efficient methods and interfaces for managing phone operations, thereby increasing the effectiveness, efficiency, and user satisfaction with such devices. Such methods and interfaces may complement or replace other methods for managing phone operations.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5E-5H illustrate exemplary components and user interfaces of a personal electronic device in accordance with some embodiments.

FIGS. 6A-6H illustrate exemplary user interfaces for accessing phone features.

FIG. 13 is a flow diagram illustrating a process for accessing phone features in accordance with some embodiments.

FIG. 15 is a flow diagram illustrating a process for accessing phone features in accordance with some embodiments.

FIG. 24 is a flow diagram illustrating a process for modifying event notifications in accordance with some embodiments.

DESCRIPTION OF EMBODIMENTS

Figure 1A:
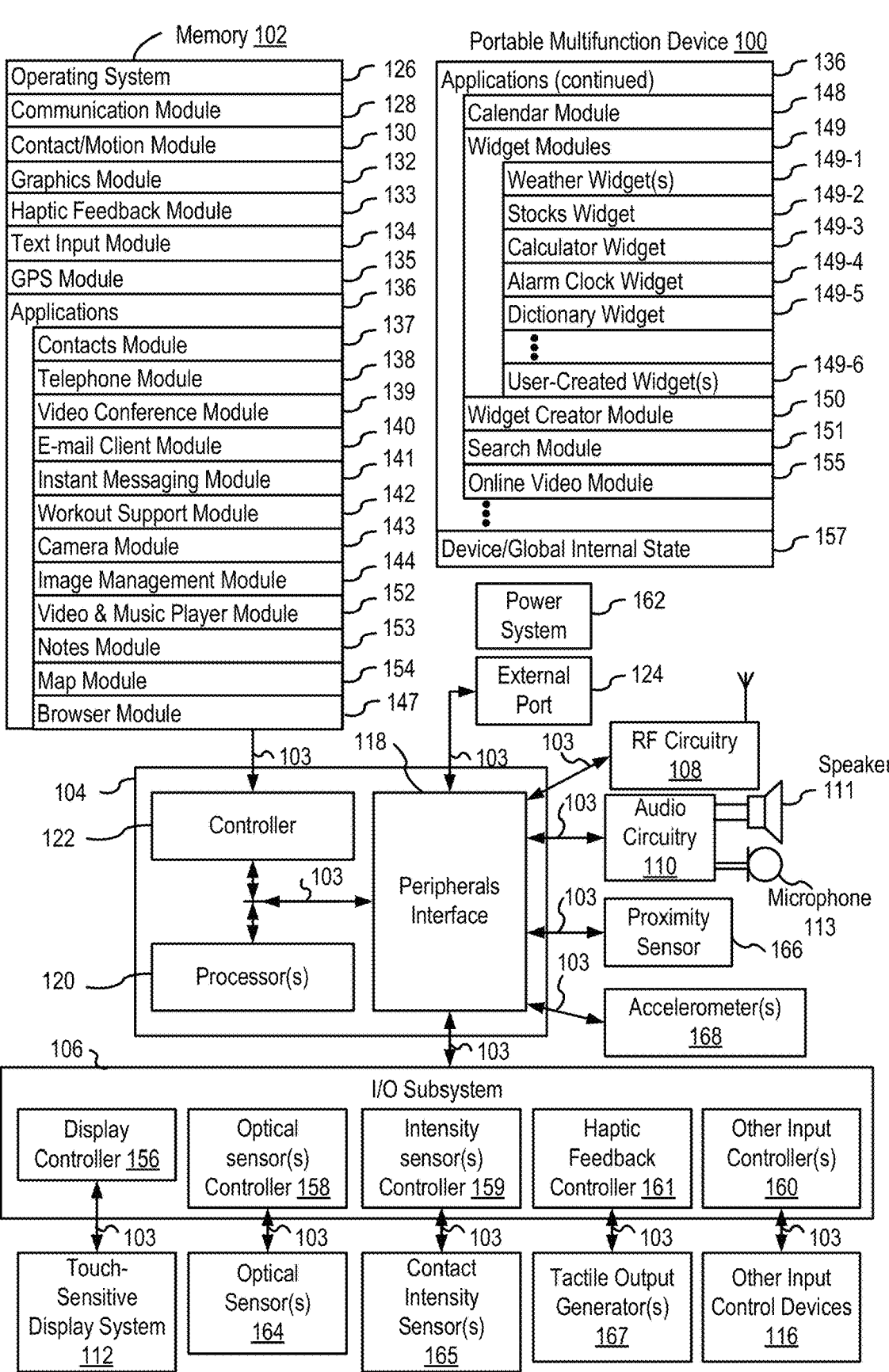
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

It is desirable for a user who is in the proximity of multiple electronic devices to be able to efficiently control how phone call operations are to be handled by not just one but one or more of those devices. For example, a user may have a cellular phone in his pocket, a wearable headset worn on his head, and a wearable multi-function device worn on his arm. When a phone call is received by the cellular phone (in his pocket), it may be more convenient for the user to (i) answer the call using a user interface on the wearable device but (ii) physically participate in the call through the worn headset, while (iii) the cellular phone remains in his pocket. Thus, a versatile user interface that provides a user efficient with control over aspects of phone call operations occurring on one or across multiple devices is desirable.

Below, FIGS. 1A-1B, 2, 3, 4A-4B, and 5A-5B, provide a description of exemplary devices that may participate in the handling of a phone. FIGS. 6A-6H, 7A-7E, 8A-8E, 9A-9B, 10A-10C, and 11A-11C illustrate exemplary user interfaces for controlling aspects of phone operations. The user interfaces in the figures are also used to illustrate the processes described below, including the processes in FIGS. 12-15.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes one or more computer-readable storage mediums. The computer-readable storage mediums are optionally tangible and non-transitory. The computer-readable storage mediums are optionally transitory. Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions)

Figure 3:
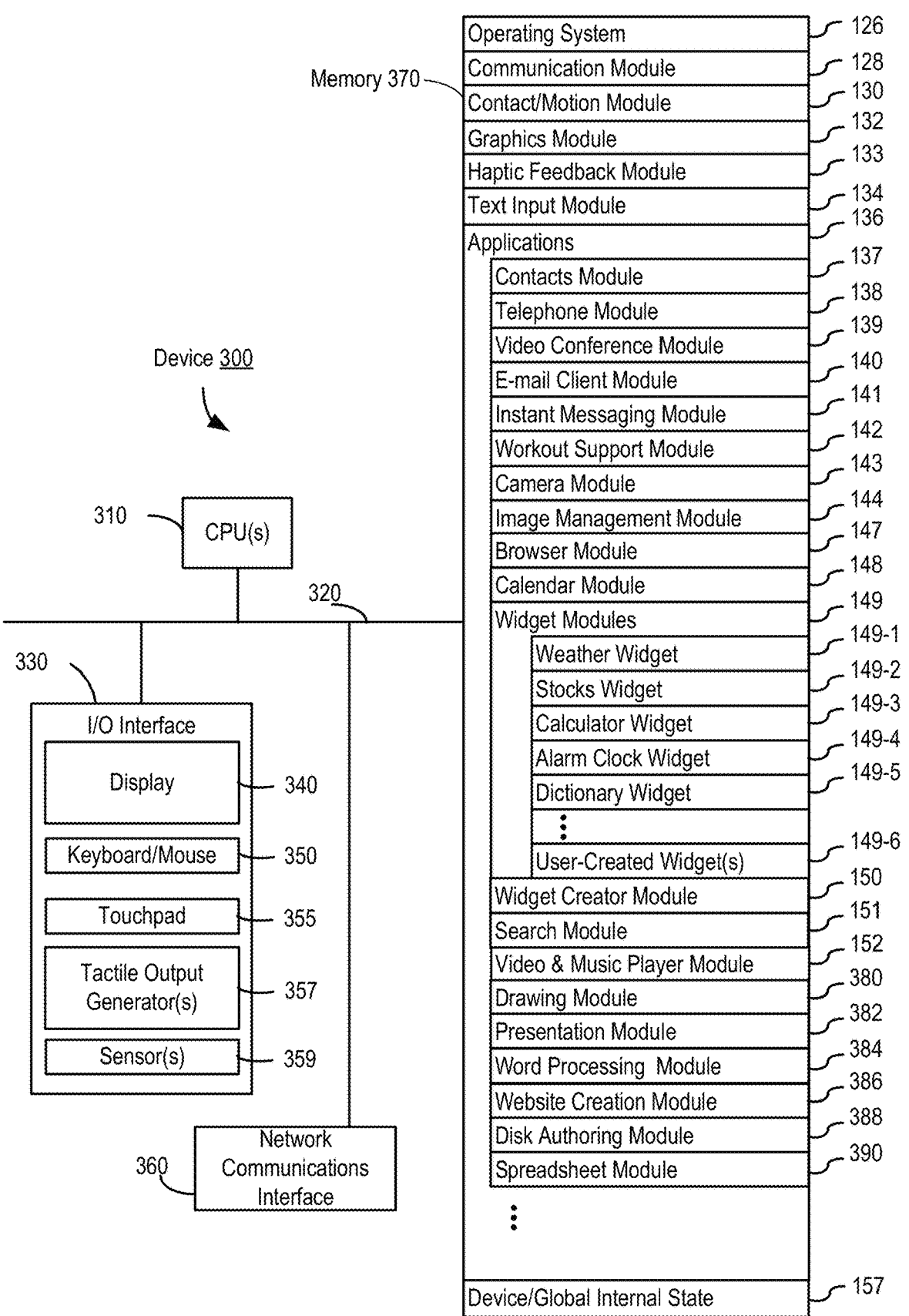
FIG. 3 is a block diagram of an exemplary multifunction device with a display and a touch-sensitive surface in accordance with some embodiments.

134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;

Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
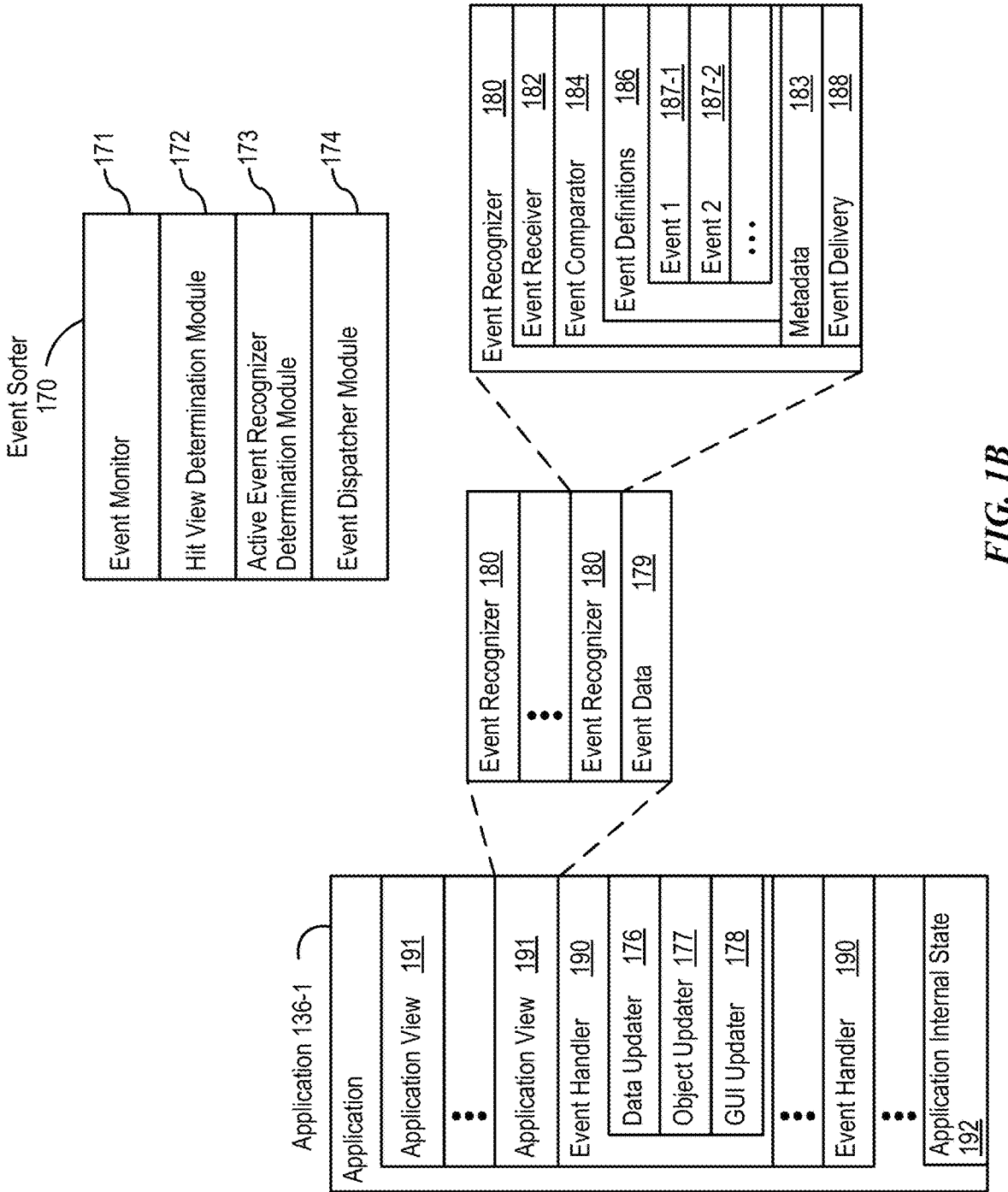
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113

(through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
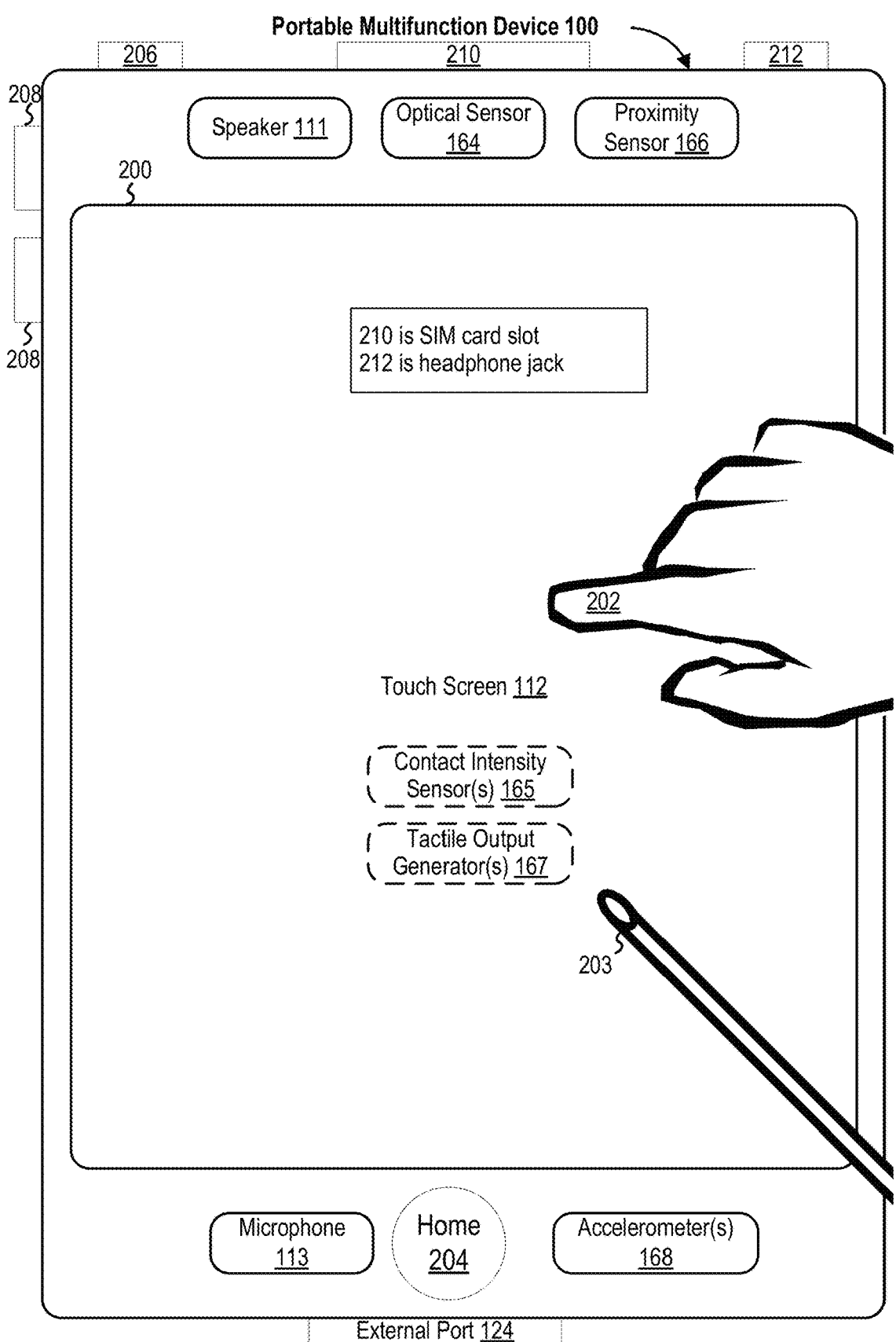
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 are, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that is, optionally, implemented on, for example, portable multifunction device 100.

Figure 4A:
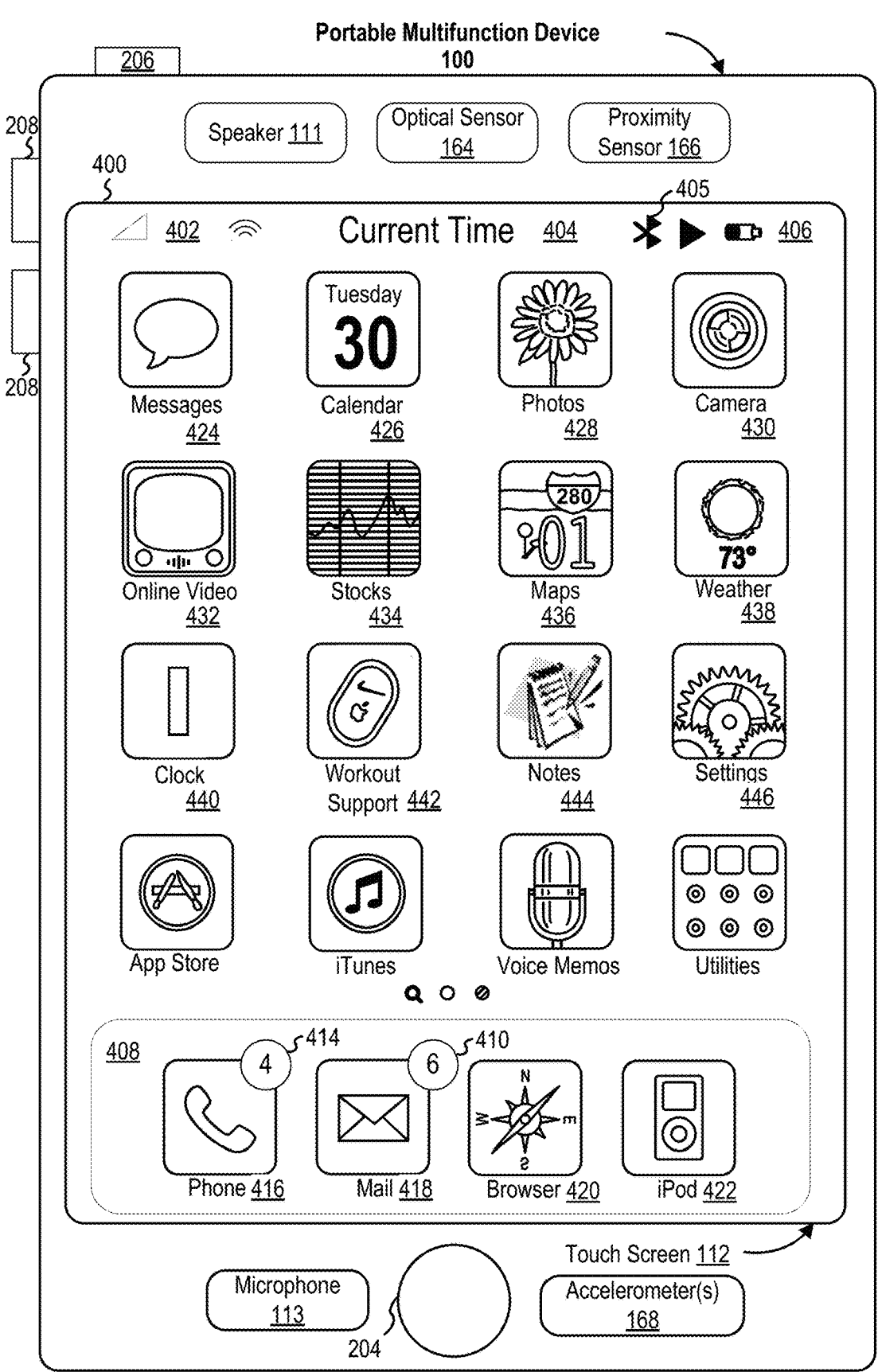
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface

451 and/or one or more tactile output generators 357 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
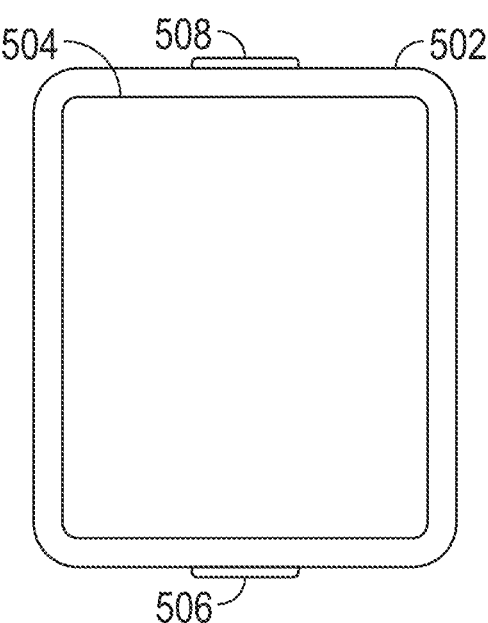
FIG. 5A is a block diagram illustrating a portable multifunction device with a touch-sensitive display and a rotatable input mechanism in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
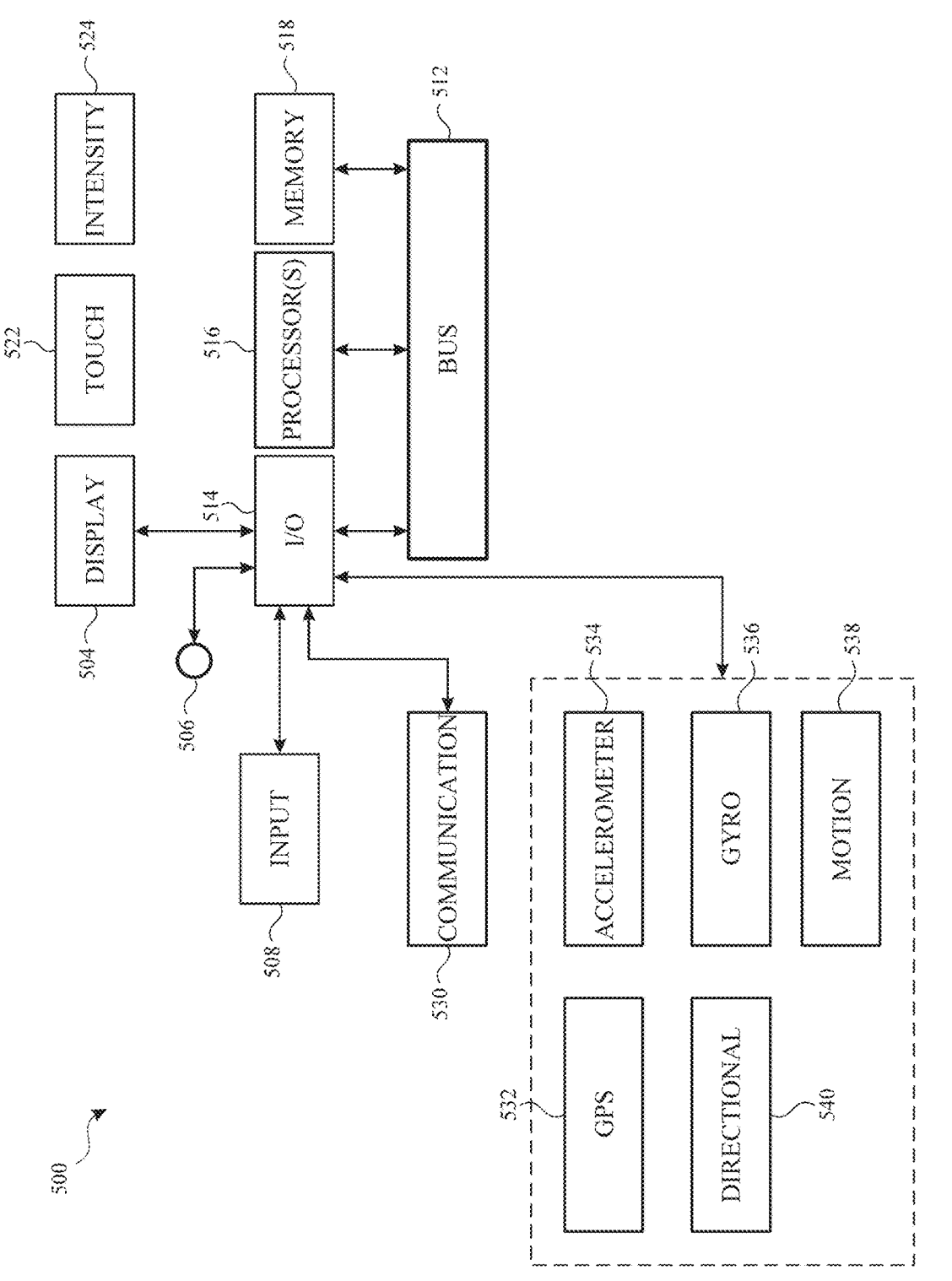
FIG. 5B illustrates a portable multifunction device having a touch-sensitive display and a rotatable input mechanism in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 1200-1500, 2100, and 2400 (FIGS. 12-15, 21, and 24). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

Figure 5C:
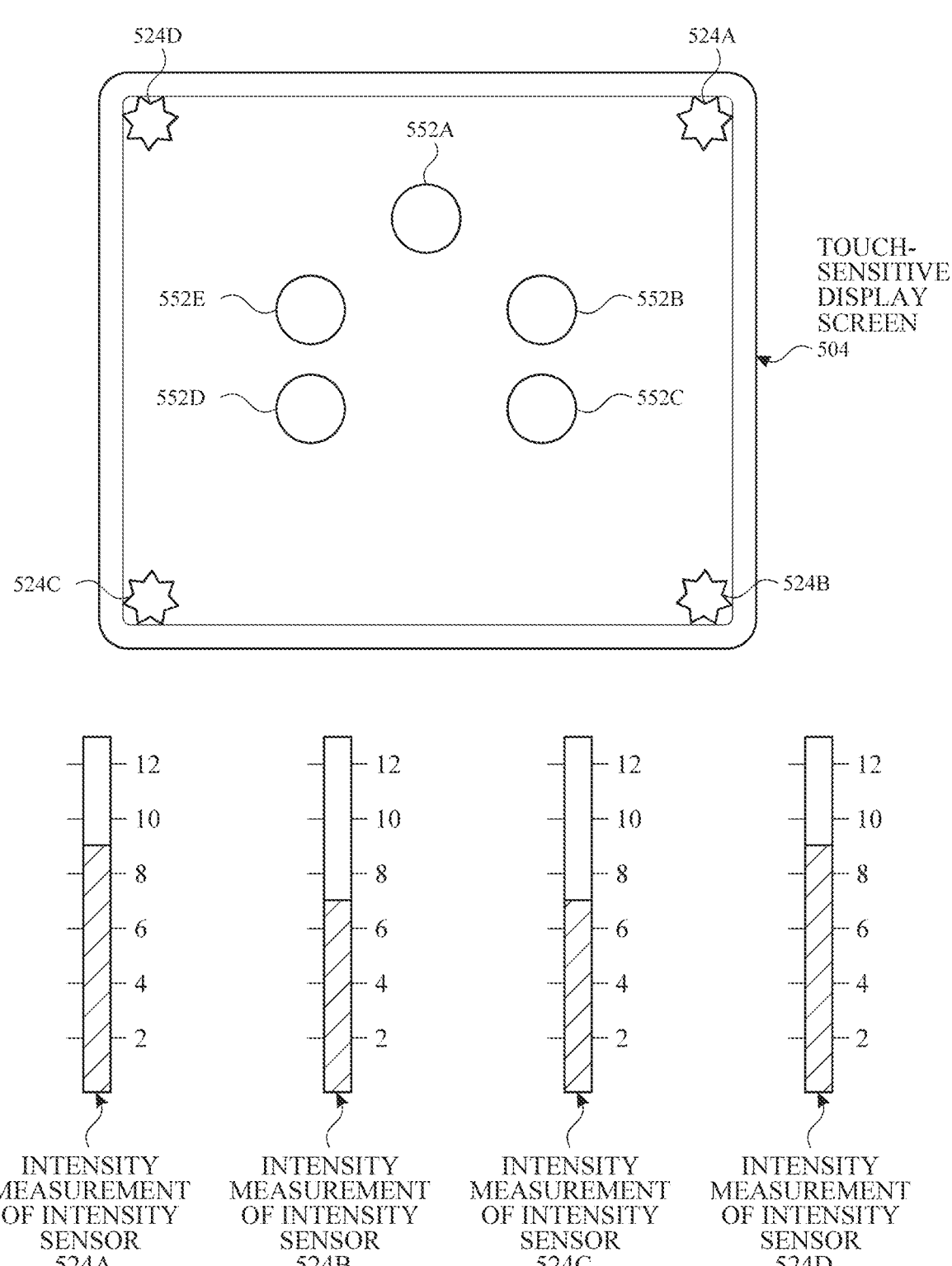
FIGS. 5C-5D illustrate exemplary components of a personal electronic device having a touch-sensitive display and intensity sensors in accordance with some embodiments.
Figure 5D:
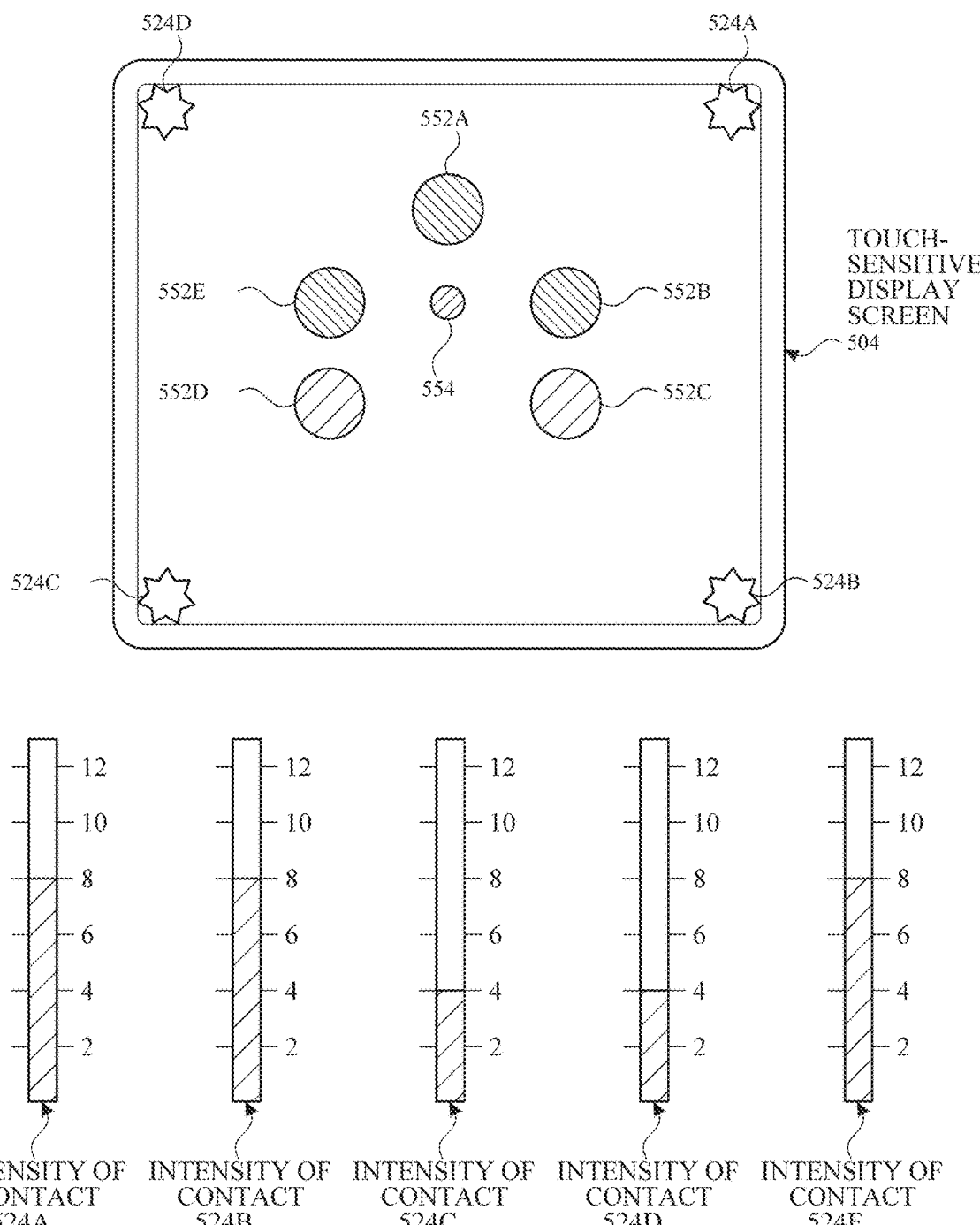

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5F:
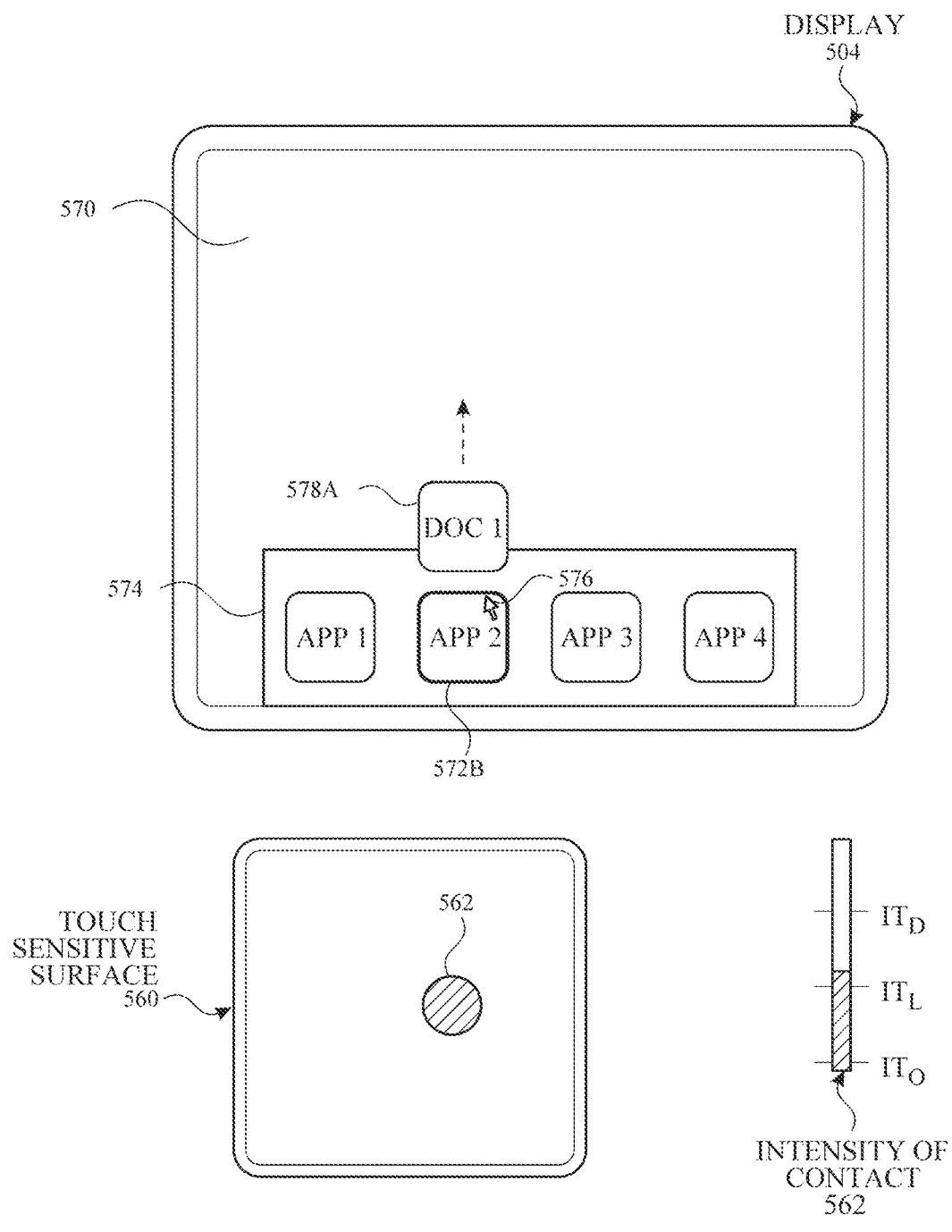
Figure 5G:
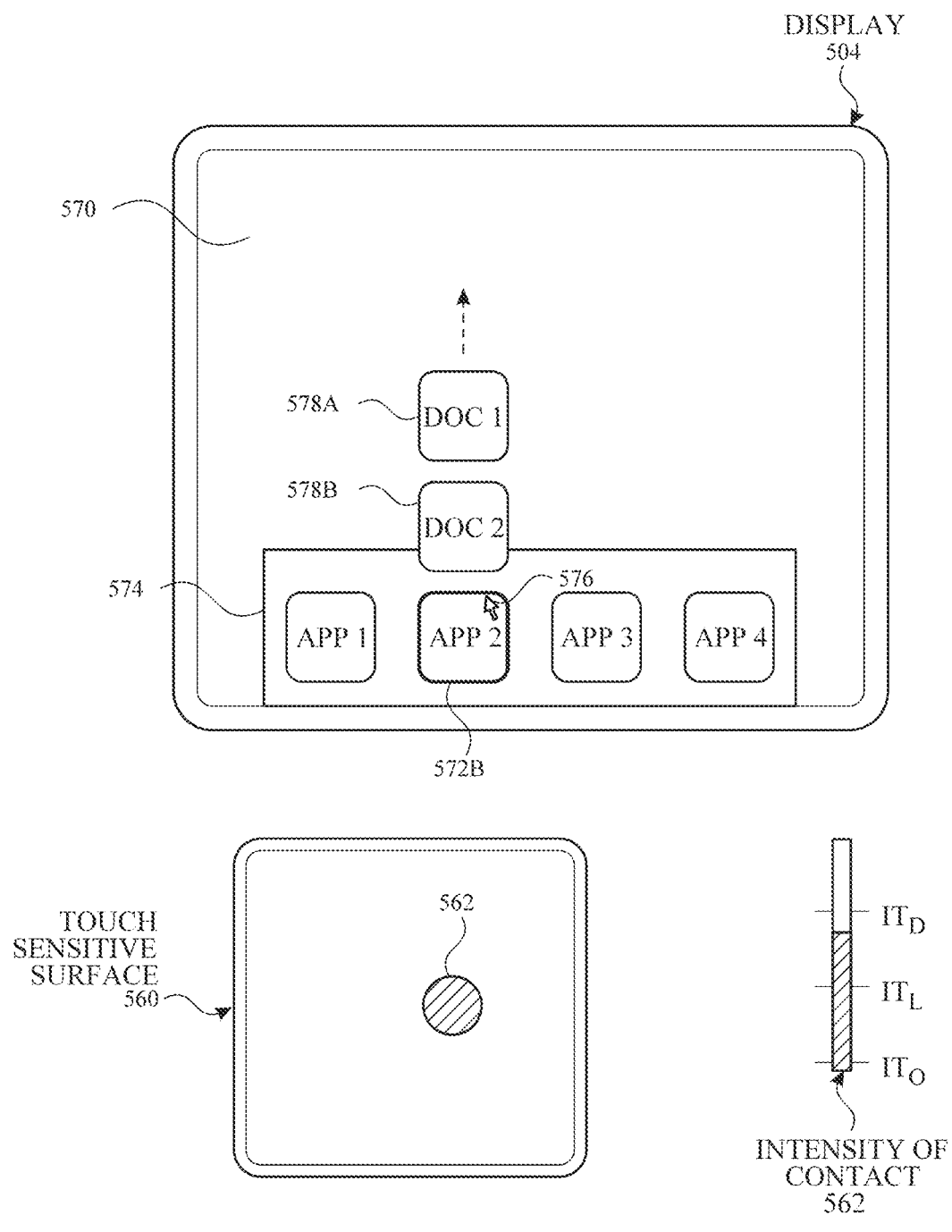
Figure 5H:
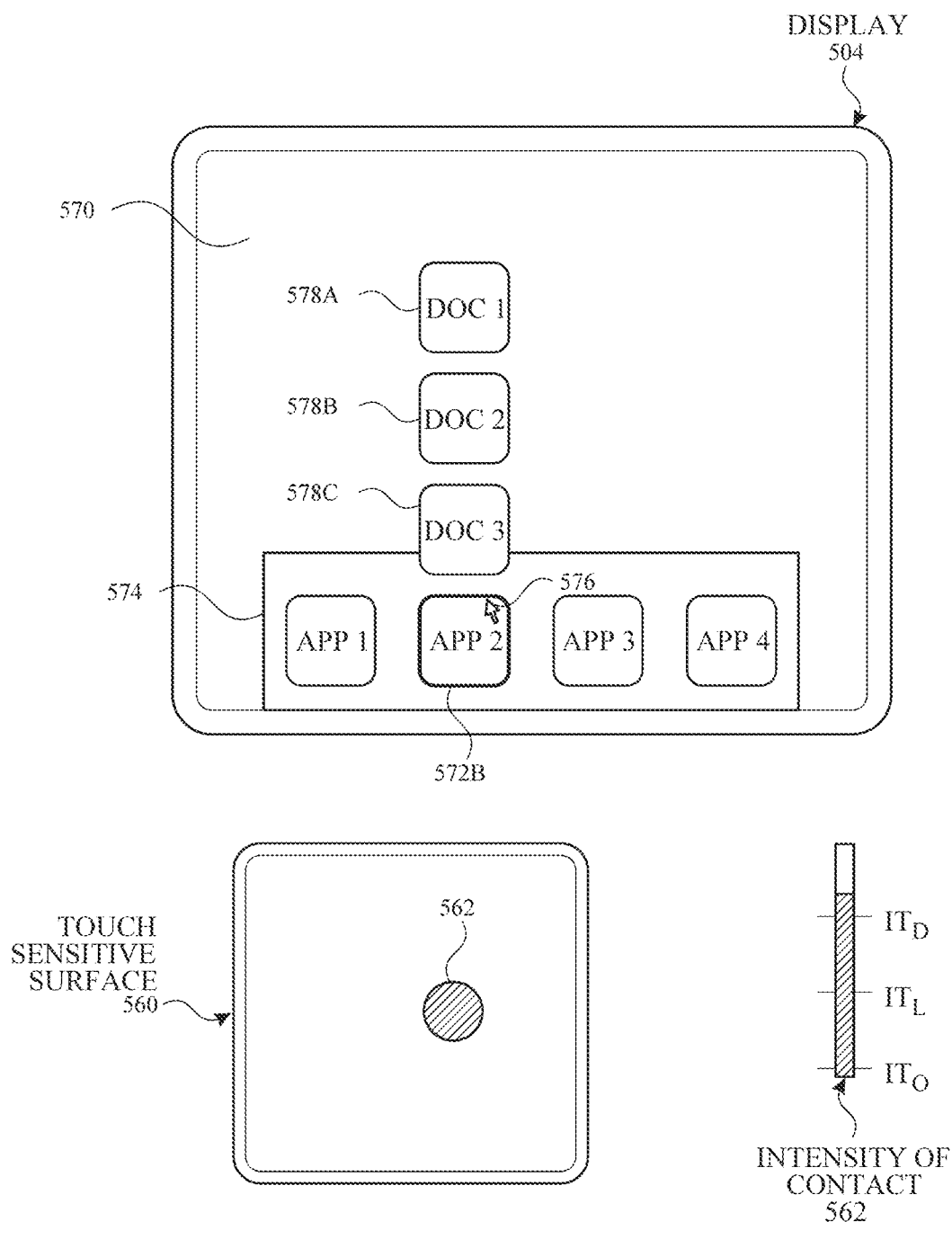

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT$_D$"). Contact 562 is maintained on touch-sensitive surface 560. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT$_D$"). In some embodiments the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:

an active application, which is currently displayed on a display screen of the device that the application is being used on;

a background application (or background processes) which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UP") and associated processes that are implemented on an electronic device, such as portable multifunction device 100, device 300, or device 500 (FIGS. 1A, 3A, and/or 5A), to provide phone functionalities.

1. Exemplary Phone User Interfaces

Figure 6A:
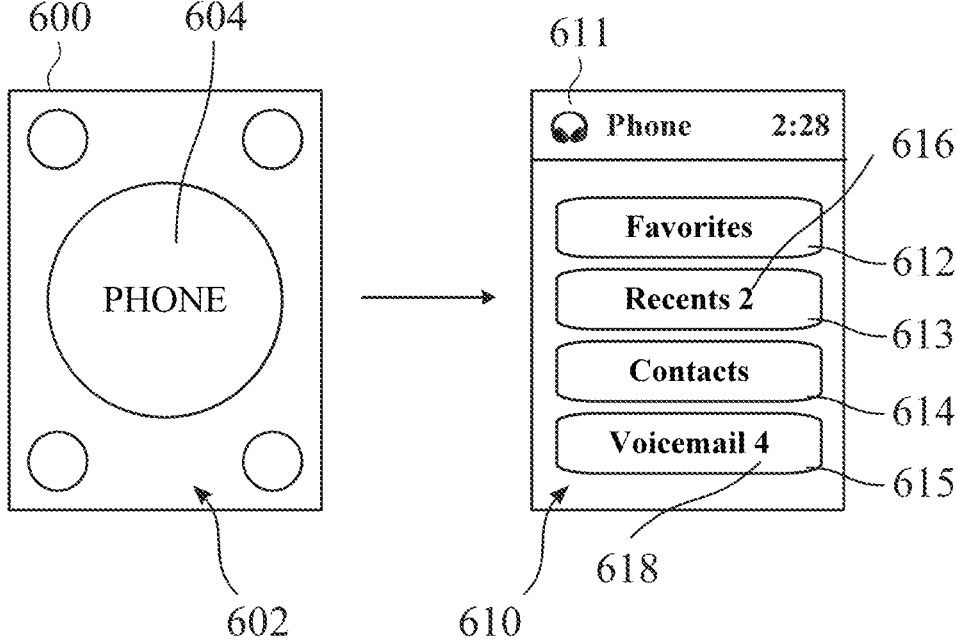

FIG. 6A illustrates exemplary wearable electronic device 600. Wearable electronic device 600 is device 500 (FIG. 5A) in some embodiments. As shown, device 600 is displaying user interface screen 602. User interface screen 602 in some embodiments has icons for launching features on device 600, including icon 604 for launching a phone user interface. In response to a user selection (e.g., touch) of icon 605, device 600 displays exemplary phone user interface screen 610. Screen 610 is referred to as a landing screen, as it is the user interface screen that is displayed when phone features are initially launched on device 600.

Landing screen 610, displayed in some embodiments, has status indicator 611 indicating whether a cellular phone and/or a headset are operatively connected for use for phone calls. Landing screen 610 also has affordance 612, which, when selected, displays a list of contacts that have been designated by a user to be favorite contacts. Landing screen 610 also has affordance 613, which, when selected, displays a list of recent incoming and/or outgoing calls. Landing screen 610 also has affordance 614, which, when selected, displays a list of address book contacts accessible to device 600. Landing screen 610 also has affordance 615, which, when selected, displays a listing of voicemail messages that have been left for the user.

Optionally, affordance 613 has missed-call indicator 616 indicating the number of missed calls. Optionally, affordance 615 has new voicemail indicator 618 indicating the number of new voicemail messages. Optional indicators 616 and/or 618 may be hidden from view when there is no missed call or new voicemail message. Landing screen 610 is scrollable to reveal additional content such as affordances for accessing additional phone features. In some embodiments, landing screen 610 is scrolled via touch input. In some embodiments, landing screen 610 is scrolled in response to movement of a rotatable input mechanism of device 600.

Figure 6B:
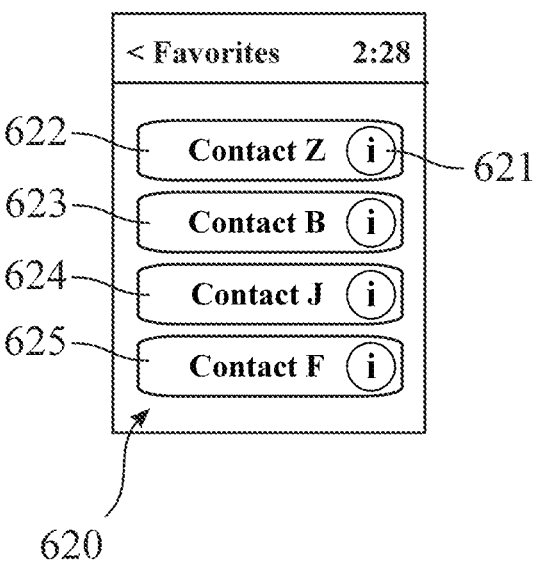

FIG. 6B illustrates an exemplary user-designated favorites screen 620 that is displayed in some embodiments in response to a user selection of affordance 612 (FIG. 6A). Favorites screen 620 has one or more affordances (e.g., 622-625) identifying user-designated contacts. A call may be placed by selecting one of affordances 622-625. An affordance representing a user-designated contact may optionally include an information icon 621 for accessing additional information regarding the contact on a user interface screen referred to as a contact card. A contract card provides contact information such as contact name, phone number and/or addresses (optionally shown on a map). A contact card may also have affordances for initiating communication with contact, such as by audio and/or video call, as well as via messages (e.g., short messages via services such as SMS and MMS, text messages via services such as iMessage® provided by Apple, Inc. of Cupertino, Calif., e-mail messages). User-designated favorites screen 620 is scrollable to reveal additional affordances representing user-designated contacts. In some embodiments, favorites screen 620 is scrolled via touch input. In some embodiments, favorites screen 620 is scrolled in response to movement of a rotatable input mechanism of device 600.

Figure 6C:
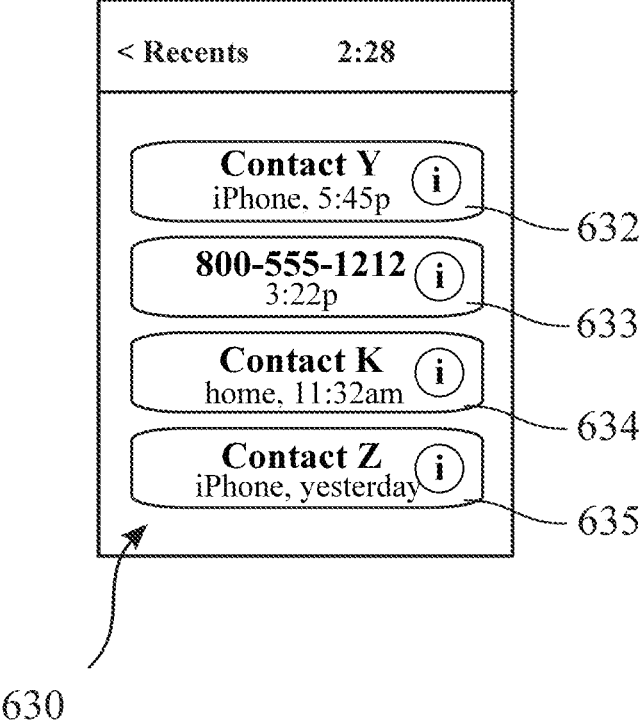

FIG. 6C illustrates exemplary recent calls screen 630, which is displayed in some embodiments in response to a user selection of affordance 613 (FIG. 6A). Recent calls screen 630 has affordances indicating recent incoming and/or outgoing calls, such as affordance 632-635. Affordances representing recent calls may include additional information about the call—such as the identity of the call's participant (s), a phone number or other identifier associated with the call, the duration of the call, the time of the call, so forth. A user may select a displayed affordance to call the represented participant(s). An affordance representing a recent call may optionally include an information icon for accessing additional information regarding the represented contact, e.g., by displaying a corresponding contact card. Recent calls screen 630 is scrollable to reveal additional affordances representing recent calls. In some embodiments, recent calls screen 630 is scrolled via touch input. In some embodiments, recent calls screen 630 is scrolled in response to movement of a rotatable input mechanism of device 600.

Figure 6D:
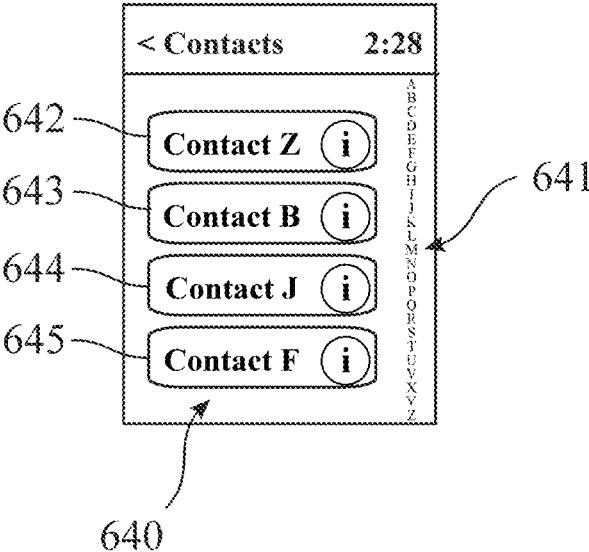

FIG. 6D illustrates exemplary contacts screen 640, which is displayed in some embodiments in response to a user selection of affordance 614 (FIG. 6A). Contacts screen 640 has affordances representing contacts that are accessible to device 600, such as contact affordances 642-645. A user may select a displayed affordance to initiate a call to the represented contact. An affordance representing a contact may optionally include an information icon for accessing additional information regarding the represented contact, e.g., by displaying a corresponding contact card. Contacts screen 640 is scrollable to reveal additional affordances representing user-designated contacts. In some embodiments, contacts screen 640 is scrolled via touch input. In some embodiments, contacts screen 640 is scrolled in response to movement of a rotatable input mechanism of device 600. In some embodiments, contacts screen 621 has index indicator 641 for scrolling through contact affordances.

Figure 6E:
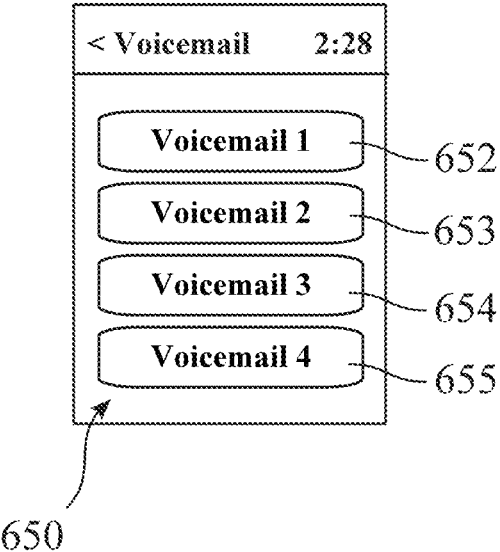

FIG. 6E illustrates exemplary voicemail screen 650, which is displayed in some embodiments in response to a user selection of affordance 615 (FIG. 6A). Voicemail screen 650 has affordances representing voicemail messages that are accessible using device 600, such as affordances 652-655. An affordance representing a voicemail may optionally include information about the voicemail message such as the caller, the duration of the message, the time of the message, an indication of whether the message has been played, so forth.

Figure 6F:
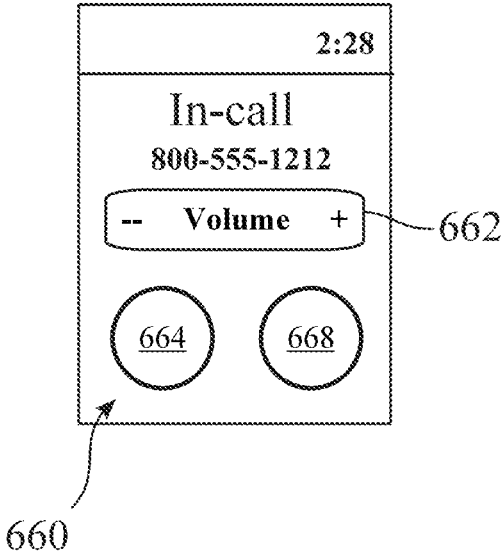

FIG. 6F illustrates exemplary in-call screen 660, which is displayed in some embodiments when a call is in-progress. As shown, in-call screen 660 includes volume control 662, as well as affordance 664 and 668 for accessing call functions. Exemplary call functions include holding the call, ending the call, muting the call, accessing a keypad, and so forth. In-call screen 660 also displays the identity of other call participant(s). In-call screen 660 is responsive to user navigation input. For example, during a call, a user may activate (e.g., touch or a rotate) one of the input mechanisms of device 600 to navigate away from in-call screen 660. When a user navigates away from in-call screen 660 while remaining on a call, device 600 in some embodiments displays an indicator of the in-progress phone call so that the user is aware that the call remains in-progress. This aspect is discussed with reference to FIG. 6G.

FIG. 6G illustrates exemplary user interface screen 670, displayed in response to user navigation away from in-call screen 652 while continuing with a call, in some embodiments. For example, a user may activate (e.g., touch or a rotate) one of the input mechanisms of device 600 while in-call screen 660 is displayed to access another user interface screen on device 600, such as a screen provided by another application. User interface screen 670 may be any user interface screen provided by device 600. In the illustrated example, user interface screen 670 is a modified instance of landing screen 610. In particular, screen 670 includes in-call indicator 676 indicating the status of the in-progress call. In-call indicator 678 includes call participant identifier 677 and a call duration indicator 678. In-call indicator 678 is displayed for the duration of the call (or until the user returns to in-call screen 660). In-call indicator 676 is positioned towards the top of landing screen 670 so as to increase its visibility to a user. The remaining contents of screen 670 are displayed below in-call indicator 676. As shown, voicemail affordance 675 is partially off-screen due to the inclusion of in-call indicator 676. By displaying in-call indicator 686, device 600 provides a user who has navigated away from in-call screen 660 an efficient method of returning to in-call screen 660 for accessing call-related features. As will be understood, in-call indicator 676 or 686 can be displayed on any user interface screen of the device while a call is in progress in response to user navigation away from in-call screen 652.

FIG. 6G also illustrates exemplary user interface 680 which is a variation of screen 670, displayed in some embodiments under certain usage conditions. In addition to affordances 683-685 for accessing phone features, as well as in-call indicator 686 indicating that a call is in-progress, screen 680 includes an additional application-specific persistent indicator 687. In the illustrated example, application-specific indicator 687 is a music playback indicator showing the current status of a background music player application. Notably, although both indicators 686 and 687 are "persistent" in the sense that they remain displayed to indicate an ongoing process (ceasing to be displayed when the application associated with the process becomes actively displayed), the indicators are still able to accommodate for the presence of one another. In the example of FIG. 6G, in-call indicator 686 moved down-screen in order to accommodate music playback indicator 687.

Figure 6H:
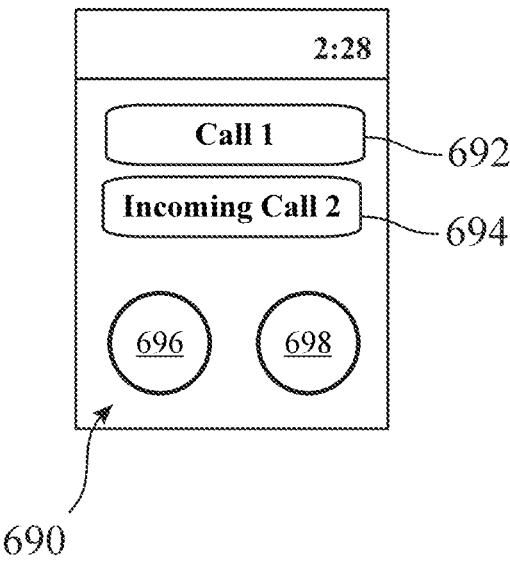

FIG. 6H illustrates exemplary call-waiting screen 690, displayed in some embodiments when an incoming call (e.g., a second call) is received while a first call is in-progress. As shown, call-waiting screen 690 has incoming call identifier 694 identifying the incoming call, affordance text 692 identifying the first call, affordance 696 for answering the second call, and affordance 698 for ignoring the second call. Although not shown, call-waiting screen 690 may have affordances representing additional ways of handling the multiple calls. For example, an affordance can be displayed permitting a user to hang up the first call and answer the second call with a single activation of the affordance.

2. Connection Scenarios

Attention is now directed to how one or more of the above-described user interface screens may be used in handling incoming and outgoing calls, particularly in scenarios where multiple devices that are capable of participating in a call are proximate (e.g., within wireless communication range of one another). Exemplary scenarios are described below with reference to FIGS. 7-9. Before turning to the illustrative examples, however, a brief summary of exemplary connection scenarios, and guiding operation principles, is provided in table 1, below. Consider the scenario in which a cellular phone, a wearable electronic device, and a headset are within communication range of one another:

TABLE 1

| Scenario | Operation Principle | Exemplary Illustration |
|---|---|---|
| (1) Headset is paired and connected with cellular phone. Wearable electronic device is paired and connected with cellular phone. | Calling and receiving calls should not require direct user interaction with cellular phone. User may control call functions from wearable electronic device. | FIGS. 7A-7C |
| (2) Headset is not connected with cellular phone. Wearable electronic device is paired and connected with cellular phone | Permit wearable electronic device to queue a call onto cellular phone. | FIGS. 8A-8C |
| (3) Headset is connected to wearable electronic device. Wearable electronic device is not connected with cellular phone. | Subset of phone features still possible, based on user interaction with wearable electronic device. | FIGS. 9A-9B |

Turning first to FIGS. 7A-7D, FIG. 7A illustrates an exemplary scenario (1) in which user 700 is in possession of cellular phone 702, wearable electronic device 704, and headset 706. Cellular phone 702 is device 100 (FIG. 1A) in some embodiments. Wearable electronic device 704 is device 500 (FIG. 5A). Headset 706 is a wireless (e.g., Bluetooth-enabled) headset in the illustration but may also be a microphone-equipped, earpiece, headphone, or the like, whether wired or wireless.

Devices 702, 704, 706 are configured to communicate with one another. In some embodiments, operative communication between two devices results from a two-stage process. First, the devices become paired. As used herein, two devices are "paired" if they are registered to communicate with one another. An exemplary pairing process is the Bluetooth pairing process. Another exemplary pairing process is the registration of a WiFi profile for purposes of communicating with another WiFi-enabled device (e.g., an access point or equivalent). Other pairing processes are possible. For example, two devices may each become registered with a cloud-based user identifier, such as an AppleID® provided by Apple, Inc. of Cupertino, Calif. Second, the paired devices share an operative connection. Two paired devices may operatively connect with one another when they come within range of one another. They may rely on information obtained during the pairing process, such as the use of an authentication token, in order to create an operative connection. One situation in which two nearby, paired devices are not operatively connected arise when one device is powered-off or in airplane mode.

In some embodiments actual operative communication can result from an ad hoc connection. Although pairing is sometimes a pre-requisite to establishing communication, (such as under communication protocols like Bluetooth), a lack of pairing in these embodiments do not necessarily preclude two devices from forming an ad hoc communication session, thereby becoming operatively connected, in certain embodiments.

Figure 7A:
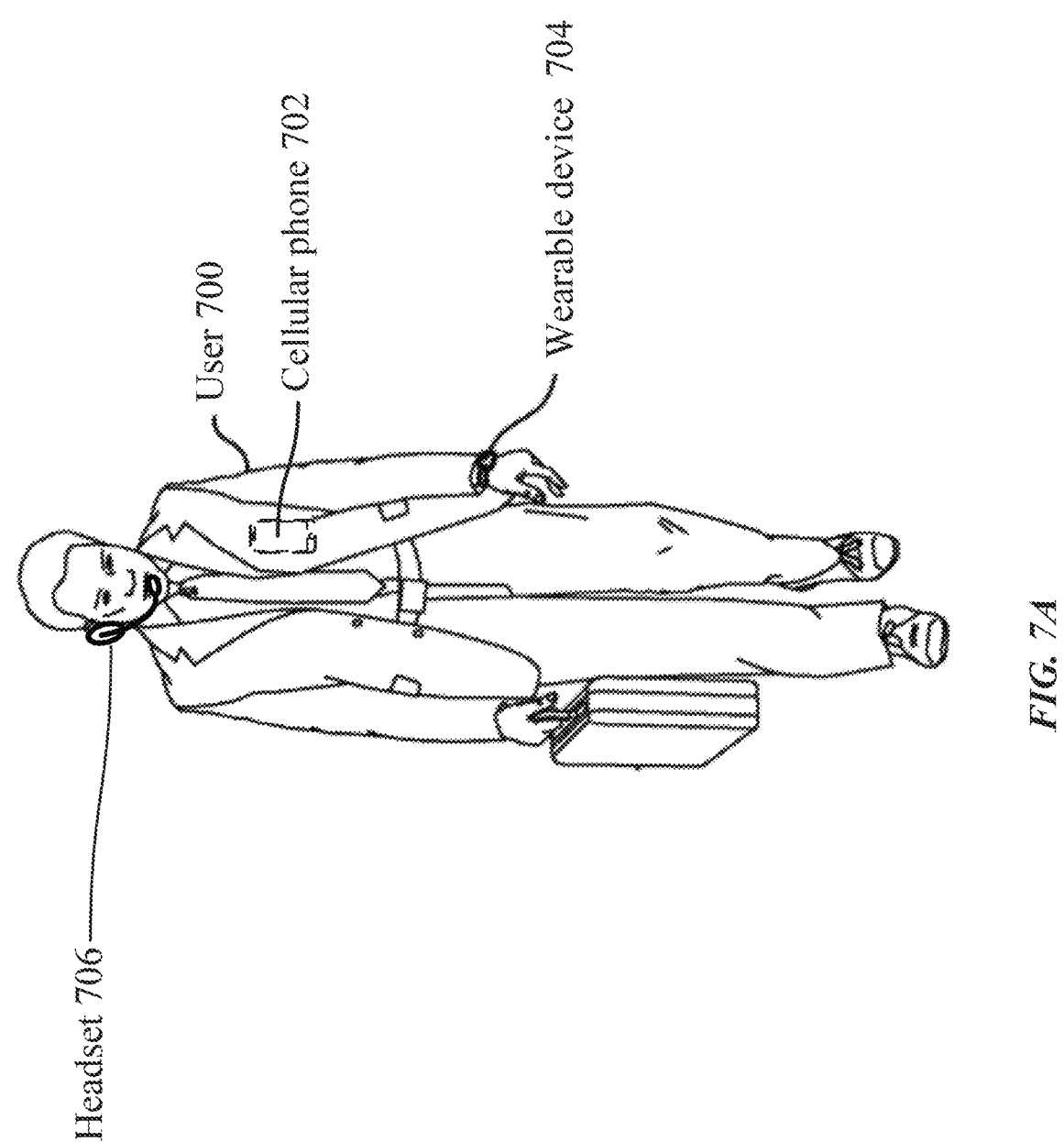
FIGS. 7A-7E illustrate exemplary user interfaces for accessing phone features among multiple devices.

In the illustrated scenario of FIG. 7A, wearable electronic device 704 is paired with and operatively connected to cellular phone 702; headset 706 is paired with and operatively connected to cellular phone 702. Cellular phone 702 has cellular circuitry necessary for placing and receiving a (cellular) phone call.

Figure 7B:
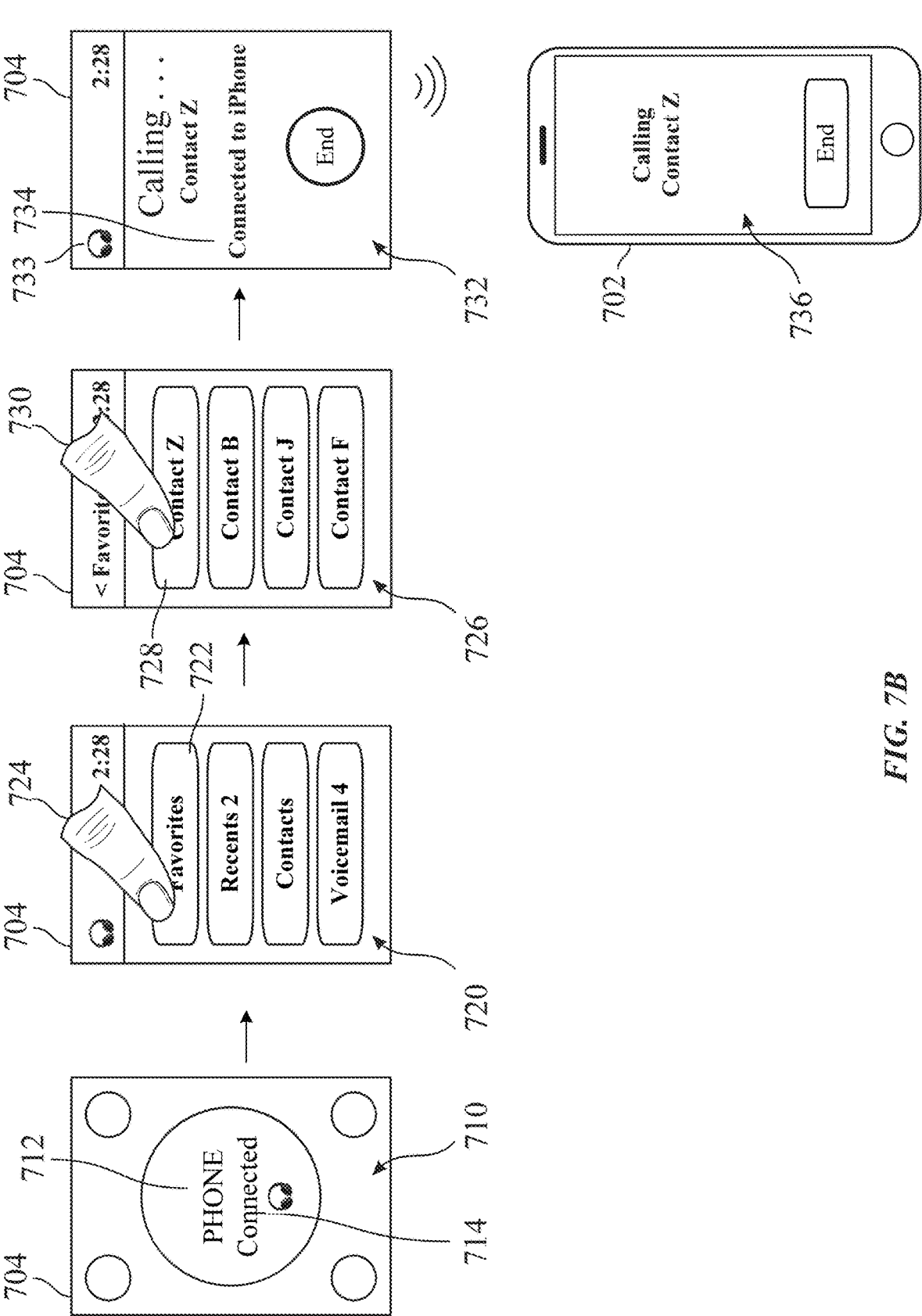

Attention is now directed to how a call may be initiated in this exemplary scenario. Recall from table 1 that in this scenario it is desirable to place the call while requiring little to no user interaction with cellular phone 702. Turning to FIG. 7B, wearable electronic device 704 displays phone affordance 712 for accessing phone functions. Wearable electronic device 704 may, along with affordance 712, display indication 714 of status of connection(s) between devices 702, 704, and/or 706. As shown, status indicator 714 indicates (textually) an operative connection between the wearable electronic device 704 and cellular phone 702, as well as (symbolically via an image) an operative connection between cellular phone 702 and headset 706.

While phone affordance 712 is displayed, a user may select the affordance to access phone landing screen 720. Phone landing screen 720 is screen 610 (FIG. 6A) in some embodiments. A user may select favorite contacts affordance 722 via touch 724 to display phone contacts on screen 726, which is user-designated favorites screen 620 (FIG. 6B) in some embodiments. The listing of contacts includes contact affordance 728 representing "Contact Z." The user may select contact affordance 728 via touch 730 to initiate a call to the represented contact.

To initiate the call, wearable electronic device 704 sends instructions to cellular phone 702 instructing cellular phone 702 to place a call to Contact Z. Upon initiating the call, wearable electronic device 704 displays in-call screen 732 and cellular phone 702 displays calling screen 736. Continuing onto FIG. 7C, after the call has been made (e.g., after a predetermined time or after the call is answered), wearable electronic device 704 displays in-call screen 740, which is in-call screen 660 (FIG. 6F) in some embodiments. In the meantime, cellular phone 702 transitions to displaying exemplary in-call screen 742 which includes an identification for the call and affordance(s) for phone operations such as ending the call. Further, as cellular phone 702 is operatively connected to headset 706, cellular phone 702 communicates with headset 706 so that the headset 706 is used to carry on the call, meaning that a microphone of headset 706 is used to provide input to the call, and a speaker of headset 706 is used to provide output from the call. As shown, in-call screen 740 includes a volume affordance for controlling the output of headset 706.

Figure 7C:
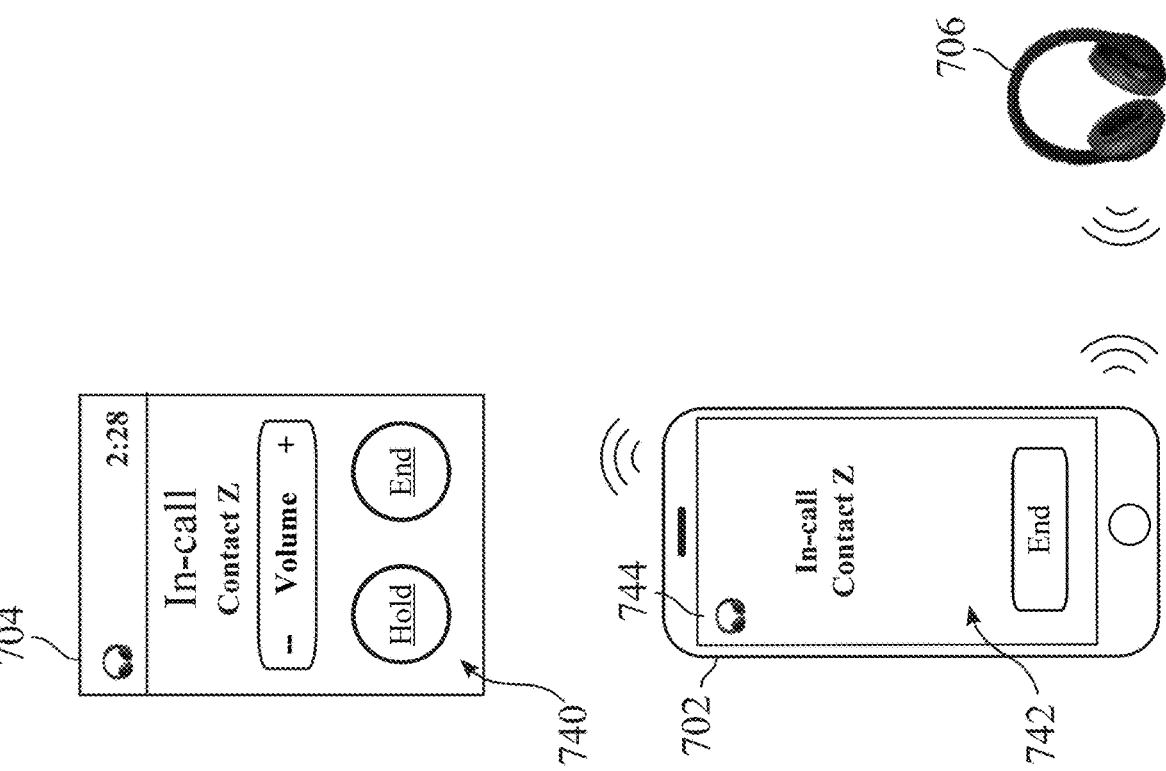
Figure 7D:
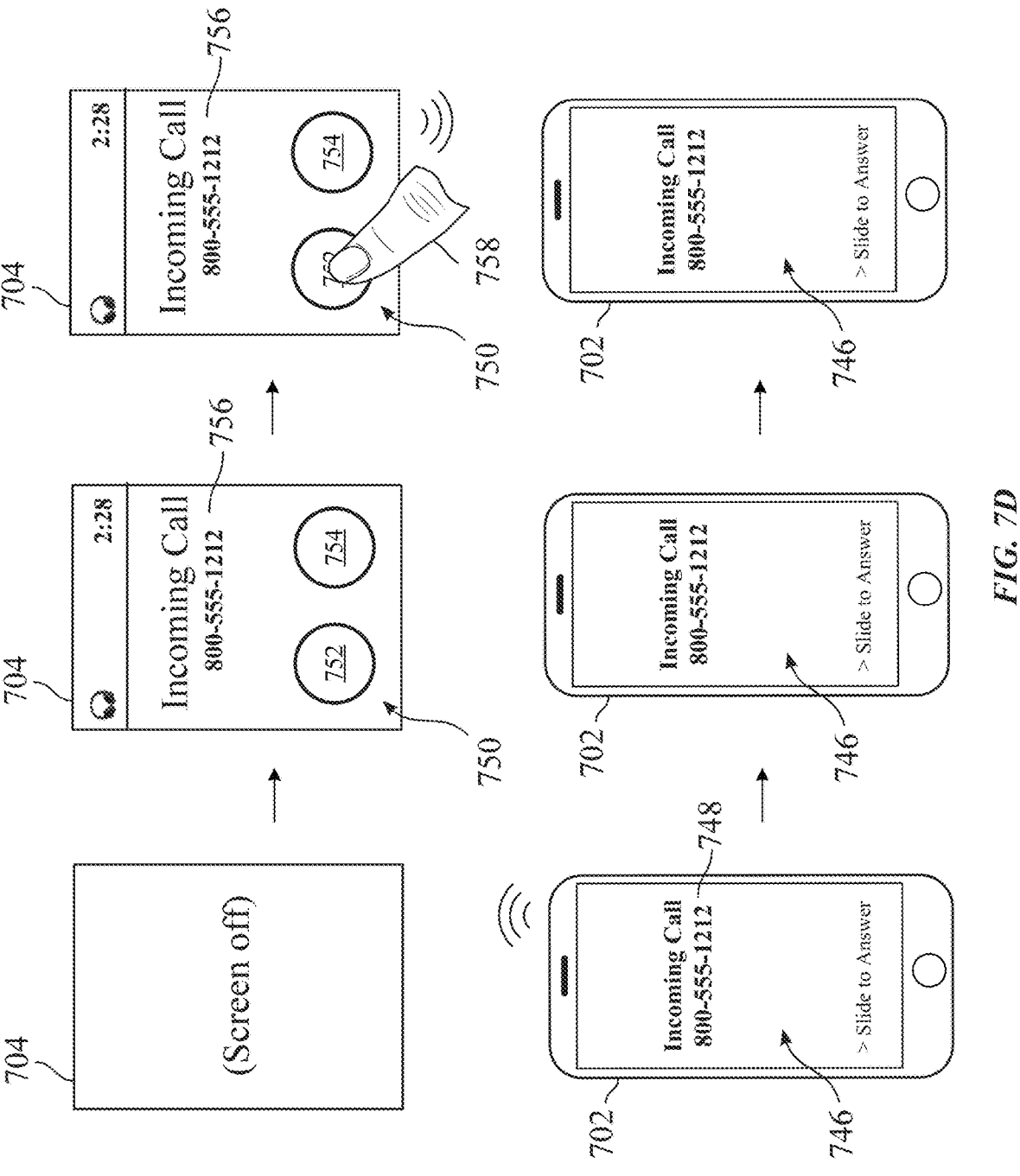
Figure 7E:
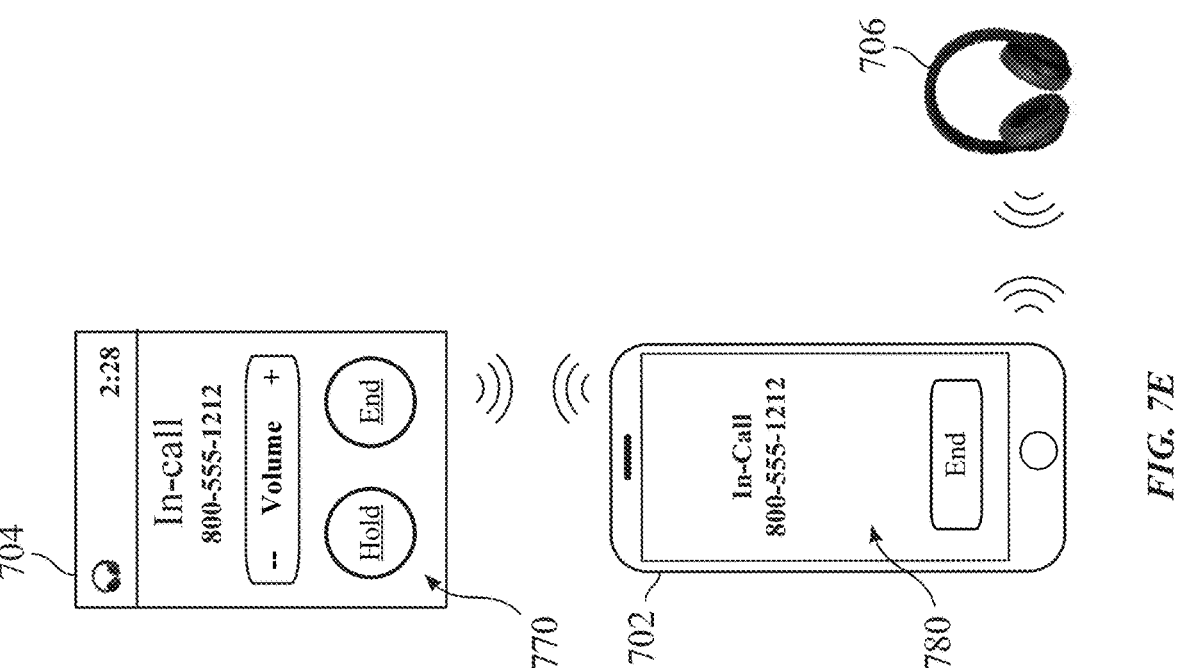

Attention is now directed to how a call may be received in this exemplary device-pairing scenario. Recall from table 1 that in this scenario (1) it is desirable to receive the call while requiring little to no direct user interaction with cellular phone 702. As shown in FIG. 7D, wearable electronic device 704 may have an inactive screen (though the device itself is turned on) while cellular phone 702 receives incoming call 748 and displays incoming call screen 746. Wearable electronic device 704 receives from cellular phone 702 an indication of the incoming call, and in response, displays incoming call screen 750. Incoming call screen 750 has identification 756 identifying the caller. Also, wearable electronic device 704 may produce an audible and/or haptic output alerting the user to the incoming call. Incoming-call screen 750 has exemplary accept affordance 752 for accepting the call and exemplary decline affordance 754 for declining the call.

If a user selects accept affordance 752 as indicated by touch 758, wearable electronic device 704 sends an indication to cellular phone 702 indicating user acceptance. Continuing onto FIG. 7E, in response to the user acceptance, cellular phone 702 answers the incoming call and uses headset 706 for carrying on the answered call. Wearable device 704 then displays in-call screen 770, which is in-call screen 660 (FIG. 6F) in some embodiments. In-call screen 770 includes a volume affordance for controlling the output of headset 706.

Although not shown, it is possible for the user to select decline affordance 754 while incoming-call screen 750 is displayed on wearable electronic device 704. When this occurs, wearable electronic device 704 sends an indication to cellular phone 706 indicating the user's refusal of the incoming call. Cellular phone 702, in turn, declines the incoming call and ceases to display incoming-call screen 746, thereby returning to the user interface screen that was displayed prior to incoming-call screen 746 (or turns off its display if no prior user interface screen was being displayed). Also, although not shown, headset 706 may be wired (or wireless).

Turning to FIGS. 8A-8E, FIG. 8A illustrates an exemplary scenario (2) in which user 800 has possession of cellular phone 802 and wearable electronic device 804, but no headset. Cellular phone 802 is device 100 (FIG. 1A) in some embodiments. Wearable electronic device 804 is device 500 (FIG. 5A) in some embodiments. In the illustrated scenario, wearable electronic device 804 is paired with and operatively connected to cellular phone 802. Cellular phone 802 is not operatively connected to a headset, even though it may be paired with one.

Attention is now directed to how a call may be initiated in this scenario. Recall from table 1 that in this scenario (2) it is desirable to permit wearable electronic device 804 to queue a call onto cellular phone 802, thereby allowing user 800 to primarily interact with wearable electronic device 804 to initiate a call, but carry on the phone call using the microphone and speaker (e.g., earphone) of cellular phone 806. (The use of cellular phone 806 in this instance avoids the use of a speakerphone on wearable electronic device 804, which may be less private.) In situations where wearable electronic device 804 is more conveniently accessible than cellular phone 806, this feature reduces the burdens placed on the user—particularly when answering an incoming call—thereby improving the overall user experience.

Figure 8A:
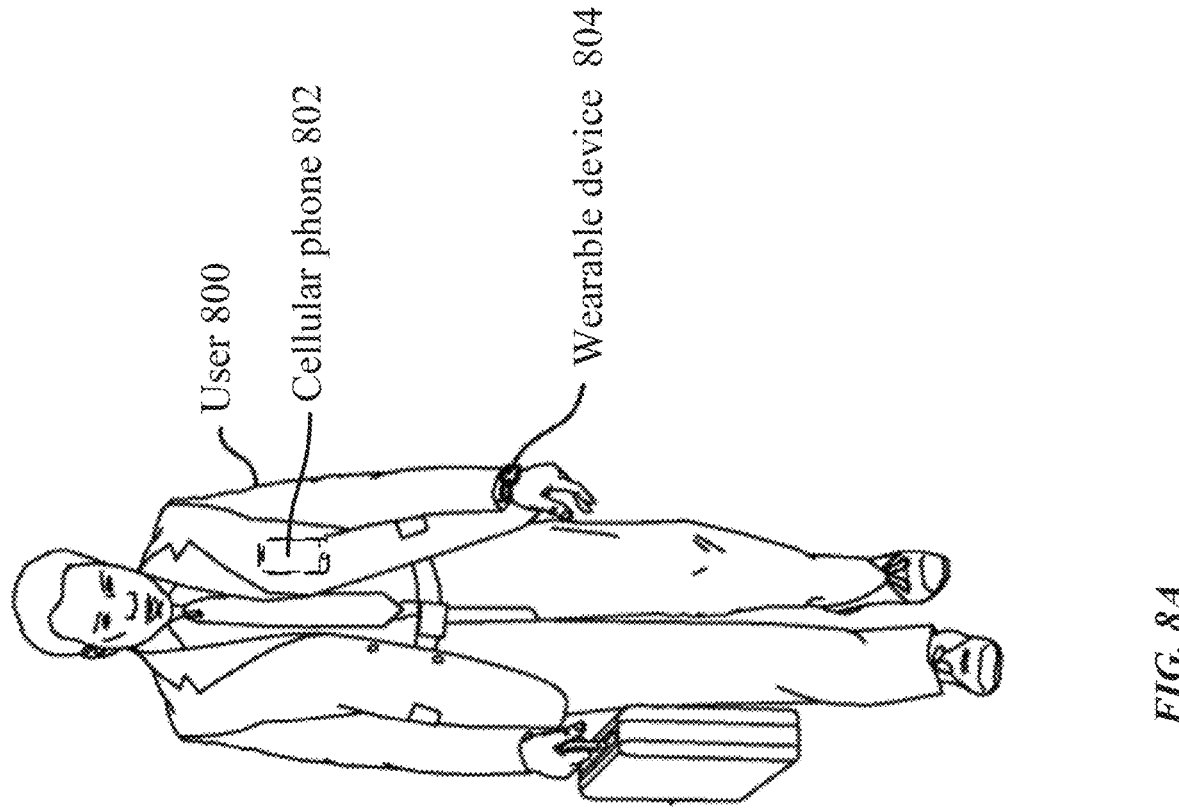
FIGS. 8A-8E illustrate exemplary user interfaces for accessing phone features among multiple devices.
Figure 8B:
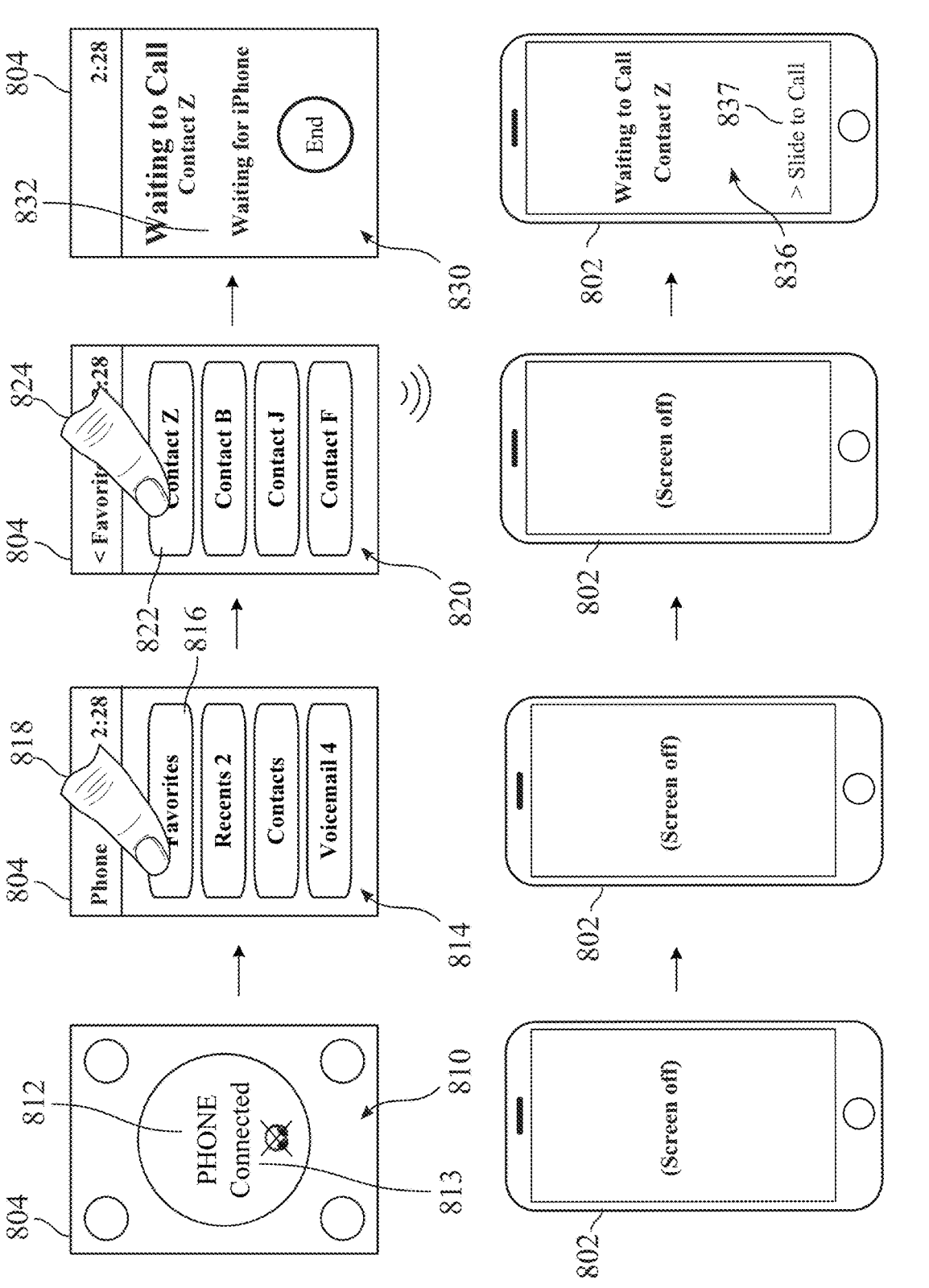

As shown in FIG. 8B, wearable electronic device 804 displays phone affordance 812 for accessing phone functions. Wearable electronic device 804 may determine that wearable electronic device 804 is operatively connected to cellular phone 802, but cellular phone 802 is not operatively connected to a headset. Wearable electronic device 804 may display, along with affordance 812, indications of these connection statuses. As shown, affordance. 812 has indication 813 which textually indicates that wearable electronic device 804 is operatively connected to cellular phone 802, and symbolically indicates that cellular phone 802 is not operatively connected to a headset.

As shown, a user may select affordance 812 to access phone landing screen 814. Phone landing screen 814 is screen 610 (FIG. 6A) in some embodiments. A user may select user-designated favorites affordance 816 to retrieve a listing of phone contacts on user-designated favorites screen 820, via touch 818. Screen 820 includes affordance 822 representing "Contact Z." The user may select contact affordance 820 to initiate a call to the represented contact (e.g., Contact A), via touch 824.

To initiate the call, wearable electronic device 804 sends instructions to cellular phone 802 instructing cellular phone 802 to initiate a call to Contact Z. Instead of placing the call immediately, however, cellular phone 802 displays call-queuing screen 832. Call-queuing screen 832 indicates that cellular phone 802 is ready to place a call, but that an additional user input is required. In the illustrated example the required user input is a swipe input, as indicated by instruction text 837, though other inputs such as a touch or activation of a button may be used. In the meantime, wearable electronic device 804 displays call-queuing screen 830 to indicate that the call to Contact Z is being queued on cellular phone 802.

Figure 8C:
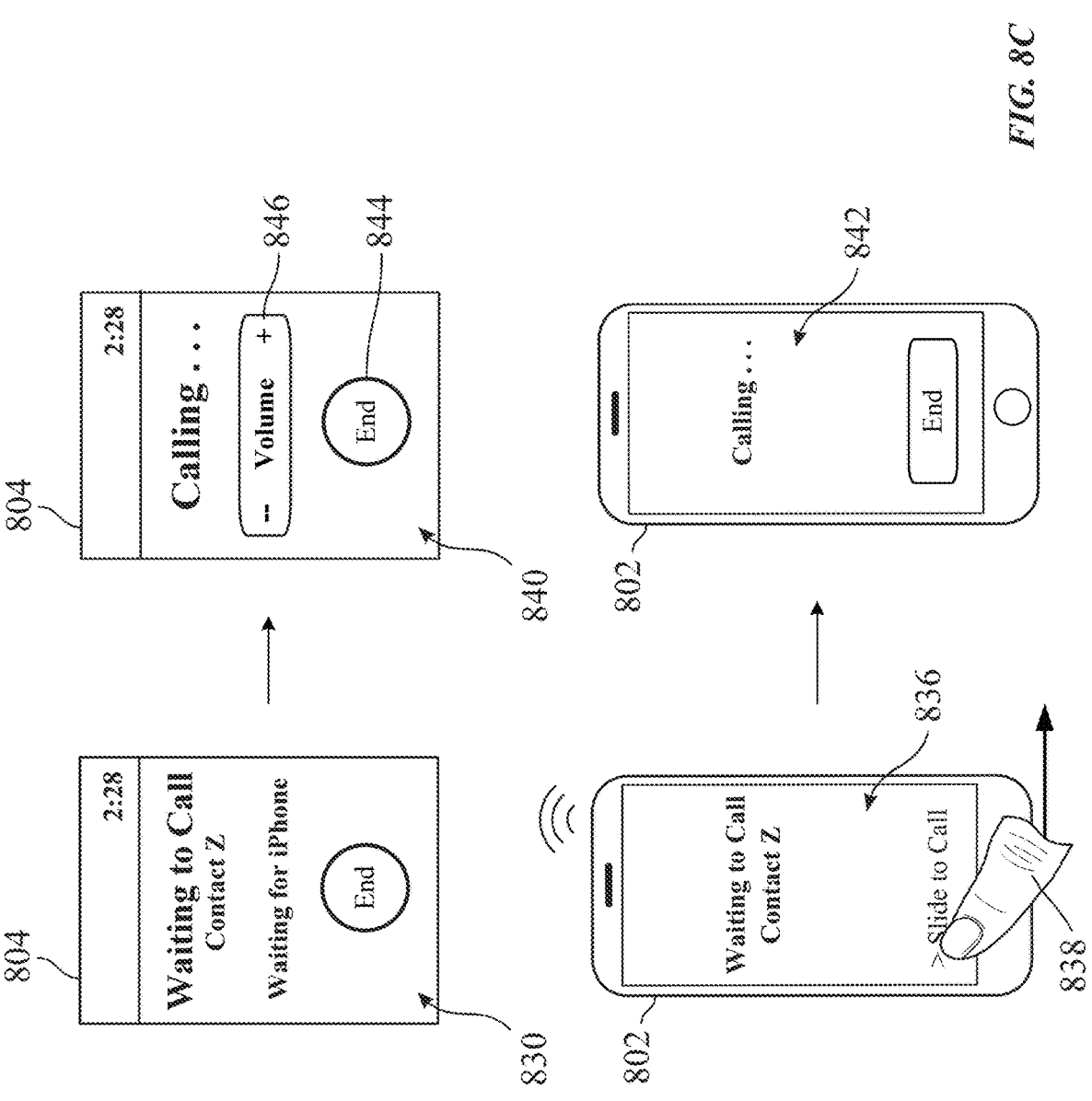

Continuing to FIG. 8C, when cellular phone 802 receives swipe input 838, it places the call to Contact Z and displays calling screen 842. Cellular phone 802 may also send data to wearable electronic device 804 indicating that the call has been placed. In response, wearable electronic device 804 displays calling screen 842. Calling screen 840 includes affordance 844 for ending the call and volume affordance 846 for controlling a volume of the speaker of cellular phone 802, which is being used for carrying on the call, as there is no connected headset.

In the above-described technique, cellular phone 802 queues up a requested call instead of calling immediately so as to provide user 800 an opportunity to retrieve cellular phone 802 from a nearby location (e.g., pocket, table). Because the phone call, once placed, would utilize the speaker and microphone of cellular phone 802, it is beneficial to allow user 800 an opportunity to gain physical control of cellular phone 802 before initiating the call.

Figure 8D:
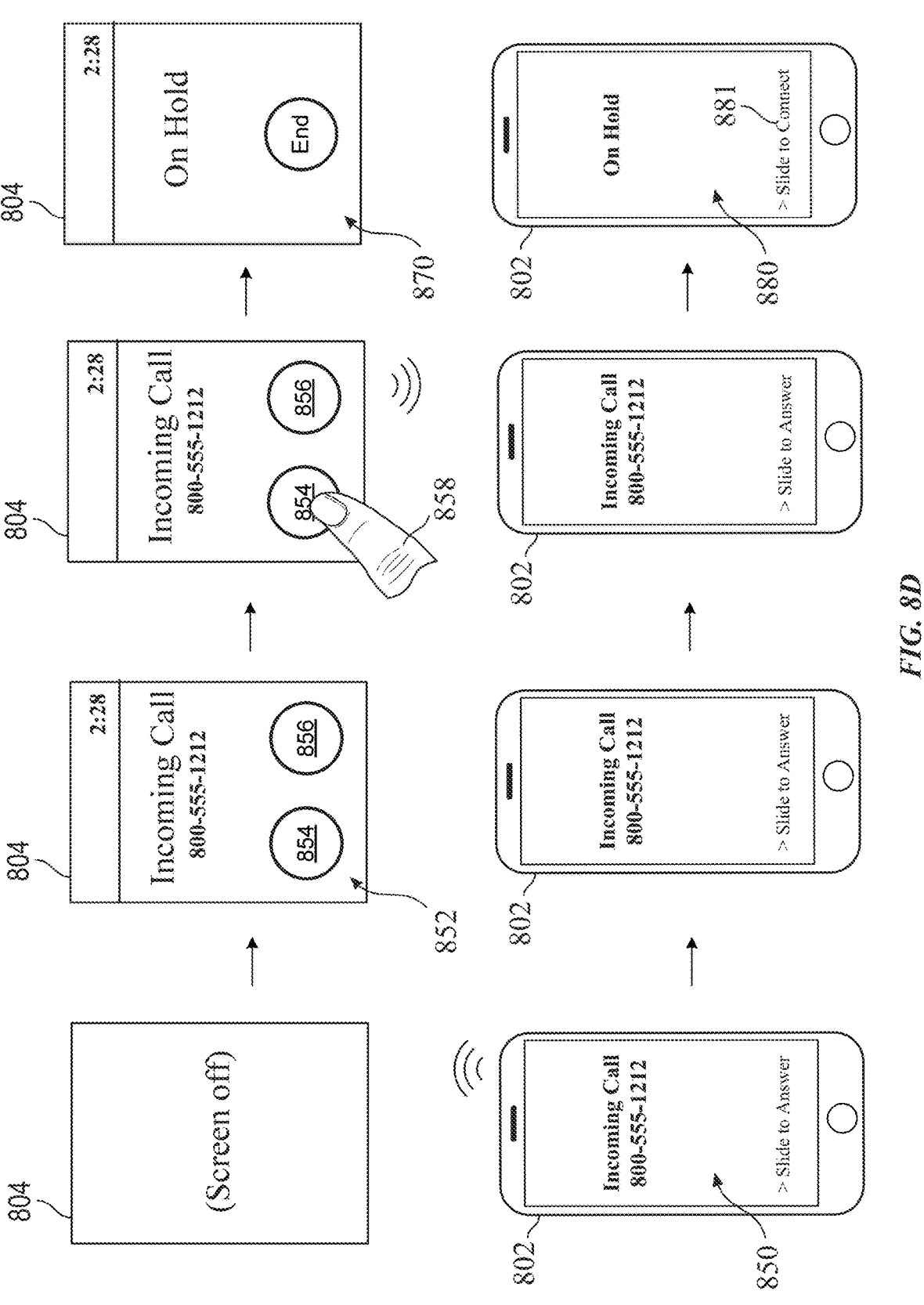

Attention is now directed to how a call may be received in this exemplary device-pairing scenario. As shown in FIG. 8D, wearable electronic device 804 may be inactive (though powered-on) when cellular phone 802 receives an incoming call. Wearable electronic device 804 may receive from cellular phone 802 an indication of the incoming call, and in response, display in-coming call screen 852. Wearable electronic device 804 may also produce an audible and/or haptic output alerting user 800 to the incoming call. Incoming-call screen 852 has affordance 854 for accepting the call and affordance 856 for declining the call.

In response to a user selection of affordance 854 (e.g., via touch 858), wearable electronic device 804 sends an indication to cellular phone 802 indicating user acceptance of the call. Instead of enabling the speaker and microphone of cellular phone 802 immediately, however, cellular phone 802 holds call and displays call-holding screen 880 to indicate that the incoming call has been held. Call-holding screen 880 indicates in region 881 that the call will be un-held if a user provides a swipe input. In the meantime, wearable electronic device 804 displays call-holding screen 870 to indicate that the incoming call has been held.

Figure 8E:
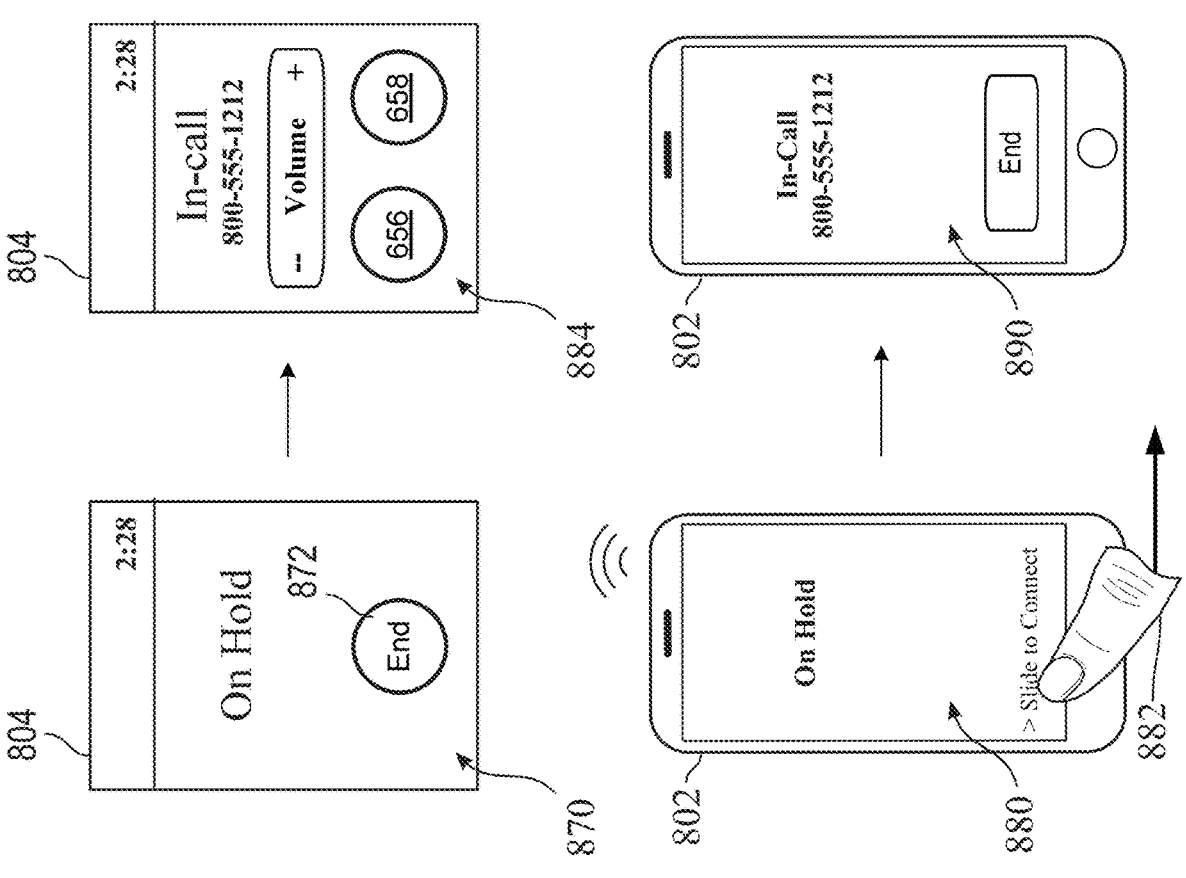

Continuing to FIG. 8E, in response to swipe input 882 on slide-to-connect affordance 862, cellular phone 802 un-holds the call and displays in-call screen 890. Once un-held, cellular phone 802 enables its microphone and speaker so user 800 may participate in the call. Cellular phone 802 also sends data to wearable electronic 804 indicating that the call has been un-held. In response, wearable electronic device 804 replaces the display of call-holding screen 870 with in-call screen 884. In-call screen 884 is screen 660 (FIG. 6F) in some embodiments.

Returning to call-holding screen 870, while call-holding screen 870 is displayed by wearable electronic device 804, a user may select end-call affordance 872 to hang-up the incoming phone call that has been held. Optionally, while the call is being held, an audio message is played to the caller informing the caller that the phone call is being held. The message may also ask the caller to hold the line so as to permit user 800 an opportunity to participate verbally in the call.

Figure 9A:
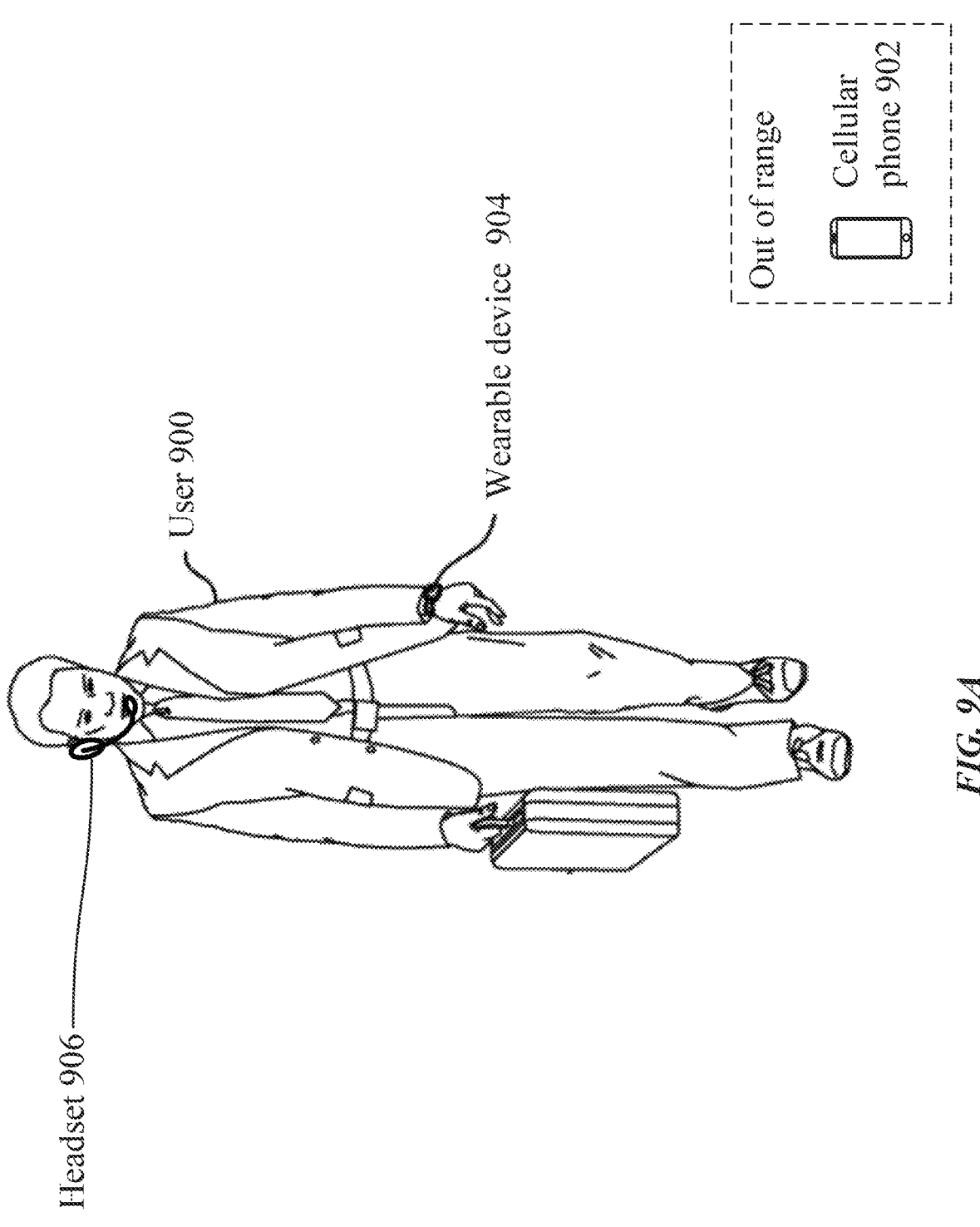
FIGS. 9A-9B illustrate exemplary user interfaces for accessing phone features among multiple devices.
Figure 9B:
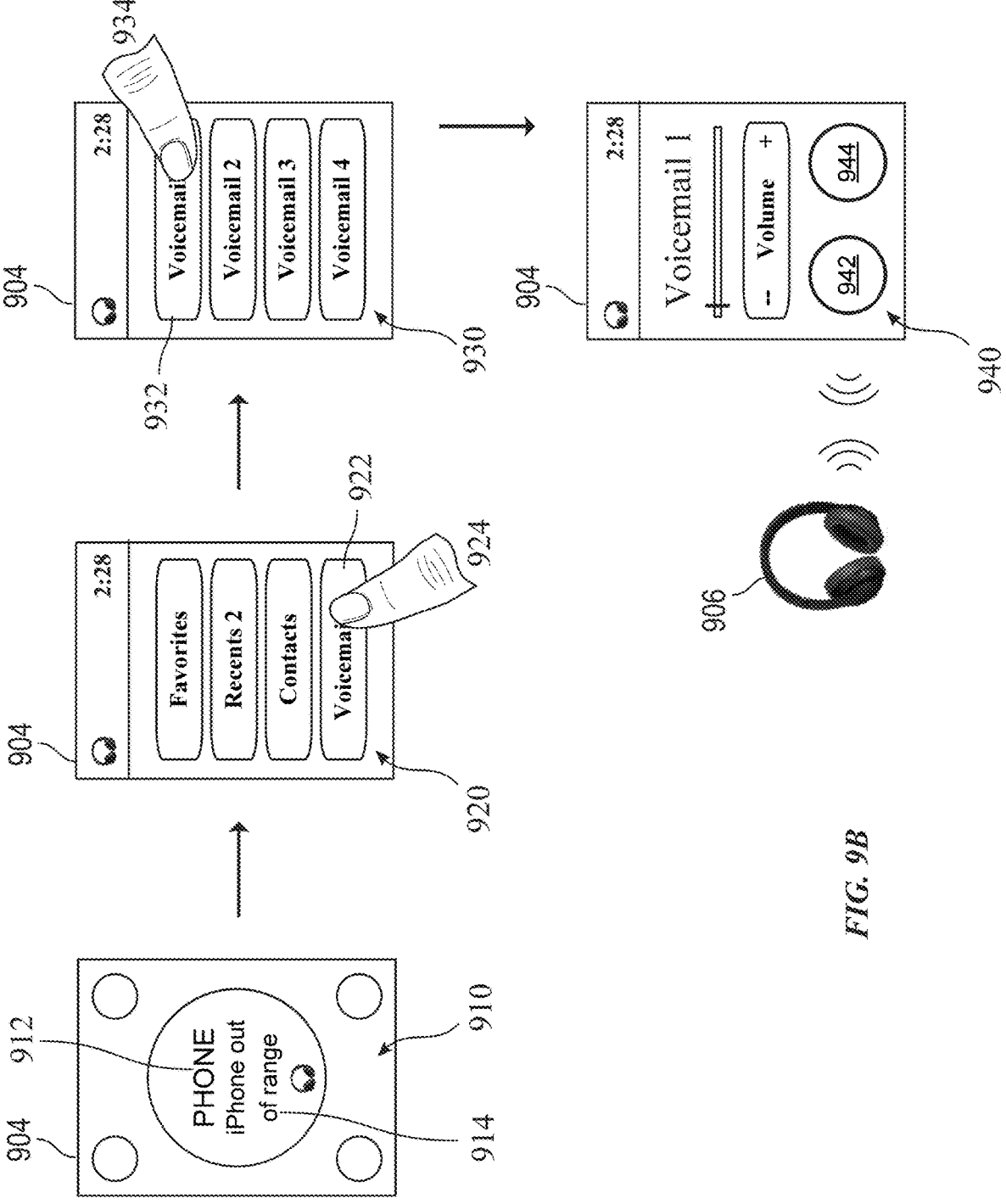

Turning to FIG. 9A-9B, FIG. 9A illustrate an exemplary scenario (3) in which user 900 has in his possession wearable electronic device 904 and headset 906, but not cellular phone 902. Wearable electronic device 904 is device 500 (FIG. 5A) in some embodiments. Cellular phone 902 may be unavailable because it is out of range.

Recall from table 1 that in this scenario it is still preferable for wearable electronic device 904 to provide some phone-related functionalities. For instance, wearable electronic device 904 may permit the retrieval of voicemail messages. This aspect is discussed with respect to FIG. 9B. As shown in FIG. 9B, wearable electronic device 904 displays user interface screen 910 having phone affordance 912. Phone affordance 912 may include indication 914 of the wearable electronic device's communication status with cellular phone 902 and headset 906. In response to a selection of phone affordance 912, wearable electronic device 904 displays phone landing screen 920. Landing screen 920 is landing screen 610 (FIG. 6A), or a modified instance thereof, in some embodiments. For instance, landing screen 910 may have a reduced number of affordances as compared with landing screen 610, excluding an affordance for accessing phone contacts that may be stored on cellular phone 902, for example.

In the illustrated example, landing screen 910 includes voicemail affordance 922 for accessing voicemail even when wearable electronic device 904 is not operatively connected to a cellular phone. In response to a user selection of voicemail affordance 922 via touch 924, wearable electronic device 904 displays voicemail screen 930. Voicemail screen 930 may have affordances representing voicemail messages, including affordance 932. In response to a user selection of voicemail affordance 932, wearable electronic device 904 displays voicemail playback screen 940, which indicates the voicemail message being played, and has affordances for accessing the voicemail message, such as affordance 942 to play the message and affordance 944 to delete the message. In response to a selection of playback affordance 942, wearable electronic device 904 initiates playback of the message on headset 906, meaning that the audio portion of the voicemail message is played on a speaker of headset 906. In some embodiments, when headset 906 is not operatively connected to wearable electronic device 904 (not shown), wearable electronic device 904 may playback the voicemail message on its internal speaker.

Wearable electronic device 904 also may be able to perform other phone-related functions. In some embodiments, wearable electronic device 904 can display recent calls. In some embodiments, wearable electronic device 904 can display notification regarding missed calls, which may be received via a communication (e.g., WiFi) unit of device 904.

3. Phone and Headset Transitions

When a wearable electronic device is operatively connected to a cellular phone and the cellular phone is in turn operatively connected to a headset, a user may find it useful under some circumstances to carry on a phone call using the headset, and at other times, using the internal speaker and microphone of the cellular phone. Attention is now directed to user interfaces for making this transition, with reference to FIGS. 10A-10C and 11A-11C.

In some embodiments, user interfaces for transitioning between headset and cellular phone usage are responsive to the touch intensity of user input. Because wearable electronic devices are compact in design, they tend to have small surface areas for the configuration of touch-sensitive and/or mechanical input mechanisms (e.g., buttons). The addition of a touch-intensity based input modality is helpful in that it permits additional user interaction techniques to be incorporated while preserving the overall form factor of the device. This aspect is discussed with reference to FIGS. 10A-10C.

Figure 10A:
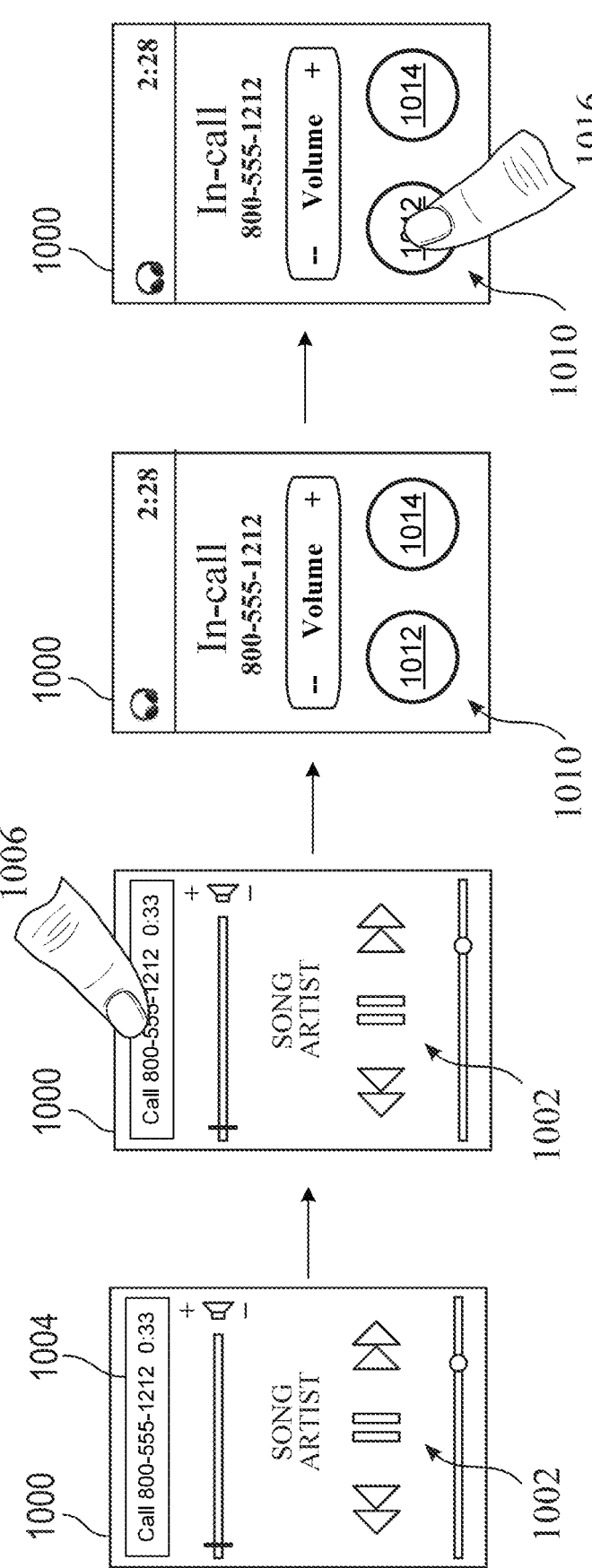
FIG. 10A-10C illustrate exemplary user interfaces for accessing phone features among multiple devices.

FIG. 10A depicts wearable electronic device 1000 which is device 500 (FIG. 5A) in some embodiments. As shown, wearable electronic device 1000 has determined that a phone call is in-progress. In this example, the cellular communications of the phone call are being handled by a companion cellular phone 1040, while the input to and output from the phone call are handled by a headset that is operatively connected to cellular phone 1040.

Wearable electronic device 1000 is displaying music playback screen 1002. Music playback screen 1002 is displayed in some embodiments in response to a user's selection of the music application during the phone call. Music screen 1002 includes in-call indicator 1004 indicative of the in-progress call. In-call indicator 1004 is responsive to user input, such as touch 1006, in that in-call indicator 1004, when selected, causes device 1000 to display in-call screen 1010. In-call screen has affordance 1012 for placing the in-progress phone call on hold, and affordance 1014 for ending the call. A user may access additional phone-related features through a high-intensity touch 1016 on device 1000. In the illustrated example, high-intensity touch 1016 is received at a position of affordance 1012.

Figure 10B:
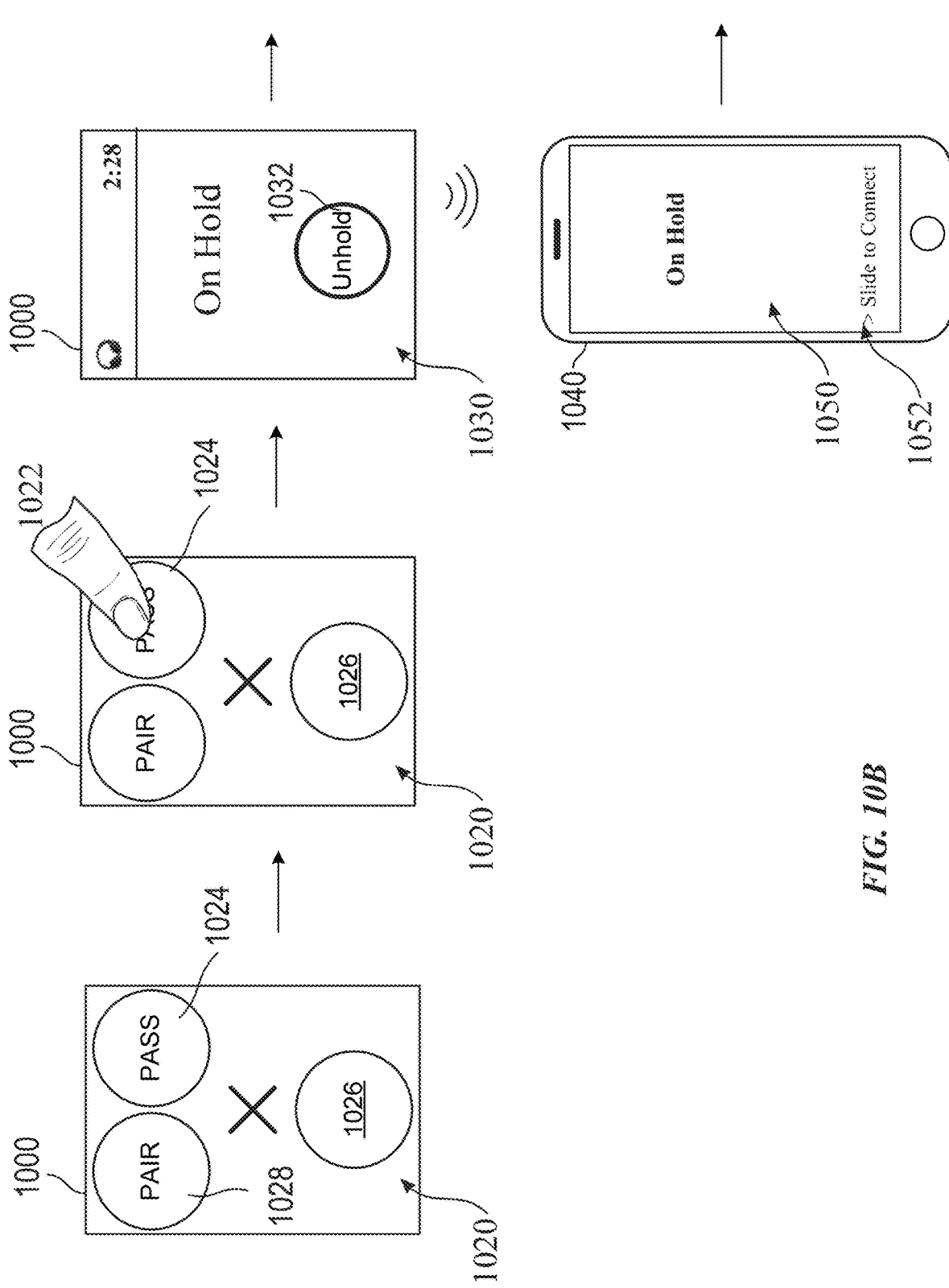

Continuing to FIG. 10B, because the touch is of high intensity (e.g., high characteristic intensity), instead of carrying out a feature corresponding to affordance 1012, device 1000 displays exemplary user interface screen 1020, which has affordances for accessing additional phone-related features (if touch 1016 is of a low intensity, device 1000 carries out the feature associated with affordance 1012 instead, e.g., holding the call).

Secondary features screen 1020 includes affordance 1024 for transferring the in-progress call to a cellular phone, meaning to use the internal speaker and microphone of the cellular phone to carry on the call, instead of the headset. Screen 1020 also includes affordance 1028 for configuring device pairings. For example, a user can select affordance 1028 to pair additional headsets. Screen 1020 may also include additional affordance(s) (e.g., 1026) for invoking other functions, such as for displaying a telephone keypad for navigating an interactive voice response system.

In response to user selection 1022 of affordance 1024, device 1000 sends an instruction to cellular phone 1040 instructing cellular phone 1040 to take over the phone call from the headset. In response, cellular phone 1040 places the call on hold and displays call-holding screen 1050. In the meantime, wearable electronic device 1000 also transitions to call-holding screen 1030. Call-holding screen 1050 on cellular phone 1040 includes label 1052 informing the user the call may be retrieved via user input, e.g., a swipe input. Call-holding screen 1030 on wearable electronic device 1000 includes affordance 1032 for un-holding and continuing with the call using the headset as before. Restated, the user may "pull back" the call even after selecting affordance 1024 to pass the call the cellular phone 1040.

Although not illustrated, in some embodiments, in response to user input 1022, cellular phone 1040 does not place in-progress call on hold; rather, the call continues via the headset while cellular phone 1040 awaits user input (e.g., a swipe input). When the swipe input is detected, cellular phone 1040 switches to its microphone and speaker (and disables those on the headset) to that the user may continue the phone call on cellular phone 1040. In these embodiments, it is also not necessary for wearable electronic device to display on-hold screen 1030. Instead, wearable electronic device may transition from secondary functions screen 1020 to in-call screen 1010 while the in-progress call is transitioned from the headset over to the internal microphone and speaker of cellular phone 1040.

Figure 10C:
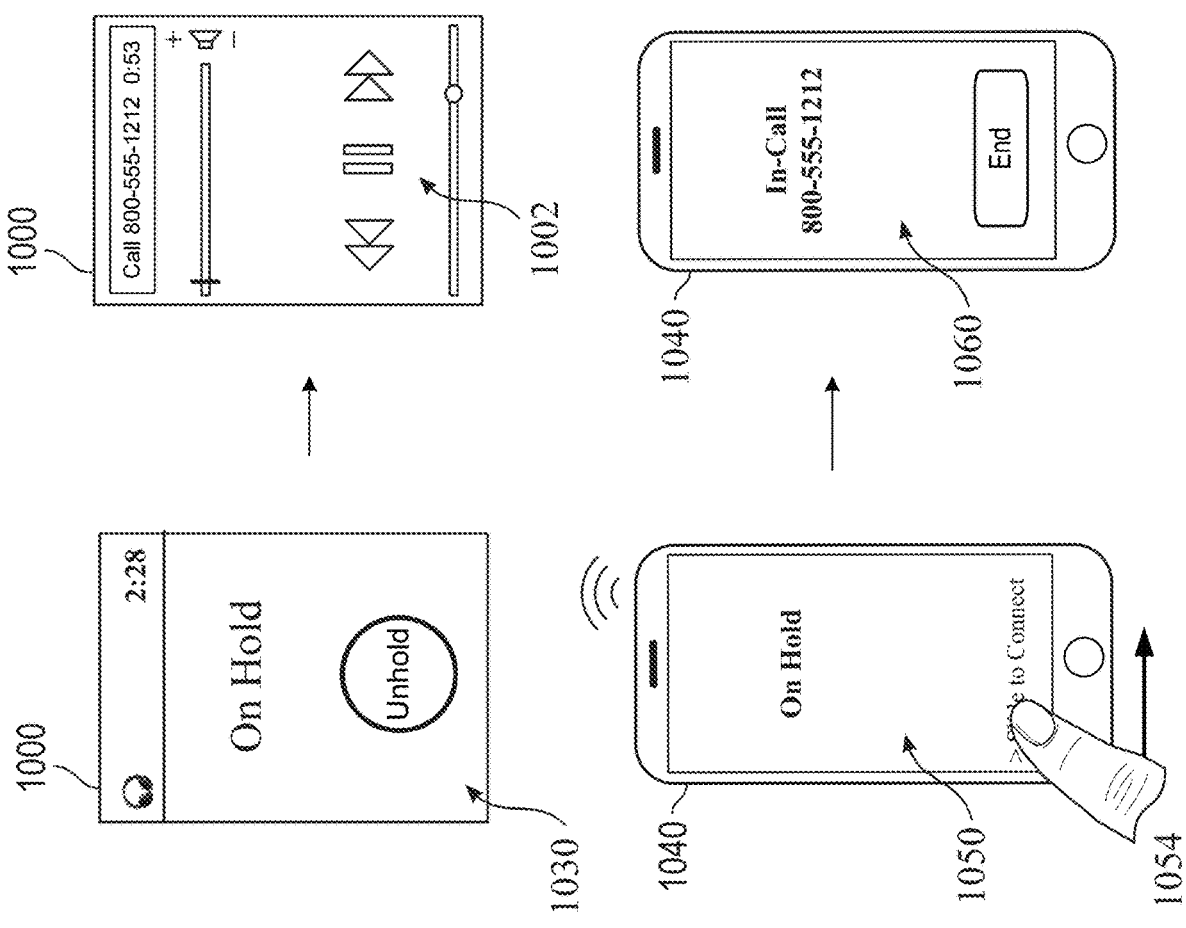

Turning to FIG. 10C, in response to swipe input 1054, cellular phone 1040 un-holds the call, enables its speaker and microphone for purposes of participating in the call, and displays in-call screen 1050. In the meantime, wearable electronic device 1000 returns to music playback screen 1002.

Figure 11A:
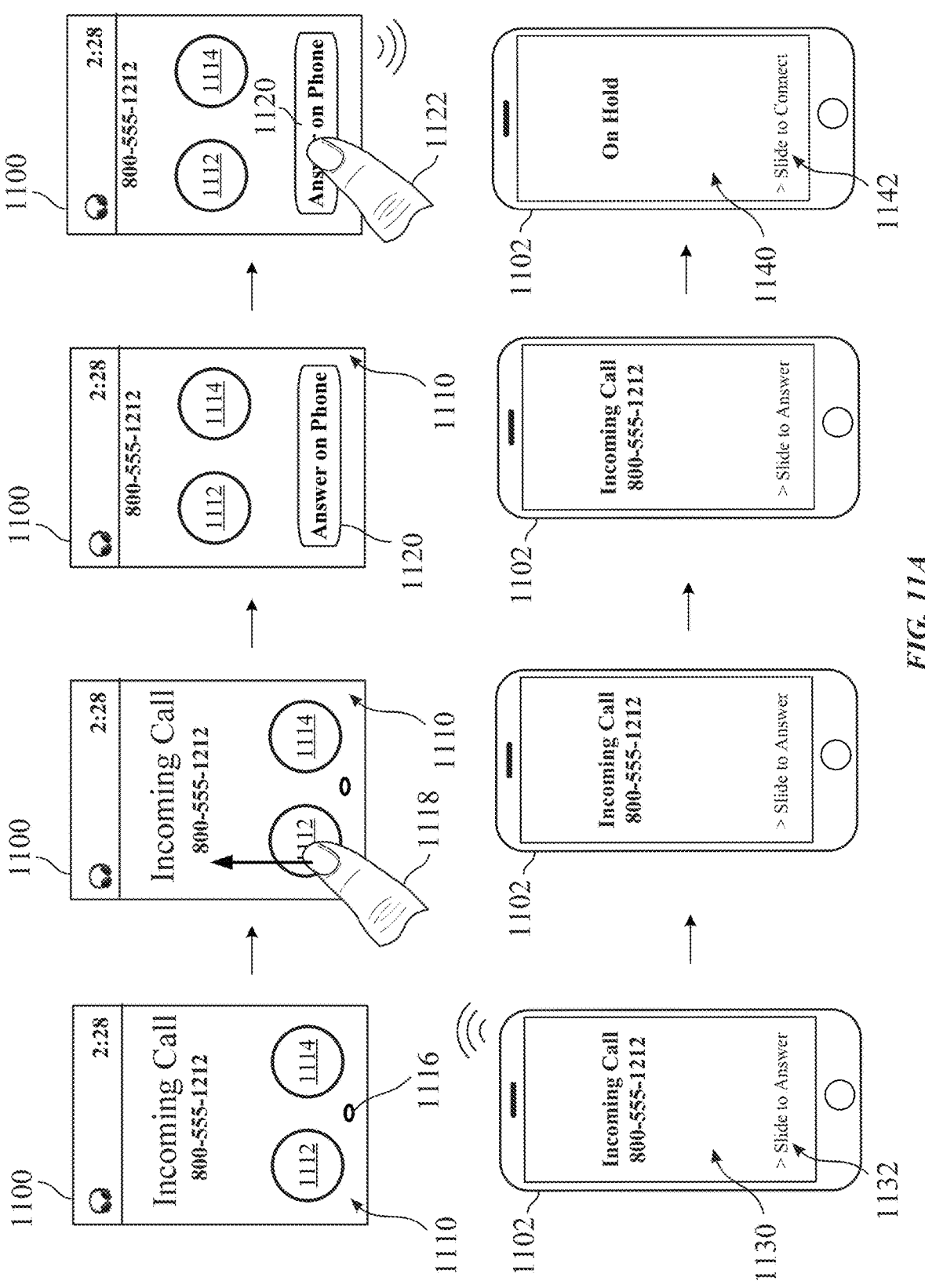
FIGS. 11A-11C illustrate exemplary user interfaces for accessing phone features among multiple devices.
Figure 11B:
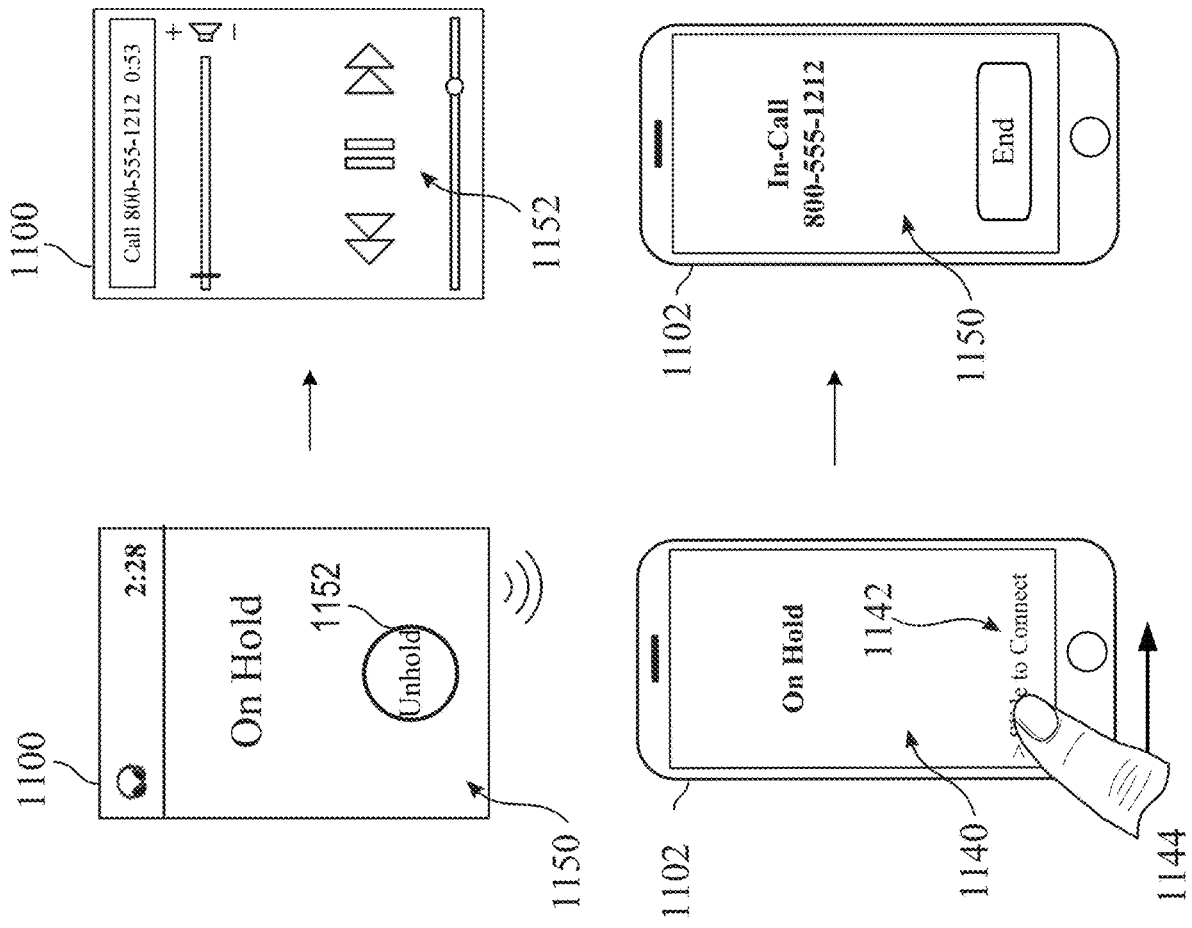
Figure 11C:
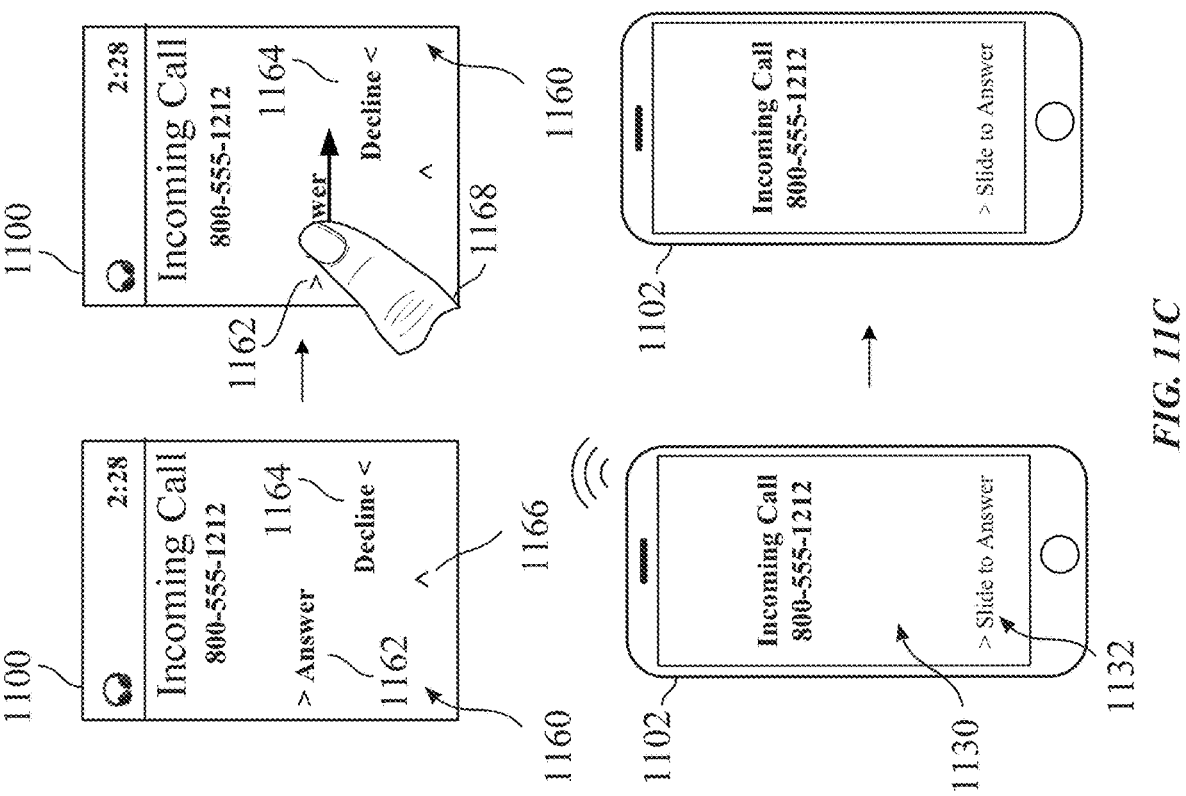

Additional exemplary user interfaces for transitioning between headset and cellular phone usage are discussed with reference to FIGS. 11A-11C. As shown in FIG. 11A, cellular phone 1102 is receiving an incoming call and displays incoming-call screen 1130. Cellular phone 1102 is device 100 (FIG. 1A) in some embodiments. Wearable electronic device 1100 receives an indication of the incoming call from cellular phone 1102 and also displays incoming-call screen 1110. Wearable electronic device 1100 is device 500 (FIG. 5A) in some embodiments. Optionally, wearable electronic device 1100 may issue a haptic or audio alert informing the user of the incoming call.

Incoming-call screen includes affordance 1112 for answering call. Consistent with the discussion above regarding usage scenarios, if affordance 1112 is selected to answer the incoming call while cellular phone 1102 is operatively connected to a headset, the headset will be used for carrying on the call. A user may wish, however, to participate on the call using another device, such as by using the internal speaker and microphone of cellular phone 1102. In this situation, while incoming-call screen 1110 is displayed on wearable electronic device 1100, the user may provide swipe input 1118 to reveal affordance 1120. Affordance 1120, when selected, causes the incoming call to be placed on hold so that the user can access cellular phone 1102 to answer the call. As shown in FIG. 11A and continuing onto FIG. 11B, in response to selection 1122 of affordance 1120, the incoming call is placed on hold, and cellular phone 1102 displays on-hold screen 1140 informing the user via instruction label 1142 that the phone call can be retrieved by certain user input, in this case a swipe input. In the illustrated example, incoming call screen 1110 has affordance 1116 indicating the availability of additional features that are not displayed, such as affordance 1112 for answering the call cellular phone 1102.

The user can retrieve the call on cellular phone 1102 by swipe input 1144, which causes cellular phone 1102 to un-hold the call and enable its speaker and microphone for participation in the call. As shown, responsive to swipe input 1144, device 1100 un-holds the phone call and transitions to in-call screen 1150. In the meantime, wearable electronic device 1100 returns to user interface screen 1152, in this case a music playback screen that was displayed prior to the incoming call. Note that, while call-holding screen 1150 is displayed on wearable electronic device 1100, the user may select un-hold affordance 1152 to continue with the call as before, meaning to continue using the headset for communication. Restated, the user may "pull back" the call even after selecting affordance 1120 (FIG. 11A) to pass the call to cellular phone 1102.

In addition to affordance 1120, incoming-call screen 1110 may include affordances for accessing other phone-related features. For example, instead of verbally answering the incoming call, a user may wish to reply with a text message stating that the user is busy and cannot talk at the moment. The user may also wish to send other messages such as those containing emoji. U.S. Provisional Patent Application Ser.

No. 62/044,923, entitled "USER INTERFACE FOR RECEIVING USER INPUT," filed Sep. 2, 2014; and U.S. Provisional Patent Application Ser. No. 62/127,800, entitled "USER INTERFACE FOR RECEIVING USER INPUT," filed Mar. 3, 2015 describe user interfaces for efficiently obtaining user input that would be helpful in the context of incoming-calls screen 1110. Each of these applications which is hereby incorporated by reference in their entirety. For example, incoming-calls screen 1110 can provide access to affordances for ignoring an incoming call and sending a suggested response, such as "can I call you back?" to the caller. As another example, incoming-calls screen 1110 can provide access to affordances for selecting and customizing an emoji to be sent to the caller. As an additional example, incoming-calls screen 1110 can provide access to an inter-face for transcribing a user's speech utterance into a mes-sage for the caller. As yet another example, incoming-calls screen 1110 can provide access to a reduce-sized keyboard interface for inputting a message for the caller.

In some embodiments, an incoming call may be answered or rejected using any form of user input, including a touch input and/or a swipe input. For example, as shown in FIG. 11C, cellular phone 1102 is receiving an incoming call and displays incoming-call screen 1130. Cellular phone 1102 is device 100 (FIG. 1A) in some embodiments. Wearable electronic device 1100 receives an indication of the incom-ing call from cellular phone 1102 and displays incoming-call screen 1160. Wearable electronic device 100 is device 500 (FIG. 5A) in some embodiments. Optionally, wearable elec-tronic device 1100 may issue a haptic or audio alert inform-ing the user of the incoming call.

Incoming-call screen 1160 includes visual object 1162. The visual object 1162 may be indicative of a first direction (e.g., a first horizontal direction). In response to a user input 1168 (e.g., a swipe input) anywhere on the display of the wearable electronic device in the indicated first direction (e.g., left to right), the incoming call may be answered. Incoming-call screen 1160 further includes visual object 1164 for declining the call. The visual object 1164 may be indicative of a second direction (e.g., different than the first direction) (e.g., a second horizontal direction). In response to a user input (e.g., a swipe input) anywhere on the display of the electronic device in the indicated second direction (e.g., right to left), the incoming call may be declined. In some examples, the visual object 1162 may be a first affordance, and a user may select the first affordance by dragging the first affordance in a first direction (e.g., right-ward direction) to answer an incoming call. In some examples, the visual objet 1164 may be a second affordance and a user may select the second affordance by dragging the second affordance in a second direction (e.g., leftward direction) to decline the incoming call.

In some instances, a user may wish to participate on the call using another device, such as by using the internal speaker and microphone of cellular phone 1102. In this situation, while incoming-call screen 1160 is displayed on wearable electronic device 1100, the user may provide a user input (e.g., a swipe input) in a third direction (e.g., different than the first direction and/or different than the second direction) to reveal one or more affordances, such as the affordance 1120 (FIG. 11A), as described. In some examples, the incoming-call screen 1160 may include a visual object 1166 indicative of the third direction.

Consistent with the discussion above regarding usage scenarios, if the user input is provided to answer the incom-ing call while cellular phone 1102 is operatively connected to a headset, the headset will be used for carrying on the call.

In some embodiments, the electronic device may be incompatible with one or more types of incoming calls. Accordingly, in some instances, the electronic device can determine whether an incoming call is of a first type (e.g., calls incompatible with the electronic device including one or more types of audio calls, such as FaceTime audio calls, and/or one or more types of video calls, such as FaceTime video calls). In accordance with a determination that a call is of the first type, the electronic device displays a first affordance (e.g., affordance 1120 of FIG. 11A) that, when activated, causes the call to be placed on hold (e.g., display "answer on phone" affordance causing call to be answered and automatically placed on hold). In accordance with a determination that the incoming call is not of the first type, the electronic device displays a second affordance that, when activated, causes the incoming call to be answered (e.g., and not automatically placed on hold).

In some embodiments, in accordance with a determina-tion that the incoming call is of the first type (e.g., the call is incompatible), the electronic device forgoes displaying the second affordance (e.g., does not display "answer on electronic device" affordance), and in accordance with a determination that the incoming call is not of the particular type, the electronic device forgoes displaying the first affor-dance (e.g., does not display "answer" affordance).

While displaying the first affordance, the electronic device can detect a user input activating the first affordance (e.g., the user performs a light press at a location of the hold affordance). In response to detecting the user input activat-ing the first affordance, the electronic device displays a third affordance and a fourth affordance (e.g., the user performs a light press at a location of the hold affordance and a new screen having "find my phone" and "end-call" affordances is displayed). The third affordance, when activated, causes a cellular phone in wireless communication with the elec-tronic device to provide at least one of an audible output, a visual output, or a haptic output, and the fourth affordance, when activated, causes the call to be ended.

4. Exemplary Processes

Figure 12:
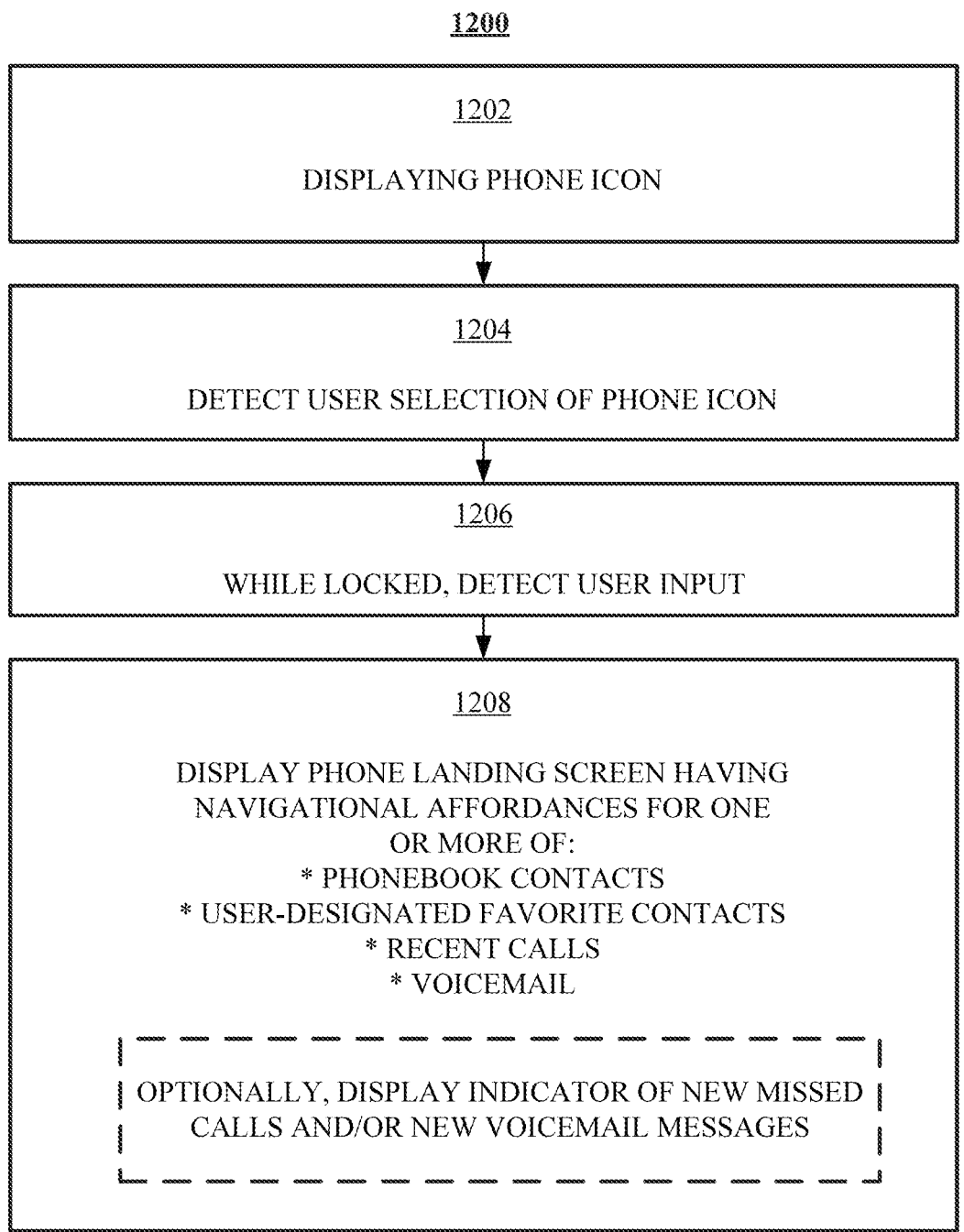
FIG. 12 is a flow diagram illustrating a process for accessing phone features in accordance with some embodiments.

FIG. 12 is a flow diagram illustrating process 1200 for handling phone calls. Process 1200 may be carried out by electronic devices such as devices 100, 300, and/or 500 (FIGS. 1A, 3A, 5A) in various embodiments. At block 1202, a phone icon is displayed. The phone icon may be among a plurality of other icons for launching applications. At block 1204, user selection of the phone icon is detected. Process-ing proceeds to block 1206, where in response to the user selection, a phone landing screen is displayed. The phone landing screen is screen 610 (FIG. 6A) in some embodi-ments. The phone landing screen may have one or more affordances for accessing features such as phonebook con-tacts, user-designated favorite contacts, recent incoming and/or outgoing calls, and voicemail messages. Phone con-tacts are displayed responsive to a user selection of the contact or user-designated favorites affordance. Optionally, the recent calls affordance and the voicemail affordance may have a numeral that is displayed when there are new missed calls and voicemail messages. In some embodiments the phone landing screen is responsive to input from a rotatable input mechanism.

FIG. 13 is a flow diagram illustrating process 1300 for handling phone calls between devices. Process 1300 may be carried out by electronic devices such as devices 100, 300, and/or 500 (FIGS. 1A, 3A, 5A) in various embodiments. At block 1302, a first communication status between a phone headset and the electronic device is determined. This first communication status indicates whether the phone headset is operatively connected to the electronic device. At block 1304, a second communication status is determined. This second communication indicates whether the phone headset and the cellular phone are operatively connected. At block 1306, an indication of at least one of the first and second statutes is displayed. In some embodiments this status is indicator 611 (FIG. 6A). In some embodiments this status is indicator 714 (FIG. 7B).

In some embodiments, this status indicator is indicator 733 (FIG. 7B). In some embodiments, this status indicator is indicator 744 (FIG. 7C). In some embodiments, processing after block 1306 proceeds to block 1308 where a third communication status is determined. The third communication status indicates whether the electronic device is operatively connected to the cellular phone. This third status is displayed in some embodiments as part of affordance 714 (FIG. 7B), affordance 813 (FIG. 8B) and/or affordance 914 (FIG. 9B), for example. The first, second, and/or third communication statuses may be used to control the handling of phone call operations between multiple electronic devices under the scenarios summarized in table 1 and described with respect to FIGS. 7A-7E, 8A-8E, and 9A-B.

Figure 14:
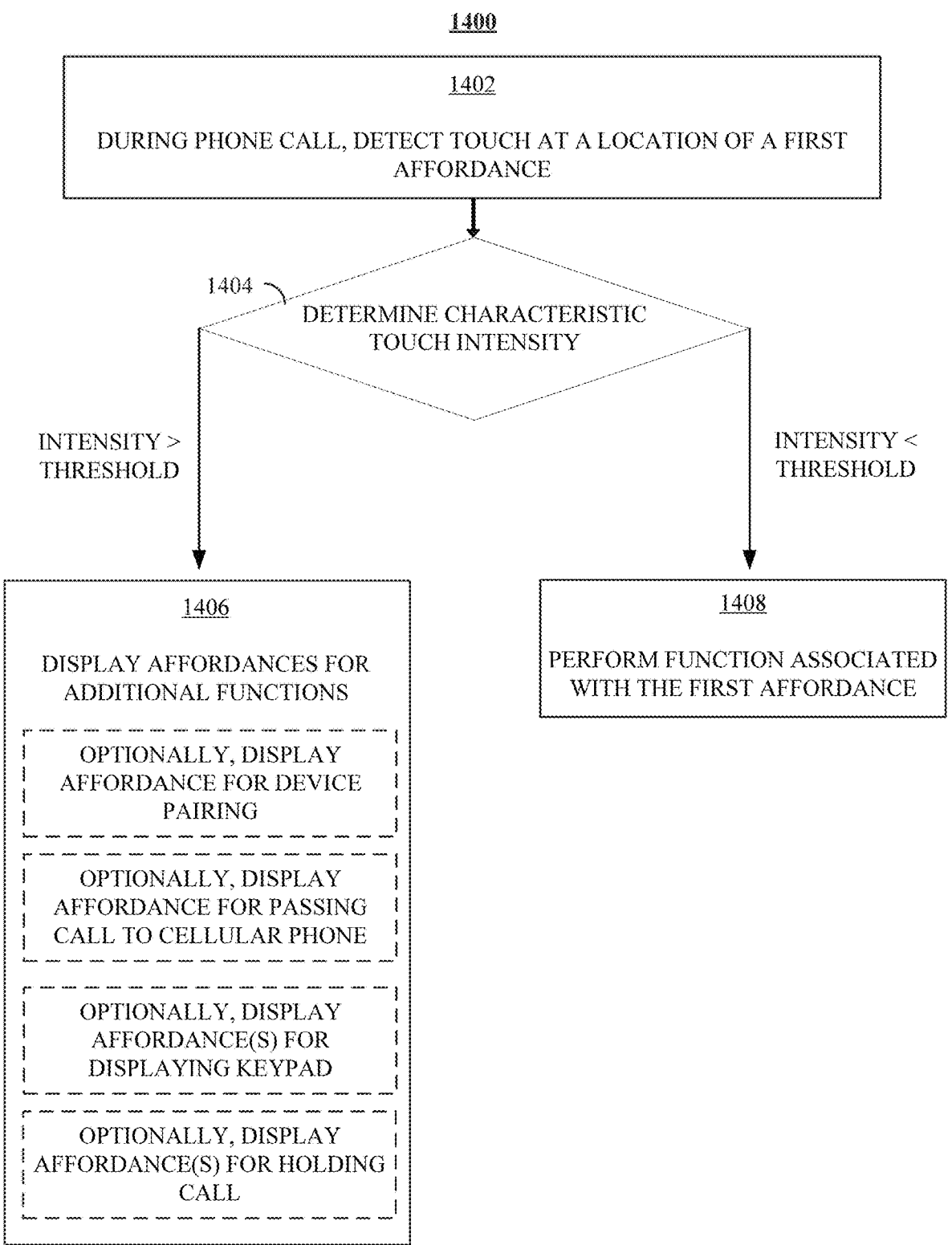
FIG. 14 is a flow diagram illustrating a process for accessing phone features in accordance with some embodiments.

FIG. 14 is a flow diagram illustrating process 1400 for handling phone calls between devices. Process 1400 may be carried out by electronic devices such as devices 100, 300, and/or 500 (FIGS. 1A, 3A, 5A) in various embodiments. At block 1402, during an active phone call, a touch on the touch-sensitive display is detected as having a characteristic intensity. The touch may be located at the position of a first affordance. As used herein, "active" phone calls includes calls being made (where the recipient has not answered), incoming calls (where the user of the electronic device has not answered), and in-progress calls (where the user of the electronic device and at least one other party is connected). At block 1404, the device determines whether the characteristic intensity exceeds a predetermined threshold intensity. If the characteristic intensity exceeds a predetermined threshold intensity, processing proceeds to block 1406 where the electronic device sends an instruction to a cellular phone instructing the cellular phone to display a second affordance. Optionally, the electronic device may display a secondary functions screen such as 1020 (FIG. 10B), and wait for an optional user input such as a selection of affordance 1024 (FIG. 10B), before sending the instruction. The second affordance, if selected, causes the cellular phone to retrieve the active phone call, and to utilize its microphone and speaker to carry on the call. If the characteristic intensity is below the predetermined threshold intensity, processing proceeds to block 1408, where the electronic device performs a function associated with the first affordance at the location of the lower intensity touch.

FIG. 15 is a flow diagram illustrating process 1500 for handling phone calls between devices. Process 1500 may be carried out by electronic devices such as devices 100, 300, and/or 500 (FIGS. 1A, 3A, 5A) in various embodiments. At block 1502, displaying, on the touch-sensitive display of an electronic device, an indication of an incoming call that is being received on a cellular phone that is within communications range of the electronic device. At block 1504, the electronic device displays at least an affordance for answering the call and an affordance for declining call. At block 1506, the electronic device receives user input other than a selection of the accept and decline affordances, which causes the electronic device to, at block 1508, display an affordance for passing the call to the cellular phone by placing the call on hold and by sending an instruction to the cellular phone instructing the cellular phone to display a second answer affordance, where the second answer affordance, when selected, causes the cellular phone to answer the incoming call. In some embodiments, the user input other than the selection of the accept and decline affordances is an upward swipe.

Figure 16:
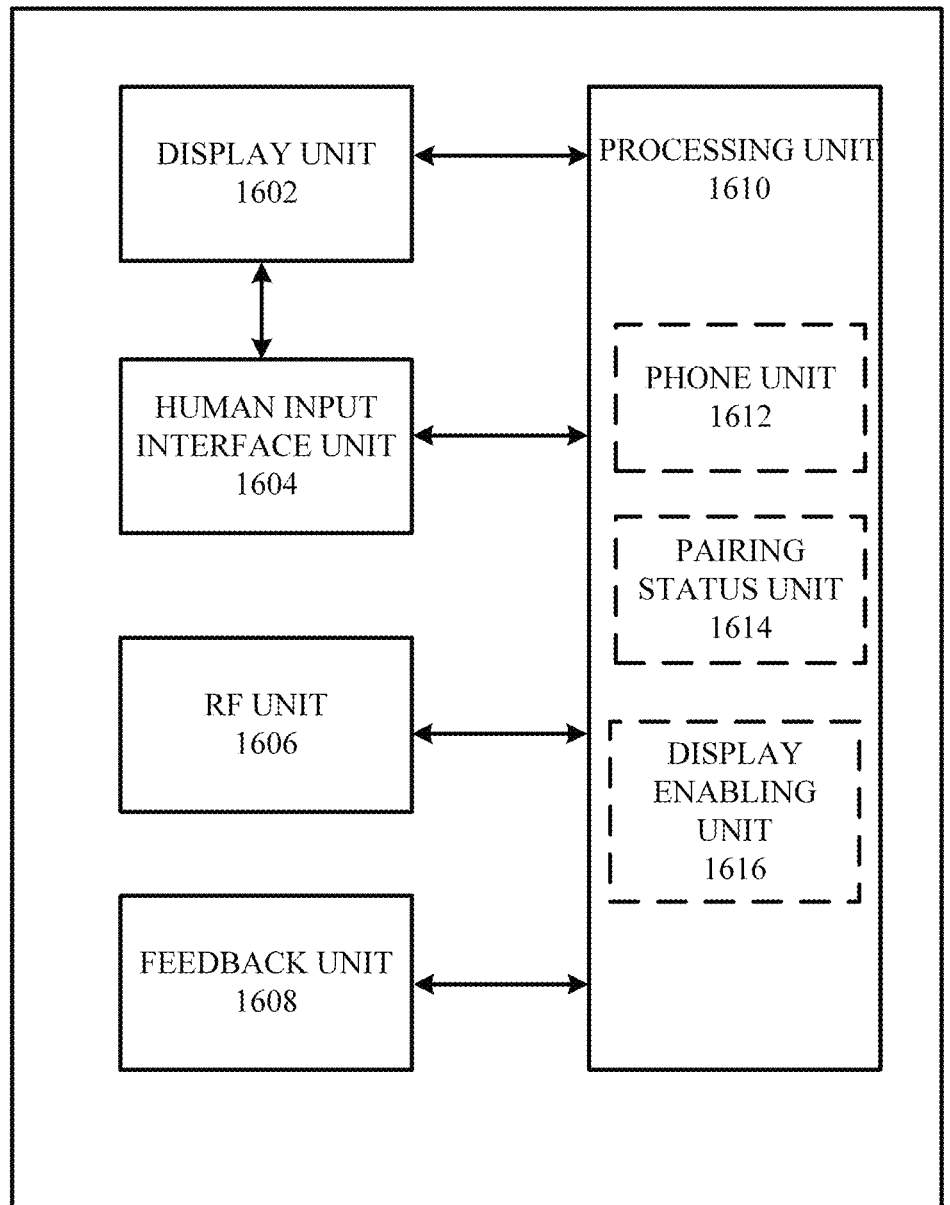
FIG. 16 is a functional block diagram of an electronic device in accordance with some embodiments.

FIG. 16 shows exemplary functional blocks of an electronic device 1600 that, in some embodiments, performs the above-described features. As shown in FIG. 16, an electronic device 1600 may include display unit 1602 configured to display graphical objects; human input interface unit 1604 configured to receive user input; one or more RF units 1606 configured to detect and communicate with external electronic devices; one or more feedback unit configured to provide user with haptic, audio, and/or visual feedback; and processing unit 1610 coupled to display unit 1602, human input interface unit 1604, RF unit(s) 1606, and feedback unit 1608. In some embodiments, processing unit 1612 is configured to support a phone unit 1612, a pairing status unit 1614, and a display enabling unit 1616.

In some embodiments, display enabling unit 1616 is configured to cause a display of a user interface (or portions of a user interface) in conjunction with the display unit 1602. For example, the display enabling unit 1616 may be used for display one or more of the user interface screens described with reference to FIGS. 6A-6H.

In some embodiments, pairing status unit 1614 is configured to determine the connection status between (i) a wearable electronic device and a headset; (ii) a wearable electronic device and a cellular phone, and/or (iii) a cellular phone and a headset. This status information is provided to display enabling unit 1616 so that display unit 1602 can display one or more of the status. This status information is also provided to phone unit 1612 so that phone unit 1612 can handle incoming and outgoing calls appropriate as discussed, for example, with reference to FIGS. 7A-7E, 8A-8E, 9A-B, 10A-10C, and/or 11A-11B.

In some embodiments, phone unit 1612 is configured to receive information from, among others, pairing status unit 1614 to determine what devices are to be used to carry on a call. For example, when pairing status unit 1614 determines that a headset is operatively connected to a cellular phone that is in turn operatively connected to device 1600, upon answering the call, phone unit 1612 may cause the headset to be used for carrying on the call. As another example, when pairing status unit 1614 determines that a headset is operatively connected to device 1600, but a cellular phone is not operatively connected to device 1600, phone unit 1612 may present a subset of phone functions for operation on device 1600.

The units of FIG. 16 may be used to implement the various techniques and methods described above with respect to FIGS. 6-15. The units of device 1600 are, optionally, implemented by hardware, software, or a combination of hardware and software to carry out the principles of the various described examples. It is understood by persons of skill in the art that the functional blocks described in FIG. 16 are, optionally, combined or separated into sub-blocks to implement the principles of the various described examples. Therefore, the description herein optionally supports any possible combination or separation or further definition of the functional blocks described herein.

Figure 17:
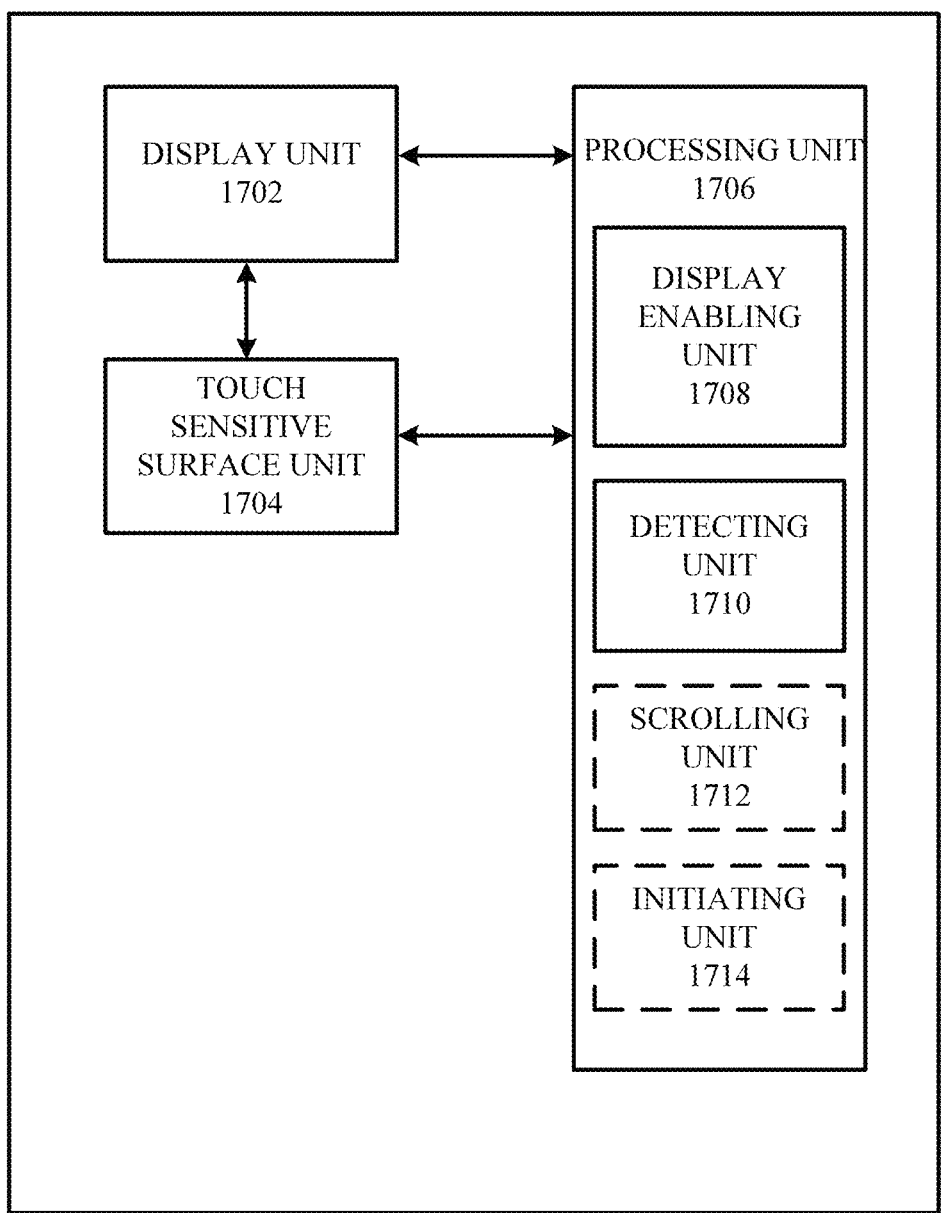
FIG. 17 is a functional block diagram of an electronic device in accordance with some embodiments.

In accordance with some embodiments, FIG. 17 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 includes a display unit 1702 configured to display a graphic user interface, a touch sensitive surface unit 1704 configured to receive contacts, and a processing unit 1706 coupled to the display unit 1702 and the touch-sensitive surface unit 1704. In some embodiments, the processing unit includes a display enabling unit 1708, a detecting unit 1710, a scrolling unit 1712, and an initiating unit 1714.

The processing unit 1706 is configured to enable display (e.g., with the display enabling unit 1708) of a phone icon; and detect (e.g., with the detecting unit 1710) user selection of the phone icon. The processing unit 1706 is further configured to, in response to the user selection, enable display (e.g., with the display enabling unit 1708) of at least two affordances comprising: a first affordance, wherein the first affordance, when selected, enables display of a plurality of phone contacts; and a second affordance, wherein the second affordance, when selected, enables display of a user-designed subset of the plurality of phone contacts. The processing unit is further configured to, while enabling display of the first and second affordances, detect (e.g., with the detecting unit 1710) user input comprising at least a selection of a displayed affordance; and in response to detecting the user input, enable display (e.g., with the display enabling unit 1708) of one or more phone contacts.

In some embodiments, the processing unit is further configured to, in response to the user selection, enable display (e.g., with the display enabling unit 1708) of a third affordance, wherein the third affordance when selected causes the electronic device to display a plurality of affordances representing voice mail messages.

In some embodiments, the processing unit is further configured to, in response to the user selection, enable display (e.g., with the display enabling unit 1708) of a fourth affordance, wherein the fourth affordance when selected causes the electronic device to display a plurality of recent calls.

In some embodiments, the second affordance includes, within its perimeter, an indication of a number of missed incoming calls.

In some embodiments, the fourth affordance includes, within its perimeter, an indication of a number of new voicemail messages.

In some embodiments, detecting user input comprises detecting a user selection of the first affordance. The processing unit may further be configured to, in response to detecting the user selection of the first affordance, enable display (e.g., with the display enabling unit 1708) of a plurality of contact affordances representing a plurality of phone contacts.

In some embodiments, the electronic device has a rotatable input mechanism and the processing unit is further configured to detect (e.g., with the detecting unit 1710) user input representing movement of the rotatable input mechanism and scroll (e.g., with the scrolling unit 1712) the displayed plurality of contact affordances in accordance with the detected user input.

In some embodiments, a displayed contact affordance of the plurality of contact affordances includes a contact information affordance, and the processing unit is further configured to, in response to detecting a user selection of the contact information affordance, enable display (e.g., with the display enabling unit 1708) of a name and number associated with a phone contact represented by the displayed contact affordance, and a call affordance, where the call affordance, when selected, causes the processor to initiate a call to the phone contact.

In some embodiments, a displayed contact affordance of the plurality of contact affordances includes a contact information affordance, and the processing unit is further configured to, in response to detecting a user selection of the contact information affordance, enable display (e.g., with the display enabling unit 1708) of a name of a phone contact represented by the displayed contact affordance, and a video call affordance, where the video call affordance, when selected, causes the processing unit to initiate a video call to the phone contact.

In some embodiments, a displayed contact affordance of the plurality of contact affordances includes a contact information affordance, and the processing unit is further configured to, in response to detecting a user selection of the contact information affordance, enable display (e.g., with the display enabling unit 1708) of a name and an email address associated with a phone contact represented by the displayed contact affordance, and an email affordance, where the email affordance, when selected, causes the processor to initiate a draft email to the email address.

In some embodiments, a displayed contact affordance of the plurality of contact affordances includes a contact information affordance, and the processing unit is further configured to, in response to detecting a user selection of the contact information affordance, enable display (e.g., with the display enabling unit 1708) of a name associated with a phone contact represented by the displayed contact affordance, and a message affordance, where the message affordance, when selected, causes the processor to initiate a draft short message to the phone contact.

In some embodiments, a displayed contact affordance of the plurality of contact affordances includes a contact information affordance, and the processing unit is further configured to, in response to detecting a user selection of the contact information affordance, enable display (e.g., with the display enabling unit 1708) of a name associated with a phone contact represented by the displayed contact affordance, and a map affordance, wherein the map affordance, when selected, causes the processing unit to display a map of a location associated with the phone contact.

In some embodiments, the processing unit is further configured to, in response to detecting a user selection of the second affordance, enable display (e.g., with the display enabling unit 1708) of a plurality of recent calls affordances representing recently incoming and outgoing calls, where a recent call affordance of the plurality of recent calls affordance comprises an indication of the time of the call.

In some embodiments, the processing unit is further configured to, in response to detecting a user selection of the second affordance, enable display (e.g., with the display enabling unit 1708) of a plurality of recent calls affordances representing recently incoming and outgoing calls, wherein a recent call affordance of the plurality of recent calls affordance comprises an indication of the duration of the call.

In some embodiments, the processing unit is further configured to initiate (e.g., with the initiating unit 1714) a call to a displayed phone contact; and after initiating the call, enable display (e.g., with the display enabling unit 1708) of the phone icon in response to detecting user input, and detect (e.g., with the detecting unit 1710) a user selection of the displayed phone icon. The processing unit is further configured to, in response to detecting the user selection of the displayed phone icon, enable display (e.g., with the display enabling unit 1708) of an indication of the initiated call, and at least the first affordance.

In some embodiments, the indication comprises text indicating the called phone contact and a duration of the call.

In some embodiments, the processing unit is further configured to, in response to detecting a user selection of the indication, enable display (e.g., with the display enabling unit 1708) of an end-call affordance, where the end-call affordance, when selected, causes the electronic device to end the call.

In some embodiments, initiating the phone operation comprises sending an instruction to a cellular phone instructing the cellular phone to place a phone call.

In some embodiments, initiating the phone operation comprises obtaining a voicemail message and causing playback of the obtained voicemail message.

In some embodiments, the touch-sensitive surface unit comprises one or more sensors to detect the intensity of touches, and detecting user input comprising at least a selection of a displayed affordance includes detecting a touch on the touch-sensitive surface unit where the touch has a characteristic intensity and is located at the position of one of the displayed first or second affordances; determining whether the characteristic intensity exceeds a predetermined threshold intensity; in response to a determination that the characteristic intensity exceeds the predetermined threshold intensity, ceasing to enable display of the first and second affordances and enabling display of additional affordances representing additional phone-related operations; and in response to a determination that the characteristic intensity does not exceed the predetermined threshold intensity, performing a function associated with the first or second displayed affordance.

In some embodiments, enabling display of additional affordances comprises enabling display of a keypad affordance, where the keypad affordance, when selected, causes the processing unit to enable display of phone keypad.

In some embodiments, enabling display of additional affordances comprises enabling display of a pairing affordance, where the pairing affordance, when selected, causes the processing unit to detect (e.g., with the detecting unit 1710) a cellular phone within wireless communication range of the electronic device, wherein the cellular phone is configured to pair with the electronic device.

In some embodiments, the electronic device is a wearable electronic device.

The operations described above with reference to FIG. 12 are, optionally, implemented by components depicted in FIGS. 1A-1B or FIG. 17. For example, displaying operations 1202 and 1208 and detecting operations 1204 and 1206 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 18:
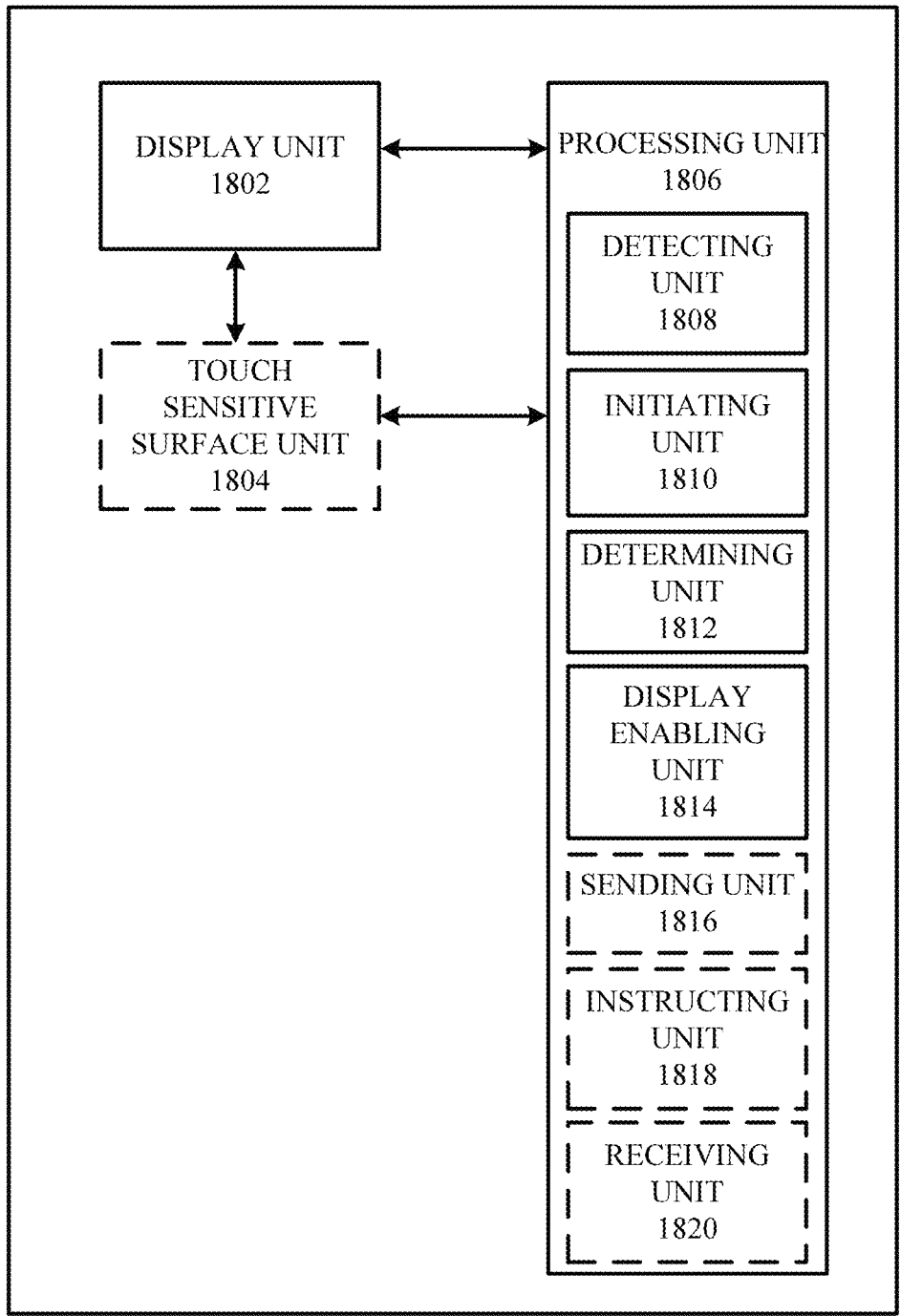
FIG. 18 is a functional block diagram of an electronic device in accordance with some embodiments.

In accordance with some embodiments, FIG. 18 shows a functional block diagram of an electronic device 1800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, an electronic device 1800 includes a display unit 1802 configured to display a graphic user interface, optionally, a touch sensitive surface unit 1804 configured to receive contacts, and a processing unit 1806 coupled to the display unit 1802 and optionally, the touch-sensitive surface unit 1804. In some embodiments, the processing unit includes a detecting unit 1808, an initiating unit 1810, a determining unit 1812, a display enabling unit 1814, a sending unit 1816, an instructing unit 1818, and a receiving unit 1820.

The processing unit is configured to detect (e.g., with the detecting unit 1808) a selection of a displayed affordance representing a phone contact; initiate (e.g., with the initiating unit 1810) a phone operation involving the phone contact; determine (e.g., with the determining unit 1812) a first communication status between a phone headset and the electronic device, where the first communication status indicates whether the phone headset is operatively connected to the electronic device; determine (e.g., with the determining unit 1812) a second communication status between the phone headset and a cellular phone, where the second communication status indicates whether the phone headset is operatively connected to the cellular phone; and enable display (e.g., with the display enabling unit 1814) of a headset indicator indicating at least one of the first communication status and the second communication status.

In some embodiments, the processing unit is further configured to, in accordance with a determination that the phone headset is not operatively connected with the cellular phone: enable display (e.g., with the display enabling unit 1814) of an indication that the cellular phone is not operatively connected to the phone headset, and send (e.g., with the sending unit 1816) an instruction instructing the cellular phone to display an indication of the phone contact and a call affordance, where the call affordance, when selected, causes the cellular phone to place a call to the phone contact.

In some embodiments, the processing unit is further configured to enable display (e.g., with the display enabling unit 1814) of an indication that the call will be placed after the cellular phone detects user input to place the call.

In some embodiments, the processing unit is further configured to enable display (e.g., with the display enabling unit 1814) of an end-call affordance, wherein the end-call affordance, when selected, causes the cellular phone to end the phone operation.

In some embodiments, the end-call affordance, when selected, causes the cellular phone to cease displaying the call affordance.

In some embodiments, in accordance with a determination that the cellular phone is operatively connected to the phone headset:

In some embodiments, the processing unit is further configured to enable display (e.g., with the display enabling unit 1814) of an indication that the cellular phone is operatively connected to the phone headset; and instruct (e.g., with the instructing unit 1818) the cellular phone to place a call to the phone contact, in response to detecting the selection of the displayed affordance representing the phone contact.

In some embodiments, the electronic device is operatively connected to the phone headset, the electronic device is not operatively connected to the cellular phone, and enabling display of the headset indicator comprises enabling display of an indication that the electronic device is operatively connected to the phone headset, and initiating the phone operation comprises obtaining a voicemail message and playing the obtained voicemail message on the connected headset.

In some embodiments, the processing unit is further configured to enable display (e.g., with the display enabling unit 1814) of a plurality of voicemail affordances representing a plurality of voicemail messages; and detect (e.g., with the detecting unit 1808) a selection of a displayed voicemail affordance, where obtaining the voicemail message comprises obtaining the voicemail message corresponding to the selected voicemail affordance.

In some embodiments, the processing unit is further configured to receive (e.g., with the receiving unit 1820) data representing an incoming call; detect (e.g., with the detecting unit 1808) user acceptance of the incoming call; in accordance with a determination that the electronic device is operatively connected to the phone headset and the electronic device is not operatively connected to the cellular phone, enable display (e.g., with the display enabling unit 1814) of an indication that the electronic device is operatively connected to the phone headset; detect (e.g., with the detecting unit 1808) a presence of the cellular phone via wireless communication; and in response to detecting the cellular phone, send (e.g., with the sending unit 1816) an instruction to the cellular phone instructing the cellular phone to display an accept affordance, wherein the accept affordance, when selected, causes the cellular phone to accept the incoming call.

In some embodiments, initiating the phone operation comprises: causing playback of an audio message to a caller of the incoming call.

In some embodiments, the audio message informs the caller to wait.

In some embodiments, the processing unit is further configured to enable display (e.g., with the display enabling unit 1814) of an end-call affordance, wherein the end-call affordance, when selected, ends the phone operation.

In some embodiments, the electronic device is a wearable electronic device.

The operations described above with reference to FIG. 13 are, optionally, implemented by components depicted in FIGS. 1A-1B or FIG. 18. For example, determining operations 1302, 1304, displaying operation 1306, and optionally, determining operation 1308 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 19:
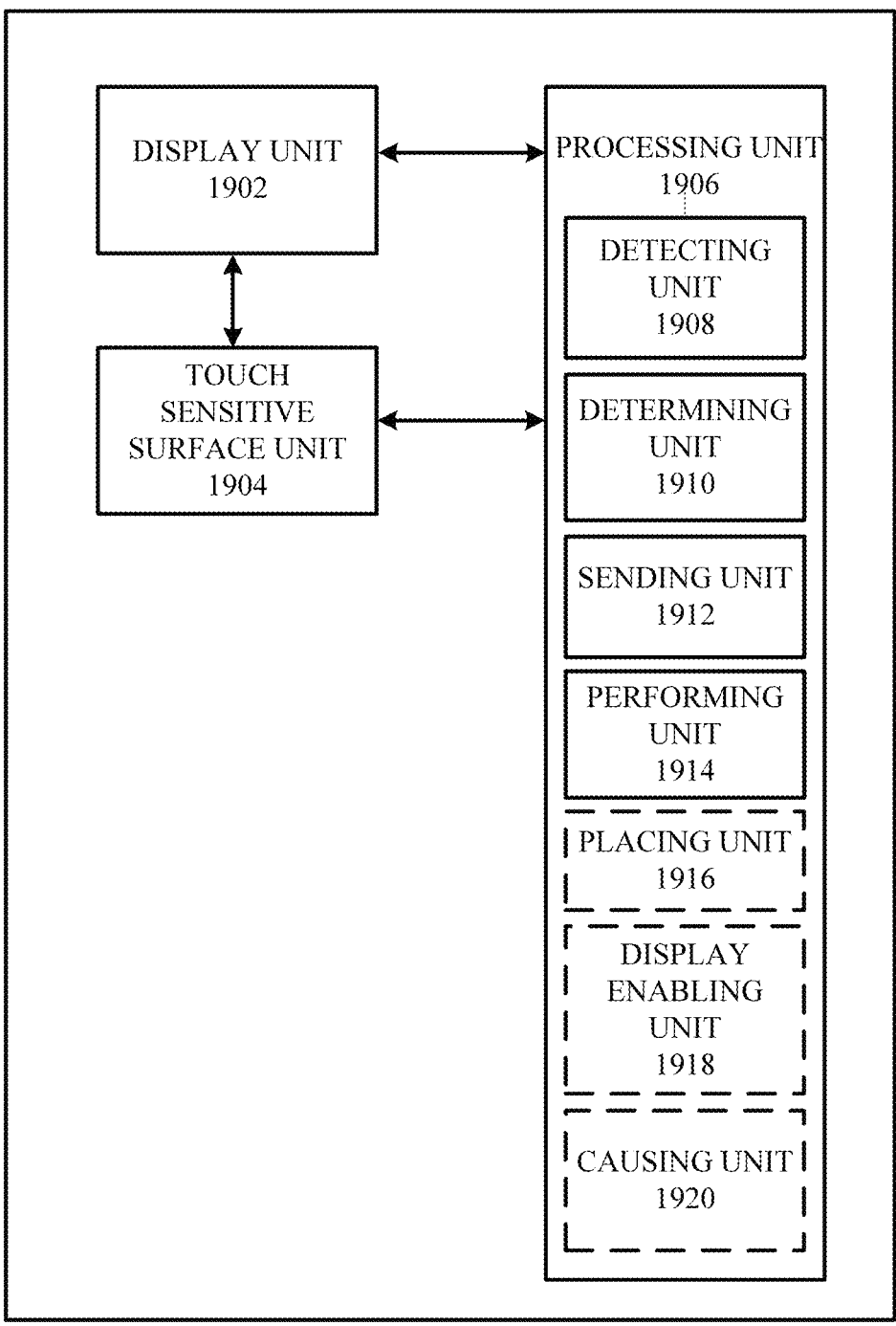
FIG. 19 is a functional block diagram of an electronic device in accordance with some embodiments.

In accordance with some embodiments, FIG. 19 shows a functional block diagram of an electronic device 1900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 includes a display unit 1902 configured to display a graphic user interface, a touch sensitive surface unit 1904 configured to receive contacts, and a processing unit 1906 coupled to the display unit 1902 and the touch-sensitive surface unit 1904. In some embodiments, the processing unit includes a detecting unit 1908, a determining unit 1910, a sending unit 1912, a performing unit 1914, a placing unit 1916, a display enabling unit 1918, and a causing unit 1920.

The processing unit 1906 is configured to, during an active phone call, detect (e.g., with the detecting unit 1908) a touch on the touch-sensitive surface unit, where the touch has a characteristic intensity and is located at the position of a first affordance; determine (e.g., with the determining unit 1910) whether the characteristic intensity exceeds a predetermined threshold intensity; in response to at least a determination that the characteristic intensity exceeds the predetermined threshold intensity, send (e.g., with the sending unit 1912) an instruction to a cellular phone instructing the cellular phone to display a second affordance, where the second affordance, when selected, causes the cellular phone to retrieve the active phone call; and in response to at least a determination that the characteristic intensity is below the predetermined threshold intensity, perform (e.g., with the performing unit 1914) a function associated with the first affordance.

In some embodiments, the processing unit is further configured to, in response to at least a determination that the characteristic intensity exceeds the predetermined threshold intensity, place (e.g., with the placing unit 1916) the active phone call on hold.

In some embodiments, the second affordance, when selected, causes a cellular phone having a speaker and a microphone to provide input into the active phone call using the microphone and to provide output from the call using the speaker.

In some embodiments, the processing unit is further configured to, after placing the active phone call on hold, enable display (e.g., with the display enabling unit 1918) of an un-hold affordance, where the un-hold affordance, when selected un-holds the held call and causes the processing unit to enable display of an end-call affordance, wherein the end-call affordance, when selected, ends the active phone call.

In some embodiments, the electronic device is operatively connected to a headset, and un-holding the held call comprises providing input into the call using the headset and providing output from the call using the headset.

In some embodiments, un-holding the held call comprises providing input into the call using a microphone of the electronic device and providing output from the call using a speaker of the electronic device.

In some embodiments, the processing unit is further configured to, after placing the call on hold, cause (e.g., with the causing unit 1920) playback of an audio message to a participant of the active phone call, the audio message informing the participant that the active phone call is on hold.

In some embodiments, the electronic device is a wearable electronic device.

The operations described above with reference to FIG. 14 are, optionally, implemented by components depicted in FIGS. 1A-1B or FIG. 19. For example, detecting operation 1402, determining operation 1404, display operation 1406, and performing operation 1408 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 20:
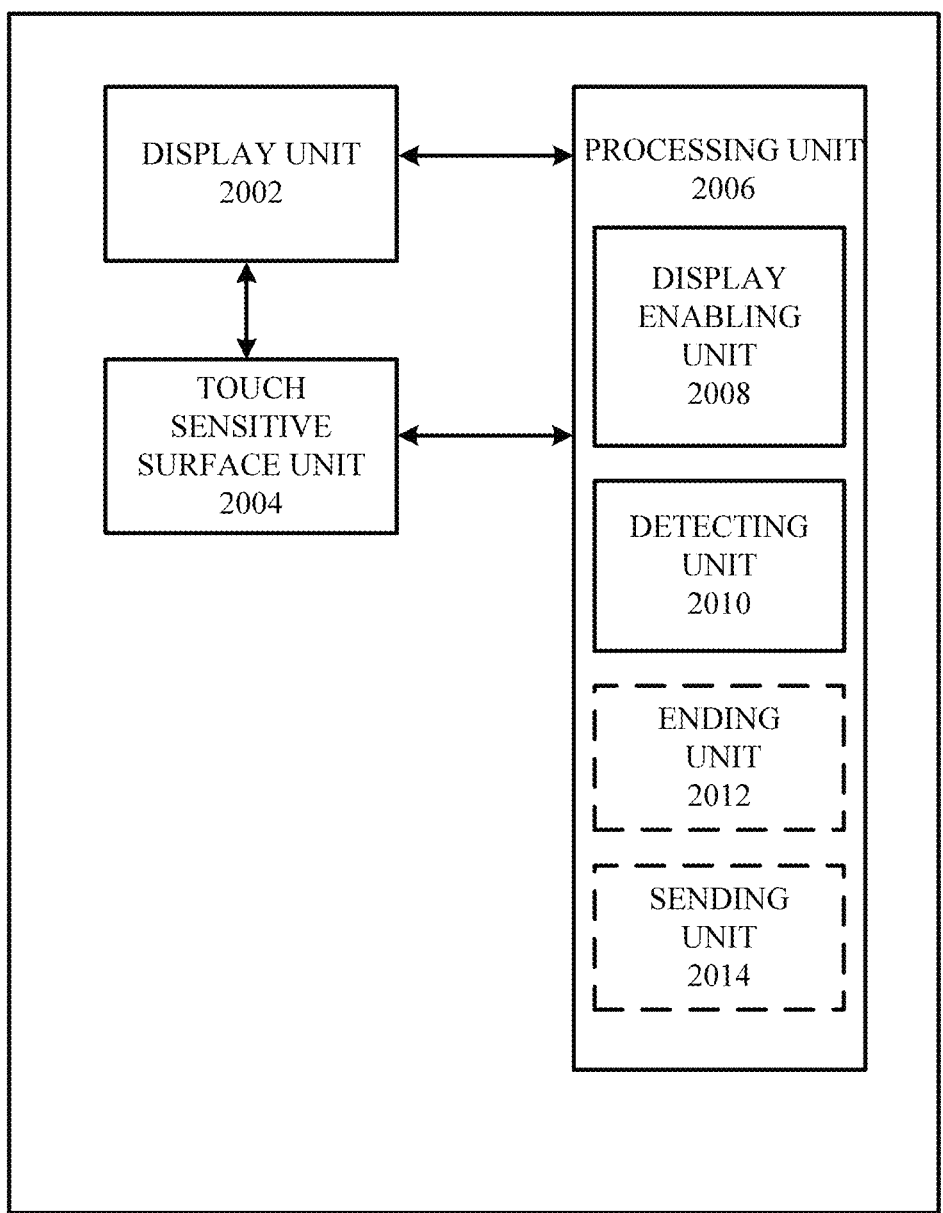
FIG. 20 is a functional block diagram of an electronic device in accordance with some embodiments.

In accordance with some embodiments, FIG. 20 shows a functional block diagram of an electronic device 2000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 20 are, optionally, combined or separated into sub-blocks to implement the principles of the various described embodiments. Therefore, the description herein optionally supports any possible combination or separation or further definition of the functional blocks described herein.

As shown in FIG. 20, an electronic device 2000 includes a display unit 2002 configured to display a graphic user interface, a touch sensitive surface unit 2004 configured to receive contacts, and a processing unit 2006 coupled to the display unit 2002 and the touch-sensitive surface unit 2004. In some embodiments, the processing unit includes a display enabling unit 2008, a detecting unit 2010, an ending unit 2012, and a sending unit 2014.

The processing unit 2006 is configured to enable display (e.g., with the display enabling unit 2008), on the display unit, of an indication of an incoming call; enable display (e.g., with the display enabling unit 2008) of a first answer affordance, where the first answer affordance, when selected, causes the incoming call to be answered; enable display (e.g., with the display enabling unit 2008) of a decline affordance, wherein the decline affordance, when selected, causes the incoming call to be ended; detect (e.g., with the detecting unit 2010) user input; in response to the detected user input, enable display (e.g., with the display enabling unit 2008) of an additional affordance, wherein the additional affordance, when selected, causes the processing unit to send an instruction to the cellular phone instructing the cellular phone to display a second answer affordance, where the second answer affordance, when selected, causes the cellular phone to answer the incoming call.

In some embodiments, causing the cellular phone to answer the incoming call comprises causing a speaker operatively connected to the cellular phone to provide input into the call, and causing a microphone operatively connected to the cellular phone to provide output from the call.

In some embodiments, the processing unit is further configured to, while enabling display of the first answer affordance and the end-call affordance, detect (e.g., with the detecting unit 2010) a swipe on the touch-sensitive surface unit; and in response to detecting the swipe, enable display of the additional affordance.

In some embodiments, detecting the swipe comprises detecting a touch on the touch-sensitive surface unit followed by a movement of the swipe in a substantially upward direction.

In some embodiments, the processing unit is further configured to enable display (e.g., with the display enabling unit 2008) of a message affordance; in response to detecting a selection of the message affordance, enable display (e.g., with the display enabling unit 2008) of a plurality of affordances representing predetermined responses to the caller; in response to detecting a selection of an affordance representing a predetermined response end (e.g., with the ending unit 2012) the call and send (e.g., with the sending unit 2014) the predetermined response to the caller as a message.

In some embodiments, detecting user input while enabling display of the indication of the incoming call comprises detecting a swipe in a direction and enabling display of the message affordance in response to the detected swipe.

In some embodiments, the direction is substantially in the up direction.

In some embodiments, the predetermined response is a text and the message is a text message.

In some embodiments, the predetermined response comprises an emoji character.

In some embodiments, the electronic device is a wearable electronic device.

The operations described above with reference to FIG. 15 are, optionally, implemented by components depicted in FIGS. 1A-1B or FIG. 20. For example, displaying operations 1502, 1504, and 1508 and receiving operation 1506 are, optionally, implemented by event sorter 170, event recognizer 180, and event handler 190. Event monitor 17 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 21:
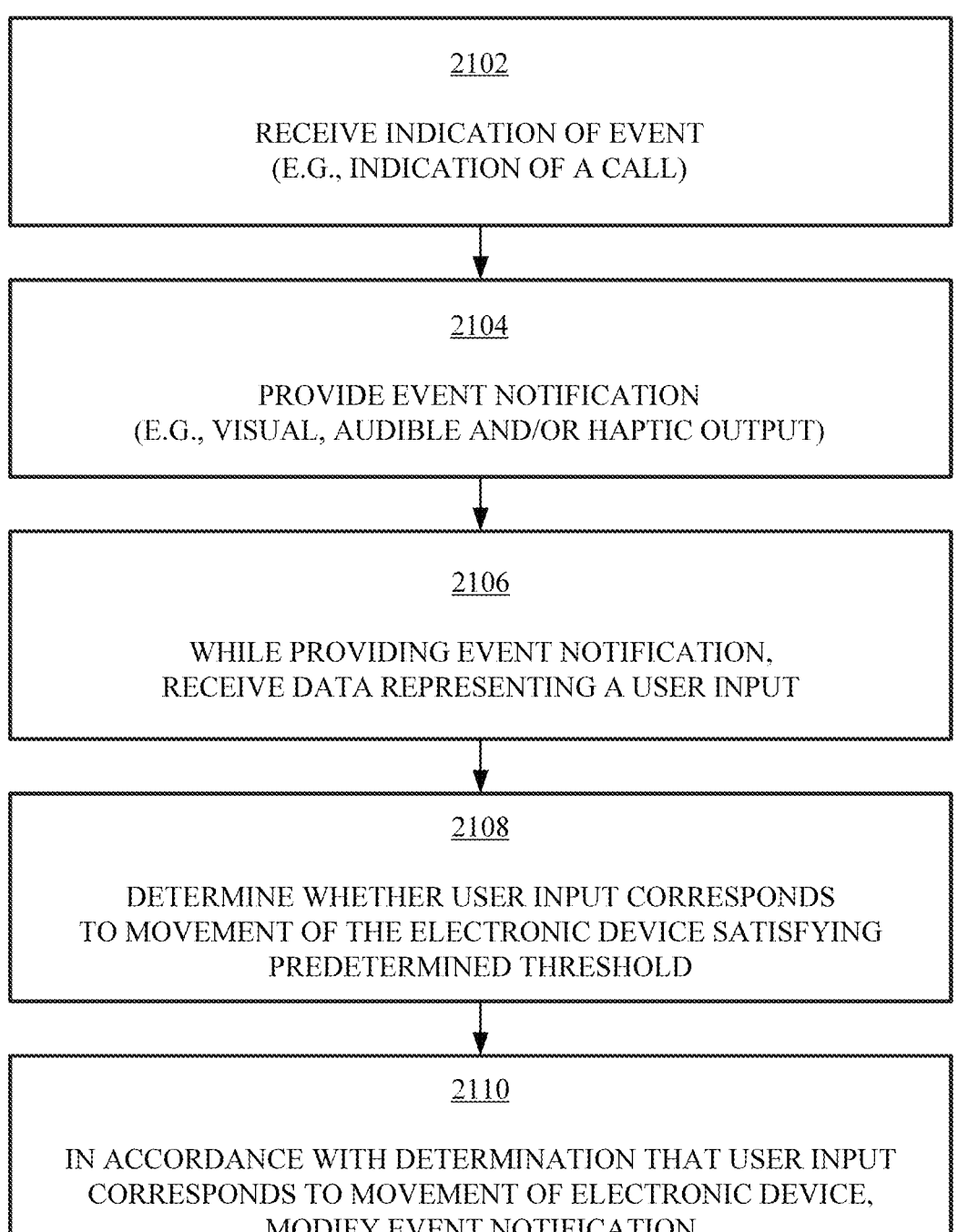
FIG. 21 is a flow diagram illustrating a process for modifying event notifications in accordance with some embodiments.

FIG. 21 is a flow diagram illustrating process 1200 for modifying event notifications. Process 2100 may be carried out by electronic devices such as devices 100, 300, and/or 500 (FIGS. 1A, 3A, 5A) in various embodiments. At block 2102, the electronic device may receive an indication of an event. The indication may be an indication of an incoming call and may be received from a cellular phone or another connected to an electronic device. At block 2104, in response to receiving the indication, the electronic device may provide an event notification. Providing an event notification may include providing an output (e.g., a visual output such as a flashing light or indication on a display, an audible output such as a ringtone, a haptic output such as vibration) to notify a user of an incoming call. At block 2106, while providing the event notification, the electronic device may receive data, from one or more motion sensors, representing a user input. The user input may correspond to a user physically raising a wrist. At block 2108, the electronic device may determine, based on the data representing the user input, whether the user input corresponds to movement of the electronic device satisfying predetermined condition. The predetermined condition may include a wrist raise, that the electronic device is moved to a particular position (e.g., rotated), activation of an input device such as a push button or a rotatable input device, or a touch on a touch-sensitive surface or display. At block 2110, in accordance with a determination that the user input corresponds to movement of the electronic device satisfying the predetermined condition (e.g., wrist raise), the electronic device may modify the event notification. Modifying the event notification may include varying, increasing, or decreasing (e.g., attenuating) visual intensity, haptic intensity, and/or a volume level of the notification, for instance, to a non-negative value including zero.

In some embodiments, in accordance with a determination that the user input does not correspond to movement of the electronic device satisfying the predetermined condition, the electronic device may forgo modification of the event notification.

In some embodiments, the electronic device wirelessly communicates with a cellular phone, and the indication of the event is an indication of a call received at the cellular phone.

In some embodiments, the predetermined condition is based on an amount of lifting of the electronic device during a time interval, the amount of lifting determined from an accelerometer of the electronic device, the predetermined condition is based on smoothness of a lifting of the electronic device during a time interval, the smoothness of the lifting determined from an accelerometer of the electronic device, and/or the predetermined condition comprises a minimum period of dwell time in a position in accordance with the lifting of the electronic device.

In some embodiments, in accordance with providing the event notification, the electronic device may provide the event notification while a display of the electronic device is inactive (e.g., display of electronic device is turned off).

In some embodiments, in accordance with modifying the event notification, the electronic device may activate the display of the electronic device. For example, the electronic device may activate a display of the electronic device in response to the predetermined condition being satisfied.

In some embodiments, in accordance with determining, based on the data representing the user input, whether the user input corresponds to movement of the electronic device satisfying a predetermined condition, the electronic device may determine whether the user input corresponds to activation an input device of the electronic device, and further in accordance with a determination that the user input corresponds to activation of the input device, may modify the event notification. By way of example, when determining whether the user input corresponds to movement of the electronic device, the electronic device can determine if a user input causes a display (or other input device) of the electronic device to be enabled, and in accordance with that determination, can modify/attenuate the notification.

In some embodiments, the electronic device may be configured to wirelessly communicate with a cellular phone, and in accordance with a determination that the user input corresponds to movement of the electronic device satisfying the predetermined condition, the electronic device may modify an event notification provided by the cellular phone. By way of example, in accordance with a determination that the user input corresponds to movement of the electronic device satisfying the predetermined threshold, the electronic device can modify a notification provided by an operatively and/or wirelessly connected cellular phone.

Figure 22:
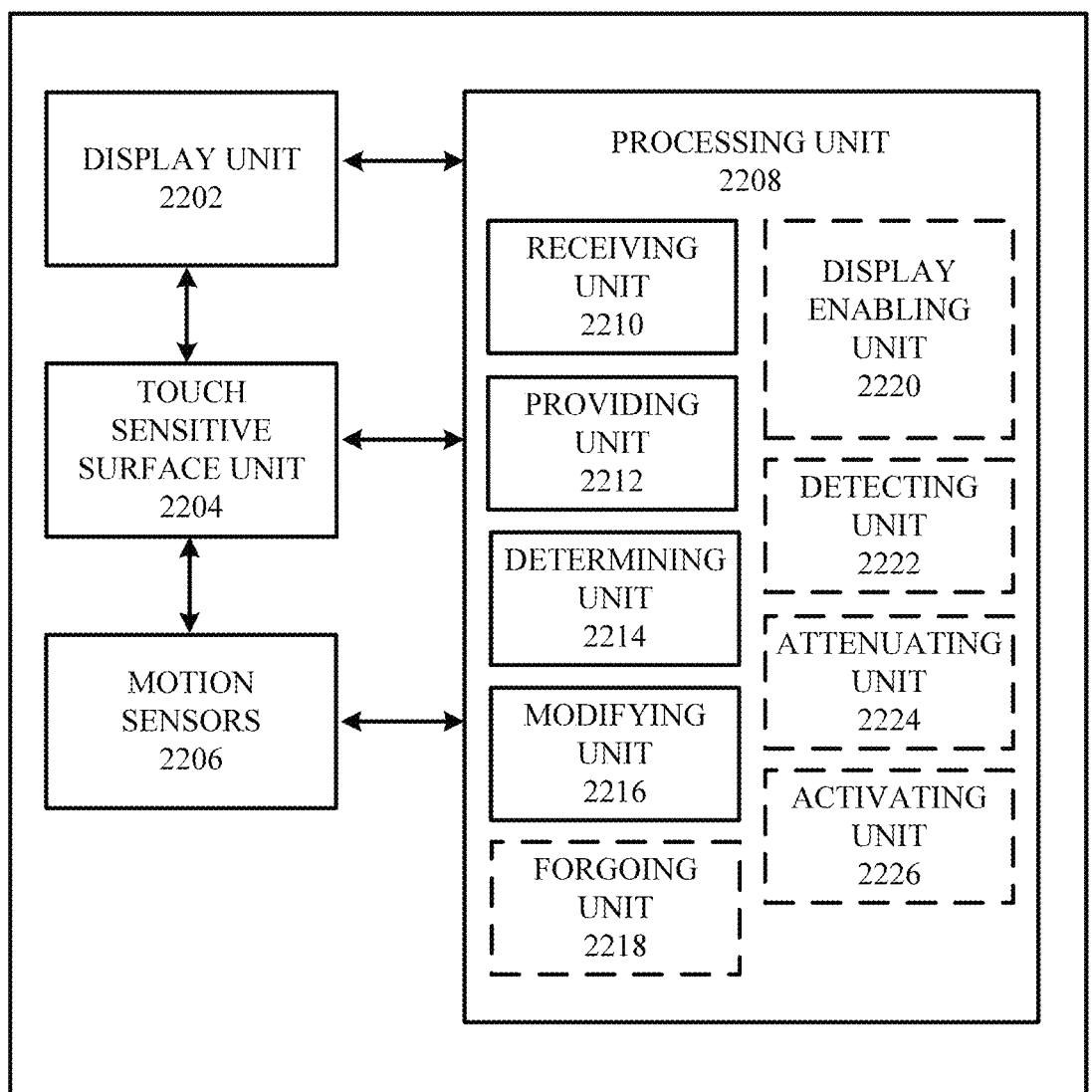
FIG. 22 is a functional block diagram of an electronic device in accordance with some embodiments.

In accordance with some embodiments, FIG. 22 shows a functional block diagram of an electronic device 2100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 22 are, optionally, combined or separated into sub-blocks to implement the principles of the various described embodiments. Therefore, the description herein optionally supports any possible combination or separation or further definition of the functional blocks described herein.

As shown in FIG. 22, an electronic device 2200 includes a display unit 2202 configured to display a graphic user interface, a touch sensitive surface unit 2204 configured to receive contacts, one or more motion sensors 2206, and a processing unit 2208 coupled to the display unit 2202, the touch-sensitive surface unit 2204, and the one or more motion sensors 2206. In some embodiments, the processing unit includes a receiving unit 2210, a providing unit 2212, a determining unit 2214, a modifying unit 2216, a forgoing unit 2218, display enabling unit 2220, a detecting unit 2222, an attenuating unit 2224, and an activating unit 2226.

The processing unit 2208 is configured to receive (e.g., with the receiving unit 2210) an indication of an event; in response to receiving the indication, provide (e.g., with the providing unit 2212) an event notification; while providing the event notification, receive (e.g., with the receiving unit 2210) data, from the one or more motion sensors 2206, representing a user input; determine (e.g., with the determining unit 2214), based on the data representing the user input, whether the user input corresponds to movement of the electronic device satisfying a predetermined condition; in accordance with a determination that the user input corresponds to movement of the electronic device satisfying the predetermined condition, modify (e.g., with the modifying unit 2216) the event notification In some embodiments, the processing unit 2208 is further configured to, in accordance with a determination that the user input does not correspond to movement of the electronic device satisfying the predetermined condition, forgo (e.g., with the forgoing unit 2218) modification of the event notification.

In some embodiments, the electronic device is configured to wirelessly communicate with a cellular phone, and the indication of the event is an indication of a call received at the cellular phone.

In some embodiments, the processing unit 2208 is further configured to determine (e.g., with the determining unit 2214) whether the call is a call of a first type; and in accordance with the determination that the call is of the first type, enable display (e.g., with the display enabling unit 2220) of a first affordance, where the first affordance, when activated, causes the call to be placed on hold.

In some embodiments, the processing unit 2208 is further configured to determine (e.g., with the determining unit 2214) whether the call is a call of a first type and in accordance with the determination that the call is not of the first type, enable display (e.g., with the display enabling unit 2220) of a second affordance, wherein the second affordance, when activated, causes the call to be answered.

In some embodiments, the processing unit 2208 is further configured to, in accordance with the determination that the call is of the first type, forgo (e.g., with the forgoing unit 2216) displaying the second affordance.

In some embodiments, the processing unit 2208 is further configured to, while displaying the first affordance, detect (e.g., with the detecting unit 2222) a second user input activating the first affordance; and in response to detecting the second user input activating the first affordance, enable display (e.g., with the display enabling unit 2220) of a third affordance and a fourth affordance, wherein the third affordance, when activated, causes a cellular phone in wireless communication with the electronic device to provide at least one of an audible output, a visual output, or a haptic output and wherein the fourth affordance, when activated, causes the call to be ended.

In some embodiments, the predetermined condition is based on an amount of lifting of the electronic device during a time interval, the amount of lifting determined from an accelerometer of the electronic device.

In some embodiments, the predetermined condition is based on smoothness of a lifting of the electronic device during a time interval, the smoothness of the lifting determined from an accelerometer of the electronic device.

In some embodiments, the predetermined condition comprises a minimum period of dwell time in a position in accordance with the lifting of the electronic device.

In some embodiments, the event notification is an audible notification.

In some embodiments, the processing unit 2208 is further configured to, in accordance with modifying the event notification, attenuate (e.g., with the attenuating unit 2224) a volume level of the audible notification.

In some embodiments, the event notification is a haptic notification.

In some embodiments, the processing unit 2208 is further configured to in accordance with modifying the event notification, attenuate (e.g., with the attenuating unit 2224) motion of the haptic notification.

In some embodiments, the event notification is a visual notification.

In some embodiments, the processing unit 2208 is further configured to in accordance with modifying the event notification, attenuate (e.g., with the attenuating unit 2224) an intensity of the visual notification.

In some embodiments, the processing unit 2208 is further configured to in accordance with providing the event notification, provide (e.g., with the providing unit 2212) the event notification while a display of the electronic device is inactive.

In some embodiments, the processing unit 2208 is further configured to, in accordance with modifying the event notification, activate (e.g., with the activating unit 2226) the display of the electronic device.

In some embodiments, the processing unit 2208 is further configured to, in accordance with determining, based on the data representing the user input, whether the user input corresponds to movement of the electronic device satisfying a predetermined condition, determine (e.g., with the determining unit 2214) whether the user input corresponds to activation an input device of the electronic device; and in accordance with a determination that the user input corresponds to activation of the input device, modify (e.g., with the modifying unit 2216) the event notification.

In some embodiments, the electronic device is configured to wirelessly communicate with a cellular phone, the processing unit 2208 further configured to, in accordance with a determination that the user input corresponds to movement of the electronic device satisfying the predetermined condition, modify (e.g., with the modifying unit 2216) an event notification provided by the cellular phone.

The operations described above with reference to FIG. 21 are, optionally, implemented by components depicted in FIGS. 1A-1B or FIG. 22. For example, receiving operations 2102 and 2106, providing operation 2104, determining operation 2108, and modifying operation 2110 are, optionally, implemented by event sorter 170, event recognizer 180, and event handler 190. Event monitor 17 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Figure 23A:
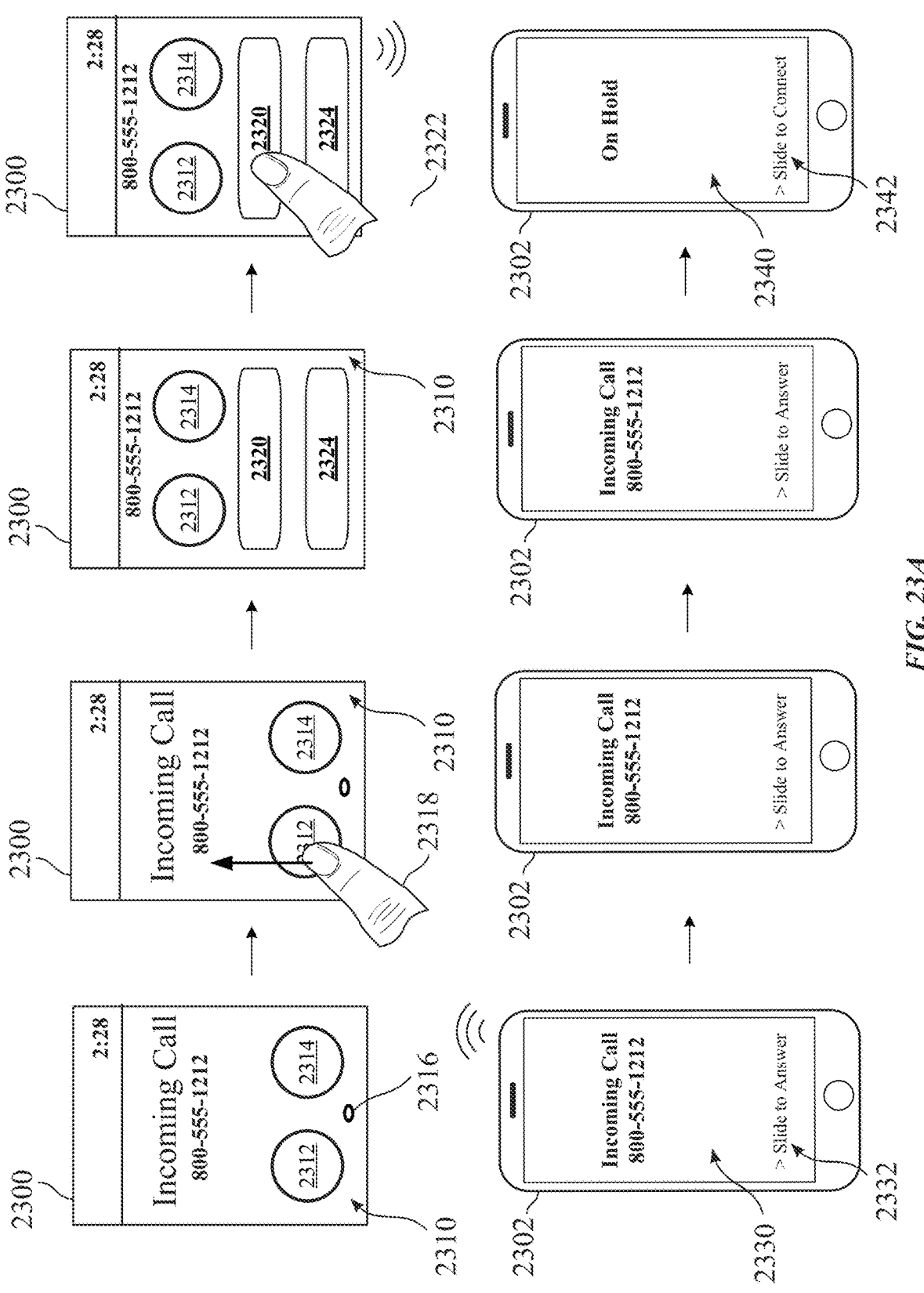
FIGS. 23A-23B illustrate exemplary user interfaces for accessing phone features among multiple devices.
Figure 23B:
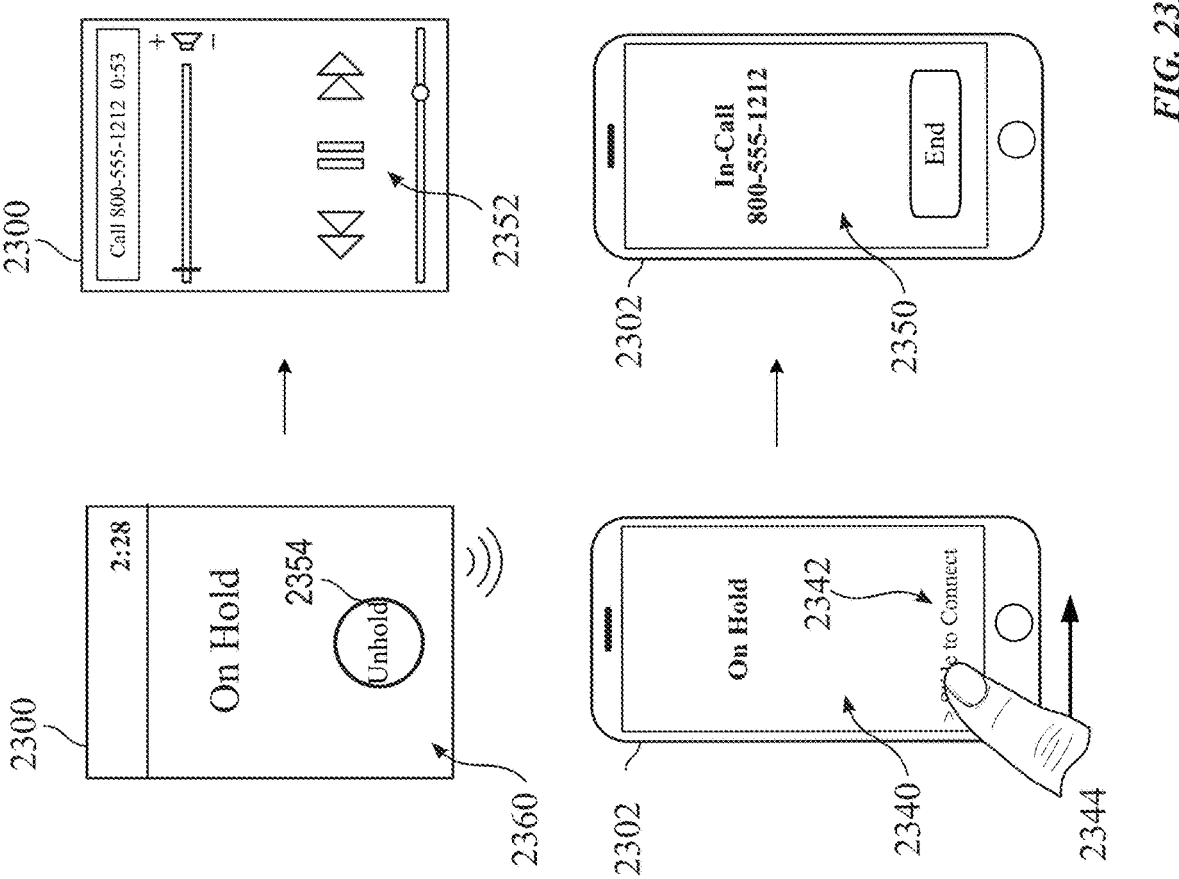

Additional exemplary user interfaces for transitioning between wearable electronic device and cellular phone usage are discussed with reference to FIGS. 23A-B. As shown in FIG. 23A, cellular phone 2302 is receiving an incoming call and displays incoming-call screen 2330. Cellular phone 2302 is device 100 (FIG. 1A) in some embodiments. Wearable electronic device 2300 receives an indication of the incoming call from cellular phone 2302 and also displays incoming-call screen 2310. Wearable electronic device 2300 is device 500 (FIG. 5A) in some embodiments. Optionally, wearable electronic device 2300 may issue a haptic or audio alert informing the user of the incoming call.

Incoming-call screen includes affordance 2312 for answering the call. Consistent with the discussion above regarding usage scenarios, if affordance 2312 is selected to answer the incoming call while cellular phone 2302 is operatively connected to a headset, the headset will be used for carrying on the call. A user may wish, however, to participate on the call using another device, such as by using the internal speaker and microphone of cellular phone 2302.

In this situation, while incoming-call screen 2310 is displayed on wearable electronic device 2300, the user may provide swipe input 2318 to reveal affordance 2320. Affordance 2320, when selected, causes the incoming call to be placed on hold so that the user can access cellular phone 2302 to answer the call. As shown in FIG. 23A and continuing onto FIG. 23B, in response to selection 2322 of affordance 2320, the incoming call is placed on hold, and cellular phone 2302 displays on-hold screen 2340 informing the user via instruction label 2342 that the phone call can be retrieved by certain user input, in this case a swipe input. In the illustrated example, incoming call screen 2310 has affordance 2316 indicating the availability of additional features that are not displayed, such as affordance 2312 for answering the call cellular phone 2302.

The user can retrieve the call on cellular phone 2302 by swipe input 2344, which causes cellular phone 2302 to un-hold the call and enable its speaker and microphone for participation in the call. As shown, responsive to swipe input 2344, device 2350 un-holds the phone call and transitions to in-call screen 2350. In the meantime, wearable electronic device 2300 returns to user interface screen 2354, in this case a music playback screen that was displayed prior to the incoming call. Note that, while call-holding screen 2350 is displayed on wearable electronic device 2300, the user may select un-hold affordance 2352 to continue with the call as before, meaning to continue using the headset for communication. Restated, the user may "pull back" the call even after selecting affordance 2320 (FIG. 23A) to pass the call to cellular phone 2302.

In addition to affordance 2320, incoming-call screen 2310 may include affordances for accessing other phone-related features. For example, with reference to FIG. 23A, the user may provide swipe input 2318 to reveal affordance 2324 in addition to affordance 2420. Affordance 2324, when selected, may allow a user may reply with a text message (e.g., using a messaging dialog box), instead of verbally answering the incoming call. By way of example, a user may for instance, indicate that the user is busy and cannot talk with the caller at the time of the call. In some instances, a user may also wish to send other messages such as those containing emoji. It will be appreciated by those in the art that a user may provide any message to the caller using one or more known formats and/or lengths. U.S. Provisional Patent Application Ser. No. 62/044,923, entitled "USER INTERFACE FOR RECEIVING USER INPUT," filed Sep. 2, 2014; and U.S. Provisional Patent Application Ser. No. 62/127,800, entitled "USER INTERFACE FOR RECEIVING USER INPUT," filed Mar. 3, 2015 describe user interfaces for efficiently obtaining user input that would be helpful in the context of incoming-calls screen 2310. Each of these applications which is hereby incorporated by reference in their entirety. For example, incoming-calls screen 2310 can provide access to affordances for ignoring an incoming call and sending a suggested response, such as "can I call you back?" to the caller. As another example, incoming-calls screen 2310 can provide access to affordances for selecting and customizing an emoji to be sent to the caller. As an additional example, incoming-calls screen 2310 can provide access to an interface for transcribing a user's speech utterance into a message for the caller. As yet another example, incoming-calls screen 2310 can provide access to a reduce-sized keyboard interface for inputting a message for the caller.

In some examples, a user may wish to learn and/or confirm the location of the cellular phone prior to or after selecting the affordance 2320. Accordingly, in some examples, the incoming call screen 2310, and/or one or more other screens displayed by the electronic device, may include additional affordances, such as an affordance directed to "pinging" the cellular phone. The pinging affordance, when selected, may cause the cellular phone to provide an audible, haptic, and/or visual output. An audible output, for example, can be a short, ringing sound for useful for attracting the user's attention. Once the output has been provided, the user may thereafter locate the phone based on the output. In some embodiments, the affordance to ping the phone is displayed in response selecting affordance 2320 to place the call on hold.

FIG. 24 is a flow diagram illustrating process 2400 for handling phone calls between devices. Process 2400 may be carried out by electronic devices such as devices 100, 300, and/or 500 (FIGS. 1A, 3A, 5A) in various embodiments. At block 2402, displaying, on the touch-sensitive display of an electronic device, is an indication of an incoming call. In some examples, the call is being received on a cellular phone that is within communications range of the electronic device. At block 2404, the electronic device displays at least an affordance for answering the call and at least one an affordance for declining call. At block 2406, the electronic device receives user input other than a selection of the accept and decline affordances. The user input causes the electronic device to, at block 2408, display an affordance for messaging the caller. In some embodiments, the user input other than the selection of the accept and decline affordances is an upward swipe.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
a touch-sensitive display,
one or more processors;
a memory; and
one or more programs, wherein the one or more programs are stored in the memory and configured to be executed by the one or more processors, the one or more programs including instructions for:
    displaying, on the touch-sensitive display, a phone icon;
    detecting a user selection of the phone icon;
    in response to detecting the user selection of the phone icon:
        in accordance with a determination that a call is in progress, displaying an in-call indicator, wherein the in-call indicator includes a call participant identifier and a call duration indicator; and
        in accordance with a determination that a call is not in progress, displaying:
            a first affordance, wherein the first affordance, when selected, causes the electronic device to display a plurality of phone contacts; and
            a second affordance, wherein the second affordance, when selected, causes the electronic device to display a user-designed subset of the plurality of phone contacts; and
    while displaying the first affordance and the second affordance, detecting user input comprising at least a selection of a displayed affordance;
    in response to detecting the user input, displaying one or more phone contacts;
    initiating a call to a displayed phone contact; and
    after initiating the call:
        displaying the phone icon in response to detecting a second user input;
        detecting a second user selection of the displayed phone icon; and
        in response to detecting the second user selection of the displayed phone icon:
            displaying an indication of the initiated call, and at least the first affordance.

2. The electronic device of claim 1, the one or more programs further including instructions for:
    in response to detecting the user selection of the phone icon, displaying a third affordance, wherein the third affordance, when selected, causes the electronic device to display a plurality of affordances representing voice-mail messages.

3. The electronic device of claim 1, the one or more programs further including instructions for:
    in response to detecting the user selection of the phone icon, displaying a fourth affordance, wherein the fourth affordance, when selected, causes the electronic device to display a plurality of recent calls.

4. The electronic device of claim 1, wherein detecting user input comprises detecting a user selection of the first affordance, the one or more programs further including instructions for:
    in response to detecting the user selection of the first affordance, displaying a plurality of contact affordances representing a plurality of phone contacts.

5. The electronic device of claim 4, wherein the electronic device has a rotatable input mechanism, the one or more programs further including instructions for:
    detecting user input representing movement of the rotatable input mechanism; and
    scrolling the displayed plurality of contact affordances in accordance with the detected user input.

6. The electronic device of claim 1, wherein the indication comprises text indicating the called phone contact and a duration of the call.

7. The electronic device of claim 1, the one or more programs further including instructions for:
    in response to detecting a user selection of the indication, displaying an end-call affordance, wherein the end-call affordance, when selected, causes the electronic device to end the call.

8. The electronic device of claim 1, wherein the electronic device is configured to communicate with a cellular phone, the one or more programs further including instructions for:
    sending an instruction to the cellular phone instructing the cellular phone to place a phone call.

9. The electronic device of claim 1, the one or more programs further including instructions for:
    obtaining a voicemail message and causing playback of the obtained voicemail message.

10. The electronic device of claim 1, wherein the touch-sensitive display comprises one or more sensors to detect an intensity of touches on the touch-sensitive display, wherein detecting user input comprising at least a selection of a displayed affordance includes:
    detecting a touch on the touch-sensitive display, wherein the touch has a characteristic intensity and is located at a position of one of the displayed first or second affordances;
    determining whether the characteristic intensity exceeds a predetermined threshold intensity;
    in response to a determination that the characteristic intensity exceeds the predetermined threshold intensity:
        ceasing to display the first and second affordances, and
        displaying additional affordances representing additional phone-related operations; and
    in response to a determination that the characteristic intensity does not exceed the predetermined threshold intensity, performing a function associated with the first displayed affordance or the second displayed affordance.

11. The electronic device of claim 1, wherein the electronic device is a wearable electronic device.

12. The electronic device of claim 1, the one or more programs further including instructions for:

in accordance with the determination that a call is in progress, displaying an application-specific persistent indicator.

13. The electronic device of claim 1, wherein the in-call indicator is a fifth affordance that, when selected, causes the electronic device to display an in-call screen for accessing call-related features.

14. The electronic device of claim 1, wherein the electronic device is a wearable electronic device.

15. The electronic device of claim 1, the one or more programs further including instructions for:

in accordance with the determination that a call is in progress, displaying an application-specific persistent indicator.

16. A non-transitory computer-readable storage medium storing one or more programs configured to be executed by one or more processors of an electronic device with a touch-sensitive display, the one or more programs including instructions for:

displaying, on the display, a phone icon;

detecting a user selection of the phone icon;

in response to detecting the user selection of the phone icon:

in accordance with a determination that a call is in progress, displaying an in-call indicator, wherein the in-call indicator includes a call participant identifier and a call duration indicator; and in accordance with a determination that a call is not in progress, displaying:

a first affordance, wherein the first affordance, when selected, causes the electronic device to display a plurality of phone contacts; and a second affordance, wherein the second affordance, when selected, causes the electronic device to display a user-designed subset of the plurality of phone contacts; and while displaying the first affordance and the second affordance, detecting user input comprising at least a selection of a displayed affordance;

in response to detecting the user input, display one or more phone contacts;

initiating a call to a displayed phone contact; and after initiating the call:

displaying the phone icon in response to detecting a second user input;

detecting a second user selection of the displayed phone icon; and in response to detecting the second user selection of the displayed phone icon:

displaying an indication of the initiated call, and at least the first affordance.

17. The computer-readable storage medium of claim 16, the one or more programs further including instructions for:

in response to detecting the user selection of the phone icon, displaying a third affordance, wherein the third affordance, when selected, causes the electronic device to display a plurality of affordances representing voicemail messages.

18. The computer-readable storage medium of claim 16, the one or more programs further including instructions for:

in response to detecting the user selection of the phone icon, displaying a fourth affordance, wherein the fourth affordance, when selected, causes the electronic device to display a plurality of recent calls.

19. The computer-readable storage medium of claim 16, wherein detecting user input comprises detecting a user selection of the first affordance, the one or more programs further including instructions for:

in response to detecting the user selection of the first affordance, displaying a plurality of contact affordances representing a plurality of phone contacts.

20. The computer-readable storage medium of claim 19, wherein the electronic device has a rotatable input mechanism, the one or more programs further including instructions for:

detecting user input representing movement of the rotatable input mechanism; and scrolling the displayed plurality of contact affordances in accordance with the detected user input.

21. The computer-readable storage medium of claim 16, wherein the indication comprises text indicating the called phone contact and a duration of the call.

22. The computer-readable storage medium of claim 16, the one or more programs further including instructions for:

in response to detecting a user selection of the indication, displaying an end-call affordance, wherein the end-call affordance, when selected, causes the electronic device to end the call.

23. The computer-readable storage medium of claim 16, wherein the electronic device is configured to communicate with a cellular phone, the one or more programs further including instructions for:

sending an instruction to the cellular phone instructing the cellular phone to place a phone call.

24. The computer-readable storage medium of claim 16, the one or more programs further including instructions for:

obtaining a voicemail message and causing playback of the obtained voicemail message.

25. The computer-readable storage medium of claim 16, wherein the touch-sensitive display comprises one or more sensors to detect an intensity of touches on the touch-sensitive display, wherein detecting user input comprising at least a selection of a displayed affordance includes:

detecting a touch on the touch-sensitive display, wherein the touch has a characteristic intensity and is located at a position of one of the displayed first or second affordances;

determining whether the characteristic intensity exceeds a predetermined threshold intensity;

in response to a determination that the characteristic intensity exceeds the predetermined threshold intensity:

ceasing to display the first and second affordances, and displaying additional affordances representing additional phone-related operations; and in response to a determination that the characteristic intensity does not exceed the predetermined threshold intensity, performing a function associated with the first displayed affordance or the second displayed affordance.

26. The computer-readable storage medium of claim 16, wherein the in-call indicator is a fifth affordance that, when selected, causes the electronic device to display an in-call screen for accessing call-related features.

27. A method, comprising:

at an electronic device with a touch-sensitive display:

displaying, on the touch-sensitive display, a phone icon;

detecting a user selection of the phone icon;

in response to detecting the user selection of the phone icon:

in accordance with a determination that a call is in progress, displaying an in-call indicator, wherein the in-call indicator includes a call participant identifier and a call duration indicator; and in accordance with a determination that a call is not in progress, displaying:

a first affordance, wherein the first affordance, when selected, causes the electronic device to display a plurality of phone contacts; and a second affordance, wherein the second affordance, when selected, causes the electronic device to display a user-designed subset of the plurality of phone contacts; and while displaying the first affordance and the second affordance, detecting user input comprising at least a selection of a displayed affordance;

in response to detecting the user input, displaying one or more phone contacts;

initiating a call to a displayed phone contact; and after initiating the call:

displaying the phone icon in response to detecting a second user input;

detecting a second user selection of the displayed phone icon; and in response to detecting the second user selection of the displayed phone icon:

displaying an indication of the initiated call, and at least the first affordance.

28. The method of claim 27, further comprising:

in response to detecting the user selection of the phone icon, displaying a third affordance, wherein the third affordance, when selected, causes the electronic device to display a plurality of affordances representing voicemail messages.

29. The method of claim 27, further comprising:

in response to detecting the user selection of the phone icon, displaying a fourth affordance, wherein the fourth affordance, when selected, causes the electronic device to display a plurality of recent calls.

30. The method of claim 27, wherein detecting user input comprises detecting a user selection of the first affordance, the method further comprising:

in response to detecting the user selection of the first affordance, displaying a plurality of contact affordances representing a plurality of phone contacts.

31. The method of claim 30, wherein the electronic device has a rotatable input mechanism, the method further comprising:

detecting user input representing movement of the rotatable input mechanism; and scrolling the displayed plurality of contact affordances in accordance with the detected user input.

32. The method of claim 27, wherein the indication comprises text indicating the called phone contact and a duration of the call.

33. The method of claim 27, the method further comprising:

in response to detecting a user selection of the indication, displaying an end-call affordance, wherein the end-call affordance, when selected, causes the electronic device to end the call.

34. The method of claim 27, wherein the electronic device is configured to communicate with a cellular phone, the method further comprising:

sending an instruction to the cellular phone instructing the cellular phone to place a phone call.

35. The method of claim 27, further comprising:

obtaining a voicemail message and causing playback of the obtained voicemail message.

36. The method of claim 27, wherein the touch-sensitive display comprises one or more sensors to detect an intensity of touches on the touch-sensitive display, wherein detecting user input comprising at least a selection of a displayed affordance includes:

detecting a touch on the touch-sensitive display, wherein the touch has a characteristic intensity and is located at a position of one of the displayed first or second affordances;

determining whether the characteristic intensity exceeds a predetermined threshold intensity;

in response to a determination that the characteristic intensity exceeds the predetermined threshold intensity:

ceasing to display the first and second affordances, and displaying additional affordances representing additional phone-related operations; and in response to a determination that the characteristic intensity does not exceed the predetermined threshold intensity, performing a function associated with the first displayed affordance or the second displayed affordance.

37. The method of claim 27, wherein the electronic device is a wearable electronic device.

38. The method of claim 27, further comprising:

in accordance with the determination that a call is in progress, displaying an application-specific persistent indicator.

39. The method of claim 27, wherein the in-call indicator is a fifth affordance that, when selected, causes the electronic device to display an in-call screen for accessing call-related features.

* * * * *